(12) United States Patent
Kaneda et al.

(10) Patent No.: US 8,102,749 B2
(45) Date of Patent: Jan. 24, 2012

(54) OBJECT LENS, OPTICAL PICKUP, AND OPTICAL DISC DEVICE

(75) Inventors: Kazumasa Kaneda, Kanagawa (JP); Yoshito Asoma, Saitama (JP); Toshifumi Yasui, Saitama (JP); Kazuyuki Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/961,914

(22) Filed: Dec. 7, 2010

(65) Prior Publication Data
US 2011/0075543 A1 Mar. 31, 2011

Related U.S. Application Data

(63) Continuation of application No. 12/142,351, filed on Jun. 19, 2008, now Pat. No. 7,924,684.

(30) Foreign Application Priority Data

Jul. 30, 2007 (JP) ................................ 2007-197961
Nov. 22, 2007 (JP) ................................ 2007-303610
Mar. 12, 2008 (JP) ................................ 2008-063383

(51) Int. Cl.
*G11B 7/00* (2006.01)
(52) U.S. Cl. ......... 369/112.23; 369/112.16; 369/112.12; 369/44.23; 369/44.37
(58) Field of Classification Search ........................ None
See application file for complete search history.

(56) References Cited

U.S. PATENT DOCUMENTS

| | | | |
|---|---|---|---|
| 6,791,933 B1 | 9/2004 | Yoo et al. | |
| 6,834,036 B1 | 12/2004 | Shiono et al. | |
| 6,952,390 B2 | 10/2005 | Mimori | |
| 7,173,895 B2 * | 2/2007 | Arai et al. | 369/112.05 |
| 7,483,358 B2 * | 1/2009 | Kimura et al. | 369/112.26 |
| 2004/0160885 A1 | 8/2004 | Kimura | |
| 2005/0122883 A1 * | 6/2005 | Kimura | 369/112.05 |

FOREIGN PATENT DOCUMENTS

| | | |
|---|---|---|
| JP | 2004-79146 | 3/2004 |
| JP | 2004-265573 | 9/2004 |
| JP | 2004-362626 | 12/2004 |
| JP | 2005-32411 | 2/2005 |
| JP | 2007-294029 | 11/2007 |
| JP | 2009-59407 | 3/2009 |
| WO | WO 2005/091280 A1 | 9/2005 |
| WO | WO 2006/040902 A1 | 4/2006 |
| WO | WO 2006/046465 A1 | 5/2006 |
| WO | WO 2007/013346 A1 | 2/2007 |
| WO | WO 2008/007553 A1 | 1/2008 |

* cited by examiner

OTHER PUBLICATIONS

Office Action issued Mar. 2, 2010, in Japanese Patent Application No. 2008-196640, filed Jul. 30, 2008.

*Primary Examiner* — Muhammad N Edun
(74) *Attorney, Agent, or Firm* — Oblon, Spivak, McClelland, Maier & Neustadt, L.L.P.

(57) ABSTRACT

An optical pickup includes: a first emitting unit to emit an optical beam of a first wavelength; a second emitting unit to emit an optical beam of a second wavelength; a third emitting unit to emit an optical beam of a third wavelength; an object lens to condense optical beams emitted from the first through third emitting units onto a signal recording face of an optical disc; and a diffraction unit provided on one face of an optical element or the object lens positioned on the optical path of the optical beams of the first through third wavelengths; wherein the diffraction unit includes a generally circular first diffraction region provided on the innermost perimeter, a ring zone shaped second diffraction region provided on the outer side of the first diffraction region, and a ring zone shaped third diffraction region provided on the outer side of the second diffraction region.

28 Claims, 55 Drawing Sheets

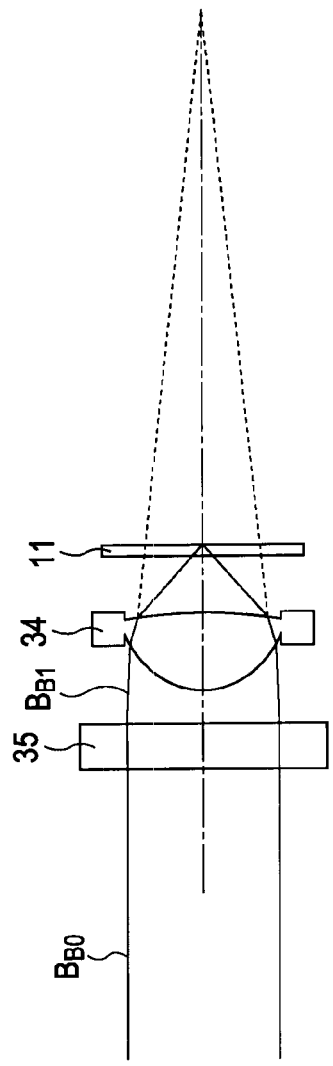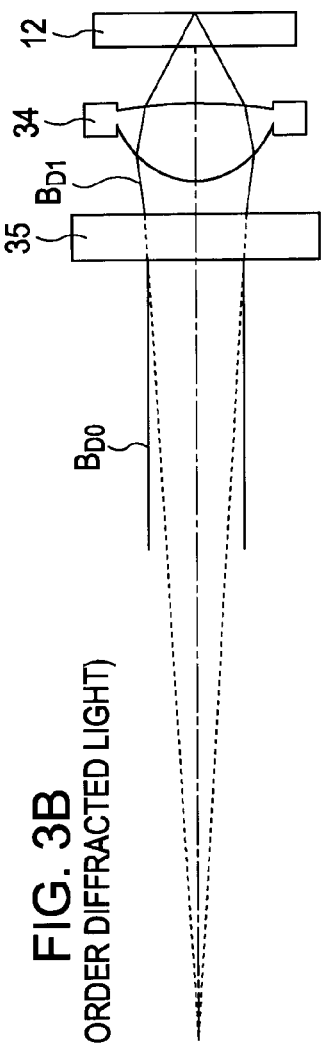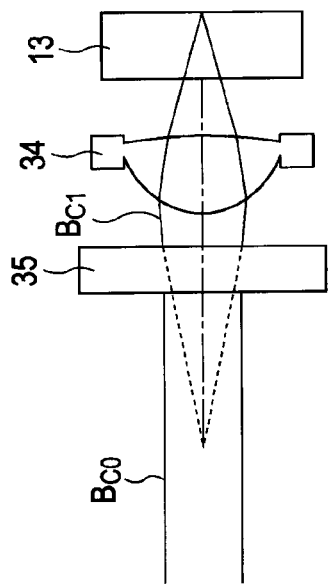
FIG. 3A (+1 ORDER DIFFRACTED LIGHT)
FIG. 3B (−1 ORDER DIFFRACTED LIGHT)
FIG. 3C (−2 ORDER DIFFRACTED LIGHT)

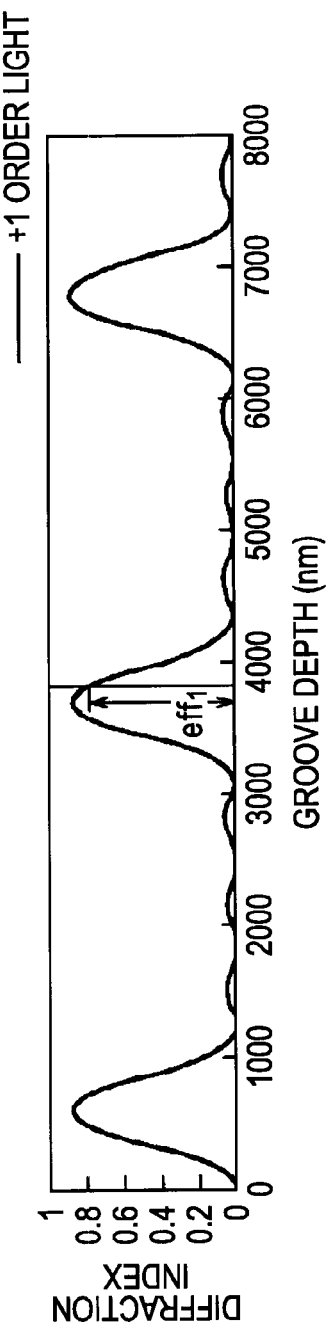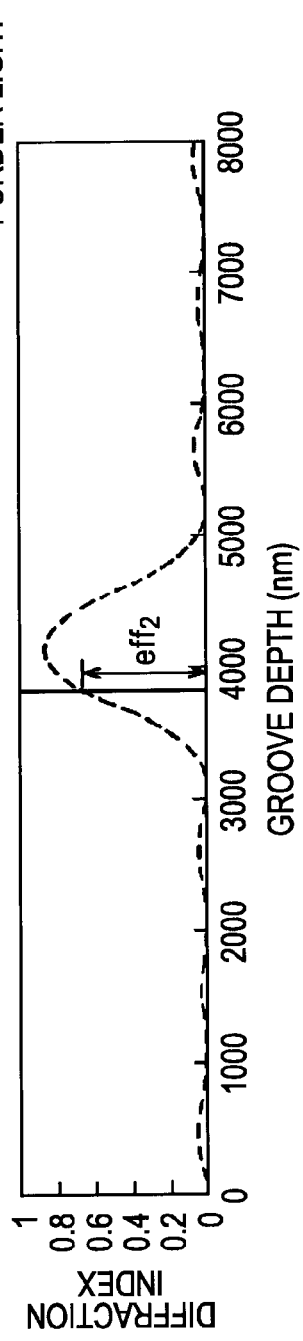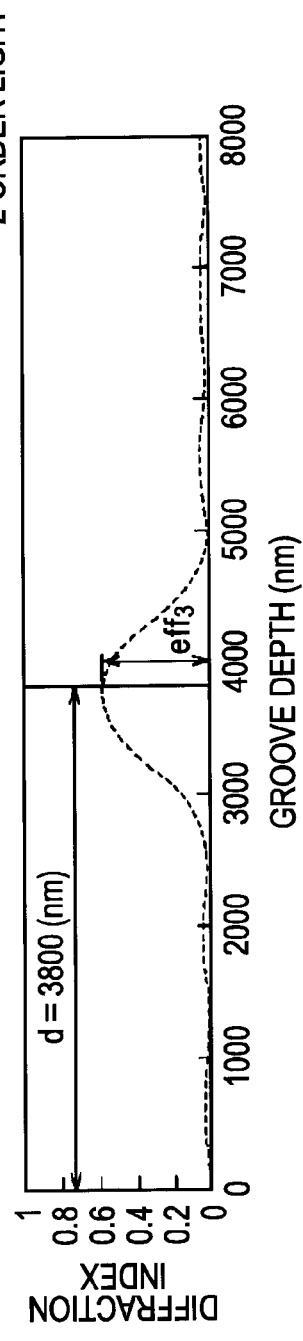
FIG. 7A
WAVELENGTH
405 nm, S=4
FIG. 7B
WAVELENGTH
655 nm, S=4
FIG. 7C
WAVELENGTH
785 nm, S=4

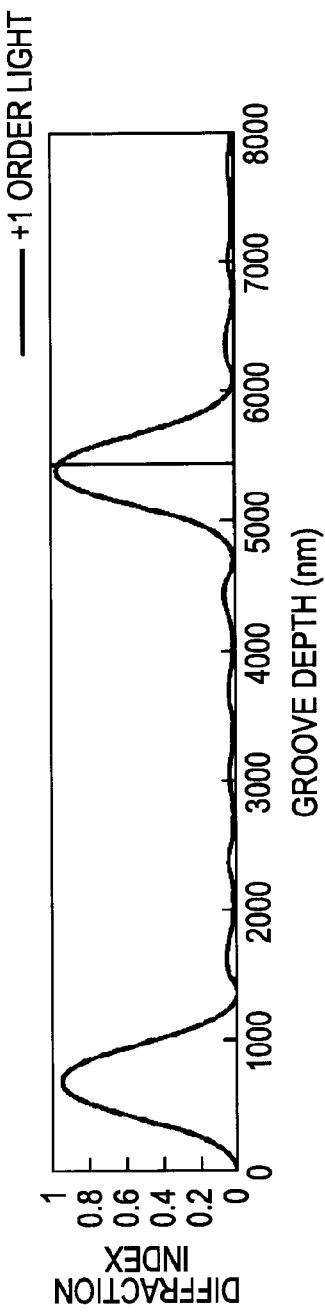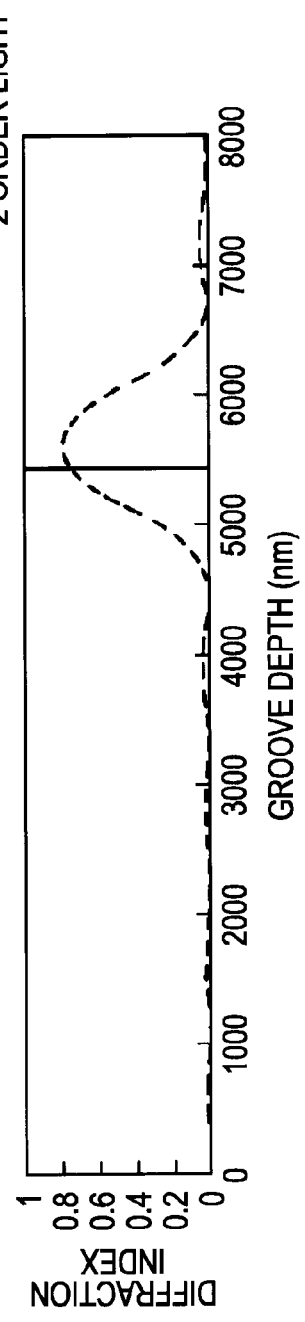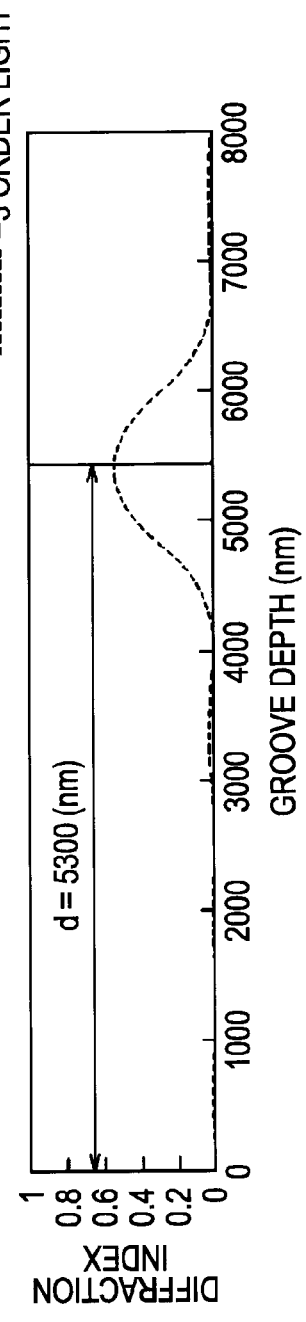
FIG. 8A WAVELENGTH 405 nm, S=6
FIG. 8B WAVELENGTH 655 nm, S=6
FIG. 8C WAVELENGTH 785 nm, S=6

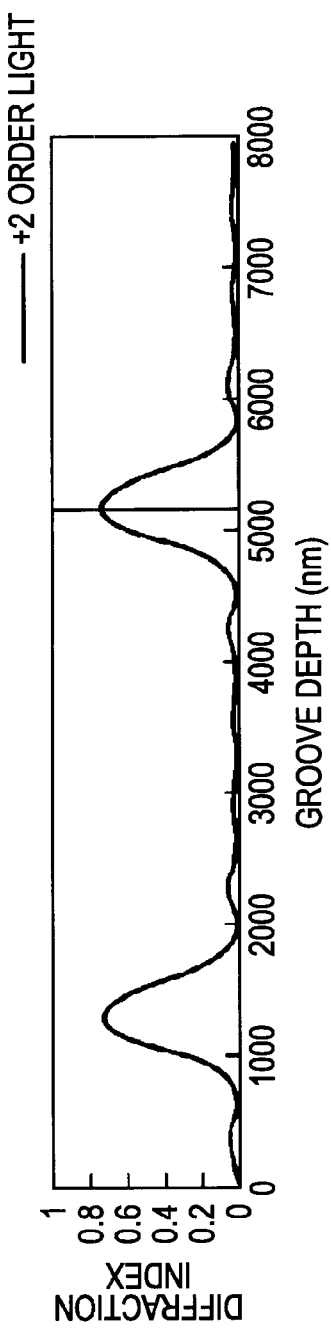
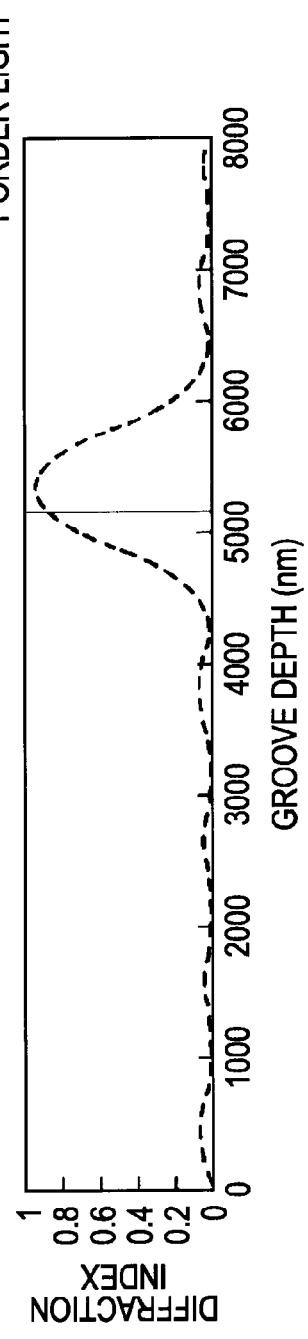
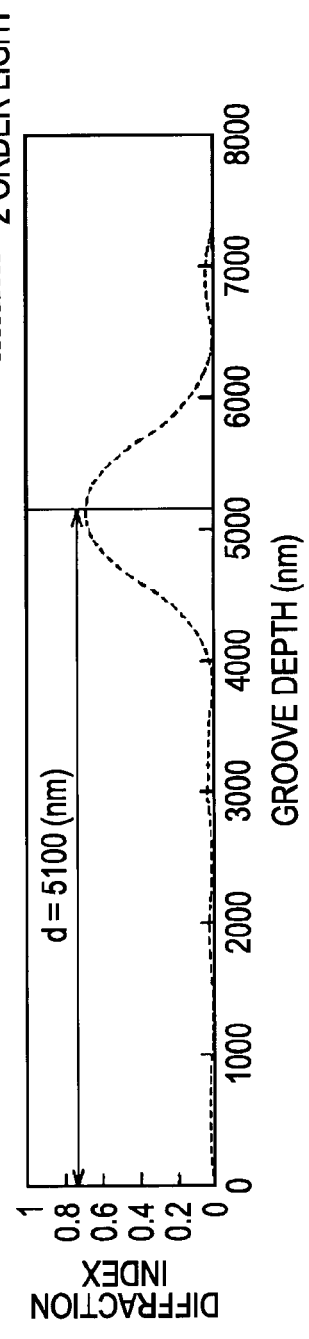
FIG. 9A WAVELENGTH 405 nm, S=5
FIG. 9B WAVELENGTH 655 nm, S=5
FIG. 9C WAVELENGTH 785 nm, S=5

WAVELENGTH
405 nm, S=6

WAVELENGTH
655 nm, S=6

WAVELENGTH
785 nm, S=6

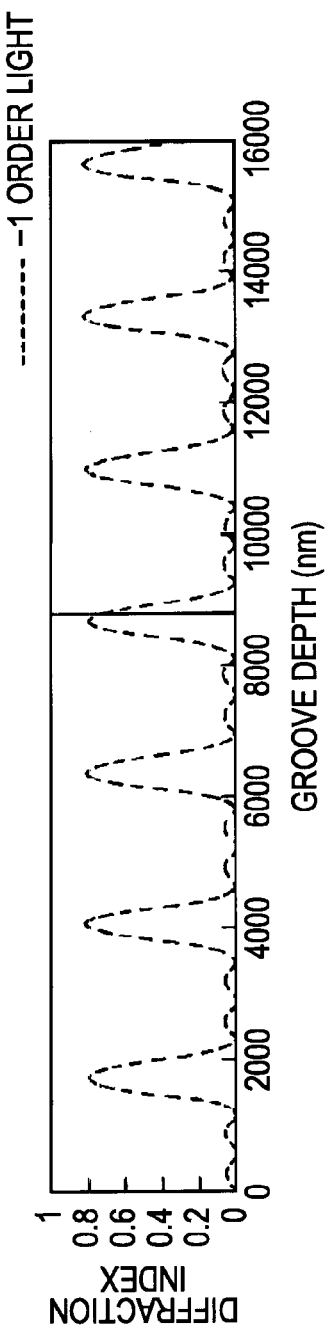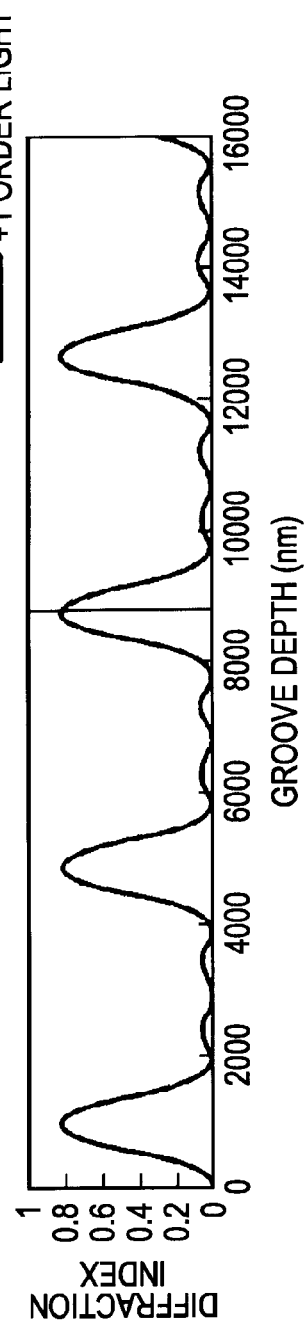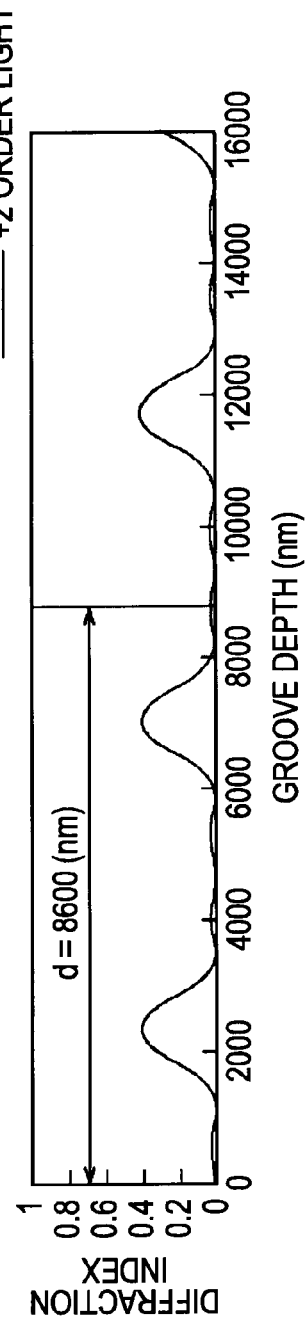

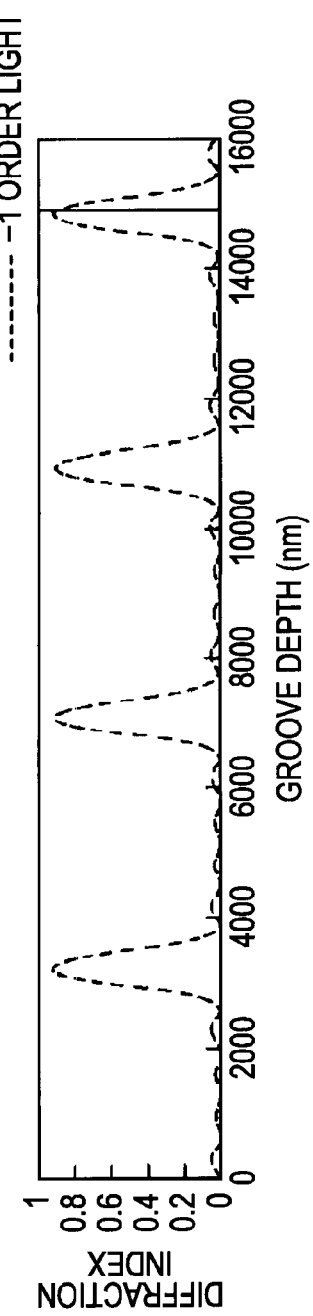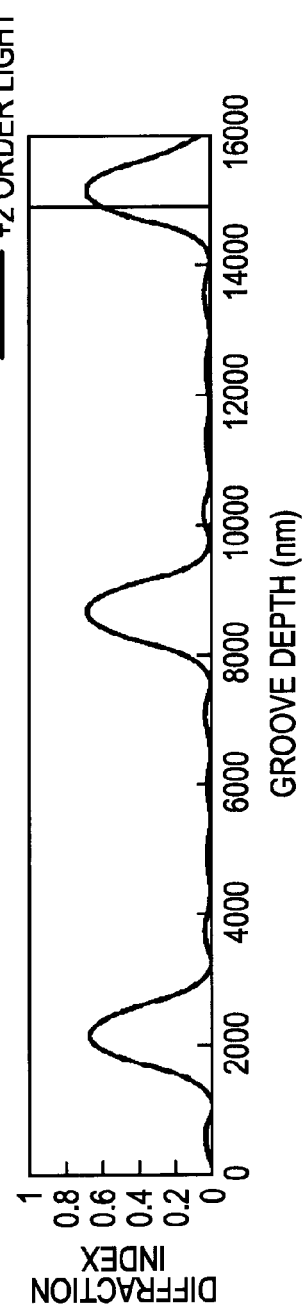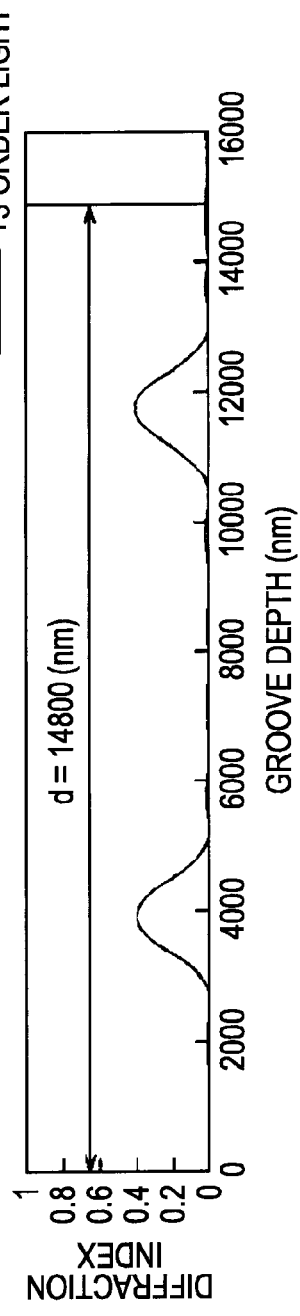
FIG. 12A WAVELENGTH 405 nm, S=5
FIG. 12B WAVELENGTH 655 nm, S=5
FIG. 12C WAVELENGTH 785 nm, S=5

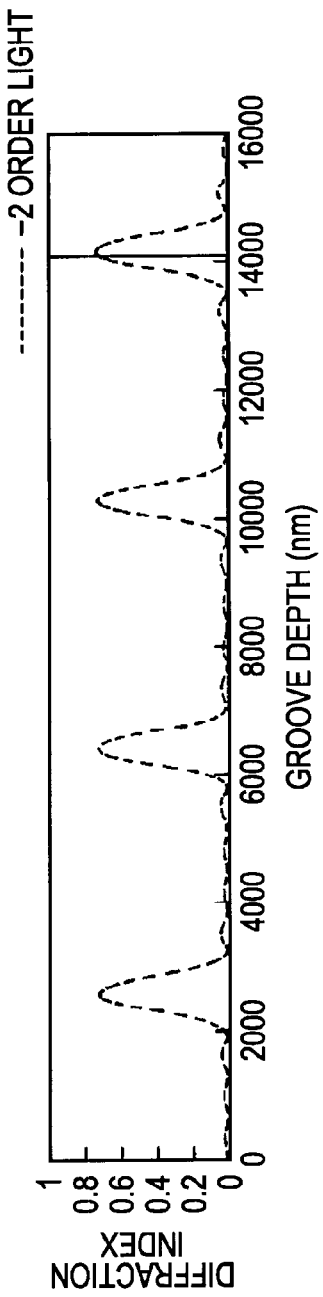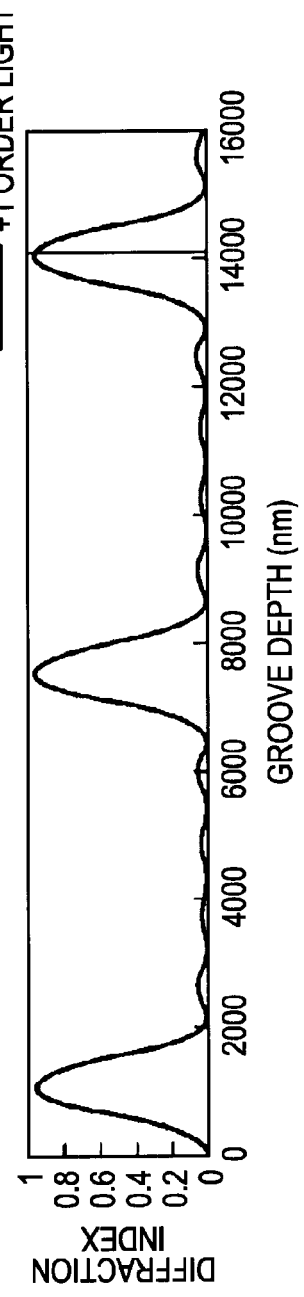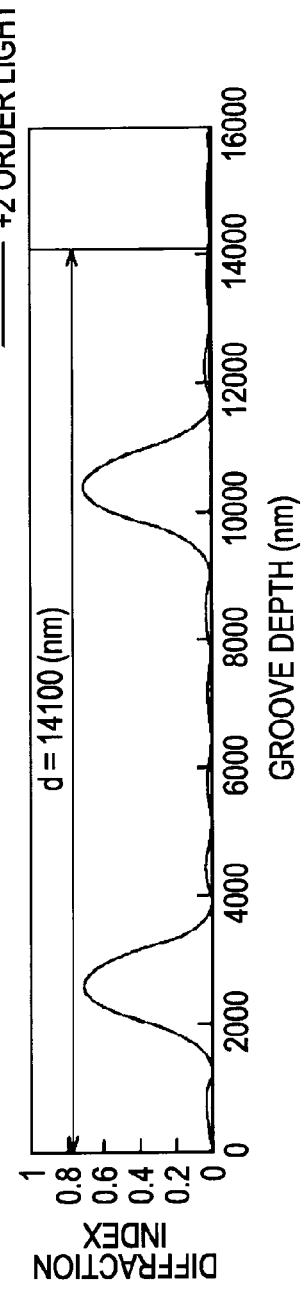
FIG. 13A WAVELENGTH 405 nm, S=5
FIG. 13B WAVELENGTH 655 nm, S=5
FIG. 13C WAVELENGTH 785 nm, S=5

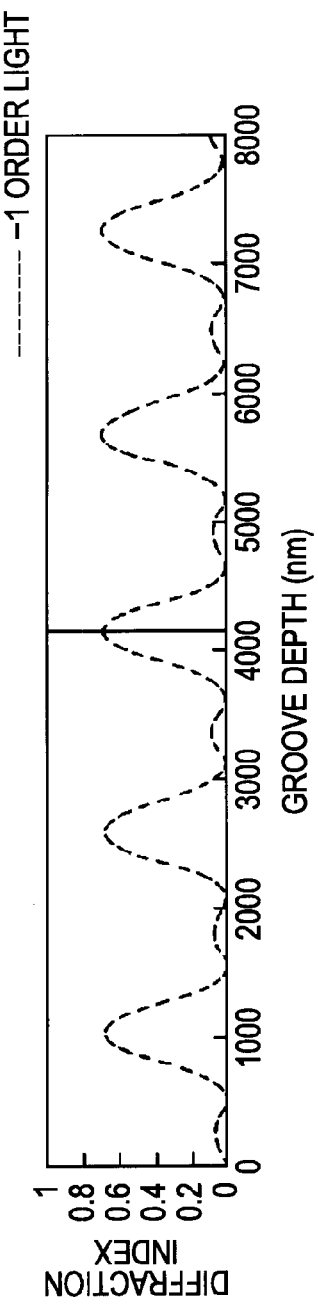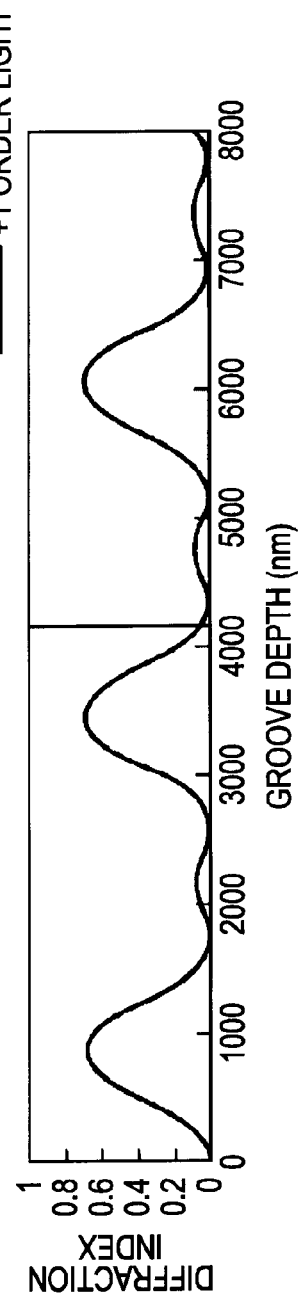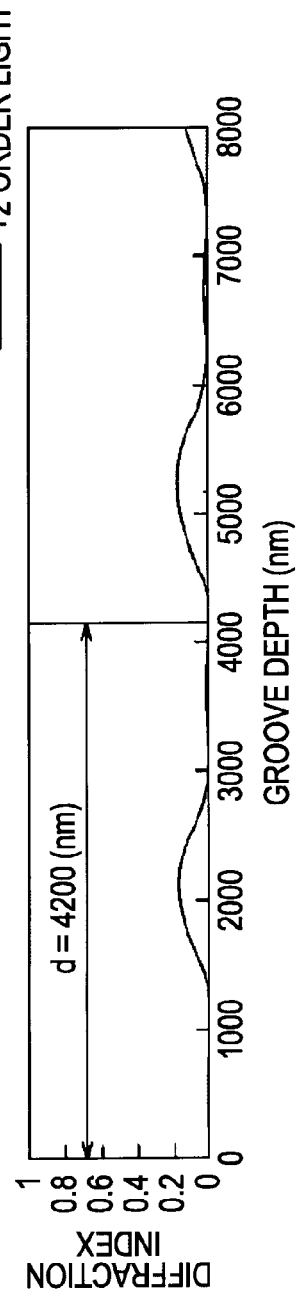
FIG. 14A
WAVELENGTH
405 nm, S=2
FIG. 14B
WAVELENGTH
655 nm, S=2
FIG. 14C
WAVELENGTH
785 nm, S=2

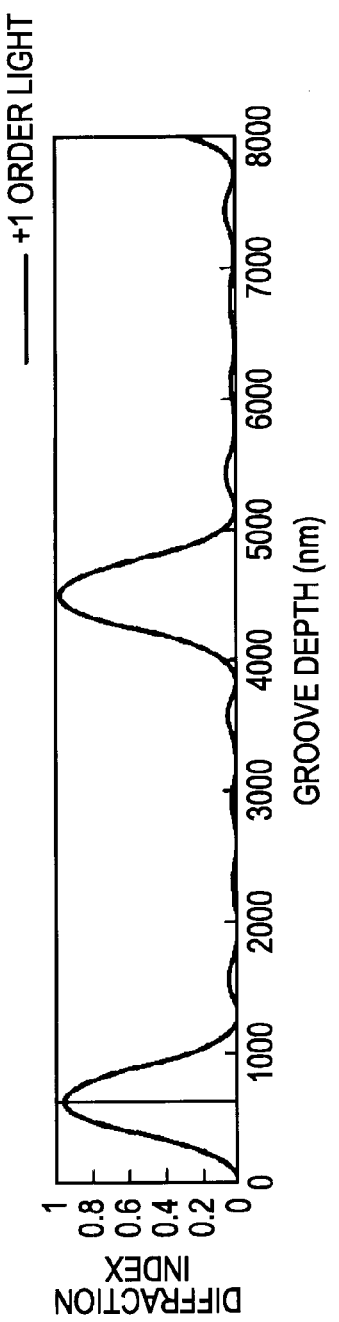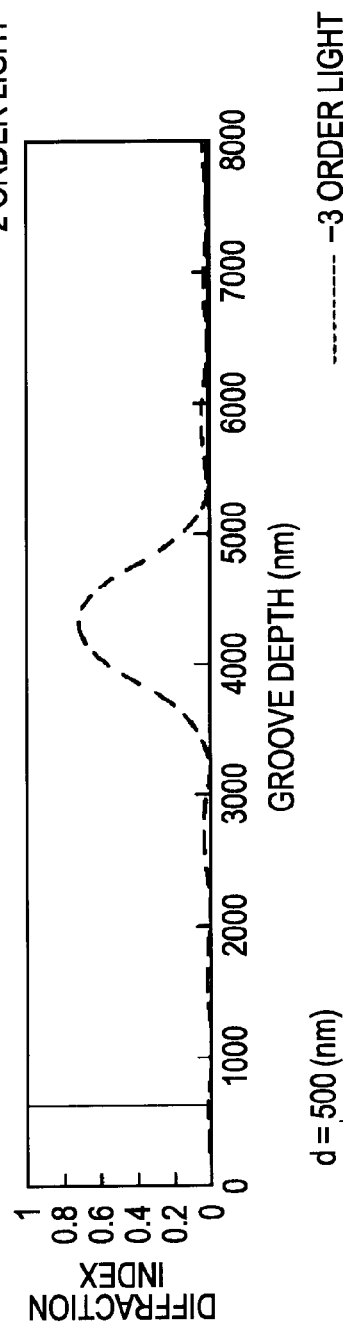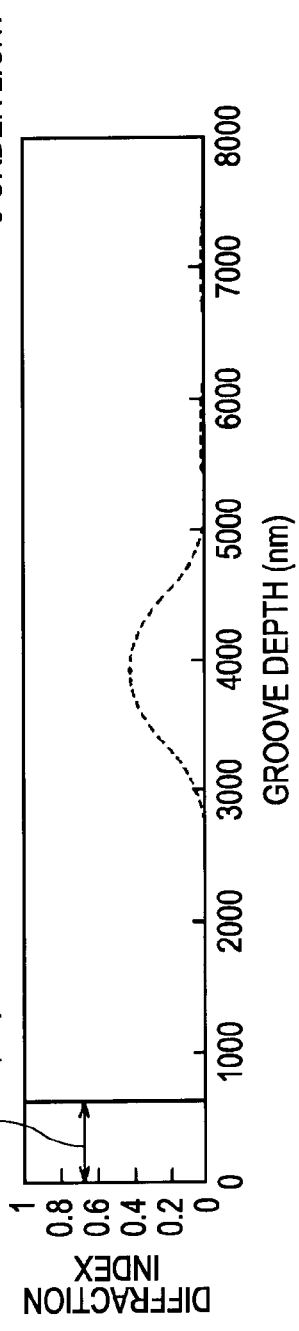
FIG. 15A WAVELENGTH 405 nm, S=5
FIG. 15B WAVELENGTH 655 nm, S=5
FIG. 15C WAVELENGTH 785 nm, S=5

WAVELENGTH
405 nm, S=5

WAVELENGTH
655 nm, S=5

WAVELENGTH
785 nm, S=5

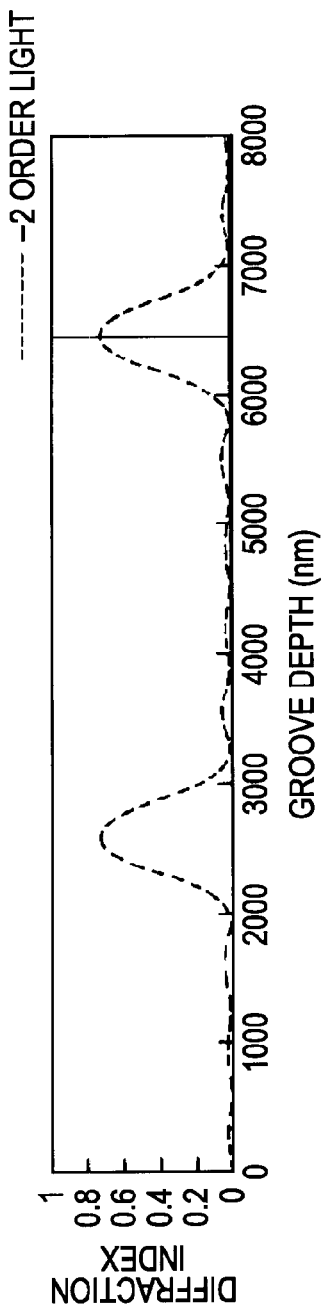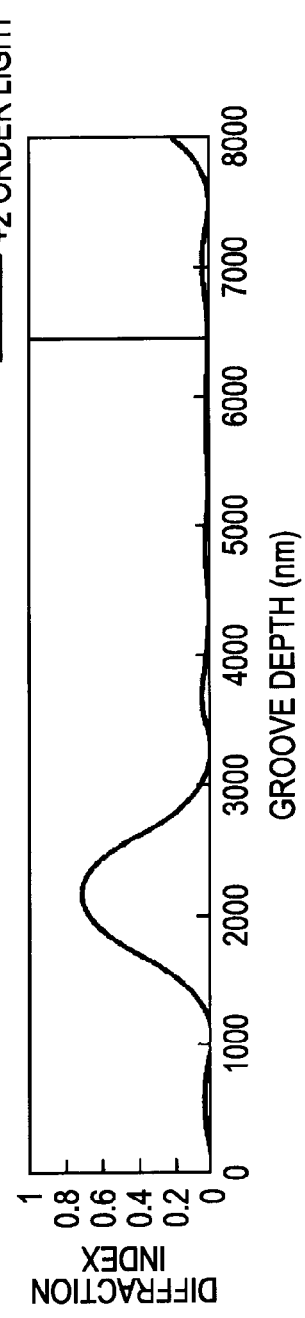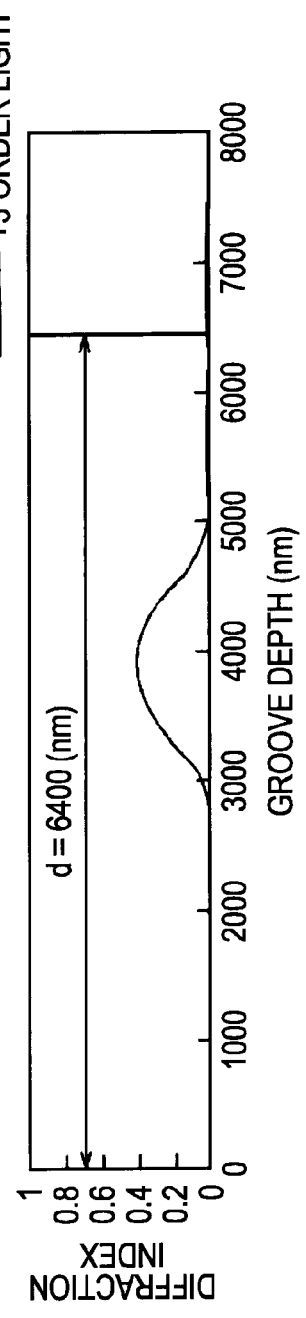
FIG. 17A
WAVELENGTH
405 nm, S=5
FIG. 17B
WAVELENGTH
655 nm, S=5
FIG. 17C
WAVELENGTH
785 nm, S=5

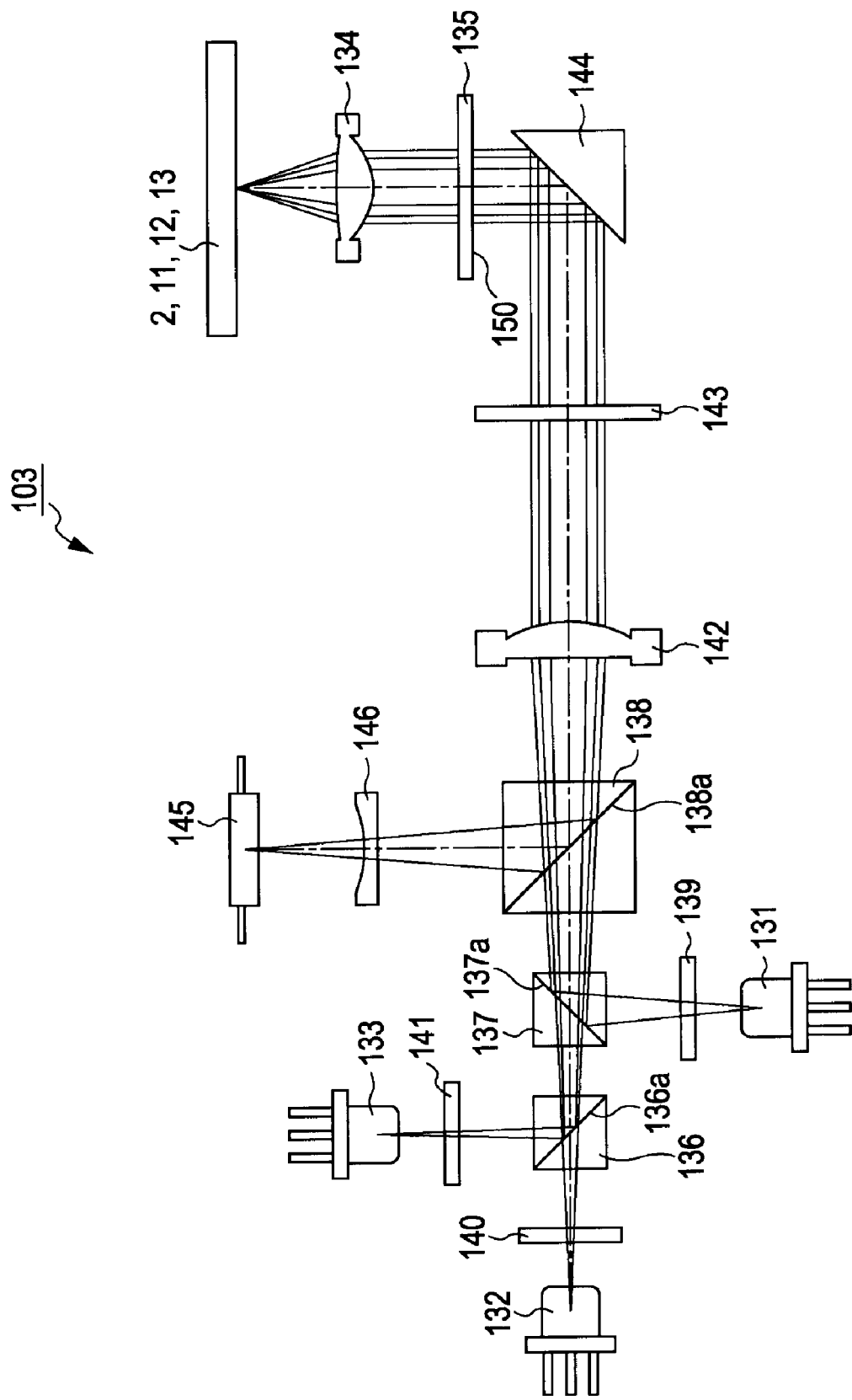

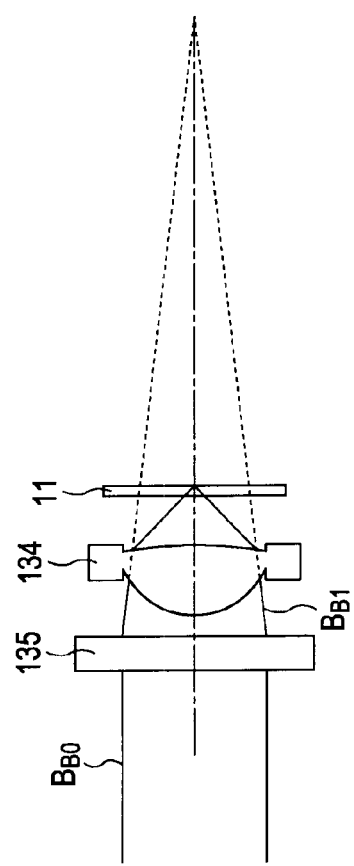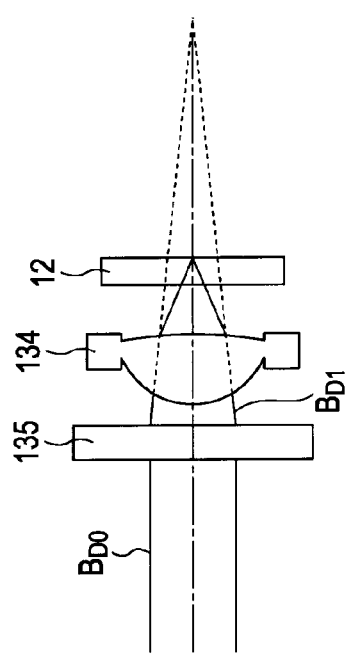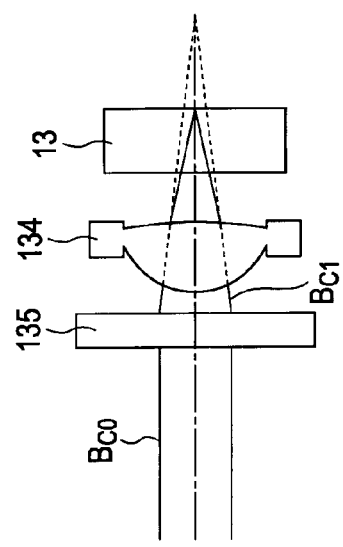
FIG. 21A
(+1 ORDER DIFFRACTED LIGHT)
FIG. 21B
(+1 ORDER DIFFRACTED LIGHT)
FIG. 21C
(+1 ORDER DIFFRACTED LIGHT)

(S=3)

(S=2)

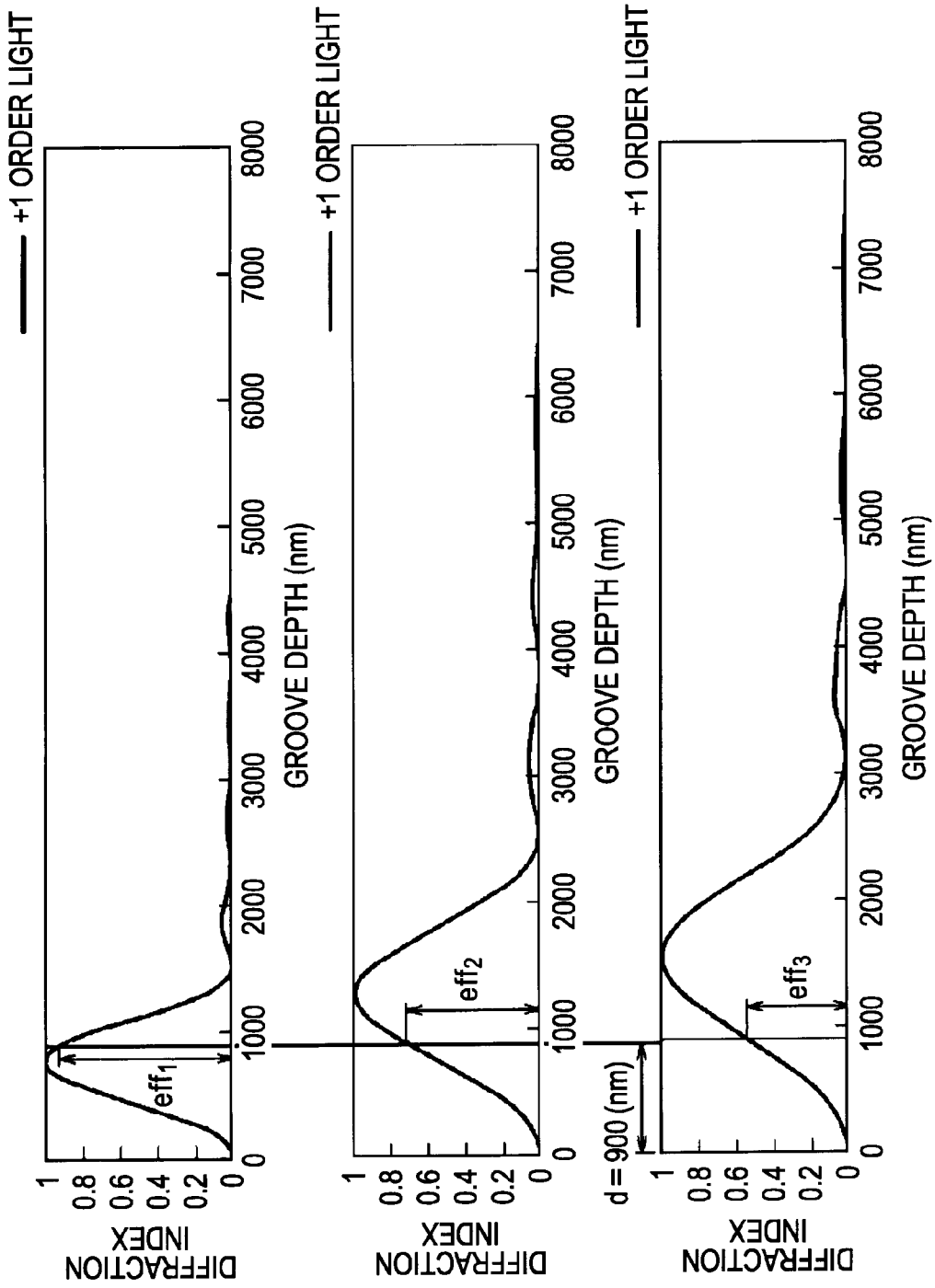
FIG. 27A WAVELENGTH 405 nm, S=∞
FIG. 27B WAVELENGTH 655 nm, S=∞
FIG. 27C WAVELENGTH 785 nm, S=∞

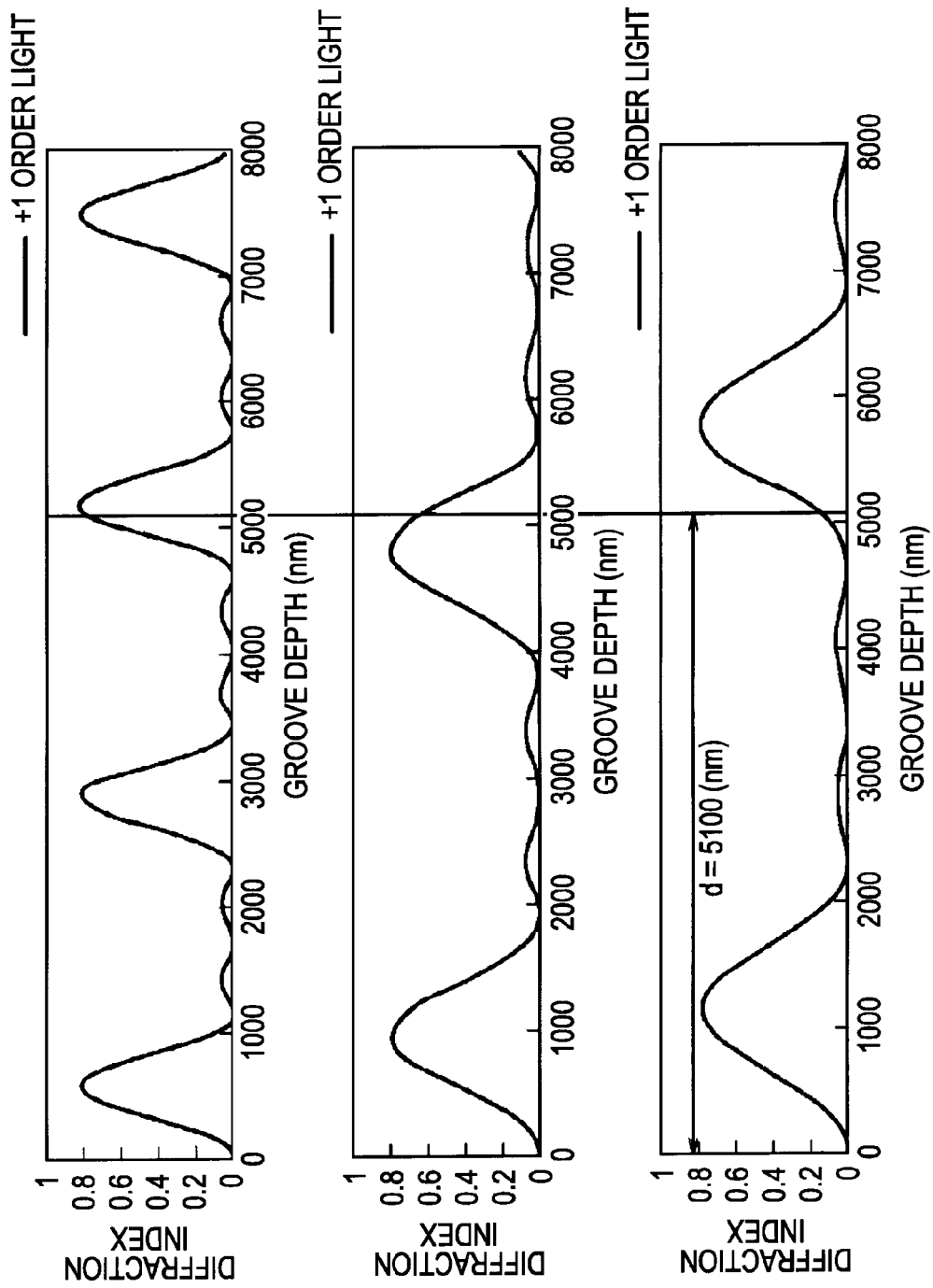
FIG. 28A WAVELENGTH 405 nm, S=3
FIG. 28B WAVELENGTH 655 nm, S=3
FIG. 28C WAVELENGTH 785 nm, S=3

WAVELENGTH
405 nm, S=∞

WAVELENGTH
655 nm, S=∞

WAVELENGTH
785 nm, S=∞

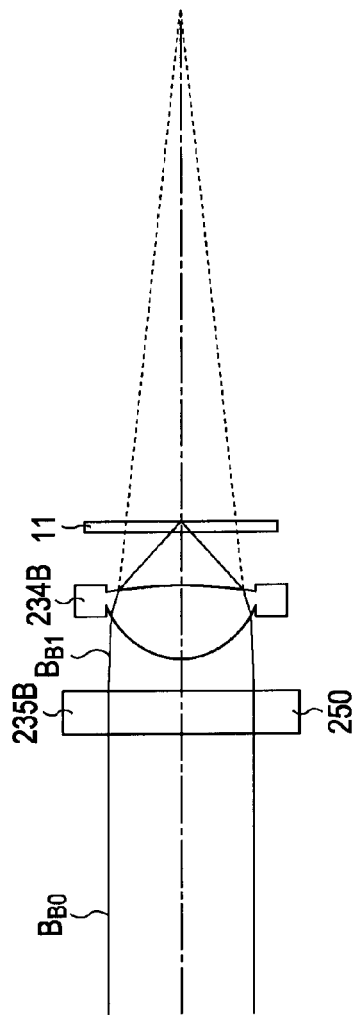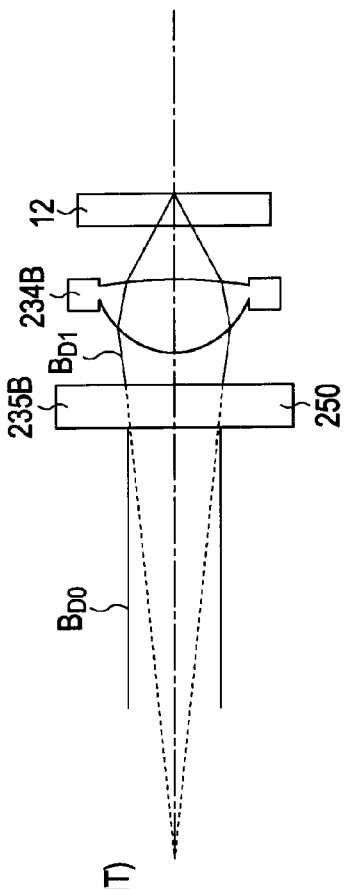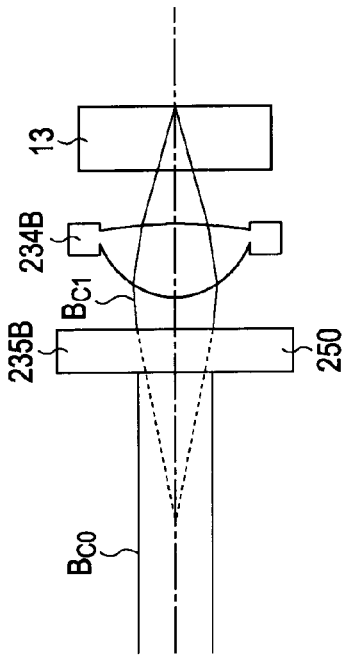
FIG. 38A (+1 ORDER DIFFRACTED LIGHT)
FIG. 38B (−1 ORDER DIFFRACTED LIGHT)
FIG. 38C (−2 ORDER DIFFRACTED LIGHT)

WAVELENGTH
405 nm, S=4

WAVELENGTH
655 nm, S=4

WAVELENGTH
785 nm, S=4

WAVELENGTH
405 nm, S=∞

WAVELENGTH
655 nm, S=∞

WAVELENGTH
785 nm, S=∞

(S=5)

FIG. 53A WAVELENGTH 405 nm, S=5

FIG. 53B WAVELENGTH 655 nm, S=5

FIG. 53C WAVELENGTH 785 nm, S=5

FIG. 54A WAVELENGTH 405 nm, S=∞

FIG. 54B WAVELENGTH 655 nm, S=∞

FIG. 54C WAVELENGTH 785 nm, S=∞

OBJECT LENS, OPTICAL PICKUP, AND
OPTICAL DISC DEVICE

CROSS REFERENCES TO RELATED APPLICATIONS

This application is a continuation application of U.S. Ser. No. 12/142,351 filed Jun. 19, 2008, which contains subject matter related to Japanese Patent Application JP 2007-197961 filed in the Japanese Patent Office on Jul. 30, 2007, Japanese Patent Application JP 2008-063383 filed in the Japanese Patent Office on Mar. 12, 2008, and Japanese Patent Application JP 2007-303610 filed in the Japanese Patent Office on Nov. 22, 2007, the entire contents of which are incorporated herein by reference.

BACKGROUND OF THE INVENTION

1. Field of the Invention

The present invention relates to an object lens used with an optical pickup for recording and/or playing information signals to and/or from three different types of optical discs, the optical pickup, and an optical disc device using the optical pickup.

2. Description of the Related Art

As of recent, there has been proposed, as a next-generation optical disc format, an optical disc capable of high density recording, wherein signals are recorded and played using an optical beam of blue-violet semiconductor laser beam having a wavelength around 405 nm (hereafter referred to as "high density recording optical disc"). This high density recording optical disc is being proposed with a structure wherein the cover layer for protecting the signal recording layer is thin, 0.1 mm for example.

In providing an optical pickup compatible with such high density recording optical discs, compatibility with CDs (Compact Discs) using a wavelength around 785 nm and DVDs (Digital Versatile Discs) using a wavelength around 655 nm, according to the related art, is desirable. That is to say, there is demand for an optical pickup and optical disc device having compatibility among optical discs of multiple formats with different disc structures and accordingly different laser specifications.

There has been related art which realizes recoding or playing of information signals to/from three types of optical discs of different formats, such as that shown in FIG. 60, for example. This arrangement involves having two types of object lenses and two types of optical systems, one corresponding to DVD and CD, and the other to high density recording optical discs, with the object lenses being switched over according to the wavelength being used.

An optical pickup 430 shown in FIG. 60 realizes recording and/or playing to and/or from optical discs of different types, by having two types of object lenses, object lens 433 and object lens 434. The optical pickup 430 has a light source unit 432, such as a laser diode or the like, including an emitting unit for emitting an optical beam of a wavelength around 785 nm for optical discs such as CDs and an emitting unit for emitting an optical beam of a wavelength around 655 nm for optical discs such as DVDs, a light source unit 431, such as a laser diode or the like, including an emitting unit for emitting an optical beam of a wavelength around 405 nm for high density recording optical discs, an object lens 434 for optical discs such as DVDs and CDs, and an object lens 433 for high density recording optical discs. The optical pickup also has collimator lenses 442A and 442B, quarter-wave plates 443A and 443B, redirecting mirrors 444A and 444B, beam splitters 437 and 438, gratings 439 and 440, a photosensor 445, a multi-lens 446, and so forth.

An optical beam of a wavelength around 785 nm emitted from the light source 432 is transmitted through the beam splitter 437 and beam splitter 438, and is input to the object lens 434. The object lens 434 condenses the beam onto the signal recording face of the optical disc having a protective layer (cover layer) 1.1 mm thick.

In the same way, the optical beam of a wavelength around 655 nm emitted from the light source 432 is input to the object lens 434 via exactly the same optical path, and is condensed onto the signal recording face of the optical disc having a protective layer 0.6 mm thick. Return light of a wavelength of 785 nm and of a wavelength of 655 nm reflected off of the signal recording face of the optical disc passes through the beam splitter 438, and is detected by the photosensor 445 having a photodetector or the like.

An optical beam of a wavelength around 405 nm emitted from the light source 431 is reflected at the beam splitter 437, and is input to the object lens 433 via the beam splitter 438. The object lens 433 condenses the beam onto the signal recording face of the optical disc having a protective layer 0.1 mm thick. Return light of a wavelength of 405 nm reflected off of the signal recording face of the optical disc is detected at the photosensor 445 via the beam splitter 438.

Thus, the optical pickup shown in FIG. 60 realizes recording and/or playing of three different types of optical discs by having two types of object lenses, the object lens 434 for DVDs and CDs, and the object lens 433 for high density recording optical discs, thereby realizing compatibility between multiple types of optical discs.

SUMMARY OF THE INVENTION

However, optical pickups according to the related art such as described above have the following problems. First, each optical disc has a different optimal inclination of object lens, and with the above-described optical pickup, using two object lenses 433 and 434 means that the attachment angle of the actuator of the object lenses 433 and 434 to lens holders may be unsuitable, resulting in a situation wherein an optimal object lens inclination cannot be realized as to an optical disc, resulting in deterioration in quality of played signals. Also, with the above-described optical pickup, increase in the number of parts which need to be placed along the optical path of each of the two optical systems, such as redirecting mirrors, collimator lenses, quarter-wave plates, and so on, is necessitated due to using the two object lenses 433 and 434, causing the problem of increased cost and increased size of the optical pickup. Further, with the above-described optical pickup, there is the need to mount the two object lenses 433 and 434 on an object lens driving actuator, resulting in a heavier actuator, of which the sensitivity is thus lowered.

As opposed to this arrangement, there is being studied an optical pickup wherein the above problems are solved and further optical parts are simplified, by having a single object lens used in common by the multiple types of optical discs and the three types of wavelengths. A basic principle for providing an object lens corresponding to optical beams of the three types of wavelengths is to provide a diffraction unit such as a diffraction optical element in the optical path upstream of the object lens, thereby inputting the beam into the object lens in the state of diffusion/convergent light, thereby correcting spherical aberration occurring due to the combination of usage wavelength and the media.

However, with the optical pickup being studied according to the related art, the structure has involved diffraction units being provided on multiple faces, or the diffractive face having a spherical face shape differing from the spherical face of the object lens, or there being a need to provide a liquid crystal device having a complex configuration in the optical path upstream of the object lens. However, each of these configurations have the lens units, diffraction units, liquid crystal devices, etc., individually formed and then later assembled, meaning that a rather high level of precision is necessary for positioning these and adhering multiple diffraction faces, leading to more and increasingly troublesome and complicated steps in manufacturing, and problems of failure to meet the necessary precision.

Also, for example, there has been proposed in Japanese Unexamined Patent Application Publication No. 2004-265573 an optical pickup wherein a diffraction unit is provided on the entire face, but this has only been successful in realizing compatibility of two wavelengths. In order to realize compatibility of three wavelengths, there is the need to separately provide an object lens corresponding to the other wavelength, and increase in the number of optical parts, and accordingly increased complication of the arrangement, has been a problem.

There has been realized the need to provide an object lens and condensing optical device used in an optical pickup realizing recording and/or playing information signals by condensing optical beams on three types of optical discs with different usage wavelengths, using a single shared object lens, without a complicated configuration, the optical pickup, and an optical disc device using the optical pickup.

An object lens, according to an embodiment of the present invention, used with an optical pickup configured to irradiate optical beams on at least a first optical disc, a second optical disc of a different type from the first optical disc, and a third optical disc of a different type from the first and second optical discs, so as to record and/or play information signals, with the object lens condensing an optical beam of a first wavelength corresponding to the first optical disc, an optical beam of a second wavelength which is longer than the first wavelength, corresponding to the second optical disc, and an optical beam of a third wavelength which is longer than the second wavelength, corresponding to the third optical disc, onto a signal recording face of a corresponding optical disc, the object lens including: a diffraction unit provided on the input side face or output side face; wherein the diffraction unit includes a generally circular first diffraction region provided on the innermost perimeter, a ring zone shaped second diffraction region provided on the outer side of the first diffraction region, and a ring zone shaped third diffraction region provided on the outer side of the second diffraction region; wherein the first diffraction region has a first diffraction structure formed in a ring zone shape and having a predetermined depth, which emits diffracted light of an order of the optical beam of the first wavelength which passes therethrough and is condensed on the signal recording face of the first optical disc via the object lens, emits diffracted light of an order of the optical beam of the second wavelength which passes therethrough and is condensed on the signal recording face of the second optical disc via the object lens, and emits diffracted light of an order of the optical beam of the third wavelength which passes therethrough and is condensed on the signal recording face of the third optical disc via the object lens; and wherein the second diffraction region has a second diffraction structure which is different from the first diffraction structure formed in a ring zone shape and having a predetermined depth, which emits diffracted light of an order of the optical beam of the first wavelength which passes therethrough and is condensed on the signal recording face of the first optical disc via the object lens, emits diffracted light of an order of the optical beam of the second wavelength which passes therethrough and is condensed on the signal recording face of the second optical disc via the object lens, and emits diffracted light such that diffracted light of an order other than the order of the optical beam of the third wavelength which passes therethrough and is condensed on the signal recording face of the third optical disc via the object lens is dominant; and wherein the third diffraction region has a third diffraction structure which is different from the first and second diffraction structures formed in a ring zone shape and having a predetermined depth, which emits diffracted light of an order of the optical beam of the first wavelength which passes therethrough and is condensed on the signal recording face of the first optical disc via the object lens, emits diffracted light such that diffracted light of an order other than the order of the optical beam of the second wavelength which passes therethrough and is condensed on the signal recording face of the second optical disc via the object lens is dominant, and emits diffracted light such that diffracted light of an order other than the order of the optical beam of the third wavelength which passes therethrough and is condensed on the signal recording face of the third optical disc via the object lens is dominant.

An optical pickup according to an embodiment of the present invention includes: a first emitting unit configured to emit an optical beam of a first wavelength corresponding to a first optical disc; a second emitting unit configured to emit an optical beam of a second wavelength which is longer than the first wavelength, corresponding to a second optical disc which is different from the first optical disc; a third emitting unit configured to emit an optical beam of a third wavelength which is longer than the second wavelength, corresponding to a third optical disc which is different from the first and second optical discs; and an object lens configured to condense optical beams emitted from the first through third emitting units onto a signal recording face of an optical disc; and a diffraction unit provided on one face of an optical element or the object lens positioned on the optical path of the optical beams of the first through third wavelengths; wherein the diffraction unit includes a generally circular first diffraction region provided on the innermost perimeter, a ring zone shaped second diffraction region provided on the outer side of the first diffraction region, and a ring zone shaped third diffraction region provided on the outer side of the second diffraction region; wherein the first diffraction region has a first diffraction structure formed in a ring zone shape and having a predetermined depth, which emits diffracted light of an order of the optical beam of the first wavelength which passes therethrough and is condensed on the signal recording face of the first optical disc via the object lens, emits diffracted light of an order of the optical beam of the second wavelength which passes therethrough and is condensed on the signal recording face of the second optical disc via the object lens, and emits diffracted light of an order of the optical beam of the third wavelength which passes therethrough and is condensed on the signal recording face of the third optical disc via the object lens; and wherein the second diffraction region has a second diffraction structure which is different from the first diffraction structure formed in a ring zone shape and having a predetermined depth, which emits diffracted light of an order of the optical beam of the first wavelength which passes therethrough and is condensed on the signal recording face of the first optical disc via the object lens, emits diffracted light of an order of the optical beam of the second wavelength which passes therethrough and is condensed on the signal recording face of the second optical disc via the object lens, and emits diffracted light such that diffracted light of an order other than the order of the optical beam of the third wavelength which passes therethrough and is condensed on the signal recording face of the third optical disc via the object lens is dominant; and wherein the third diffraction region has a third diffraction structure which is different from the first and second diffraction structures formed in a ring zone shape and having a predetermined depth, which emits diffracted light of an order of the optical beam of the first wavelength which passes therethrough and is condensed on the signal recording face of the first optical disc via the object lens, emits diffracted light such that diffracted light of an order other than the order of the optical beam of the second wavelength which passes therethrough and is condensed on the signal recording face of the second optical disc via the object lens is dominant, and emits diffracted light such that diffracted light of an order other than the order of the optical beam of the third wavelength which passes therethrough and is condensed on the signal recording face of the third optical disc via the object lens is dominant.

An optical disc device according to the present invention includes: a driving unit configured to hold and rotationally drive an optical disc optionally selected from at least a first optical disc, a second optical disc of a different type from the first optical disc, and a third optical disc of a different type from the first and second optical discs; and an optical pickup configured to selectively irradiate multiple optical beams of different wavelengths to an optical disc rotationally driven by the driving unit, so as to record and/or play information signals the optical pickup used with the optical disc device being such as described above.

According to the above configurations, due to a diffraction unit provided on one face of an optical element disposed on an optical path between an emitting unit emitting optical beams and the signal recording face of an optical disc, optical beams corresponding to each of the types of optical discs having different usage wavelengths can be suitably condensed on the signal recording faces thereof with a single shared object lens, thereby realizing three-wavelength compatibility with a common object lens, and realizing excellent recording and/or playing of signals to and from each optical disc, without a complicated structure.

BRIEF DESCRIPTION OF THE DRAWINGS

FIGS. 3A and 3B are diagram for describing the functions of a diffraction optical element and object lens configuring the optical pickup shown in FIG. 2, wherein FIG. 3A is a diagram illustrating an optical beam in a case of generating +1 order diffracted light of an optical beam of a first wavelength as to a first optical disc for example, FIG. 3B is a diagram illustrating an optical beam in a case of generating −1 order diffracted light of an optical beam of a second wavelength as to a second optical disc for example, and FIG. 3C is a diagram illustrating an optical beam in a case of generating −2 order diffracted light of an optical beam of a third wavelength as to a third optical disc for example;

FIGS. 5A through 5C are diagrams for describing the configuration of the diffraction unit provided on one face of the diffraction optical element shown in FIG. 4, wherein FIG. 5A is a cross-sectional view illustrating an example of a first diffraction region provided as an inner ring zone of the diffraction unit, FIG. 5B is a cross-sectional view illustrating an example of a second diffraction region provided as a middle ring zone of the diffraction unit, and FIG. 5C is a cross-sectional view illustrating an example of a third diffraction region provided as an outer ring zone of the diffraction unit;

FIGS. 7A through 7C show graphs for calculating the diffraction efficiency of an inner ring zone configuration example 1 according to the first embodiment, illustrating the change in the diffraction efficiency of the optical beams of each wavelength as to change in the groove depth d in a case wherein S=4, and (k1$i$, k2$i$, k3$i$)=(+1, −1, −2);

FIGS. 8A through 8C show graphs for calculating the diffraction efficiency of an inner ring zone configuration example 2 according to the first embodiment, illustrating the change in the diffraction efficiency of the optical beams of each wavelength as to change in the groove depth d in a case wherein S=6, and (k1$i$, k2$i$, k3$i$)=(+1, −2, −3);

FIGS. 9A through 9C show graphs for calculating the diffraction efficiency of an inner ring zone configuration example 3 according to the first embodiment, illustrating the change in the diffraction efficiency of the optical beams of each wavelength as to change in the groove depth d in a case wherein S=5, and (k1$i$, k2$i$, k3$i$)=(+2, −1, −2);

FIGS. 11A through 11C show graphs for calculating the diffraction efficiency of a middle ring zone configuration example 1 according to the first embodiment, illustrating the change in the diffraction efficiency of the optical beams of each wavelength as to change in the groove depth d in a case wherein S=3, and (k1$m$, k2$m$, k3$m$)=(−1, +1, +2);

FIGS. 12A through 12C show shows graphs for calculating the diffraction efficiency of a middle ring zone configuration example 2 according to the first embodiment, illustrating the change in the diffraction efficiency of the optical beams of each wavelength as to change in the groove depth d in a case wherein S=5, and (k1$m$, k2$m$, k3$m$)=(−1, +2, +3);

FIGS. 13A through 13C show graphs for calculating the diffraction efficiency of a middle ring zone configuration example 3 according to the first embodiment, illustrating the change in the diffraction efficiency of the optical beams of each wavelength as to change in the groove depth d in a case wherein S=5, and (k1$m$, k2$m$, k3$m$)=(−2, +1, +2);

FIGS. 14A through 14C show shows graphs for calculating the diffraction efficiency of an outer ring zone configuration example 1 according to the first embodiment, illustrating the change in the diffraction efficiency of the optical beams of each wavelength as to change in the groove depth d in a case wherein S=2, and (k1$o$, k2$o$, k3$o$)=(−1, +1, +2);

FIGS. 15A through 15C show shows graphs for calculating the diffraction efficiency of an outer ring zone configuration example 2 according to the first embodiment, illustrating the change in the diffraction efficiency of the optical beams of each wavelength as to change in the groove depth d in a case wherein S=5, and (k1o, k2o, k3o)=(+1, −2, −3);

FIGS. 17A through 17C show graphs for calculating the diffraction efficiency of an outer ring zone configuration example 4 according to the first embodiment, illustrating the change in the diffraction efficiency of the optical beams of each wavelength as to change in the groove depth d in a case wherein S=5, and (k1o, k2o, k3o)=(−2, +2, +3);

FIGS. 18A and 18B are diagrams describing an example of a condensing optical device making up the optical pickup to which the present invention has been applied, according to the first embodiment, wherein FIG. 18A is a side view illustrating an example of a condensing optical device configured of a diffraction optical element having a diffraction unit on the incident side thereof and an object lens, and FIG. 18B is a side view illustrating a diffraction optical device according to an example wherein a diffraction unit is integrally formed on the incident side face of an object lens;

FIG. 20 is an optical path diagram illustrating the optical system of an optical pickup to which the present invention has been applied, as a second embodiment;

FIGS. 21A through 21C are diagrams for describing the functions of the diffraction optical element and object lens configuring the optical pickup shown in FIG. 20, wherein FIG. 21A is a diagram illustrating an optical beam in a case of generating +1 order diffracted light of an optical beam of a first wavelength as to a first optical disc for example, FIG. 21B is a diagram illustrating an optical beam in a case of generating +1 order diffracted light of an optical beam of a second wavelength as to a second optical disc for example, and FIG. 21C is a diagram illustrating an optical beam in a case of generating +1 order diffracted light of an optical beam of a third wavelength as to a third optical disc for example;

FIGS. 23A through 23C are diagrams for describing the configuration of the diffraction unit provided on one face of the diffraction optical element shown in FIG. 22, wherein FIG. 23A is a cross-sectional view illustrating an example wherein first through third diffraction regions provided as the inner ring zone, middle ring zone, and outer ring zone, of the diffraction unit, respectively, are formed in a blazed form, FIG. 23B is a cross-sectional view illustrating another example of the second diffraction region provided as the middle ring zone of the diffraction unit, with the second diffraction region formed in a staircase form as another example, and FIG. 23C is a cross-sectional view illustrating another example of the third diffraction region provided as the outer ring zone of the diffraction unit, with the third diffraction region formed in a staircase form as another example;

FIGS. 25A through 25C are diagrams illustrating the longitudinal aberration of effect term ΔWn due to refractive index fluctuation of the composition material under change in temperature, the effect term ΔWλ due to wavelength fluctuation, and the sum ΔW of the effect terms ΔWn and ΔWλ, wherein FIG. 25A is a diagram illustrating the longitudinal aberration of each, in a case of selecting a negative diffraction order, FIG. 25B is a diagram illustrating the longitudinal aberration of each, in a case of selecting a positive diffraction order, and FIG. 25C is a diagram illustrating the longitudinal aberration of each, in a case of selecting a positive diffraction order and also selecting relatively high order diffraction orders for the middle ring zone and outer ring zone;

FIGS. 26A and 26B are diagrams for describing the longitudinal aberration illustrated in FIGS. 25A through 25C, wherein FIG. 26A is diagram illustrating the state of longitudinal aberration with a lens having no aberration, and FIG. 26B is a diagram illustrating a line LB indicating the state of longitudinal aberration with a lens having aberration;

FIGS. 27A through 27C show graphs for calculating the diffraction efficiency of an example 1 and example 2 of an inner ring zone according to the second embodiment, illustrating the change in the diffraction efficiency of the optical beams of each wavelength as to change in the groove depth d in a case wherein S=∞, and (k1i, k2i, k3i)=(+1, +1, +1);

FIGS. 28A through 28C show graphs for calculating the diffraction efficiency of an example 1 of a middle ring zone according to the second embodiment, illustrating the change in the diffraction efficiency of the optical beams of each wavelength as to change in the groove depth d in a case wherein S=3, and (k1m, k2m, k3m)=(+1, +1, +1);

FIGS. 35A and 35B are diagrams for describing an example of a condensing optical device making up the optical pickup to which the present invention has been applied, according to the second embodiment, wherein FIG. 35A is a side view illustrating a condensing optical device configured of a diffraction optical element having a diffraction unit on the incident side thereof, and an object lens, and FIG. 35B is a side view illustrating a condensing optical device according to an example wherein a diffraction unit is integrally formed on the incident side face of the object lens;

FIGS. 38A through 38C are diagrams for describing the functions of the diffraction unit configuring the optical pickup shown in FIG. 37, and is a diagram for describing the functions of a diffraction optical element provided with a diffraction unit and having diffraction functions and an object lens having refractive functions, with reference to an example wherein the diffraction unit is provided to an optical element separate from the object lens, wherein FIG. 38A is a diagram illustrating an optical beam in a case of generating +1 order diffracted light of an optical beam of a first wavelength as to a first optical disc for example, FIG. 38B is a diagram illustrating an optical beam in a case of generating −1 order diffracted light of an optical beam of a second wavelength as to a second optical disc for example, and FIG. 38C is a diagram illustrating an optical beam in a case of generating −2 order diffracted light of an optical beam of a third wavelength as to a third optical disc for example;

FIGS. 40A through 40C are diagrams for describing the configuration of the diffraction unit provided on one face of the object lens shown in FIG. 39, wherein FIG. 40A is a cross-sectional view illustrating a shape as to the reference face as an example of the first diffraction region provided as the inner ring zone of the diffraction unit, FIG. 40B is a cross-sectional view illustrating a shape as to the reference face as an example of the second diffraction region provided as the middle ring zone of the diffraction unit, and FIG. 40C is a cross-sectional view illustrating a shape as to the reference face as an example of the third diffraction region provided as the outer ring zone of the diffraction unit;

FIGS. 46A through 46C are diagrams for describing a technique for determining the pitch of the diffraction structure, wherein FIG. 46A is a diagram indicating the design phase amount φ to be provided to the design wavelength λ0 at each position in the radial direction, FIG. 46B is a diagram illustrating indicating the phase amount φ' to be actually provided at each position in the radial direction based on φ in FIG. 46A, and FIG. 46C is a diagram conceptually illustrating the shape of the diffraction structure for providing the phase amount φ' shown in FIG. 46B;

FIGS. 58A and 58B are diagrams for describing an example of a condensing optical device making up the optical pickup to which the present invention has been applied, according to the third embodiment, wherein FIG. 58A is a side view illustrating a condensing optical device having a diffraction unit according to an example of being configured of an object lens with a diffraction unit integrally formed on the incident side thereof, and FIG. 58B is a side view illustrating a condensing optical device according to an example configured of a diffraction optical element having a diffraction unit formed on the incident side thereof, and an object lens;

DESCRIPTION OF THE PREFERRED EMBODIMENTS

An embodiment of an optical disc device using an optical pickup to which the present invention has been applied will be described with reference to the drawings.

Figure 1:
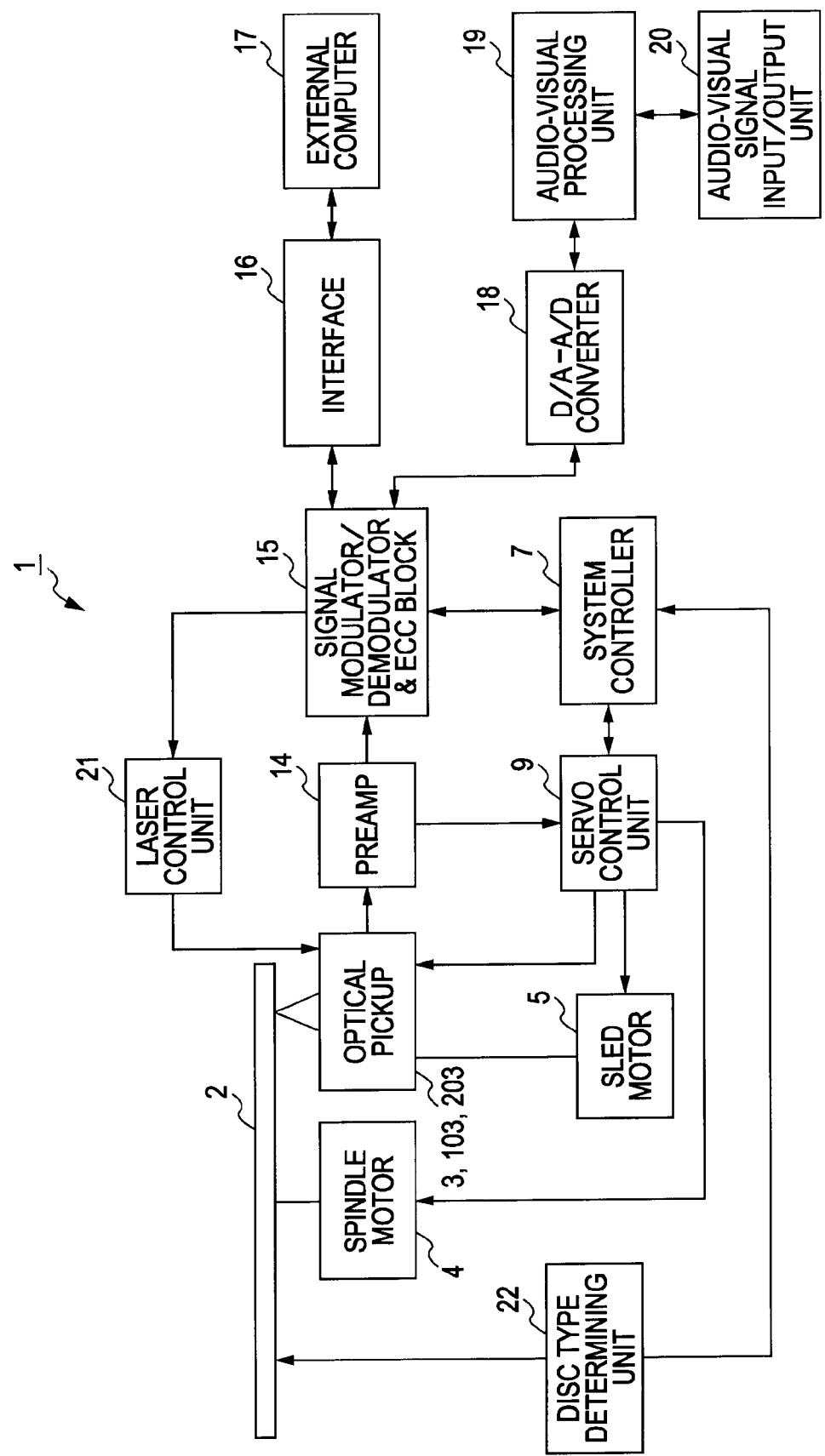
FIG. 1 is a block circuit diagram illustrating an optical device to which the present invention has been applied.

<1> Overall Configuration of Optical Disc Device FIG. 1

An optical disc device 1 to which the present invention has been applied includes, as shown in FIG. 1, an optical pickup 3 for performing information recording/playing to and from an optical disc 2, a spindle motor 4 serving as a driving device for rotationally driving the optical disc 2, and a sled motor 5 for moving the optical pickup 3 in the radial direction of the optical disc 2. The optical disc device 1 is an optical disc device realizing compatibility between three standards, whereby information can be recorded and/or played to/from three types of optical discs with different formats, and optical discs with layered recording layers. Note that the optical pickup in the optical disc device 1 is not restricted to the optical pickup 3, and that later-described optical pickups 103, 203, and so forth, may be used as well.

Optical discs used here include, for example, optical discs using semiconductor laser of an emission wavelength around 785 nm, such as CD (Compact Disc), CD-R (Recordable), CD-RW (ReWritable), and so forth, optical discs using semiconductor laser of an emission wavelength around 655 nm, such as DVD (Digital Versatile Disc), DVD-R (Recordable), DVD-RW (ReWritable), DVD+RW (ReWritable), and so forth, and further high density recording optical discs using a semiconductor laser of a shorter emission wavelength around 405 nm (blue-violet), capable of high density recording, such as BD (Blu-ray Disc (a registered trademark)) and so forth.

Hereinafter, the three types of optical discs 2 which the optical disc device 1 records information to or plays information from will be described as a first optical disc 11 such as BD, described above as being capable of high density recording, which has a protective layer formed to a thickness of around 0.1 mm and uses an optical beam of a wavelength around 405 nm as the recording/playing beam, a second optical disc 12 such as DVD which has a protective layer formed to a thickness of around 0.6 mm and uses an optical beam of a wavelength around 655 nm as the recording/playing beam, and a third optical disc 13 such as CD which has a protective layer formed to a thickness of around 1.1 mm and uses an optical beam of a wavelength around 785 nm as the recording/playing beam.

Driving of the spindle motor 4 and sled motor 5 of the optical disc device 1 is controlled by a servo control unit 9 controlled based on instructions from a system controller 7 also serving as a disc type determination unit, depending on the type of disc, and are driven at a certain revolution according to the first optical disc 11, second optical disc 12, and third optical disc 13, for example.

The optical pickup 3 is an optical pickup having a three wavelength compatible optical system, wherein optical beams of different wavelengths are irradiated onto the recording layers of optical discs of different standards from the protective layer side, and reflected light of the optical beams off of the recording layer is detected. The optical pickup 3 outputs signals corresponding to each of the optical beams, from the detected reflected light.

The optical disc device 1 includes a preamp 14 for generating focus error signals, tracking error signals, RF signals, and so forth, based on signals output from the optical pickup 3, a signal modulator/demodulator and error correction code block (hereinafter referred to as signal modulator/demodulator & ECC block) 15 for demodulating signals from the preamp 14 or modulating signals from an external computer 17 or the like, an interface 16, a D/A-A/D converter 18, and audio-visual processing unit 19, and an audio-visual signal input/output unit 20.

Based on the output form the photosensor, the preamp 14 generates focus error signals by the astigmatic method or the like, generates tracking error signals by the three-beam method, DPD, DPP, or the like, further generates RF signals, and outputs the RF signals to the signal modulator/demodulator & ECC block 15. Also, the preamp 14 outputs focus error signals and tracking error signals to the servo control unit 9.

At the time of recording data to the first optical disc 11, the signal modulator/demodulator & ECC block 15 performs error correction processing according to LDC-ECC and BIS or the like on the digital signals input from the interface 16 or D/A-A/D converter 18, and then performs modulation such as 1-7PP or the like. At the time of recording data to the second optical disc 12, the signal modulator/demodulator & ECC block 15 performs error correction processing such as PC (Product Code) or the like, and then performs modulation such as 8-16 modulation or the like. At the time of recording data to the third optical disc 13, the signal modulator/demodulator & ECC block 15 performs error correction processing such as CIRC or the like, and then performs modulation such as 8-14 modulation or the like. The signal modulator/demodulator & ECC block 15 then outputs the modulated data to a laser control unit 21. Further, when playing each of the optical discs, the signal modulator/demodulator & ECC block 15 performs demodulation processing based on the RF signals input from the preamp 14, and then further performs error correction processing, and outputs the data to the interface 16 or D/A-A/D converter 18.

For an arrangement wherein data is to be compressed and recorded, a compression/decompression unit may be provided between the signal modulator/demodulator & ECC block 15 and the interface 16 or D/A-A/D converter 18. In this case, the data is compressed with a format such as MPEG2, MPEG4, or the like.

The servo control unit 9 receives input of focus error signals and tracking error signals from the preamp 14. The servo control unit 9 generates focus servo signals and tracking servo signals such that the focus error signals and tracking error signals become zero, and drive and control an object lens driving unit such as a biaxial actuator or the like driving the object lens, based on the servo signals. Also, synchronization signals or the like are detected from the output from the preamp 14, and servo control of the spindle motor is performed by CLV (Constant Linear Velocity), CAV (Constant Angular Velocity), a combination thereof, or the like.

The laser control unit 21 controls the laser source of the optical pickup 3. Particularly, with this specific example, control is effected by the laser control unit 21 such that the laser source output power differs between the recording mode and playback mode. Further, control is effected by the laser control unit 21 such that the laser source output power differs depending on the type of the optical disc 2. The laser control unit 21 switches over the laser source of the optical pickup 3 depending on the type of optical disc 2 detected by a disc type determination unit 22.

The disc type determination unit 22 can detect the different formats of the optical disc 2 by detecting change in the amount of reflected light from the first through third optical discs 11, 12, and 13, from difference in surface reflectivity, shape and other external differences, and so forth.

Each block making up the optical disc device 1 is configured so as to be capable of signal processing in accordance with the specifications of the optical disc 2 which has been mounted, based on the detection results at the disc type determination unit 22.

The system controller 7 controls the entire device in accordance with the type of optical disc 2 determined at the disc type determination unit 22. Also, the system controller 7 identifies the recording position or playing position of the optical disc regarding which recording/playing is to be performed, based on address information and TOC (Table of Contents) information recorded in premastered bits or grooves or the like on the innermost portion of the optical disc, and controls the components based on the determined position, in accordance with operation input from the user.

With the optical disc device 1 configured thus, the optical disc 2 is rotationally driven by the spindle motor 4, the sled motor 5 is driven and controlled in accordance with control signals from the servo control unit 9, and the optical pickup 3 is moved to a position corresponding to the desired recording track on the optical disc 2, thereby performing recording/playing of information to/from the optical disc 2.

Specifically, at the time of performing recording/playing with the optical disc device 1, the servo control unit 9 rotates the optical disc 2 by CAV or CLV or a combination thereof. The optical pickup 3 irradiates an optical beam from the light source onto the optical disc 2 and detects the returning optical beam therefrom with the photosensor, generates focus error signals and tracking error signals, and performs focus servo and tracking servo control by driving the object lens with an object lens driving mechanism, based on the focus error signals and tracking error signals.

Also, at the time of recording with the optical disc device 1, signals from an external computer 17 are input to the signal modulator/demodulator & ECC block 15 via the interface 16. The signal modulator/demodulator & ECC block 15 adds the above-described predetermined error correction code to the digital data input from the interface 16 or the D/A-A/D converter 18, and after performing further predetermined modulation processing, generates recording signals. The laser control unit 21 controls the laser light source of the optical pickup 3 based on the recording signals generated at the signal modulator/demodulator & ECC block 15, and records onto a predetermined optical disc.

Also, at the time of playing information recorded in an optical disc 2 with the optical disc device 1, the signal modulator/demodulator & ECC block 15 performs demodulation processing on signals detected with the photosensor. In the event that the recorded signals demodulated by the signal modulator/demodulator & ECC block 15 are for computer data storage, these are output to the external computer 17 via the interface 16. Accordingly, the external computer 17 can operate based on the signals recorded on the optical disc 2. Also, in the event that the recorded signals demodulated by the signal modulator/demodulator & ECC block 15 are for audio-visual, the signals are subjected to digital/analog conversion at the D/A-A/D converter 18, and supplied to the audio-visual processing unit 19. Audio-visual processing is performed at the audio-visual processing unit 19, and signals are output to unshown external speakers or a monitor, via the audio-visual signal input/output unit 20.

Now, the recording/playing optical pickups 3, 103, 203, etc., used with the above-described optical disc device 1, will be described in detail.

<2> First Embodiment of Optical Pickup FIGS. 2 through 19

First, an optical pickup 3 to which the present invention is applied will be described as a first embodiment of the optical pickup according to the present invention, with reference to FIGS. 2 through 19. As described above, the optical pickup 3 is an optical pickup which selectively irradiates multiple optical beams with different wavelengths onto three types of optical discs arbitrarily selected from first through third optical discs 11, 12, and 13, of which the format such as the thickness of the protective layer differs, thereby performing recording and/or playing of information signals.

Figure 2:
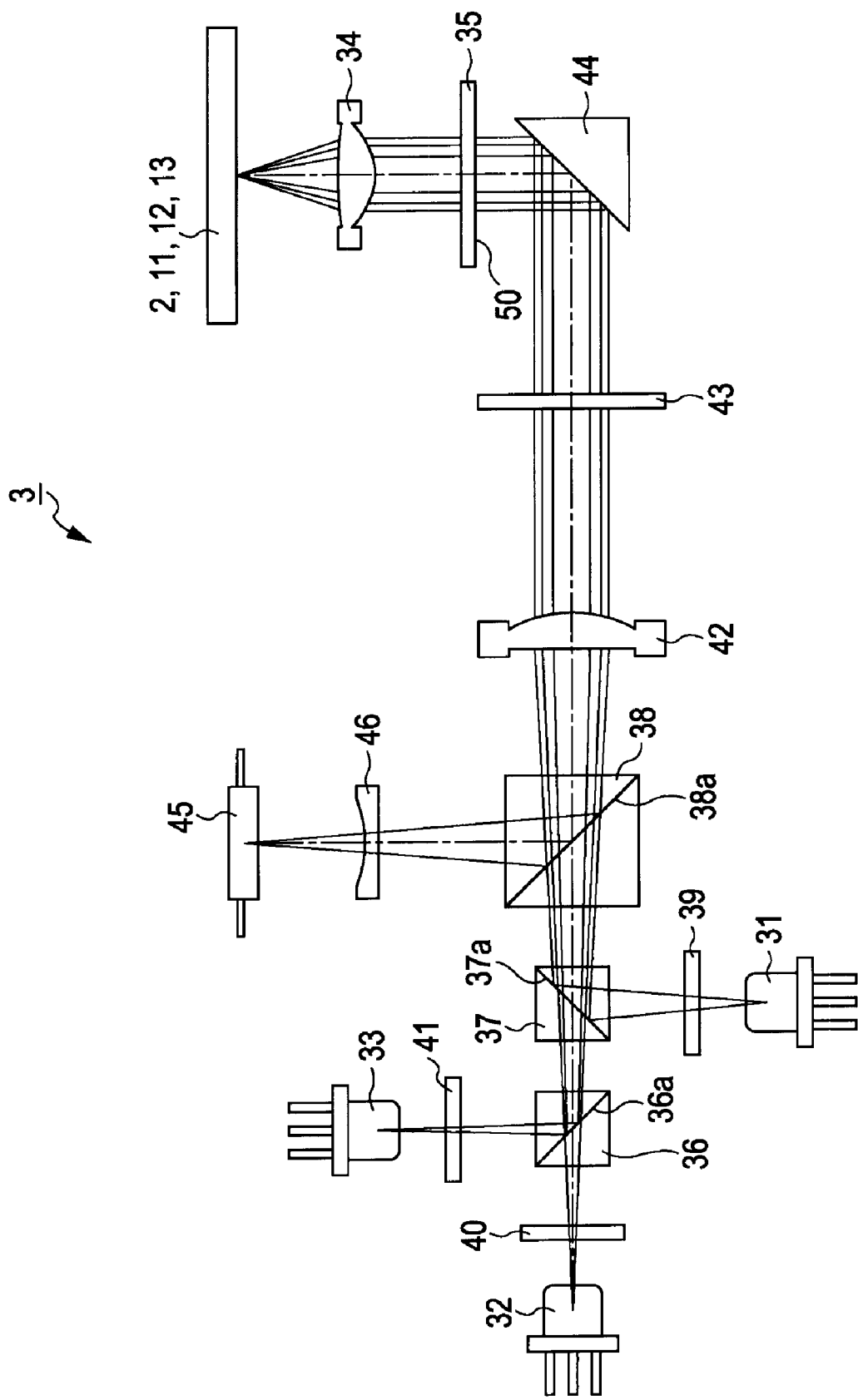
FIG. 2 is an optical path diagram illustrating the optical system of an optical pickup to which the present invention has been applied, as a first embodiment.

As shown in FIG. 2, the optical pickup 3 to which the present invention has been applied includes a first light source 31 having a first emitting unit for emitting an optical beam of a first wavelength, a second light source 32 having a second emitting unit for emitting an optical beam of a second wavelength longer than the first wavelength, a third light source 33 having a third emitting unit for emitting an optical beam of a third wavelength longer than the second wavelength, an object lens 34 for condensing optical beams emitted from the emitting unit of the first through third emitting units onto the signal recording face of an optical disc 2, and a diffraction optical element 35 provided on the optical path between the first through third emitting units and the object lens 34.

Also, the optical pickup 3 includes a first beam splitter 36 provided between the second and third emitting units and the diffraction optical element 35, serving as an optical path synthesizing unit for synthesizing the optical paths of the optical beam of the second wavelength that has been emitted from the second emitting unit and the optical beam of the third wavelength that has been emitted from the third emitting unit, a second beam splitter 37 provided between the first beam splitter 36 and the diffraction optical element 35, serving as an optical path synthesizing unit for synthesizing the optical path of the optical beams of the second and third wavelengths of which the optical paths have been synthesized by the first beam splitter 36 and the optical beam of the first wavelength that has been emitted from the first emitting unit, and a third beam splitter 38 provided between the second beam splitter 37 and the diffraction optical element 35, serving as an optical path splitting unit for splitting the outgoing optical path of the optical beams of the first through third wavelengths synthesized at the second beam splitter 37 from the returning optical path of the optical beam of the first through third wavelengths reflected off of the optical disc (hereinafter also referred to as "return path").

Further, the optical pickup 3 has a first grating 39 provided between the first emitting unit of the first light source unit 31 and the second beam splitter 37, for diffracting the optical beam of the first wavelength that has been emitted from the first emitting unit into three beams, for detection of tracking error signals and so forth, a second grating 40 provided between the second emitting unit of the second light source unit 32 and the first beam splitter 36, for diffracting the optical beam of the second wavelength that has been emitted from the second emitting unit into three beams, for detection of tracking error signals and so forth, and a third grating 41 provided between the third emitting unit of the third light source unit 33 and the first beam splitter 36, for diffracting the optical beam of the third wavelength that has been emitted from the third emitting unit into three beams, for detection of tracking error signals and so forth.

Also, the optical pickup 3 has a collimator lens 42 provided between the third beam splitter 38 and the diffraction optical element 35, serving as a divergent angle conversion unit for converting the divergent angle of the optical beams of the first through third wavelengths of which the optical paths have been synthesized at the third beam splitter 38 so as to be adjusted into a state of generally parallel light or a state diffused or converged as to generally parallel light, and outputting, a quarter-wave plate 43 provided between the collimator lens 42 and the diffraction optical element 35, so as to provide quarter-wave phase difference to the optical beams of the first through third wavelengths of which the divergent angle has been adjusted by the collimator lens 42, and a redirecting mirror 44 provided between the diffraction optical element 35 and the quarter-wave plate 43, for redirecting by reflection the optical beam which has passed through the above-described optical parts within a plane generally orthogonal to the optical axis of the object lens 34 and diffraction optical element 35, so as to emit the optical beam in the direction toward the optical axis of the object lens 34 and diffraction optical element 35.

Further, the optical pickup 3 includes a photosensor 45 for receiving and detecting the optical beams of the first through third wavelengths split at the third beam splitter 38 on the return path from the optical beam of the first through third wavelengths on the outgoing path, and a multi lens 46 provided between the third beam splitter 38 and the photosensor 45, for condensing optical beams of the first through third wavelengths on the return path split at the third beam splitter 38 onto the photoreception face of a photodetector or the like of the photosensor 45, and also providing astigmatism for detecting focus error signals or the like.

The first light source 31 has a first emitting unit for emitting an optical beam of a first wavelength around 405 nm onto the first optical disc 11. The second light source 32 has a second emitting unit for emitting an optical beam of a second wavelength around 655 nm onto the second optical disc 12. The third light source 33 has a third emitting unit for emitting an optical beam of a third wavelength around 785 nm onto the third optical disc 13. Note that while the first through third emitting units are configured disposed at individual light sources 31, 32, and 33, the invention is not restricted to this, and an arrangement may be made wherein two emitting units of the first through third emitting units are disposed at one light source and the remaining emitting unit is disposed at another light source, or wherein the first through third emitting units are disposed so as to form a light source at generally the same position.

The object lens 34 condenses the input optical beams of the first through third wavelengths onto the signal recording face of the optical disc 2. The object lens 34 is movably held by an object lens driving mechanism such as an unshown biaxial actuator or the like. The object lens 34 is driven along two axes, one in the direction toward/away from the optical disc 2, and the other in the radial direction of the optical disc 2, by being moved by a biaxial actuator or the like based on the tracking error signals and focus error signals generated from the RF signals of the return light from the optical disc 2 that has been detected at the photosensor 45. The object lens 34 condenses optical beams emitted from the first through third emitting units such that the optical beams are always focused on the signal recording face of optical disc 2, and also causes the focused optical beam to track a recording track formed on the signal recording face of the optical disc 2. Note that a configuration wherein the later-described diffraction optical element 35 is held by a lens holder of the object lens driving mechanism where the object lens 34 is held so as to be integral with the object lens 34 enables the later-described advantages of a diffraction unit 50 provided to the diffraction optical element 35 to be suitably manifested at the time of field shift of the object lens 34 such as movement in the tracking direction.

The diffraction optical element 35 has, as one face thereof for example, a diffraction unit 50 having multiple diffraction regions on the incident side face thereof, with the diffraction unit 50 diffracting each of the optical beams of the first through third wavelengths passing through each of the multiple diffraction regions into predetermined orders and inputting into the object lens 34, i.e., inputting into the object lens 34 as optical beams in a diffused state or converged state having a predetermined divergent angle, whereby the single object lens 34 can be used to perform suitable condensing of the optical beams of the first through third wavelengths such that spherical aberration does not occur at the signal recording face of the three types of optical discs corresponding to the optical beams of the first through third wavelengths. The diffraction optical element 35 serves as a condensation optical device along with the object lens 34 to appropriately perform condensation such that no spherical aberration occurs at the signal recording face of the three types of optical discs corresponding to the optical beams of the three different wavelengths.

The diffraction optical element 35 having the diffraction unit 50 performs diffraction of the first wavelength optical beam BB0 which has transmitted the diffraction unit 50 so as to become +1st order diffracted beam BB1 and inputs to the object lens 34, i.e., as an optical beam in a diffused state having a predetermined divergent angle, thereby appropriately condensing on the signal recording face of the first optical disc 11, as shown in FIG. 3A, performs diffraction of the second wavelength optical beam BD0 which has transmitted the diffraction unit 50 so as to become −1st order diffracted beam BD1 and inputs to the object lens 34, i.e., as an optical beam in a converged state having a predetermined divergent angle, thereby appropriately condensing on the signal recording face of the second optical disc 12, as shown in FIG. 3B, and performs diffraction of the third wavelength optical beam BC0 which has transmitted the diffraction unit 50 so as to become −2nd order diffracted beam BC1 and inputs to the object lens 34, i.e., as a beam in a converged state having a predetermined divergent angle, thereby appropriately condensing on the signal recording face of the third optical disc 13, as shown in FIG. 3C, for example, whereby suitable condensation can be performed such that no spherical aberration occurs at the signal recording face of the three types of optical discs, with a single object lens 34. While description has been made here with an example wherein optical beams of the same wavelength are made to be diffracted beams of the same diffraction order at the multiple diffraction regions of the diffraction unit 50, with reference to FIGS. 3A through 3C, the diffraction unit 50 configuring the optical pickup 3 to which the present invention is applied enables diffraction order corresponding to each wavelength to be set for each region as described later, so as to further reduce spherical aberration.

Specifically, as shown in FIGS. 4A and 4B, the diffraction unit 50 provided at the incident side face of the diffraction optical element 35 has a generally-circular first diffraction region 51 provided on the innermost portion (hereinafter also referred to as "inner ring zone"), a ring-shaped second diffraction region 52 provided on the outer side of the first diffraction region 51 (hereinafter also referred to as "middle ring zone"), and a ring-shaped third diffraction region 53 provided on the outer side of the second diffraction region 52 (hereinafter also referred to as "outer ring zone").

The first diffraction region 51 which is an inner ring zone has a first diffraction structure formed having a ring shape with a predetermined depth, and diffracts the optical beam of the first wavelength that is transmitted therethrough such that diffracted light of an order which condenses light so as to form an appropriate spot on the signal recording face of the first optical disc via the object lens 34 is dominant, i.e., such that maximum diffraction efficiency is manifested regarding diffracted light of other orders.

The first diffraction region 51 diffracts the optical beam of the second wavelength that is transmitted therethrough such that diffracted light of an order which condenses light so as to form an appropriate spot on the signal recording face of the second optical disc via the object lens 34 is dominant, i.e., such that maximum diffraction efficiency is manifested regarding diffracted light of other orders, by way of the first diffraction structure.

The first diffraction region 51 diffracts the optical beam of the third wavelength that is transmitted therethrough such that diffracted light of an order which condenses light so as to form an appropriate spot on the signal recording face of the third optical disc via the object lens 34 is dominant, i.e., such that maximum diffraction efficiency is manifested regarding diffracted light of other orders, by way of the first diffraction structure.

Thus, the first diffraction region 51 has a diffraction structure formed whereby diffracted light of a predetermined order is dominant in the optical beam of each wavelength, thereby enabling correction and reduction of spherical aberration at the time of optical beams of each wavelength that have passed through the first diffraction region 51 and become diffracted light of a predetermined order being condensed on the signal recording face of the respective optical discs by the object lens 34.

Figure 4:
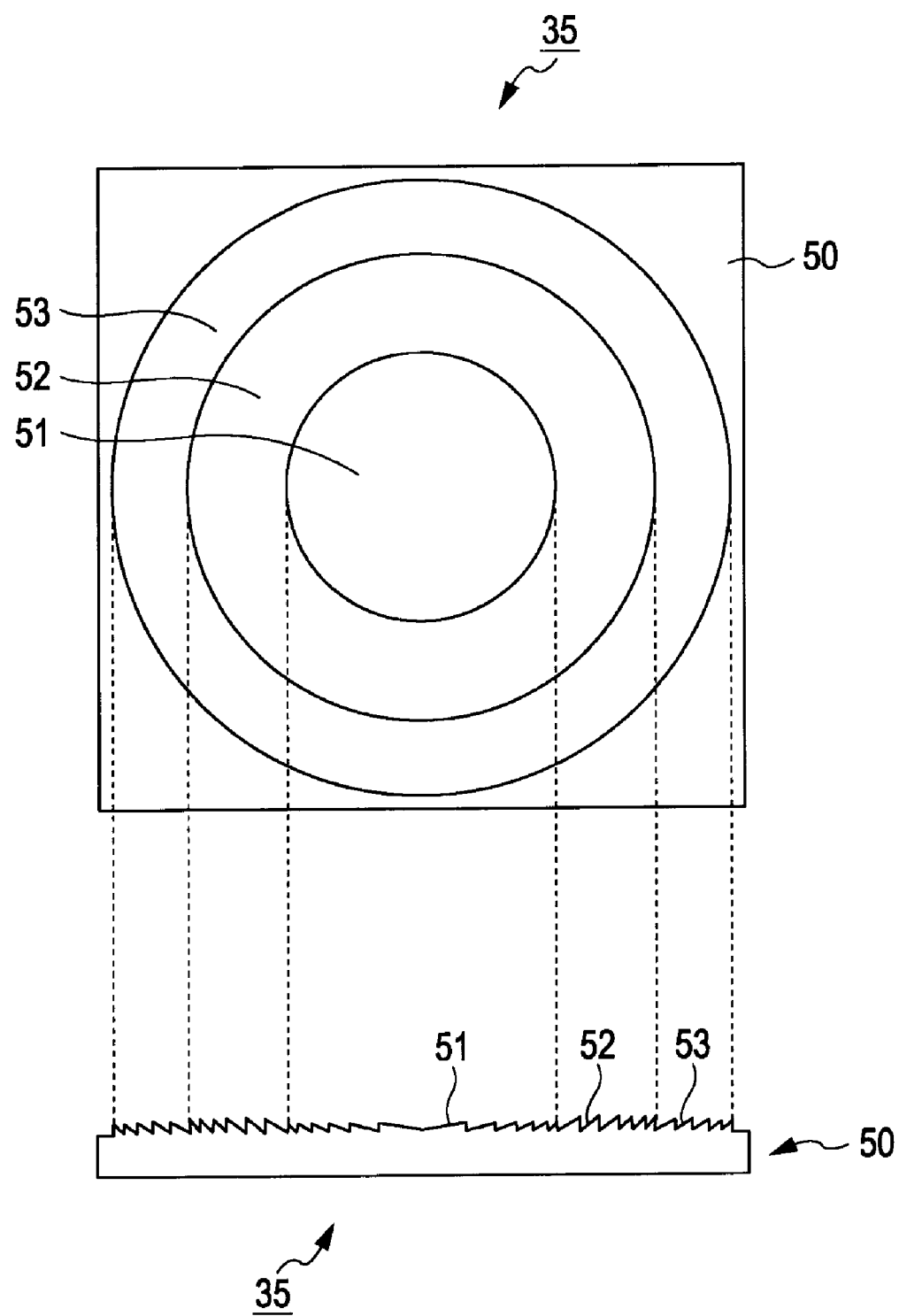
FIG. 4 is a diagram for describing a diffraction optical element configuring the optical pickup shown in FIG. 2, showing a correlated plan view and cross-sectional view of the diffraction optical element.
Figure 5:
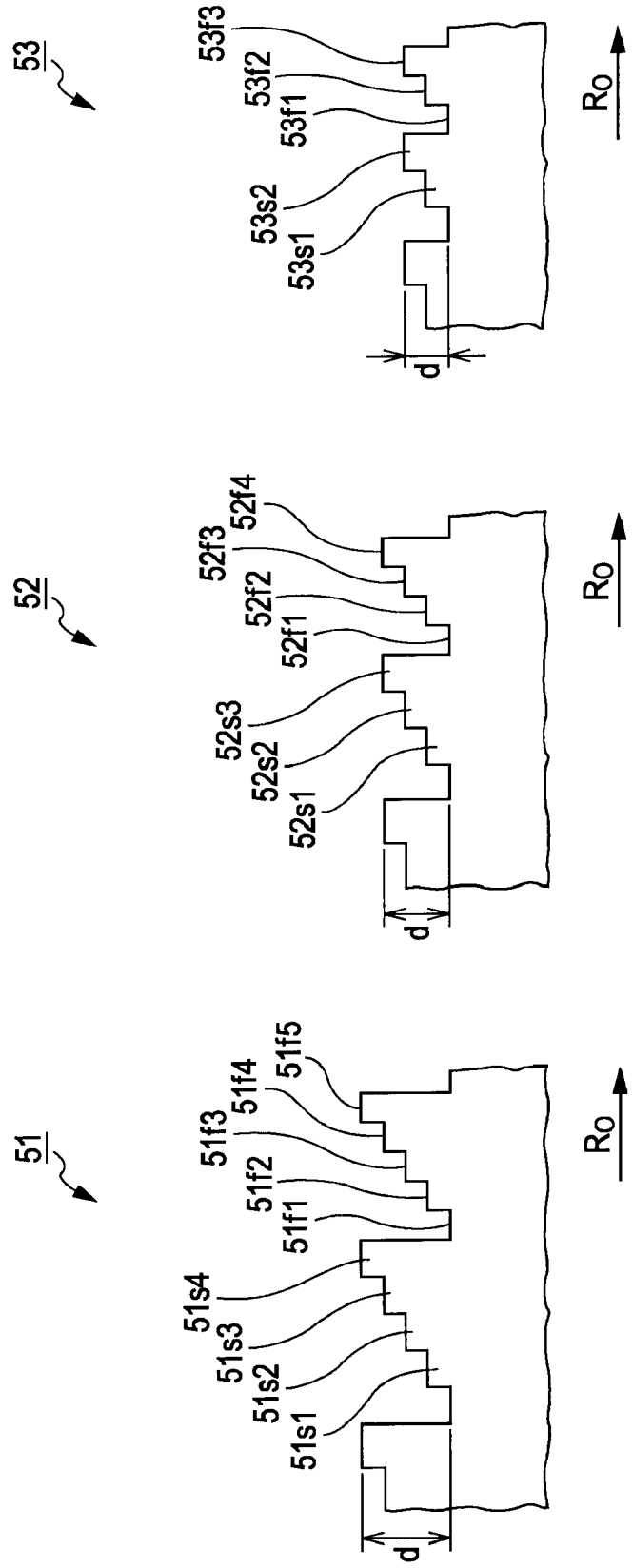

Specifically, as shown in FIGS. 4 and 5A, the first diffraction region 51 is formed with the cross-sectional form of ring shapes centered on the optical axis being formed in a staircase-like form having a predetermined depth (hereinafter also referred to as "groove depth") d and a predetermined number of steps S (where S is a positive integer), continuing in the radial direction (also referred to as a "multi-step staircase form"). Note that the cross-sectional form of the ring shapes in this diffraction structure means the cross-sectional form of the rings taken along a plane including the radial direction of the rings, i.e., a plane orthogonal to the tangential direction of the rings. Also, the diffraction structure having the staircase form with a predetermined number of steps S is a structure in which a staircase form having first through S steps, each of which have generally the same depth, continuing in the radial direction, which can be rephrased as saying that the structure has first through S+1'th diffraction faces formed with generally the same interval in the optical axis direction. Also, the predetermined depth d in the diffraction structure means the length along the optical axis between the diffraction face of the S+1'th diffraction face which is formed at the side of the staircase form closest to the surface (i.e., the highest step, which is the shallowest position) and diffraction face of the first diffraction face which is formed at the side of the staircase form closest to the optical element (i.e., the lowest step, which is the deepest position). This holds true for later described FIGS. 5B and 5C as well.

Note that while a structure has been illustrated in FIGS. 5A through 5C wherein the steps of each stepped portion of the staircase shape are formed such that the closer to the outer side in the radial direction, the closer to the surface side the steps are formed, but the invention is not restricted to this arrangement, and an arrangement may be made wherein the steps of each stepped portion of the diffraction structure formed of the inner ring zone, middle ring zone, and outer ring zone, are formed toward the inner side in the radial direction. Specifically, predetermined diffraction angles and diffraction efficiency can be obtained by setting the dominant diffraction order and later-described groove width at each diffraction structure, and also a diffused state or converged state with a desired diffraction angle can be obtained by setting the formation direction of the staircase form in accordance with whether the diffraction order is positive or negative. The symbol $R_o$ in FIGS. 5A through 5C represents the direction toward the outer side in the radial direction of the rings, i.e., the direction away from the optical axis.

In the first diffraction structure and the later-described second and third diffraction structures formed at the first diffraction region 51, the groove depth d and number of steps S are determined taking into consideration the dominant diffraction order and diffraction efficiency. Also, as shown in FIGS. 5A through 5C, the groove width of each step (the radial-direction dimension of each step portion of the staircase form) is such that the steps are formed with equal width within one staircase form, while looking at the different staircase forms formed continuously in the radial direction, the value of the step width is smaller at staircase forms further away form the optical axis. Note that the groove widths are determined based on phase difference obtained at the diffraction regions formed with the groove widths, such that the spot condensed on the signal recording face of the optical disc is optimal.

For example, the diffraction structure of the first diffraction region 51 is, as shown in FIG. 5A, a diffraction structure having a staircase portion including first through fourth steps 51s1, 51s2, 51s3, and 51s4, formed continuously in the radial direction, wherein the number of steps is 4 (S=4), and the depth of each step is generally the same depth (d/4), and first through fifth diffraction faces 51f1, 51f2, 51f3, 51f4, and 51f5 formed at the same intervals of d/4 in the optical axis direction.

Figure 6:
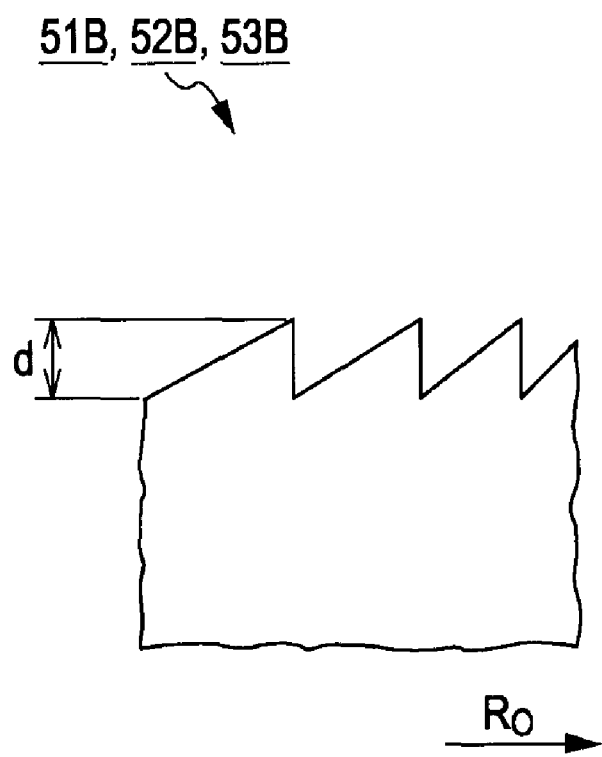
FIG. 6 is a cross-sectional view illustrating an example wherein a blazed form diffraction structure has been formed, as another example of the inner ring zone, middle ring zone, and outer ring zone, configuring the diffraction unit.

Also, while description is made here with regard to the first diffraction region 51 having the cross-sectional form of the rings formed as a diffraction structure with a multi-step staircase form, any diffraction structure may be used as long as an optical beam of a predetermined order is dominant as to the optical beam of each wavelength as described above, so a configuration may be used such as shown in FIG. 6, with a diffraction region 51B having a diffraction structure wherein the cross-sectional form of the rings is formed as blazed diffraction grating having a predetermined depth d, for example.

Also, in a case wherein the first diffraction region 51 diffracts the optical beam of the first wavelength which is transmitted therethrough such that diffracted light of the k1i'th order is dominant, i.e., such that the diffraction efficiency thereof is maximum, diffracts the optical beam of the second wavelength which is transmitted therethrough such that diffracted light of the k2i'th order is dominant, i.e., such that the diffraction efficiency thereof is maximum, and diffracts the optical beam of the third wavelength which is transmitted therethrough such that diffracted light of the k3i'th order is dominant, none of k1i, k2i, and k3i is zero, k1i and k2i are of opposite signs (k1i×k2i<0), and k2i and k3i are of the same sign (k2i×k3i>0). Note that in the above case, k1i and k3i are of opposite signs.

Now, with the first diffraction region 51, due to the diffraction order k1i of the first wavelength at which the diffraction efficiency is maximum being set to other than zero, coupling at the object lens 34 can be reduced, the problem of noise due to light source return light can be prevented, and problems such as having to keep the output of the light source emission within a suitable range with the related art can be avoided. Also, with the first diffraction region 51, in the event that the diffraction orders k2i and k3i of the second and third wavelengths at which the diffraction efficiency is maximum are set to zero, there is no combination wherein the aberration and efficiency are optimal. In other words, with the first diffraction region 51, due to the diffraction orders k2i and k3i being other than zero, a combination can be obtained wherein aberration and efficiency can be ensured.

Also, with the first diffraction region 51, due to the relation of the diffraction orders k1i, k2i, and k3i wherein the diffraction efficiency of each wavelength is maximum being of a relation wherein k1i and k2i are of opposite signs, and k2i and k3i are of the same sign, spherical aberration can be further reduced in a case of condensing optical beams of each wavelength on the multiple types of optical discs with the same object lens 34. This is based on the idea that since the design center of the protective layer is often set to 0.1 to 0.6 in the event of designing an object lens 34 for the above-described first through third optical discs, spherical aberration can be suppressed by inverting the polarity provided to the optical beam of the first wavelength and the polarity provided to the optical beams of the second and third wavelengths.

Further, with the first diffraction region 51, the diffraction orders k1i, k2i, and k3i of each wavelength wherein the diffraction efficiency is maximum are set such as to conform to one of the following:

(k1i, k2i, k3i)=(+1, −1, −2), (−1, +1, +2), (+1, −2, −3), (−1, +2, +3), (+2, −1, −2), (−2, +1, +2), (+2, −2, −3), or (−2, +2, +3).

Specific examples of the first diffraction region 51 which is the inner ring zone will be given below, with specific numerical values of the depth d and number of steps S, and the diffraction order of diffracted light of the order that is dominant in the optical beam of each wavelength, and the diffraction efficiency of the diffracted light of each diffraction order is shown in Table 1. Note that Table 1 illustrates Inner Ring Zone Configuration Example 1 through Inner Ring Zone Configuration Example 4 serving as examples of the first diffraction region 51, wherein k1i in Table 1 indicates the diffraction order where the diffraction efficiency of the optical beam of the first wavelength is maximum, eff1 illustrates the diffraction efficiency of the diffraction order where the diffraction efficiency of the optical beam of the first wavelength is maximum, k2i indicates the diffraction order where the diffraction efficiency of the optical beam of the second wavelength is maximum, eff2 illustrates the diffraction efficiency of the diffraction order where the diffraction efficiency of the optical beam of the second wavelength is maximum, k3i indicates the diffraction order where the diffraction efficiency of the optical beam of the third wavelength is maximum, eff3 illustrates the diffraction efficiency of the diffraction order where the diffraction efficiency of the optical beam of the third wavelength is maximum, d indicates the groove depth of the first diffraction region 51, i.e., the distance from the lowest step of the staircase form to the highest step thereof, and S indicates the number of steps of the staircase form of the first diffraction region 51.

TABLE 1

Inner Ring Zone Diffraction Efficiency, Diffraction Order, Depth, and Number of Steps, for Each Configuration Example

|  | k1i | eff$_1$ | K2i | eff$_2$ | K3i | eff$_3$ | d [μm] | s |
|---|---|---|---|---|---|---|---|---|
| Inner Ring Zone Configuration Example 1 | 1 | 0.81 | −1 | 0.62 | −2 | 0.57 | 3.8 | 4 |
| Inner Ring Zone Configuration Example 2 | 1 | 0.93 | −2 | 0.65 | −3 | 0.52 | 5.3 | 6 |
| Inner Ring Zone Configuration Example 3 | 2 | 0.67 | −1 | 0.72 | −2 | 0.67 | 5.1 | 5 |
| Inner Ring Zone Configuration Example 4 | 2 | 0.63 | −2 | 0.64 | −3 | 0.36 | 5.8 | 6 |

Now, the Inner Ring Zone Configuration Example 1 shown in Table 1 will be described. As shown in Table 1, with the Inner Ring Zone Configuration Example 1, with the groove depth d=3.8 (μm) and the number of steps S=4, the diffraction efficiency eff1=0.81 for the first wavelength optical beam diffraction order k1i=+1, the diffraction efficiency eff2=0.62 for the second wavelength optical beam diffraction order k2i=−1, and the diffraction efficiency eff3=0.57 for the third wavelength optical beam diffraction order k3i=−2. This Inner Ring Zone Configuration Example 1 will be described more specifically with reference to FIGS. 7A through 7C. FIG. 7A is a diagram illustrating the change in diffraction efficiency of the +1 order diffracted light of the optical beam of the first wavelength in a case wherein the groove depth d is changed in the staircase form with the number of steps S=4, FIG. 7B is a diagram illustrating the change in diffraction efficiency of the −1 order diffracted light of the optical beam of the second wavelength in a case wherein the groove depth d is changed in the staircase form with the number of steps S=4, and FIG. 7C is a diagram illustrating the change in diffraction efficiency of the −2 order diffracted light of the optical beam of the third wavelength in a case wherein the groove depth d is changed in the staircase form with the number of steps S=4. In FIGS. 7A through 7C, the horizontal axis represents the groove depth in nm, and the vertical axis represents the diffraction efficiency (intensity of light). As shown in FIG. 7A, at the position of 3800 nm on the horizontal axis, eff1 is 0.81, eff2 is 0.62 as shown in FIG. 7B, and eff3 is 0.57 as shown in FIG. 7C.

Figures 10A, 10B, 10C:
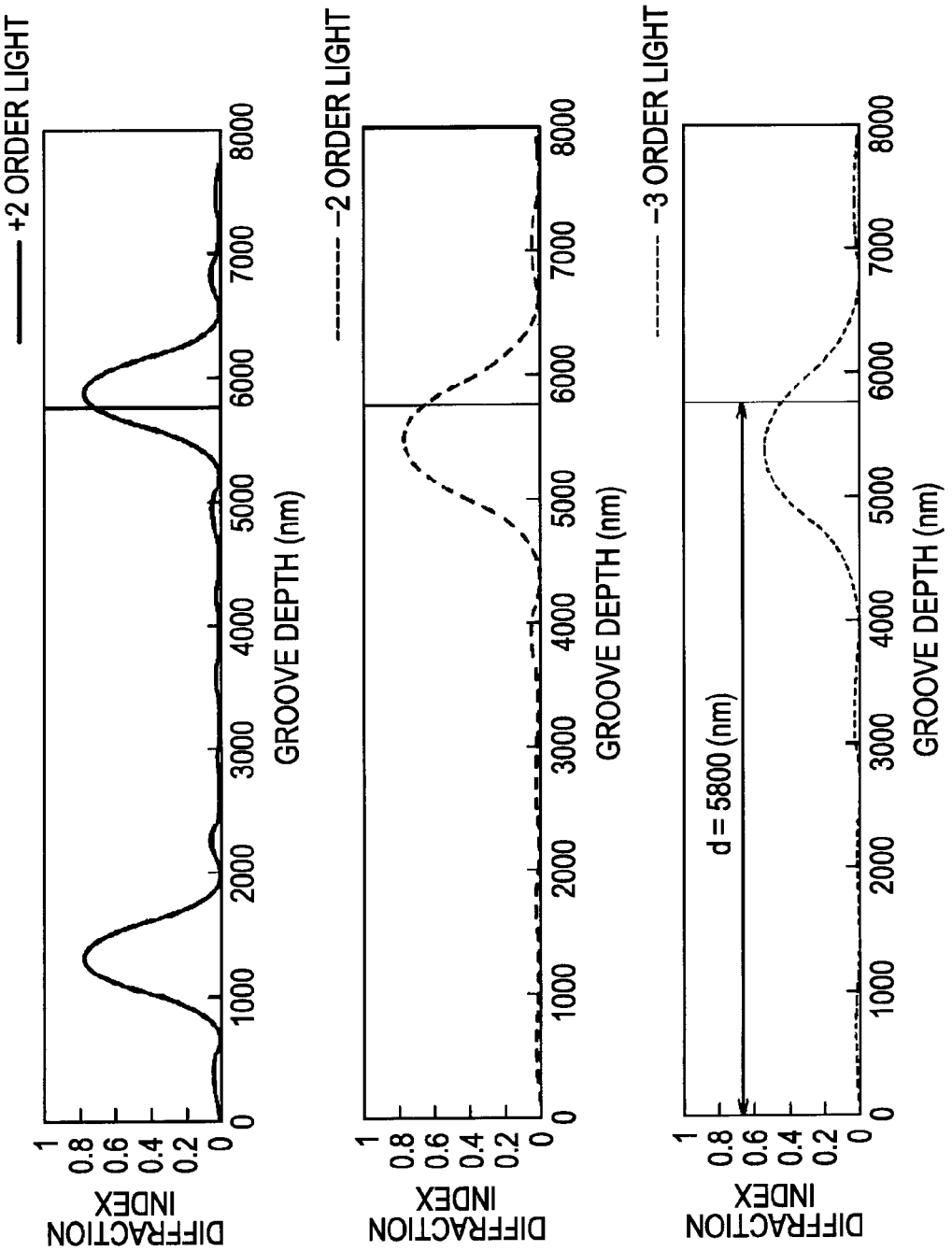
FIGS. 10A through 10C show graphs for calculating the diffraction efficiency of an inner ring zone configuration example 4 according to the first embodiment, illustrating the change in the diffraction efficiency of the optical beams of each wavelength as to change in the groove depth d in a case wherein S=6, and (k1$i$, k2$i$, k3$i$)=(+2, −2, −3)

In the same way in Table 1, with the Inner Ring Zone Configuration Example 2, with the groove depth d=5.3 (μm) and S=6, the diffraction efficiency eff1, eff2, and eff3 are obtained for the diffraction orders k1$i$, k2$i$, and k3$i$, as shown in Table 1 and FIGS. 8A through 8C; with the Inner Ring Zone Configuration Example 3, with the groove depth d=5.1 (μm) and S=5, the diffraction efficiency eff1, eff2, and eff3 are obtained for the diffraction orders k1$i$, k2$i$, and k3$i$, as shown in Table 1 and FIGS. 9A through 9C; and with the Inner Ring Zone Configuration Example 4 shown in Table 1 as well, with the groove depth d=5.8 (μm) and S=6, the diffraction efficiency eff1, eff2, and eff3 are obtained for the diffraction orders k1$i$, k2$i$, and k3$i$, as shown in Table 1 and FIGS. 10A through 10C.

The second diffraction region 52 which is a middle ring zone has a second diffraction structure formed which is ring shaped and has a predetermined depth, and which is a different structure from the first diffraction structure. The second diffraction region 52 diffracts the optical beam of the first wavelength that is transmitted therethrough such that diffracted light of an order which condenses light so as to form an appropriate spot on the signal recording face of the first optical disc via the object lens 34 is dominant, i.e., such that maximum diffraction efficiency is manifested regarding diffracted light of other orders.

The second diffraction region 52 diffracts the optical beam of the second wavelength that is transmitted therethrough such that diffracted light of an order which condenses light so as to form an appropriate spot on the signal recording face of the second optical disc via the object lens 34 is dominant, i.e., such that maximum diffraction efficiency is manifested regarding diffracted light of other orders, by way of the second diffraction structure.

The second diffraction region 52 diffracts the optical beam of the third wavelength that is transmitted therethrough such that diffracted light of orders other than an order which forms an appropriate spot on the signal recording face of the third optical disc via the object lens 34 is dominant, i.e., such that maximum diffraction efficiency is manifested regarding diffracted light of other orders, by way of the second diffraction structure. Note that the second diffraction region 52 can sufficiently reduce diffraction efficiency diffracted light of an order which forms an appropriate spot on the signal recording face of the third optical disc via the object lens 34 for the optical beam of the third wavelength that is transmitted therethrough, by way of the second diffraction structure.

Thus, the second diffraction region 52 has a diffraction structure formed suitable for diffracted light of a predetermined order to be dominant in the optical beam of each wavelength, thereby enabling correction and reduction of spherical aberration at the time of optical beams of first and second wavelengths that have passed through the second diffraction region 52 and become diffracted light of a predetermined order being condensed on the signal recording face of the respective optical discs by the object lens 34.

Also, the second diffraction region 52 is configured so as to function as described above regarding the optical beams of the first and second wavelengths, but for the optical beam of the third wavelength such that diffracted light of orders other than diffracted light of an order which is condensed on the signal recording face of the third optical disc after passing through the second diffraction region 52 and the object lens 34 is dominant, whereby aperture restriction can be applied to the optical beam of the third wavelength, such that there is very little effect even if the optical beam of the third wavelength which has been transmitted through the second diffraction region 52 is input to the object lens 34, there is hardly any effect on the signal recording face of the third optical disc, i.e., markedly reducing the light quantity of the optical beam of the third wavelength which is condensed on the signal recording face after passing through the second diffraction region 52 and the object lens 34, to around zero.

Now, the above-described first diffraction region 51 is formed of a size such that the optical beam of the third wavelength which has been transmitted through the region thereof is input to the object lens 34 in the same state as an optical beam which has been subjected to aperture restriction at around NA=0.45, and since the second diffraction region 52 formed on the outer side of the first diffraction region 51 does not allow condensation of the optical beam of the third wavelength which has been transmitted through this region on the third optical disc via the optical lens 34, the diffraction unit 50 which has the first and second diffraction regions 51 and 52 configured thus functions so as to restrict the numerical aperture of the optical beam of the third wavelength to around NA=0.45. It should be noted however, that while in this arrangement of the diffraction unit 50, the optical beam of the third wavelength is subjected to aperture restriction around NA=0.45, but the present invention is not restricted to this, i.e., numerical aperture restriction due to the above configuration is not limited to this.

Specifically, as shown in FIGS. 4 and 5B, in the same way as with the above-described first diffraction region 51, the second diffraction region 52 is formed with the cross-sectional form of ring shapes centered on the optical axis being formed in a staircase-like shape having a predetermined depth d and a predetermined number of steps S, continuing in the radial direction in a staircase form. Note that the values of the second diffraction region 52 for d and/or S differ from those with the first diffraction region 51, so the second diffraction region 52 has formed a second diffraction structure which differs from the diffraction structure formed with the first diffraction region 51. For example, the diffraction structure of the second diffraction region 52 is, as shown in FIG. 5B, a diffraction structure having a staircase portion including first through third steps 52$s$1, 52$s$2, and 52$s$3, formed continuously in the radial direction, wherein the number of steps is 3 (S=3), and the depth of each step is generally the same depth (d/3), and first through fourth diffraction faces 52$f$1, 52$f$2, 52$f$3, and 52$f$4 formed at the same intervals of d/3 in the optical axis direction.

Also, while description is made here with regard to the second diffraction region 52 having the cross-sectional form of the rings formed as a diffraction structure with a multi-step staircase form, any diffraction structure may be used as long as an optical beam of a predetermined order is dominant as to the optical beam of each wavelength as described above, in the same way as with the first diffraction region 51, so a configuration may be used such as shown in FIG. 6, with a diffraction region 52B having a diffraction structure wherein the cross-sectional form of the rings is formed as blazed diffraction grating having a predetermined depth d, for example.

Also, in a case wherein the second diffraction region 52 diffracts the optical beam of the first wavelength which is transmitted therethrough such that diffracted light of the k1$m$'th order is dominant, i.e., such that the diffraction efficiency thereof is maximum, and diffracts the optical beam of the second wavelength which is transmitted therethrough such that diffracted light of the k2$m$'th order is dominant, i.e., such that the diffraction efficiency thereof is maximum, the diffraction orders k1$m$ and k2$m$ are set such as to conform to one of the following:

(k1$m$, k2$m$)=(+1, −1), (−1, +1), (+1, −2), (−1, +2), (+2, −1), or (−2, +1).

Specific examples of the second diffraction region 52 which is the middle ring zone will be given below, with specific numerical values of the depth d and number of steps S, and the diffraction order of diffracted light of the order that is dominant in the optical beam of each wavelength, and the diffraction efficiency of the diffracted light of each diffraction order is shown in Table 2. Note that Table 2 illustrates Middle Ring Zone Configuration Example 1 through Middle Ring Zone Configuration Example 3, wherein k1$m$ in Table 2 indicates the diffraction order where the diffraction efficiency of the optical beam of the first wavelength is maximum, eff1 illustrates the diffraction efficiency of the diffraction order where the diffraction efficiency of the optical beam of the first wavelength is maximum, k2$m$ indicates the diffraction order where the diffraction efficiency of the optical beam of the second wavelength is maximum, eff2 illustrates the diffraction efficiency of the diffraction order where the diffraction efficiency of the optical beam of the second wavelength is maximum, k3$m$ indicates the diffraction order where the optical beam of the third wavelength is selected as described below, eff3 illustrates the diffraction efficiency of the diffraction order where the optical beam of the third wavelength is selected, d indicates the groove depth of the second diffraction region 52, i.e., the distance from the lowest step of the staircase form to the highest step thereof, and S indicates the number of steps of the staircase form of the second diffraction region 52. Note that the asterisks in Table 2 indicate diffraction order for condensing an optical beam passing through the middle ring zone in this configuration example so as to appropriately form a spot on the signal recording face of the corresponding optical disk via the object lens 34, i.e., a diffraction order whereby spherical aberration on the signal recording face of the corresponding optical disc can be corrected, and "≈0" indicates that the diffraction efficiency is at a state of approximately zero.

TABLE 2

Middle Ring Zone Diffraction Efficiency, Diffraction Order, Depth, and Number of Steps, for Each Configuration Example

|  | k1m | eff$_1$ | K2m | eff$_2$ | K3m | eff$_3$ | d [μm] | s |
|---|---|---|---|---|---|---|---|---|
| Middle Ring Zone Configuration Example 1 | −1 | 0.76 | 1 | 0.77 | ✳ | ~0 | 8.6 | 3 |
| Middle Ring Zone Configuration Example 2 | −1 | 0.91 | 2 | 0.54 | ✳ | ~0 | 14.8 | 5 |

TABLE 2-continued

Middle Ring Zone Diffraction Efficiency, Diffraction Order, Depth, and Number of Steps, for Each Configuration Example

|  | k1m | eff$_1$ | K2m | eff$_2$ | K3m | eff$_3$ | d [μm] | s |
|---|---|---|---|---|---|---|---|---|
| Middle Ring Zone Configuration Example 3 | −2 | 0.67 | 1 | 0.89 | ✳ | ~0 | 14.1 | 5 |

* indicates diffraction orders regarding which spherical aberration is possible

Now, the Middle Ring Zone Configuration Example 1 shown in Table 2 will be described. As shown in Table 2, with the Middle Ring Zone Configuration Example 1, with the groove depth d=8.6 (μm) and the number of steps S=3, the diffraction efficiency eff1=0.76 for the first wavelength optical beam diffraction order k1$m$=−1, the diffraction efficiency eff2=0.77 for the second wavelength optical beam diffraction order k2$m$=+1. Also, the diffraction efficiency eff3 is approximately 0 for the diffraction order k3$m$, where optical beams of the third wavelength passing through this region are condensed on the signal recording face of the third optical disc so as to form a spot, via the object lens 34.

This Middle Ring Zone Configuration Example 1 will be described more specifically with reference to FIGS. 11A through 11C. FIG. 11A is a diagram illustrating the change in diffraction efficiency of the −1 order diffracted light of the optical beam of the first wavelength in a case wherein the depth d is changed in the staircase form with the number of steps S=3, FIG. 11B is a diagram illustrating the change in diffraction efficiency of the +1 order diffracted light of the optical beam of the second wavelength in a case wherein the depth d is changed in the staircase form with the number of steps S=3, and FIG. 11C is a diagram illustrating the change in diffraction efficiency of the +2 order diffracted light of the optical beam of the third wavelength in a case wherein the depth d is changed in the staircase form with the number of steps S=3. In FIGS. 11A through 11C, the horizontal axis represents the groove depth in nm, and the vertical axis represents the diffraction efficiency (intensity of light). As shown in FIG. 11A, at the position of 8600 nm on the horizontal axis, eff1 is 0.76, eff2 is 0.77 as shown in FIG. 11B, and eff3 is approximately zero as shown in FIG. 11C. The diffraction order k3$m$ of the optical beam of the third wavelength noted by the asterisk in Table 2 is k3$m$=+2.

In the same way in Table 2, with the Middle Ring Zone Configuration Example 2, with the groove depth d=14.8 (μm) and S=5, the diffraction efficiency eff1, eff2, and eff3 are obtained for the diffraction orders k1$m$, k2$m$, and k3$m$, as shown in Table 2 and FIGS. 12A through 12C; and with the Middle Ring Zone Configuration Example 3 shown in Table 2, with the groove depth d=14.1 (μm) and S=5, the diffraction efficiency eff1, eff2, and eff3 are obtained for the diffraction orders k1$m$, k2$m$, and k3$m$, as shown in Table 2 and FIGS. 13A through 13C.

The third diffraction region 53 which is an outer ring zone has a third diffraction structure formed which is ring shaped and has a predetermined depth, and which is a different structure from the first and second diffraction structures. The third diffraction region 53 diffracts the optical beam of the first wavelength that is transmitted therethrough such that diffracted light of an order which forms an appropriate spot condensed on the signal recording face of the first optical disc via the object lens 34 is dominant, i.e., such that maximum diffraction efficiency is manifested regarding diffracted light of other orders.

The third diffraction region 53 diffracts the optical beam of the second wavelength that is transmitted therethrough such that diffracted light of orders other than an order which forms an appropriate spot condensed on the signal recording face of the second optical disc via the object lens 34 is dominant, i.e., such that maximum diffraction efficiency is manifested regarding diffracted light of other orders, by way of the third diffraction structure. Note that the third diffraction region 53 can sufficiently reduce diffraction efficiency diffracted light of an order which forms an appropriate spot condensed on the signal recording face of the second optical disc via the object lens 34 for the optical beam of the second wavelength that is transmitted therethrough, by way of the third diffraction structure.

The third diffraction region 53 diffracts the optical beam of the third wavelength that is transmitted therethrough such that diffracted light of orders other than an order which forms an appropriate spot condensed on the signal recording face of the third optical disc via the object lens 34 is dominant, i.e., such that maximum diffraction efficiency is manifested regarding diffracted light of other orders, by way of the third diffraction structure. Note that the third diffraction region 53 can sufficiently reduce diffraction efficiency diffracted light of an order which forms an appropriate spot condensed on the signal recording face of the third optical disc via the object lens 34 for the optical beam of the third wavelength that is transmitted therethrough, by way of the third diffraction structure.

Thus, the third diffraction region 53 has a diffraction structure suitably formed whereby diffracted light of a predetermined order is dominant in the optical beam of each wavelength, thereby enabling correction and reduction of spherical aberration at the time of optical beams of the first wavelength that has passed through the third diffraction region 53 and become diffracted light of a predetermined order being condensed on the signal recording face of the respective optical discs by the object lens 34.

Also, the third diffraction region 53 is configured so as to function as described above regarding the optical beams of the first wavelength, but such that regarding the second and third wavelength beams, diffracted light of orders other than diffracted light of an order which is condensed on the signal recording face of the second and third optical discs after passing through the third diffraction region 53 and the object lens 34 is dominant, whereby aperture restriction can be applied to the optical beam of the second wavelength, such even if the optical beams of the second and third wavelengths which have been transmitted through the third diffraction region 53 are input to the object lens 34, that there is very little effect on the signal recording face of the second and third optical discs, i.e., markedly reducing the light quantity of the optical beams of the second and third wavelengths which are condensed on the signal recording faces after passing through the third diffraction region 53 and the object lens 34, to around zero. Also, the third diffraction region 53 can function to subject the optical beam of the third wavelength to aperture restriction along with the above-described second diffraction region 52.

Now, the above-described second diffraction region 52 is formed of a size such that the optical beam of the second wavelength which has been transmitted through the region thereof is input to the object lens 34 in the same state as an optical beam which has been subjected to aperture restriction at around NA=0.6, and since the third diffraction region 53 formed on the outer side of the second diffraction region 52 does not allow condensation of the optical beam of the second wavelength which has been transmitted through this region on the optical disc via the object lens 34, the diffraction unit 50 which has the second and third diffraction regions 52 and 53 configured thus functions so as to restrict the numerical aperture of the optical beam of the second wavelength to around NA=0.6. It should be noted however, that while in this arrangement of the diffraction unit 50, the optical beam of the second wavelength is subjected to aperture restriction around NA=0.6, but the present invention is not restricted to this, i.e., numerical aperture restriction due to the above configuration is not limited to this.

Also, the third diffraction region 53 is formed of a size such that the optical beam of the first wavelength which has been transmitted through the region thereof is input to the object lens 34 in the same state as an optical beam which has been subjected to aperture restriction at around NA=0.85, and since there is no diffraction structure formed on the outer side of the third diffraction region 53, this does not allow condensation of the optical beam of the first wavelength which has been transmitted through this region on the first optical disc via the object lens 34, and the diffraction unit 50 which has the third diffraction region 53 configured thus functions so as to restrict the numerical aperture of the optical beam of the first wavelength to around NA=0.85. Note that with the first wavelength optical beam transmitted through the third diffraction region 53, light of diffraction orders of −1, +1, +2, and −2 is dominant, so the zero-order light transmitted through the region outside the third diffraction region 53 almost never passes through the object lens 34 to be condensed on the first optical disc, but in cases wherein this zero-order does pass through the object lens 34 and is condensed on the first optical disc, a configuration may be provided to perform aperture restriction by providing, at the region outside of the third diffraction region 53, either a shielding portion for shielding optical beams passing through, or a diffraction region having a diffraction structure wherein optical beams of orders other than the order of the optical beam passing through the object lens 34 to be condensed on the first optical disc are dominant. It should be noted however, that while in this arrangement of the diffraction unit 50, the optical beam of the first wavelength is subjected to aperture restriction around NA=0.85, but the present invention is not restricted to this, i.e., numerical aperture restriction due to the above configuration is not limited to this.

Specifically, as shown in FIGS. 4 and 5C, in the same way as with the above-described first diffraction region 51, the third diffraction region 53 is formed with the cross-sectional form of ring shapes centered on the optical axis being formed in a staircase-like shape having a predetermined depth d and a predetermined number of steps S, continuing in the radial direction in a staircase form. Note that the values of the third diffraction region 53 for d and/or S differ from those with the first and second diffraction regions 51 and 52, so the third diffraction region 53 has formed a third diffraction structure which differs from the first and second diffraction structures formed with the first and second diffraction regions 51 and 52. For example, the diffraction structure of the third diffraction region 53 is, as shown in FIG. 5C, a diffraction structure having a staircase portion including first and second steps 53$s$1 and 53$s$2, formed continuously in the radial direction, wherein the number of steps is 2 (S=2), and the depth of each step is generally the same depth (d/2), and first through third diffraction faces 53$f$1, 53$f$2, and 53$f$3 formed at the same intervals of d/2 in the optical axis direction.

Also, while description is made here with regard to the third diffraction region 53 having the cross-sectional form of the rings formed as a diffraction structure with a multi-step staircase form, any diffraction structure may be used as long as an optical beam of a predetermined order is dominant as to the optical beam of each wavelength as described above, in the same way as with the first and second diffraction regions 51 and 52, so a configuration may be used such as shown in FIG. 6, with a diffraction region 53B having a diffraction structure wherein the cross-sectional form of the rings is formed as a blazed form having a predetermined depth d, for example.

Specific examples of the third diffraction region 53 which is the outer ring zone will be given below, with specific numerical values of the depth d and number of steps S, and the diffraction order of diffracted light of the order that is dominant in the optical beam of each wavelength, and the diffraction efficiency of the diffracted light of each diffraction order is shown in Table 3. Note that Table 3 illustrates Outer Ring Zone Configuration Example 1 through Outer Ring Zone Configuration Example 4, wherein k1o in Table 3 indicates the diffraction order where the diffraction efficiency of the optical beam of the first wavelength is maximum, eff1 illustrates the diffraction efficiency of the diffraction order where the diffraction efficiency of the optical beam of the first wavelength is maximum, k2o indicates the diffraction order where the optical beam of the second wavelength is selected as described below, eff2 illustrates the diffraction efficiency of the diffraction order where the optical beam of the second wavelength is selected, k3o indicates the diffraction order where the optical beam of the third wavelength is selected as described below, eff3 illustrates the diffraction efficiency of the diffraction order where the optical beam of the third wavelength is selected, d indicates the groove depth of the third diffraction region 53, i.e., the distance from the lowest step of the staircase form to the highest step thereof, and S indicates the number of steps of the staircase form of the third diffraction region 53. Note that the asterisks in Table 3 indicate diffraction order for condensing an optical beam passing through the outer ring zone in this configuration example so as to appropriately form a spot on the signal recording face of the corresponding optical disk via the object lens 34, i.e., a diffraction order whereby spherical aberration on the signal recording face of the corresponding optical disc can be corrected, and "≈0" indicates that the diffraction efficiency is at a state of approximately zero.

TABLE 3

Outer Ring Zone Diffraction Efficiency, Diffraction Order, Depth, and Number of Steps, for Each Configuration Example

|  | k1o | eff$_1$ | K2o | eff$_2$ | K3o | eff$_3$ | d [μm] | s |
|---|---|---|---|---|---|---|---|---|
| Outer Ring Zone Configuration Example 1 | −1 | 0.63 | ※ | ~0 | ※ | ~0 | 4.2 | 2 |
| Outer Ring Zone Configuration Example 2 | 1 | 0.78 | ※ | ~0 | ※ | ~0 | 0.5 | 5 |
| Outer Ring Zone Configuration Example 3 | 2 | 0.65 | ※ | ~0 | ※ | ~0 | 1.2 | 5 |
| Outer Ring Zone Configuration Example 4 | −2 | 0.68 | ※ | ~0 | ※ | ~0 | 6.4 | 5 |

* indicates diffraction orders regarding which spherical aberration is possible

Now, the Outer Ring Zone Configuration Example 1 shown in Table 3 will be described. As shown in Table 3, with the Outer Ring Zone Configuration Example 1, with the groove depth d=4.2 (μm) and the number of steps S=2, the diffraction efficiency eff1=0.63 for the first wavelength optical beam diffraction order k1o=−1. Also, the diffraction efficiency eff2 is approximately 0 for the second wavelength optical beam diffraction order k2o, where optical beams of the second wavelength passing through this region are condensed on the signal recording face of the second optical disc so as to form a spot, via the object lens 34. Further, the diffraction efficiency eff3 is approximately 0 for the third wavelength optical beam diffraction order k3o, where optical beams of the third wavelength passing through this region are condensed on the signal recording face of the third optical disc so as to form a spot, via the object lens 34.

Next, this Outer Ring Zone Configuration Example 1 will be described more specifically with reference to FIGS. 14A through 14C. FIG. 14A is a diagram illustrating the change in diffraction efficiency of the −1 order diffracted light of the optical beam of the first wavelength in a case wherein the depth d is changed in the staircase form with the number of steps S=2, FIG. 14B is a diagram illustrating the change in diffraction efficiency of the +1 order diffracted light of the optical beam of the second wavelength in a case wherein the depth d is changed in the staircase form with the number of steps S=2, and FIG. 14C is a diagram illustrating the change in diffraction efficiency of the +2 order diffracted light of the optical beam of the third wavelength in a case wherein the depth d is changed in the staircase form with the number of steps S=2. In FIGS. 14A through 14C, the horizontal axis represents the groove depth in nm, and the vertical axis represents the diffraction efficiency (intensity of light). As shown in FIG. 14A, at the position of 4200 nm on the horizontal axis, eff1 is 0.63, eff2 is approximately zero as shown in FIG. 14B, and eff3 is approximately zero as shown in FIG. 14C. The diffraction orders k2o and k3o noted by the asterisks in Table 3 are k2o=+1 and k3o=+2.

Figure 16A:
FIGS. 16A through 16C show graphs for calculating the diffraction efficiency of an outer ring zone configuration example 3 according to the first embodiment, illustrating the change in the diffraction efficiency of the optical beams of each wavelength as to change in the groove depth d in a case wherein S=5, and (k1o, k2o, k3o)=(+2, −1, −2)
Figure 16B:
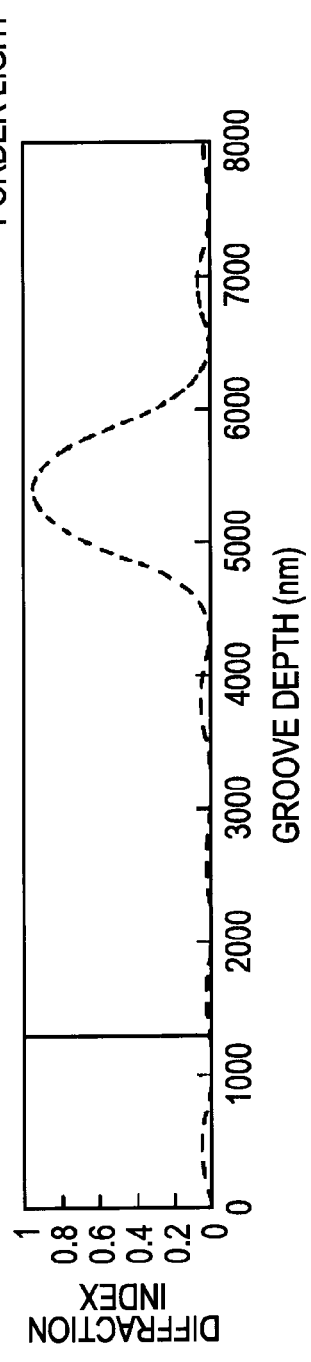
Figure 16C:
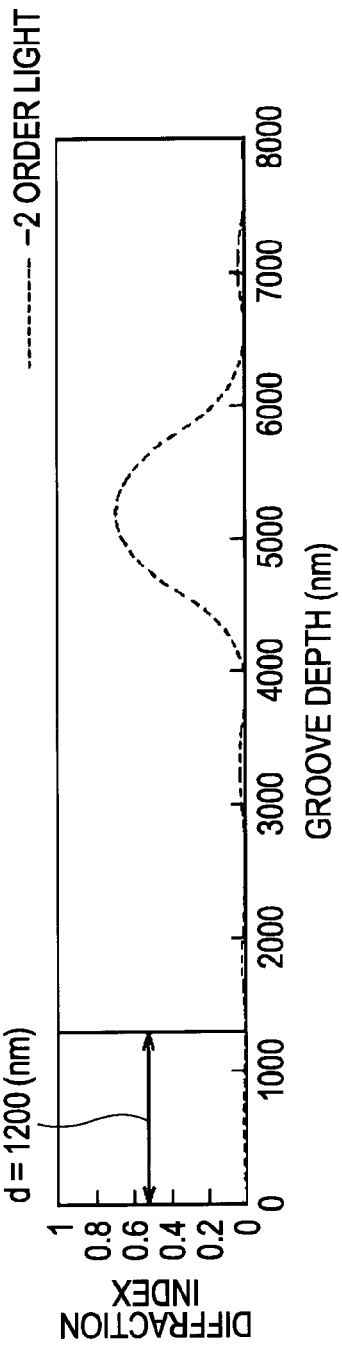

In the same way with the Outer Ring Zone Configuration Example 2 in Table 3, with the groove depth d=0.5 (μm) and S=5, the diffraction efficiency eff1, eff2, and eff3 are obtained for the diffraction orders k1o, k2o, and k3o, as shown in Table 3 and FIGS. 15A through 15C; with the Outer Ring Zone Configuration Example 3 in Table 3, with the groove depth d=1.2 (μm) and S=5, the diffraction efficiency eff1, eff2, and eff3 are obtained for the diffraction orders k1o, k2o, and k3o, as shown in Table 3 and FIGS. 16A through 16C; and with the Outer Ring Zone Configuration Example 4 in Table 3, with the groove depth d=6.4 (μm) and S=5, the diffraction efficiency eff1, eff2, and eff3 are obtained for the diffraction orders k1o, k2o, and k3o, as shown in Table 3 and FIGS. 17A through 17C.

The diffraction unit 50, having the first through third diffraction regions 51, 52, and 53 with the configuration such as described above, is capable of condensation of the optical beams of the first through third wavelengths passing through the first diffraction region 51 so as to form a suitable spot on the signal recording face of the corresponding optical disc by being input to the object lens 34, in a divergent angle state wherein no spherical aberration occurs at the signal recording face of respectively corresponding optical discs via the common object lens 34, i.e., in a dispersed state or converged state wherein spherical aberration is corrected via the object lens 34, and is capable of condensation of the optical beams of the first and second wavelengths passing through the second diffraction region 52 so as to form a suitable spot on the signal recording face of the corresponding optical disc by being input to the object lens 34, in a divergent angle state wherein no spherical aberration occurs at the signal recording face of respectively corresponding optical discs via the common object lens 34, i.e., in a dispersed state or converged state wherein spherical aberration is corrected via the object lens 34, and also is capable of condensation of the optical beam of the first wavelength passing through the third diffraction region 53 so as to form a suitable spot on the signal recording face of the corresponding optical disc by being input to the object lens 34, in a divergent angle state wherein no spherical aberration occurs at the signal recording face of the corresponding optical disc via the object lens 34, i.e., in a dispersed state or converged state wherein spherical aberration is corrected via the object lens 34.

That is to say, the diffraction unit 50 provided on one face of the diffraction optical element 35 disposed on the optical path between the first through third emitting units of the optical pickup 3 and the signal recording face allows optical beams of respective wavelengths passing through the respective regions (first through third diffraction regions 51, 52, and 53) to be input to the object lens 34 in a state wherein spherical aberration occurring at the signal recording face to be reduced, so spherical aberration occurring at the signal recording face when condensing optical beams of the first through third wavelengths on the signal recording face of the respective corresponding optical discs using the common object lens 34 in the optical pickup 3 can be minimized, which is to say that three-wavelength compatibility of the optical pickup using three types of wavelengths for three types of optical discs and a common object lens 34 can be realized, wherein information signals can be recorded to and/or played from respective optical discs.

Also, the diffraction unit 50 having the first through third diffraction regions 51, 52, and 53 performs diffraction of the optical beam of the third wavelength passing through the second and third diffraction regions 52 and 53 such that an order other than the diffraction order where the optical beam is appropriately condensed on the signal recording face of the corresponding type of optical disc via the object lens 34 is dominant, whereby, with regard to the optical beam of the third wavelength, only the optical beam portion which has passed through the first diffraction region 51 is condensed on the signal recording face of the optical disc via the object lens 34, and also, the first diffraction region 51 is formed to a size which is the predetermined numerical aperture of the third wavelength optical beam passing through this region, whereby aperture restriction can be performed regarding the optical beam of the third wavelength such that NA= around 0.45, for example.

Also, the diffraction unit 50 performs diffraction of the optical beam of the second wavelength passing through the third diffraction region 53 such that an order other than the diffraction order where the optical beam is appropriately condensed on the signal recording face of the corresponding type of optical disc via the object lens 34 is dominant, whereby, with regard to the optical beam of the second wavelength, only the optical beam portion which has passed through the first and second diffraction regions 51 and 52 is condensed on the signal recording face of the optical disc via the object lens 34, and also, the first and second diffraction regions 51 and 52 are formed to a size which is the predetermined numerical aperture of the second wavelength optical beam passing through this region, whereby aperture restriction can be performed regarding the optical beam of the second wavelength such that NA= around 0.60, for example.

Also, the diffraction unit 50 places the optical beam of the first wavelength passing outside of the third diffraction region 53 in a state so as to not be suitably condensed on the signal recording face of the corresponding type of optical disc via the object lens 34, or shields the optical beam of the first wavelength passing outside of the third diffraction region 53, whereby, with regard to the optical beam of the first wavelength, only the optical beam portion which has passed through the first through third diffraction regions 51, 52, and 53 is condensed on the signal recording face of the optical disc via the object lens 34, and also, the first through third diffraction regions 51, 52, and 53 are formed to a size which is the predetermined numerical aperture of the first wavelength optical beam passing through this region, whereby aperture restriction can be performed regarding the optical beam of the first wavelength such that NA= around 0.85, for example.

Thus, the diffraction unit 50 provided on one face of the diffraction optical element 35 disposed on the optical path as described above not only realizes three-wavelength compatibility, but also enables optical beams of each wavelength to be input to the common object lens 34 in a state wherein aperture restriction is performed appropriately for each of the three types of optical discs and optical beams of the first through third wavelengths. That is to say, the diffraction unit 50 not only has functions of aberration correction corresponding to three wavelengths, but also has functions as an aperture restricting unit.

It should be noted that a diffraction unit can be configured by suitably combining the above-described diffraction region examples. That is to say, the diffraction order of each wavelength passing through each diffraction region can be selected as appropriate. In the event of changing the diffraction order of each wavelength passing through each diffraction region, an object lens 34 corresponding to each diffraction order of each wavelength passing through each diffraction region can be used.

Also, while the first through third diffraction regions 51, 52, and 53 have been shown here having a so-called multi-step form diffraction structure with a staircase form having steps of a predetermined depth, a configuration may be used such as shown in FIG. 6, formed as a blazed form. Particularly, with a diffraction region having a diffraction structure with a shallow groove depth d formed, such as the third diffraction region, the manufacturing processes is simplified by forming as a blazed form, thereby simplifying and reducing costs of manufacturing.

Figure 18A:
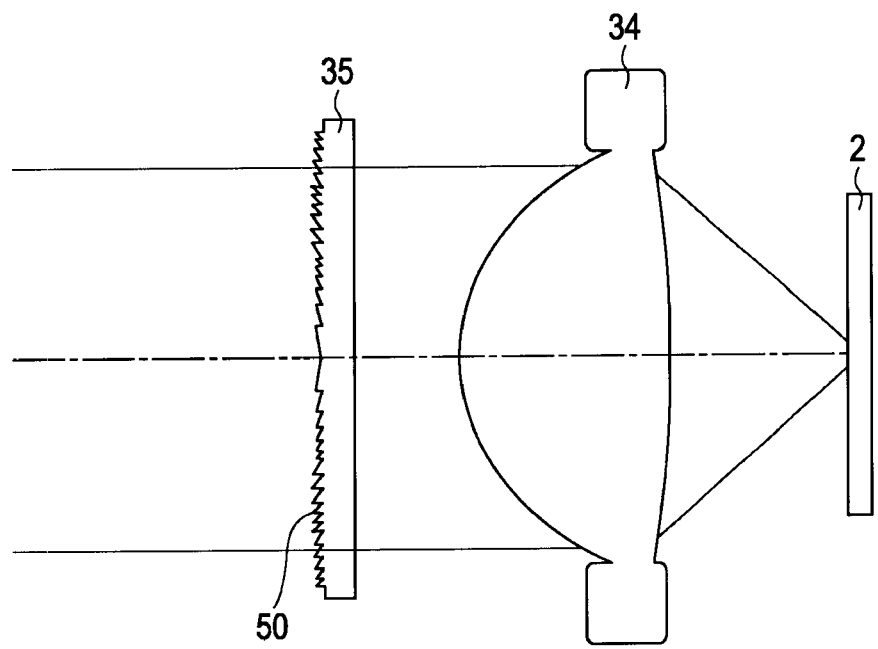
Figure 18B:
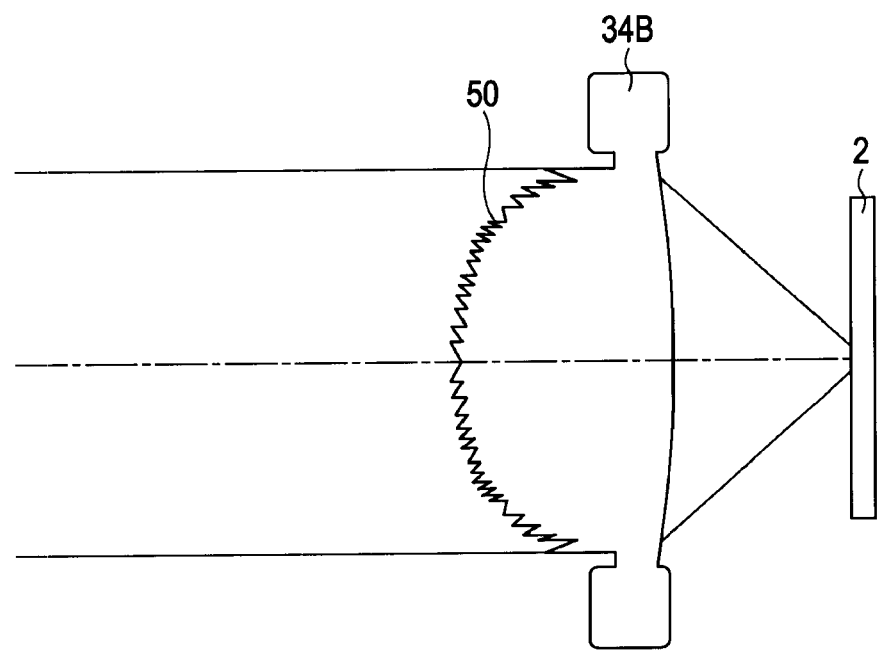

Also, while description has been made above with the diffraction unit 50 configured of the three diffraction regions 51, 52, and 53 formed on the incident side face of the diffraction optical element 35 provided separately from the object lens 34, as shown in FIG. 18A, the present invention is not restricted to this arrangement, and may be provided to the output side face of the diffraction optical element 35. Further, the diffraction unit 50 having the first through third diffraction regions 51, 52, and 53, can be integrally configured on the input or output side of the object lens 34, or further, as shown in FIG. 18B for example, an object lens 34B having the diffraction unit 50 on the incident side thereof may be configured. In the event of providing the diffraction unit 50 on the incident side face of the object lens 34B for example, the planar shape of the above-described diffraction structure is combined with a reference face at the incident side required for the lens to be able to function as an object lens. While the above-described diffraction optical element 35 and the object lens 34 are two separate elements serving as a condensing optical device, the object lens 34B thus configured functions as a condensing optical device which can perform suitable light condensing such that spherical aberration does not occur at the signal recording face of optical discs corresponding to each of the three optical beams of different wavelengths, with a single element. Providing the diffraction unit 50 integrally with the object lens 34B enables further reduction in optical parts and also reduction in configuration size.

The object lens 34B having a diffraction unit having functions the same as the diffraction unit 50 provided integrally at the input side or output side face realizes three-wavelength compatibility of the optical pickup 3 by reducing aberration and so forth when used in an optical pickup, and also reduces the number of parts so as to enable simplification and reduction in size of the configuration, thereby realizing high production and reduced costs. Note that the above-described diffraction unit 50 sufficiently manifests the advantages thereof with the diffraction structure for aberration correction to realize three-wavelength compatibility being provided on a single face that has been difficult with the related art, which enables such a diffraction element to be integrally formed with the object lens 34, further enabling directly forming a diffraction face on a plastic lens, and forming the object lens 34B with which the diffraction unit 50 has been integrated of a plastic material further realized improved production and lower costs.

The collimator lens 42 provided between the diffraction optical element 35 and the third beam splitter 38 converts the divergent angle of the first through third wavelength optical beams of which the optical paths have been synthesized at the second beam splitter 37 and passed through the third beam splitter, and outputs to the quarter-wave plate 43 and diffraction optical element 35 side, in a generally parallel light state, for example. The arrangement wherein the collimator lens 42 inputs the optical beams of the first and second wavelengths into the above-described diffraction optical element 35 with the divergent angle thereof in the state of generally parallel light, and also inputs the optical beam of the third wavelength into the diffraction optical element 35 in a divergent angle state which is slightly diffused or converged as to parallel light (hereinafter also referred to as "finite system state") enables further reduction of spherical aberration at the time of condensing the third wavelength optical beam on the signal recording face of the third optical disc via the diffraction optical element 35 and the object lens 34. While an arrangement has been described here wherein the optical beam of the third wavelength is input to the diffraction optical element 35 in a state of a predetermined divergent angle, due to the positional relation between the third light source 33 having the third emitting unit for emitting the third wavelength optical beam and the collimator lens 42, in the event of positioning multiple emitting units at a common light source for example, this may be realized by providing an element which converts only the divergent angle of the optical beam of the third wavelength, or by inputting into the diffraction optical element 35 in a predetermined divergent angle state by providing a mechanism to drive the collimator lens 42. Also, the optical beams of the second wavelength, or the optical beams of the second and third wavelengths, may be input to the diffraction optical element 35 in the finite system state, thereby further reducing aberration.

The multi-lens 46 is, for example, a wavelength-selective multi-lens, whereby the returning first through third wavelength optical beams separated from the outgoing path optical beams by being reflected at the third beam splitter 38, after having been reflected off of the signal recording face of the respective optical disc, and passed through the object lens 34, diffraction optical element 35, redirecting mirror 44, quarter-wave plate 43, and collimator lens 42, is appropriately condensed on the photoreception face of the photodetector or the like of the photosensor 45. At this time, the multi-lens 46 provides the return optical beam with astigmatism for detection of focus error signals or the like.

The photosensor 45 receives the return optical beam condensed at the multi-lens 46, and detects, along with information signals, various types of detection signals such as focus error signals, tracking error signals, and so forth.

With the optical pickup 3 configured as described above, the object lens 34 is driven so as to be displaced based on the focus error signals and tracking error signals obtained by the photosensor 45, whereby the object lens 34 is moved to a focal position as to the signal recording face of the optical disc 2, the optical beam is focused onto the signal recording face of the optical disc 2, and information is recorded to or played from the optical disc 2.

The optical pickup 3 is provided on one face of the diffraction optical element 35, can provide optical beams of each wavelength with a diffraction efficiency and diffraction angle suitable for each region due to the diffraction unit 50 having the first through third diffraction regions 51, 52, and 53, can sufficiently reduce spherical aberration at the signal recording face of the three types of first through third optical discs 11, 12, and 13, of which the format for the thickness of the protective layer differs, and enables reading and writing of signals to and from the multiple types of optical discs 11, 12, and 13, using optical beams of three different wavelengths.

Also, the diffraction optical element 35 having the diffraction unit 50, and object lens 34, in the above optical pickup 3, can function as a condensing optical device for condensing incident optical beams at a predetermined position. In the event of using an optical pickup which performs recording and/or playing of information signals by irradiating optical beams onto three different types of optical discs, the diffraction unit 50 provided on one face of the diffraction optical element 35 enables the condensing optical device to appropriately condense corresponding optical beams onto the signal recording face of the three types of optical discs in a state with spherical aberration sufficiently reduced, meaning that three-wavelength compatibility of the optical pickup using the object lens 34 common to the three wavelengths can be realized.

Also, while description has been made above regarding a configuration wherein the diffraction optical element 35 to which the diffraction unit 50 is provided, and the object lens 34, are provided to an actuator such as an object lens driving mechanism or the like for driving the object lens 34 is as to be integral, this may be configured as a condensing optical unit wherein the diffraction optical element 35 and the object lens 34 are formed as an integrated unit, in order to improve precision of assembly to the lens holder of the actuator, and facilitate assembly work. For example, a condensing optical unit can be configured by use of spacers or the like to fix the diffraction optical element 35 and object lens 34 to the holder while setting the positioning, spacing, and optical axis, so as to be integrally formed. Due to being integrally assembled to the object lens driving mechanism as described above, the diffraction optical element 35 and object lens 34 can appropriately condense the first through third wavelength optical beams on the signal recording face of the respective optical discs in a state with spherical aberration reduced, even at the time of field shift such as displacement in the tracking direction.

Next, the optical paths of the optical beams emitted from the first through third light sources 31, 32, and 33 of the optical pickup 3 configured as described above, will be described with reference to FIG. 2. First, the optical path at the time of emitting the optical beam of the first wavelength as to the first optical disc 11 and performing reading or writing of information will be described.

The disc type determination unit 22 which has determined that the type of the optical disc 2 is the first optical disc 11 causes the optical beam of the first wavelength to be emitted from the first emitting unit of the first light source 31.

The optical beam of the first wavelength emitted form the first emitting unit is split into three beams by the first grating 39, for detection of tracking error signals and so forth, and is input to the second beam splitter 37. The optical beam of the first wavelength which has been input to the second beam splitter 37 is reflected at a mirror face 37a thereof, and is output to the third beam splitter 38 side.

The optical beam of the first wavelength which is input to the third beam splitter 38 is transmitted through a mirror face 38a thereof, output to the collimator lens 42 side, where the divergent angle is converted by the collimator lens 42 so as to be generally parallel light, provided with a predetermined phase difference at the quarter-wave plate 43, reflected off of the redirecting mirror 44, and output to the diffraction optical element 35 side.

The optical beam of the first wavelength which is input to the diffraction optical element 35 is output with the optical beam which has passed through each region thereof having a predetermined diffraction order dominant therein as described above, due to the first through third diffraction regions 51, 52, and 53 of the diffraction unit 50 provided on the incident side face thereof, and input to the object lens 34. The optical beam of the first wavelength output from the diffraction optical element 35 is not only in a state of a predetermined divergent angle, but also is in a state of aperture restriction.

The optical beam of the first wavelength input to the object lens 34 has been input in a divergent angle state whereby spherical aberration of the optical beam having passed through the regions 51, 52, and 53 can be reduced, and accordingly is appropriately condensed by the object lens 34 on the signal recording face of the first optical disc 11.

The optical beam condensed at the first optical disc 11 is reflected at the signal recording face, passes through the object lens 34, diffraction optical element 35, redirecting mirror 44, quarter-wave plate 43, and collimator lens 42, is reflected off of the mirror face 38a of the third beam splitter 38, and is output to the photosensor 45 side.

The optical beam split from the optical path of the outgoing optical beam reflected off of the third beam splitter 38 is condensed on the photoreception face of the photosensor 45 by the multi-lens 46, and detected.

Next, description will be made regarding the optical path at the time of emitting an optical beam of the second wavelength to the second optical disc 12 and reading or writing information. The disc type determination unit 22 which has determined that the type of the optical disc 2 is the second optical disc 12 causes the optical beam of the second wavelength to be emitted from the second emitting unit of the second light source 32.

The optical beam of the second wavelength emitted from the second emitting unit is split into three beams by the second grating 40, for detection of tracking error signals and so forth, and is input to the first beam splitter 36. The optical beam of the second wavelength which has been input to the first beam splitter 36 is transmitted through a mirror face 36a thereof, also transmitted through the mirror face 37a of the second beam splitter 37, and is output to the third beam splitter 38 side.

The optical beam of the second wavelength which is input to the third beam splitter 38 is transmitted through the mirror face 38a thereof, output to the collimator lens 42 side, where the divergent angle is converted by the collimator lens 42 so as to be generally parallel light, provided with a predetermined phase difference at the quarter-wave plate 43, reflected off of the redirecting mirror 44, and output to the diffraction optical element 35 side.

The optical beam of the second wavelength which is input to the diffraction optical element 35 is output with the optical beam which has passed through each region thereof having a predetermined diffraction order dominant therein as described above, due to the first through third diffraction regions 51, 52, and 53 of the diffraction unit 50 provided on the incident side face thereof, and input to the object lens 34. The optical beam of the second wavelength output from the diffraction optical element 35 is not only in a state of a predetermined divergent angle, but also is in a state of aperture restriction due to entering the object lens 34.

The optical beam of the second wavelength input to the object lens 34 has been input in a divergent angle state whereby spherical aberration of the optical beams having passed through the first and second diffraction regions 51 and 52 can be reduced, and accordingly is appropriately condensed by the object lens 34 on the signal recording face of the second optical disc 12.

The return optical path of the optical beam reflected off of the signal recording face of the second optical disc 12 is the same as with the case of the above-described optical beam of the first wavelength, and accordingly description thereof will be omitted.

Next, description will be made regarding the optical path at the time of emitting an optical beam of the third wavelength to the third optical disc 13 and reading or writing information. The disc type determination unit 22 which has determined that the type of the optical disc 2 is the third optical disc 13 causes the optical beam of the third wavelength to be emitted from the third emitting unit of the third light source 33.

The optical beam of the third wavelength emitted form the third emitting unit is split into three beams by the third grating 41, for detection of tracking error signals and so forth, and is input to the first beam splitter 36. The optical beam of the third wavelength which has been input to the first beam splitter 36 is reflected off of the mirror face 36a thereof, transmitted through the mirror face 37a of the second beam splitter 37, and is output to the third beam splitter 38 side.

The optical beam of the third wavelength which is input to the third beam splitter 38 is transmitted through the mirror face 38a thereof, output to the collimator lens 42 side, where the divergent angle is converted by the collimator lens 42 so as to be diffused or converged as to generally parallel light, provided with a predetermined phase difference at the quarter-wave plate 43, reflected off of the redirecting mirror 44, and output to the diffraction optical element 35 side.

The optical beam of the third wavelength which is input to the diffraction optical element 35 is output with the optical beam which has passed through each region thereof having a predetermined diffraction order dominant therein as described above, due to the first through third diffraction regions 51, 52, and 53 of the diffraction unit 50 provided on the incident side face thereof, and input to the object lens 34. The optical beam of the third wavelength output from the diffraction optical element 35 is not only in a state of a predetermined divergent angle, but also is in a state of aperture restriction due to having been input to the object lens 34.

The optical beam of the third wavelength input to the object lens 34 has been input in a divergent angle state whereby spherical aberration of the optical beam having passed through the first diffraction region 51 can be reduced, and accordingly is appropriately condensed by the object lens 34 on the signal recording face of the third optical disc 13.

The return optical path of the optical beam reflected off of the signal recording face of the third optical disc 13 is the same as with the case of the above-described optical beam of the first wavelength, and accordingly description thereof will be omitted.

Note that while a configuration has been described here wherein the optical beam of the third wavelength has the position of the third emitting unit adjusted such that the optical beam of which the divergent angle is converted by the collimator lens 42 and input to the diffraction optical element 35 is in a diffused or converged state as to generally parallel light, but a configuration may be made wherein the optical beam is input to the diffraction optical element 35 by providing an element which has wavelength selectivity and converts the divergent angle, or by providing a mechanism which drives the collimator lens 42 in the optical axis direction.

Also, while description has been made regarding a configuration wherein the optical beams of the first and second wavelengths are input to the diffraction optical element 35 in a state of generally parallel light, while the optical beam of the third wavelength is input to the diffraction optical element 35 in a diffused or converged state, the present invention is not restricted to this arrangement, and configurations may be made wherein, for example, all of the first through third wavelength optical beams are input to the diffraction optical element 35 in a state of generally parallel light, or wherein any or all of the first through third wavelength optical beams are input to the diffraction optical element 35 in a diffused or converged state.

The optical pickup 3 to which the present invention has been applied has first through third emitting units for emitting optical beams of first through third wavelengths, an object lens 34 for condensing the optical beams of first through third wavelengths emitted from the first through third emitting units into a signal recording face of an optical disc, and a diffraction unit 50 provided on one face of an optical element disposed on the outgoing optical path of the optical beams of first through third wavelengths, wherein the diffraction unit 50 has first through third diffraction regions 51, 52, and 53, with the first through third diffraction regions 51, 52, and 53 being different diffraction structures ring-shaped and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having difference usage wavelengths can be appropriately condensed on the signal recording face using the shared object lens 34, thereby realizing excellent recording and/or playing of information signals to/from the respective optical discs by realizing three-wavelength compatibility with the common object lens 34, without necessitating a complex structure.

That is to say, the optical pickup 3 to which the present invention has been applied obtains optimal diffraction efficiencies and diffraction angels for the first through third wavelength optical beams due to the diffraction unit 50 provided on one face within the optical path thereof, whereby signals can be read from and written to the multiple types of optical discs 11, 12, and 13, using the optical beams of different wavelengths emitted from the multiple emitting units provided to each of the light sources 31, 32, and 33, and also optical parts such as the object lens 34 and so forth can be shared, thereby reducing the number of parts, simplifying and reducing the size of the configuration, and realizing high production and lower costs.

Also, the optical pickup 3 to which the present invention has been applied can share the object lens 34 between the three wavelengths, thereby preventing trouble of reduction of sensitivity of the actuator due to increase weight of moving parts. Also, the optical pickup 3 to which the present invention has been applied can sufficiently reduce spherical aberration which is problematic in the case of sharing the common object lens 34 between the three wavelengths, due to the diffraction unit 50 provided on one face of the optical element, so problems such as positioning of diffraction units in the event that multiple diffraction units are provided on multiple faces to reduce spherical aberration as with the related art, and deterioration of diffraction efficiency due to providing of the multiple diffraction units, can be prevented, which realizes simplification of the assembly process and improved usage efficiency of light.

Further, the optical pickup 3 to which the present invention has been applied not only realizes three-wavelength compatibility with the diffraction unit 50 provided on the one face of the diffraction optical element 35 described above, but also can perform aperture restriction with a numerical aperture corresponding to each of the three types of optical discs and three types of optical disc wavelengths, which enables further simplification of configuration, reduction in size, and reduction in costs.

Also, while the above optical pickup 3 has been described having the first emitting unit provided at the first light source 31, the second emitting unit provided at the second light source 32, and the third emitting unit provided at the third light source 33, the present invention is not restricted to this arrangement, and an arrangement may be made wherein a light source having two of the first through third emitting units, and another light source having the remaining one emitting unit, are provided at different positions.

Next, description will be made regarding an optical pickup 60 shown in FIG. 19 including a light source having a first emitting unit, and a light source having second and third emitting units. Note that portions in the following description which are the same as with the optical pickup 3 will be denoted with the same reference numerals, and description thereof will be omitted.

Figure 19:
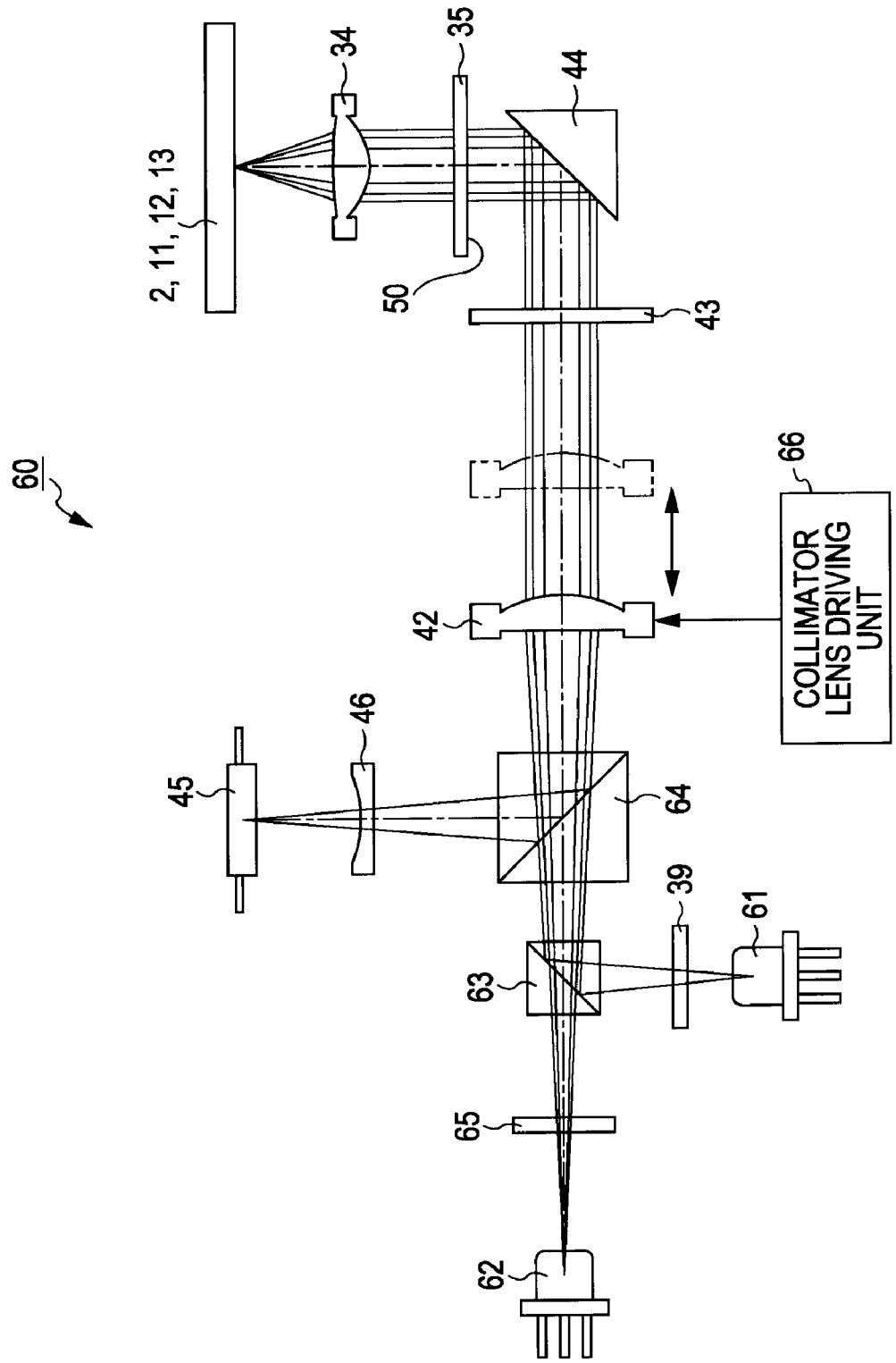
FIG. 19 is an optical path diagram illustrating another example of the optical system of an optical pickup to which the present invention has been applied, as a first embodiment.

As shown in FIG. 19, the optical pickup 60 to which the present invention has been applied includes a first light source 61 having a first emitting unit for emitting an optical beam of a first wavelength, a second light source 62 having a second emitting unit for emitting an optical beam of a second wavelength and a third emitting unit for emitting an optical beam of a third wavelength, an object lens 34 for condensing optical beams emitted from the first through third emitting units onto the signal recording face of an optical disc 2, and a diffraction optical element 35 provided on the optical path between the first through third emitting units and the object lens 34.

Also, the optical pickup 60 includes a beam splitter 63 serving as an optical path synthesizing unit for synthesizing the optical paths of the optical beam of the first wavelength that has been emitted from the first emitting unit of the first light source 61 and the optical beams of the second and third wavelengths that have been emitted from the second and third emitting unit of the second light source 62, and a beam splitter 64 serving the same function as the above third beam splitter 38.

Further, the optical pickup 60 has a first grating 39, and a grating 65 with wavelength dependency, provided between the second light source 62 and the beam splitter 63, for diffracting the optical beams of the second and third wavelengths that have been emitted from the second and third emitting units into three beams, for detection of tracking error signals and so forth.

Also, the optical pickup 60 has a collimator lens 42, quarter-wave plate 43, redirecting mirror 44, photosensor 45, and multi-lens 46, and also a collimator lens driving unit 66 for driving the collimator lens 42 in the optical axis direction. The collimator lens driving unit 66 can adjust the divergent angle of optical beams passing through the collimator lens 42 as described above, whereby not only can spherical aberration be reduced, but in the event that the mounted optical disc is a so-called multi-layer optical disc having multiple signal recording faces, recording and/or playing to/from each of the signal recording faces is enabled by driving the collimator lens 42 in the optical axis direction.

With the optical pickup 60 configured as described above, the functions of each of the optical parts is the same as with the optical pickup 3 except for those mentioned above, and the optical paths of the optical beams of the first through third wavelengths emitted from the first through third emitting units are the same as with the optical pickup 3 except for the above-mentioned, i.e., following synthesizing of the optical paths of the optical beams of each wavelength by the beam splitter 64, so detailed description thereof will be omitted.

The optical pickup 60 to which the present invention has been applied has first through third emitting units for emitting optical beams of first through third wavelengths, an object lens 34 for condensing the optical beams of first through third wavelengths emitted from the first through third emitting units into a signal recording face of an optical disc, and a diffraction unit 50 provided on one face of an optical element disposed on the outgoing optical path of the optical beams of first through third wavelengths, wherein the diffraction unit 50 has first through third diffraction regions 51, 52, and 53, with the first through third diffraction regions 51, 52, and 53 being different diffraction structures ring-shaped and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having difference usage wavelengths can be appropriately condensed on the signal recording face using the shared object lens 34, thereby realizing excellent recording and/or playing of information signals to/from the respective optical discs by realizing three-wavelength compatibility with the common object lens 34, without necessitating a complex structure. The optical pickup 60 also has the other advantages of the above-described optical pickup 3, as well.

Further, the optical pickup 60 is configured such that the second and third emitting units are positioned at a common light source 62, thereby realizing further simplification of structure and reduction in size. Note that in the same way, with the optical pickup to which the present invention has been applied, the first through third emitting units may be positioned at a common light source at generally the same position, thereby realizing further simplification of structure and reduction in size with such a configuration.

The optical disc device 1 to which the present invention has been applied has a driving unit for holding and rotationally driving an optical disc arbitrarily selected from the first through third optical discs, and an optical pickup for performing recording and/or playing of information signals from/to the optical disc being rotationally driven by the driving unit by selectively irradiating one of multiple optical beams of different wavelengths corresponding to the optical disc, and by using the above-described optical pickups 3 or 60 as the optical pickup, optical beams corresponding to each of three types of optical discs having difference usage wavelengths can be appropriately condensed on the signal recording face due to the diffraction unit provided on one face of the optical element on the optical path of the optical beams of the first through third wavelengths, using a common object lens 34, thereby realizing excellent recording and/or playing by realizing three-wavelength compatibility with the common object lens 34, while enabling simplification of the structure and reduction in size, without necessitating a complex structure.

<3> Second Embodiment of Optical Pickup (FIGS. 20 through 36)

Next, an optical pickup 103 to which the present invention is applied will be described as a second embodiment of the optical pickup used in the above-described optical disc device 1, with reference to FIGS. 20 through 36. As described above, the optical pickup 103 is an optical pickup which selectively irradiates multiple optical beams with different wavelengths onto optical discs arbitrarily selected from first through third optical discs 11, 12, and 13, of which the format such as the thickness of the protective layer differs, thereby performing recording and/or playing of information signals.

As shown in FIG. 20, the optical pickup to which the present invention has been applied includes a first light source 131 having a first emitting unit for emitting an optical beam of a first wavelength, a second light source 132 having a second emitting unit for emitting an optical beam of a second wavelength longer than the first wavelength, a third light source 133 having a third emitting unit for emitting an optical beam of a third wavelength longer than the second wavelength, an object lens 134 for condensing optical beams emitted from the emitting unit of the first through third emitting units onto the signal recording face of an optical disc 2, and a diffraction optical element 135 provided on the optical path between the first through third emitting units and the object lens 134.

Also, the optical pickup 103 includes a first beam splitter 136 provided between the second and third emitting units and the diffraction optical element 135, serving as an optical path synthesizing unit for synthesizing the optical paths of the optical beam of the second wavelength that has been emitted from the second emitting unit and the optical beam of the third wavelength that has been emitted from the third emitting unit, a second beam splitter 137 provided between the first beam splitter 136 and the diffraction optical element 135, serving as an optical path synthesizing unit for synthesizing the optical path of the optical beams of the second and third wavelengths of which the optical paths have been synthesized by the first beam splitter 136 and the optical beam of the first wavelength emitted form the frits emitting unit, and a third beam splitter 138 provided between the second beam splitter 137 and the diffraction optical element 135, serving as an optical path splitting unit for splitting the outgoing optical path of the optical beams of the first through third wavelengths synthesized at the second beam splitter 137 from the returning optical path of the optical beams of the first through third wavelengths reflected off of the optical disc (hereinafter also referred to as "return path").

Further, the optical pickup 103 has a first grating 139 provided between the first emitting unit of the first light source unit 131 and the second beam splitter 137, for diffracting the optical beam of the first wavelength that has been emitted from the first emitting unit into three beams, for detection of tracking error signals and so forth, a second grating 140 provided between the second emitting unit of the second light source unit 132 and the first beam splitter 136, for diffracting the optical beam of the second wavelength that has been emitted from the second emitting unit into three beams, for detection of tracking error signals and so forth, and a third grating 141 provided between the third emitting unit of the third light source unit 133 and the first beam splitter 136, for diffracting the optical beam of the third wavelength that has been emitted from the third emitting unit into three beams, for detection of tracking error signals and so forth.

Also, the optical pickup 103 has a collimator lens 142 provided between the third beam splitter 138 and the diffraction optical element 135, serving as a divergent angle conversion unit for converting the divergent angle of the optical beams of the first through third wavelengths of which the optical paths have been synthesized at the third beam splitter 138 so as to be adjusted into a state of generally parallel light or a state diffused or converged as to generally parallel light, and outputting, a quarter-wave plate 143 provided between the collimator lens 142 and the diffraction optical element 135, so as to provide quarter-wave phase difference to the optical beams of the first through third wavelengths of which the divergent angle has been adjusted by the collimator lens 142, and a redirecting mirror 144 provided between the diffraction optical element 135 and the quarter-wave plate 143, for redirecting by reflecting the optical beam which has passed through the above-described optical parts within a plane generally orthogonal to the optical axis of the object lens 134 and diffraction optical element 135, so as to emit the optical beam in the optical axis direction toward the object lens 134 and diffraction optical element 135.

Further, the optical pickup 103 includes a photosensor 145 for receiving and detecting the optical beams of the first through third wavelengths split at the third beam splitter 138 on the return path from the optical beams of the first through third wavelengths on the outgoing path, and a multi lens 146 provided between the third beam splitter 138 and the photosensor 145, for condensing optical beams of the first through third wavelengths split at the third beam splitter 138 return path onto the photoreception face of a photodetector or the like of the photosensor 145, and also providing astigmatism for detecting focus error signals or the like.

The first light source 131 has a first emitting unit for emitting an optical beam of a first wavelength around 405 nm onto the first optical disc 11. The second light source 132 has a second emitting unit for emitting an optical beam of a second wavelength around 655 nm onto the second optical disc 12. The third light source 133 has a third emitting unit for emitting an optical beam of a third wavelength around 785 nm onto the third optical disc 13. Note that while the first through third emitting units are configured disposed at individual light sources 131, 132, and 133, the invention is not restricted to this, and an arrangement may be made wherein two emitting units of the first through third emitting units are disposed at one light source and the remaining emitting unit is disposed at another light source at a different position, or wherein the first through third emitting units are disposed so as to form a light source at generally the same position.

The object lens 134 condenses the input optical beams of the first through third wavelengths into the signal recording face of the optical disc 2. The object lens 134 is movably held by an object lens driving mechanism such as an unshown biaxial actuator or the like. The object lens 134 is driven along two axes, one in the direction toward/away from the optical disc 2, and the other in the radial direction of the optical disc 2, by being moved by a biaxial actuator or the like based on the tracking error signals and focus error signals generated from the RF signals of the return light from the optical disc 2 that has been detected at the photosensor 145. The object lens 134 condenses optical beams emitted from the first through third emitting units such that the optical beams are always focused on the signal recording face of optical disc 2, and also causes the condensed optical beam to track a recording track formed on the signal recording face of the optical disc 2. Note that a configuration wherein the later-described diffraction optical element 135 is held by a lens holder of the object lens driving mechanism where the object lens 134 is held so as to be integral with the object lens 134 enables the later-described advantages of a diffraction unit 150 provided to the diffraction optical element 135 to be suitably manifested at the time of field shift of the object lens 134 such as movement in the tracking direction.

The diffraction optical element 135 has, as one face thereof for example, a diffraction unit 150 having multiple diffraction regions on the incident side face thereof, with the diffraction unit 150 diffracting each of the optical beams of the first through third wavelengths passing through each of the multiple diffraction regions into predetermined orders and inputting into the object lens 134, i.e., inputting into the object lens 134 as optical beams in a diffused state or converged state having a predetermined divergent angle, whereby the single object lens 134 can be used to perform suitable condensing of the optical beams of the first through third wavelengths such that spherical aberration does not occur at the signal recording face of the three types of optical discs corresponding to the optical beams of the first through third wavelengths. The diffraction optical element 135 serves as a condensation optical device along with the object lens 134 to appropriately perform condensation such that no spherical aberration occurs at the signal recording face of the three types of optical discs corresponding to the optical beams of the three different wavelengths.

The diffraction optical element 135 having the diffraction unit 150 performs diffraction of the first wavelength optical beam BB0 which has transmitted the diffraction unit 150 so as to become +1st order diffracted beam BB1 and inputs to the object lens 134, i.e., as an optical beam in a diffused state having a predetermined divergent angle, thereby appropriately condensing on the signal recording face of the first optical disc 11, as shown in FIG. 21A, performs diffraction of the second wavelength optical beam BD0 which has transmitted the diffraction unit 150 so as to become −1st order diffracted beam BD1 and inputs to the object lens 134, i.e., as an optical beam in a converged state having a predetermined divergent angle, thereby appropriately condensing on the signal recording face of the second optical disc 12, as shown in FIG. 21B, and performs diffraction of the third wavelength optical beam BC0 which has transmitted the diffraction unit 150 so as to become −2nd order diffracted beam BC1 and inputs to the object lens 134, i.e., as an optical beam in a converged state having a predetermined divergent angle, thereby appropriately condensing on the signal recording face of the third optical disc 13, as shown in FIG. 21C, for example, whereby suitable condensation can be performed such that no spherical aberration occurs at the signal recording face of the three types of optical discs, with a single object lens 134. While description has been made here with an example wherein optical beams of the same wavelength are made to be diffracted beams of the same diffraction order at the multiple diffraction regions of the diffraction unit 150, with reference to FIGS. 21A through 21C, the diffraction unit 150 configuring the optical pickup 103 to which the present invention is applied enables diffraction order corresponding to each wavelength to be set for each region as described later, so as to further reduce spherical aberration.

Note that in the above and following description of diffraction orders, an order of diffraction which draws closer to the optical axis side in the direction of progression with regard to an input optical beam is a positive order. In other words, an order which diffracts toward the optical axis direction of the input optical beam is a positive order. That is to say, with the above first through third wavelengths, +1 order diffracted light selected so as to be dominant diffracts in the direction of convergence as compared to the input optical beams of each wavelength.

Figure 22:
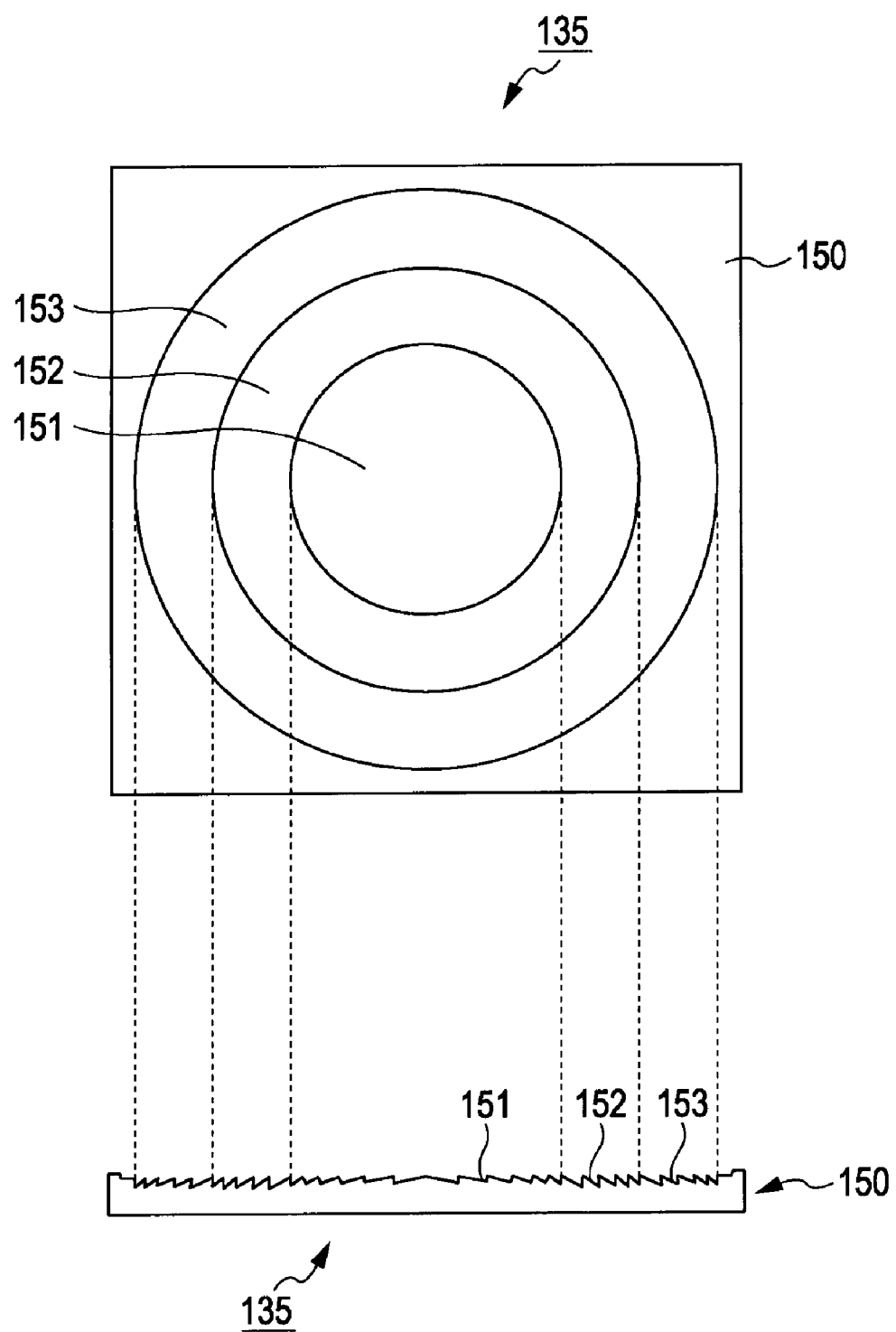
FIG. 22 is a diagram for describing the diffraction optical element configuring the optical pickup shown in FIG. 20, showing a correlated a plan view and cross-sectional view of the diffraction optical element.

Specifically, as shown in FIG. 22, the diffraction unit 150 provided at the incident side face of the diffraction optical element 135 has a generally-circular first diffraction region 151 provided on the innermost portion (hereinafter also referred to as "inner ring zone"), a ring-shaped second diffraction region 152 provided on the outer side of the first diffraction region 151 (hereinafter also referred to as "middle ring zone"), and a ring-shaped third diffraction region 153 provided on the outer side of the second diffraction region 152 (hereinafter also referred to as "outer ring zone").

The first diffraction region 151 which is an inner ring zone has a first diffraction structure formed having a ring shape with a predetermined depth, and diffracts the optical beam of the first wavelength that is transmitted therethrough such that diffracted light of an order which forms an appropriate spot condensed on the signal recording face of the first optical disc via the object lens 134 is dominant, i.e., such that maximum diffraction efficiency is manifested regarding diffracted light of other orders.

The first diffraction region 151 diffracts the optical beam of the second wavelength that is transmitted therethrough such that diffracted light of an order which forms an appropriate spot condensed on the signal recording face of the second optical disc via the object lens 134 is dominant, i.e., such that maximum diffraction efficiency is manifested regarding diffracted light of other orders, by way of the first diffraction structure.

The first diffraction region 151 diffracts the optical beam of the third wavelength that is transmitted therethrough such that diffracted light of an order which forms an appropriate spot condensed on the signal recording face of the third optical disc via the object lens 134 is dominant, i.e., such that maximum diffraction efficiency is manifested regarding diffracted light of other orders, by way of the first diffraction structure.

Thus, the first diffraction region 151 has a diffraction structure suitably formed whereby diffracted light of a predetermined order is dominant in the optical beam of each wavelength, thereby enabling correction and reduction of spherical aberration at the time of optical beams of each wavelength that have passed through the first diffraction region 151 and become diffracted light of a predetermined order being condensed on the signal recording face of the respective optical discs by the object lens 134.

Figure 23A:
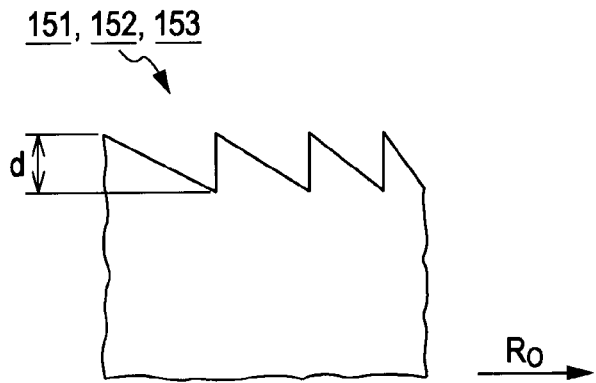
Figure 23B:
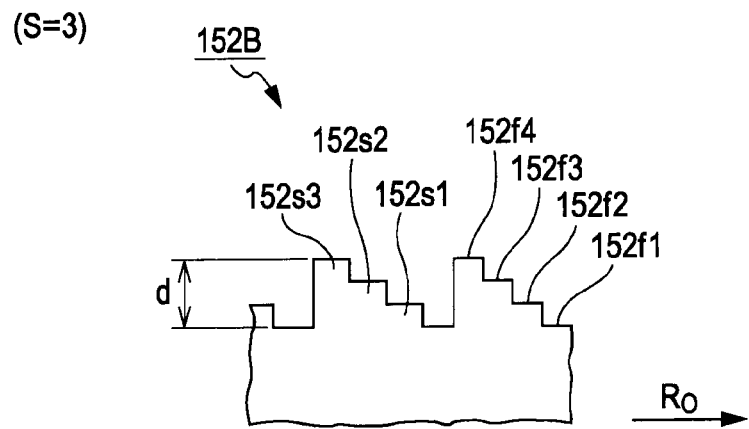
Figure 23C:
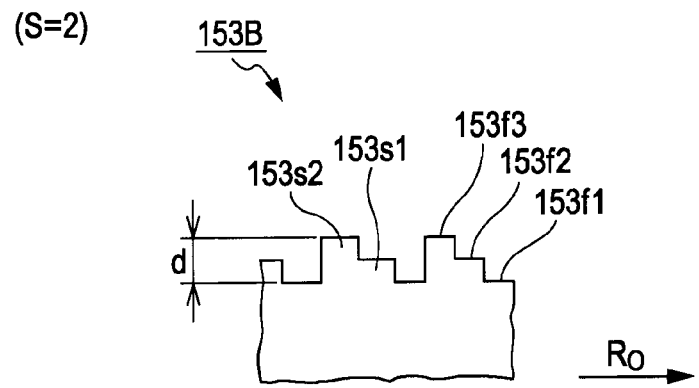
Figure 24:
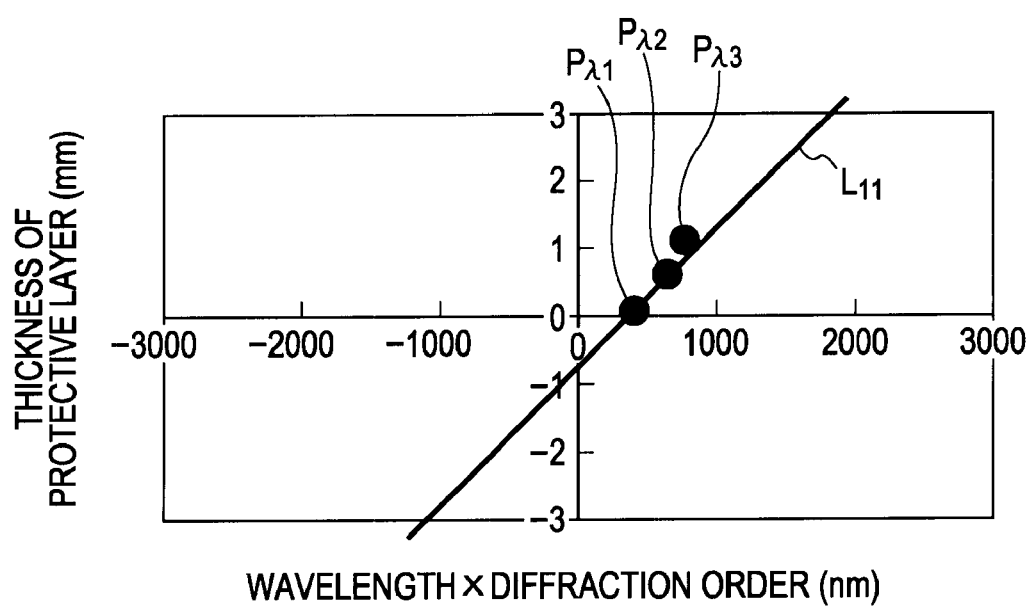
FIG. 24 is a diagram for describing spherical aberration correction possibility at the diffraction region of the diffraction unit configuring the optical pickup which is used for diffracting the three wavelengths (inner ring zone), showing points plotted according to the relation between wavelength× diffraction order and protective layer thickness, and the design line of the object lens, in a case wherein (k1i, k2i, k3i)=(+1, +1, +1)

Specifically, as shown in FIGS. 22 and 23A, the first diffraction region 151 is formed with the cross-sectional form of ring shapes centered on the optical axis being formed in a blazed shape having a predetermined depth (hereinafter also referred to as "groove depth") d. Note that the cross-sectional form of the ring shapes in this diffraction structure means the cross-sectional form of the rings taken along a plane including the radial direction of the rings, i.e., a plane orthogonal to the tangential direction of the rings. Also, in FIG. 23A, the saw-tooth shape is formed such that the slopes of the protrusions and recesses heat inward in the radial direction, which is to make the selected diffraction order positive, and obtain a converged state with a desired divergent angle. Note that here, a divergent angle for obtaining a converged state is a negative divergent angle. The symbol $R_o$ in FIGS. 23A through 23C represents the direction toward the outer side in the radial direction of the rings, i.e., the direction away from the optical axis.

Note that in the first diffraction structure formed at the first diffraction region 151, the groove width is determined taking into consideration the dominant diffraction order and diffraction efficiency. Also, as shown in FIG. 23A, the groove width is smaller in value the farther away from the optical axis. Note that the groove widths are determined based on phase difference obtained at the diffraction regions formed with the groove widths, such that the spot condensed on the signal recording face of the optical disc is optimal.

Also, in a case wherein the first diffraction region 151 diffracts the optical beam of the first wavelength which is transmitted therethrough such that diffracted light of the k1$i$'th order is dominant, i.e., such that the diffraction efficiency thereof is maximum, diffracts the optical beam of the second wavelength which is transmitted therethrough such that diffracted light of the k2$i$'th order is dominant, i.e., such that the diffraction efficiency thereof is maximum, and diffracts the optical beam of the third wavelength which is transmitted therethrough such that diffracted light of the k3$i$'th order is dominant, i.e., such that the diffraction efficiency thereof is maximum, k1$i$, k2$i$, and k3$i$ are such that (k1$i$, k2$i$, k3$i$)=(+1, +1, +1).

Now, as a first aspect regarding the first diffraction region 151, there is need to reduce spherical aberration at each wavelength, as a second aspect, there is the need to take into consideration temperature-spherical aberration properties, i.e., there is the need to reduce spherical aberration occurring during temperature change, and as a third perspective, the structure must be advantageous in manufacturing, and from these, the above diffraction orders k1$i$, k2$i$, and k3$i$ have been selected as diffraction orders with maximum diffraction efficiency, a point which will be described below.

First, the first perspective will be described. Generally, in a region having a function such as the first diffraction region 151, it is known that satisfying the conditional expression $$(\lambda 1 \times k1x - \lambda 2 \times k2x)/(t1-t2) \approx (\lambda 1 \times k1x - \lambda 3 \times k3x)/(t1-t3)$$

where $\lambda 1$ is the first wavelength (nm), $\lambda 2$ is the second wavelength (nm), $\lambda 3$ is the third wavelength (nm), k1$i$ is the diffraction order where an optical beam of the first wavelength is selected, k2$i$ is the diffraction order where an optical beam of the second wavelength is selected, k3$i$ is the diffraction order where an optical beam of the third wavelength is selected, t1 is the thickness (mm) of the first protective layer of the first optical disc, t2 is the thickness (mm) of the second protective layer of the second optical disc, t3 is the thickness (mm) of the third protective layer of the third optical disc, and x=i for the inner ring zone in k1$x$, k2$x$, and k3$x$ in this conditional expression, is a condition whereby spherical aberration on the signal recording face of each optical disc at each wavelength can be corrected and reduced. In the first diffraction region 151 which is the above-described inner ring zone, when $\lambda 1$=405 (nm), $\lambda 2$=655 (nm), $\lambda 3$=785 (nm), t1=0.1 (mm), t2=0.6 (mm), and t3=1.1 (mm), then k1$i$=+1, k2$i$=+1, and k3$i$=+1, each hold, thereby satisfying the conditional expression, and it has been confirmed that spherical aberration can be reduced. This can be restated in other words that when plotting points P$\lambda$1, P$\lambda$2, and P$\lambda$3 in the graph in FIG. 24 wherein the horizontal axis represents a value calculated by wavelength×diffraction order (nm) and the vertical axis represents the thickness (mm) of the protective layer, in the event of being situated on a straight line this means that the spherical aberration on the signal recording face of each optical disc of each wavelength can be corrected and reduced; in reality, in the case of plotting the points P$\lambda$1, P$\lambda$2, and P$\lambda$3 under the conditions described below, the points are on a generally straight design line, meaning that spherical aberration can be realized. Specifically, the object lens 134 has the material of which it is configured, and the face shape at the input and output sides, determined with the line L11 in FIG. 24 as the design line, with the inclination of the design line approximating the inclination of the line connecting P$\lambda$1 and P$\lambda$2 calculated by $(t1-t2)/(\lambda 1 \times k1x - \lambda 2 \times k2x)$ or the inclination of the line connecting P$\lambda$1 and P$\lambda$3 calculated by $(t1-t3)/(\lambda 1 \times k1x - \lambda 3 \times k3x)$, or determined taking into consideration the inclination of these lines and other design conditions. Note that while in FIG. 24 P$\lambda$3 deviates slightly upwards from the line, spherical aberration can be corrected in a sure manner by inputting the incident light to the one of the object lens 134 and diffraction optical element 135 which is closer to the emitting units, which is the diffraction optical element 135 in this case, as a divergent ray.

Next, the second perspective will be described. In a region having a function such as the first diffraction region 151, these orders must be positive in order to realize suitable temperature-spherical aberration properties, i.e., reduction in spherical aberration without depending on temperature change. Now, a positive diffraction order is an order of diffraction which draws closer to the optical axis side in the direction of progression with regard to an input optical beam. Spherical aberration which occurs due to rise in temperature is represented as the sum of an effect term $\Delta Wn$ due to refractive index fluctuation of the material configuring the object lens 134 under change in temperature, and an effect term $\Delta W\lambda$ due to wavelength fluctuation of the incident optical beam under change in temperature, i.e., by $\Delta W$ which is obtained by the relational expression $$\Delta W = \Delta Wn + \Delta W\lambda.$$

Of these, the sign of the latter effect term $\Delta W\lambda$ due to wavelength fluctuation is governed by the diffraction direction due to the diffraction unit 150. The object lens 134 provides positive power (refractive power), so the refractive index drops as the temperature rises, consequently acting in the direction such that the positive power is weakened, and the effect term Wn due to refractive index fluctuation is $\Delta Wn<0$. There is the need for the effect term $\Delta W\lambda$ due to wavelength fluctuation to be such that $\Delta W\lambda>0$ holds in order to cancel out this effect term Wn, i.e., such that the positive power is increased at the diffraction unit 150 under rising temperature. Accordingly, it is advantageous form the perspective of temperature-spherical aberration properties for the diffraction orders at the diffraction unit 150 to be positive.

Now, the fact that the spherical aberration occurring due to temperature rise can be cancelled out due to a configuration such as described will be described in further detail with reference to the longitudinal aberration drawing in FIGS. 25A through 25C. Prior to description with reference to FIGS. 25A through 25C, longitudinal aberration will be described with reference to FIGS. 26A and 26B. In FIGS. 26A and 26B the x-axial direction represents the optical axis direction, and the y-axial direction represents the image height, i.e., the height from the optical axis in the direction orthogonal to the optical axis.

As shown in FIG. 26A, generally, optical beams passing through a lens with no aberration are condensed on the same image plane regardless of the incident position in the direction orthogonal to the optical axis of the lens, i.e., condensed equally at the paraxial image point A0.

On the other hand, as shown in FIG. 26B for example, optical beams passing through a lens with aberration are condensed on different image planes according to the incident position in the direction orthogonal to the optical axis of the lens, i.e., condensed at positions shifted in the x-axial direction from the paraxial image point B0. At this time, the line LB indicating the state of longitudinal aberration is indicated by a curve obtained by connecting points B1 through B7 for example, with the height of the incident position of the optical beam from the optical axis (image height) as the y-axis, and the position where the image plane of rays input at the position this height from the optical axis and the optical axis which is the principal ray intersect as the x-axis. Specifically, the ray input at the height position y1 from the optical axis intersects with the optical axis at the position x1, so a B1 at the coordinates (x1, y1) is obtained. Also, the ray input at the height position y2 from the optical axis intersects with the optical axis at the position x2, so a B2 at the coordinates (x2, y2) is obtained. This holds true for B3 through B7 as well, so detailed description will be omitted here.

In the same way, with the lens shown in FIG. 26A, in the same way as with the above-described line LB, the line LA indicating the state of longitudinal aberration is indicated by a line obtained by connecting points A1 through A7 for example, with the height of the incident position of the optical beam from the optical axis as the y-axis, and the position where rays input at the position this height from the optical axis, and the optical axis, intersect as the x-axis. In the case in FIG. 26A, the position of the x-axis intersecting with the optical axis is always constant regardless of the position on the y-axis, so the line LA indicating the state of longitudinal aberration agrees with the y-axis. Generally, a line indicating the state of longitudinal aberration can be said to be representing a state of little or not aberration of in a state of matching the y-axis as shown in FIG. 26A or in a state as close thereto as possible.

Next, in light of the above, the fact that the spherical aberration occurring due to rise in temperature can be cancelled out by selecting the above-described diffraction orders k1$i$, k2$i$, and k3$i$will be described with reference to FIGS. 25A through 25C.

Figures 25A, 25B, 25C:
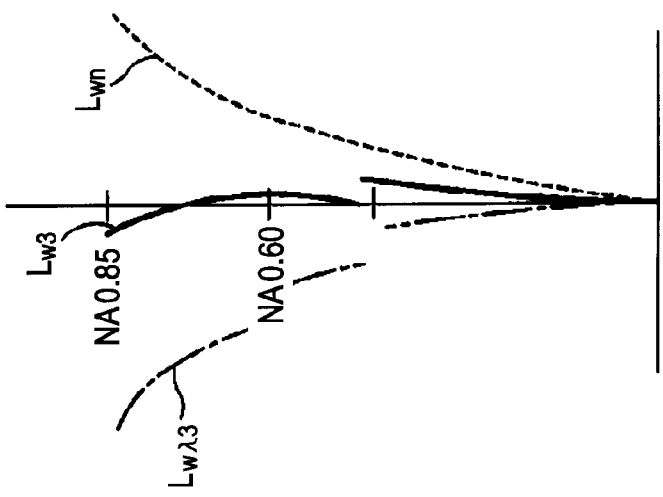
Figure 26A:
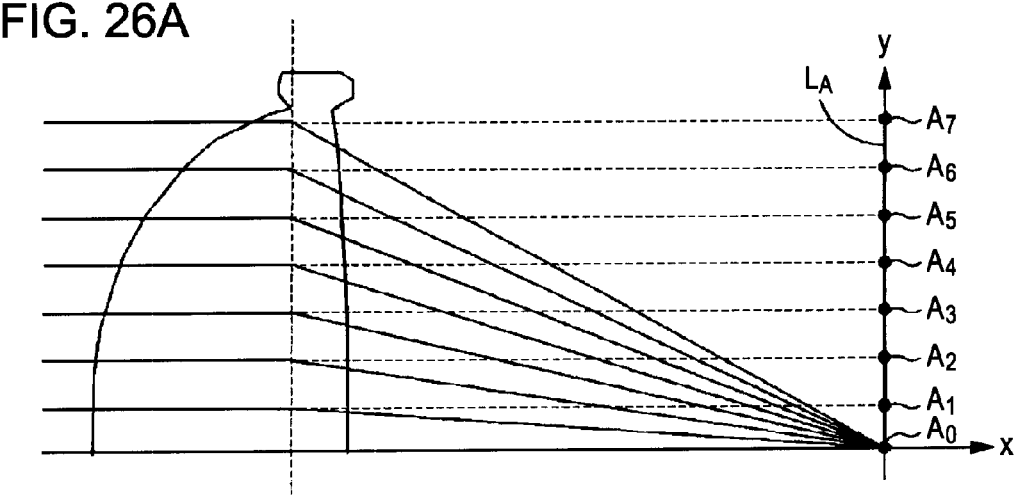
Figure 26B:
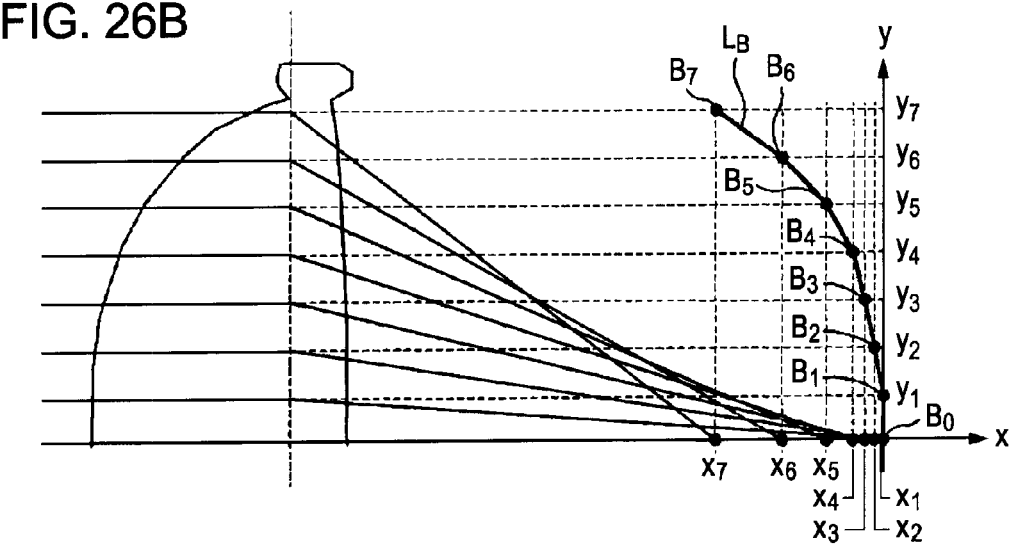

FIGS. 25A and 25B are conceptual diagrams illustrating the effect term $\Delta Wn$ due to refractive power fluctuation of the composition material under change in temperature, and the effect term $\Delta W\lambda$ due to wavelength fluctuation of the incident optical beam under change in temperature, as longitudinal aberration respectively. In FIGS. 25A and 25B, the dotted line Lwn represents the longitudinal aberration due to refractive power fluctuation, i.e., represents the effect term $\Delta Wn$ due to refractive power fluctuation of the composition material under change in temperature as longitudinal aberration, the single-dot broken line Lw$\lambda$1 represents longitudinal aberration due to change in diffraction angle in the event that the selected diffraction order is a positive diffraction order which is to say positive refractive power is provided by the diffraction unit, i.e., the effect term $\Delta W\lambda$ due to wavelength fluctuation as longitudinal aberration, and the single-dot broken line Lw$\lambda$2 represents longitudinal aberration in the event that the selected diffraction order is a negative diffraction order which is to say negative refractive power is provided by the diffraction unit, i.e., the effect term $\Delta W\lambda$ due to wavelength fluctuation as longitudinal aberration, for comparison with Lw$\lambda$1. In FIGS. 25A and 25B, the solid lines Lw1 and Lw2 represent spherical aberration $\Delta W$ occurring due to temperature rise, obtained by adding the $\Delta$Wn and $\Delta W\lambda$ in FIG. 25A, as longitudinal aberration. In FIG. 25B, the solid line Lw1 illustrates addition of the dotted line Lwn in FIG. 25B and the single-dot broken line Lw$\lambda$1, i.e., the spherical aberration $\Delta W$ in the event that the diffraction order is positive, and the solid line Lw2 In FIG. 25A illustrates addition of the dotted line Lwn in FIG. 25A and the single-dot broken line Lw$\lambda$2, i.e., the spherical aberration $\Delta W$ in the event that the diffraction order is negative.

As shown in FIG. 25B, in a region having a function such as the first diffraction region 151, selecting the above-described diffraction orders k1$i$, k2$i$, and k3$i$, i.e., selecting positive diffraction orders enables a situation wherein aberration is suppressed, with the longitudinal aberration state (Lw1) being close to the state in FIG. 26A. Conversely, in the event that negative diffraction orders are selected as shown in FIG. 25A, the state of longitudinal aberration (Lw2) does not have aberration suppressed. That is to say, this is a problematic state from the perspective of temperature-spherical aberration properties. As described above, selecting the above-described diffraction orders k1$i$, k2$i$, and k3$i$is advantageous from the perspective of temperature-spherical aberration properties.

Next, the third perspective will be described. A diffraction unit having a function such as the first diffraction region 151 is configured with one face of the diffraction optical element 135, or one face of the object lens as described later, having a diffraction structure formed thereupon, so in the event that the diffraction order selected is very great, the depth d of the diffraction structure to be formed becomes deep. A deep diffraction structure depth d may not only lead to poor formation precision; the optical path length increasing effect due to temperature change is greater, and there may be a problem wherein the temperature-diffraction efficiency property deteriorates. Due to such reasons, diffractions orders up to around the 3rd order or 4th order is suitable, and generally used. That is to say, the diffraction orders k1$i$, k2$i$, and k3$i$, to be selected for the first diffraction region 151 are such as described above, so from the perspective of manufacturing as well, manufacturing is easy, there is no problem with deterioration in precision or the like, quality can be improved, and consequently, diffracted light having excellent diffraction efficiency can be emitted in a sure manner.

Thus, the first diffraction region 151 serving as the inner ring zone has selected excellent orders from the first perspective of reduction of spherical aberration, the second perspective of temperature-spherical aberration properties, and the third perspective from depth of the diffraction structure formed in manufacturing, and accordingly, the above configuration yields a configuration wherein spherical aberration can be reduced, occurrence of aberration under temperature change can be reduced, and which is advantageous in manufacturing.

The second diffraction region 152 which is a middle ring zone has a second diffraction structure formed which is ring shaped and has a predetermined depth, and which is a different structure from the first diffraction structure. The second diffraction region 152 diffracts the optical beam of the first wavelength that is transmitted therethrough such that diffracted light of an order which forms an appropriate spot condensed on the signal recording face of the first optical disc via the object lens 134 is dominant, i.e., such that maximum diffraction efficiency is manifested regarding diffracted light of other orders.

The second diffraction region 152 diffracts the optical beam of the second wavelength that is transmitted therethrough such that diffracted light of an order which forms an appropriate spot condensed on the signal recording face of the second optical disc via the object lens 34 is dominant, i.e., such that maximum diffraction efficiency is manifested regarding diffracted light of other orders, by way of the second diffraction structure.

The second diffraction region 152 diffracts the optical beam of the third wavelength that is transmitted therethrough such that diffracted light of orders other than an order which forms an appropriate spot condensed on the signal recording face of the third optical disc via the object lens 134 is dominant, i.e., such that maximum diffraction efficiency is manifested regarding diffracted light of other orders, by way of the second diffraction structure. Note that the second diffraction region 152 can sufficiently reduce diffraction efficiency diffracted light of an order which forms an appropriate spot condensed on the signal recording face of the third optical disc via the object lens 134 for the optical beam of the third wavelength that is transmitted therethrough, by way of the second diffraction structure.

Thus, the second diffraction region 152 has a diffraction structure formed suitably whereby diffracted light of a predetermined order is dominant in the optical beam of each wavelength, thereby enabling correction and reduction of spherical aberration at the time of optical beams of first and second wavelengths that have passed through the second diffraction region 152 and become diffracted light of a predetermined order being condensed on the signal recording face of the respective optical discs by the object lens 134.

Also, the second diffraction region 152 is configured so as to function as described above regarding the optical beams of the first and second wavelengths, but such that diffracted light of orders other than diffracted light of an order which is condensed on the signal recording face of the third optical disc after passing through the second diffraction region 152 and the object lens 134 is dominant, whereby aperture restriction can be applied to the optical beam of the third wavelength, such that even if the optical beam of the third wavelength which has been transmitted through the second diffraction region 152 is input to the object lens 134, there is very little effect on the signal recording face of the third optical disc, i.e., markedly reducing the light quantity of the optical beam of the third wavelength which is condensed on the signal recording face of the third optical disc after passing through the second diffraction region 152 and the object lens 134, to around zero.

Now, the above-described first diffraction region 151 is formed of a size such that the optical beam of the third wavelength which has been transmitted through the region thereof is input to the object lens 134 in the same state as an optical beam which has been subjected to aperture restriction at around NA=0.45, and since the second diffraction region 152 formed on the outer side of the first diffraction region 151 does not allow condensation of the optical beam of the third wavelength which has been transmitted through this region on the third optical disc via the object lens 134, the diffraction unit 150 which has the first and second diffraction regions 151 and 152 configured thus functions so as to restrict the numerical aperture of the optical beam of the third wavelength to around NA=0.45. It should be noted however, that while in this arrangement of the diffraction unit 150, the optical beam of the third wavelength is subjected to aperture restriction around NA=0.45, but numerical aperture restriction due to the above configuration is not limited to this.

Specifically, as shown in FIGS. 22 and 23A, in the same way as with the above-described first diffraction region 151, the second diffraction region 152 is formed with the cross-sectional form of ring shapes centered on the optical axis being formed in a blazed shape having a predetermined depth d.

Also, while description is made here with regard to the second diffraction region 152 having the cross-sectional form of the rings formed as a diffraction structure with a blazed form, any diffraction structure may be used as long as an optical beam of a predetermined order is dominant as to the optical beam of each wavelength as described above, so a configuration may be used such as shown in FIG. 23B, with a diffraction region 152B having a diffraction structure wherein the cross-sectional form of the rings is formed with the cross-sectional form of ring shapes centered on the optical axis being formed in a staircase-like shape having a predetermined depth d and a predetermined number of steps S, continuing in the radial direction in a staircase form, for example.

Now, the diffraction structure having a staircase-like shape with a predetermined number of steps S is a structure wherein a staircase-like shape having first through S'th steps of which the depths are approximately the same is configured continuing in the radial direction, and further, in other words, is a structure having first through S+1'th diffraction faces formed at approximately the same interval in the optical axis direction. Also, the predetermined depth d in the diffraction structure means the length along the optical axis direction between the diffraction face of the S+1'th diffraction face which is formed at the side of the staircase form closest to the surface (i.e., the highest step, which is the shallowest position) and diffraction face of the first diffraction face which is formed at the side of the staircase form closest to the element (i.e., the lowest step, which is the deepest position). This holds true for later-described FIG. 23C as well. Note that while a structure has been illustrated in FIGS. 23B and 23C wherein the steps of each stepped portion of the staircase shape are formed such that the closer to the inner side in the radial direction, the closer to the surface side the steps are formed, an arrangement which has been made to select positive diffraction orders, and to obtain a convergent state with a desired divergent angle. In the second and the later-described third diffraction structures, the groove depth d and number of steps S in the case of having a staircase form are determined taking into consideration the dominant diffraction order and diffraction efficiency.

Also, as shown in FIGS. 23B and 23C, the groove width of each step (the radial-direction dimension of each step portion of the staircase form) is such that the steps are formed with equal width within one staircase form, while looking at the different staircase forms formed continuously in the radial direction, the value of the step width is greater at staircase forms further away form the optical axis. Note that the groove widths are determined based on phase difference obtained at the diffraction regions formed with the groove widths, such that the spot condensed on the signal recording face of the optical disc is minimal.

For example, the diffraction structure of the second diffraction region 152B is, as shown in FIG. 23B, a diffraction structure having a staircase portion including first through third steps 152s1, 152s2, and 152s3, formed continuously in the radial direction, wherein the number of steps is 3 (S=3), and the depth of each step is generally the same depth (d/3), and first through fourth diffraction faces 152f1, 152f2, 152f3, and 152f4 formed at the same intervals of d/3 in the optical axis direction.

Also, in a case wherein the second diffraction region 152 diffracts the optical beam of the first wavelength which is transmitted therethrough such that diffracted light of the k1m'th order is dominant, i.e., such that the diffraction efficiency thereof is maximum, and diffracts the optical beam of the second wavelength which is transmitted therethrough such that diffracted light of the k2m'th order is dominant, i.e., such that the diffraction efficiency thereof is maximum, the diffraction orders k1m and k2m are in the following relation.

$$(k1m, k2m) = (+1, +1), (+3, +2).$$

Now, the second diffraction region 152 serving as the inner ring zone is obtained by orders most excellent from the first through third perspectives described in the above description of the first diffraction region 151, and accordingly, spherical aberration can be reduced, occurrence of aberration under temperature change can be reduced, a configuration which is advantageous in manufacturing can be had.

Now, as described above, the second diffraction region 152 is configured so as to diffract light such that the diffraction efficiency of the diffracted light of the diffraction orders k1m and k2m for the optical beams of the first and second wavelengths passing through the object lens 134 is in a high state, so as to form a suitable spot condensed on the signal recording faces of the first and second optical discs, and also to have an aperture restriction function for suppressing the diffraction efficiency of the diffraction order of the optical beam of the third wavelength to be condensed on the signal recording face of the third optical disc as much as possible, but a configuration may be made wherein the optical beam of this diffraction order in the optical beam of the third wavelength is shifted from a state wherein the focal point is imaged on the signal recording face of the third optical disc, so as to further reduce the light quantity of the optical beam substantially condensed on the third optical disc. Note that hereinafter, shifting the position where the optical beam of a predetermined wavelength is imaged via the object lens 34, from the signal recording face of the corresponding optical disc, so as to substantially reduce the light quantity of the optical beam condensed on the signal recording face, will be also referred to as "flaring".

Now, with regard to the second diffraction region 152, flaring and the configuration thereof will be described. Description has been made above regarding the first diffraction region 151 that there is the need to satisfy the conditional expression of $$(\lambda 1 \times k1x - \lambda 2 \times k2x)/(t1-t2) \approx (\lambda 1 \times k1x - \lambda 3 \times k3x)/(t1-t2),$$

this conditional expression (x=m for the middle ring zone in k1x, k2x, and k3x in this conditional expression) being taken into consideration in the second diffraction region 152 as well. With this second diffraction region 152 serving as the middle ring zone, giving thought to the function of diffracting light such that the diffraction efficiency of the diffracted light of the diffraction orders k1m and k2m for the optical beams of the first and second wavelengths passing through the object lens 134 is in a high state, so as to form a suitable spot on the signal recording faces of the first and second optical discs, as described above, the Pλ1 and Pλ2 to be plotted can be positioned on a design line, and further, a design line can be selected such that the Pλ3 intentionally deviates from the design line so as to cause flaring regarding the third wavelength. That is to say, configuring the object lens 134 formed based on a design line wherein Pλ3 deviates from the design line allows the diffracted rays of the diffraction order of the optical beam of the third wavelength to be shifted from a state of imaging the focal point on the signal recording face of the third optical disc, so the quantity of light of the optical beam of the third wavelength condensed on the signal recording face of the third optical disc can be substantially reduced, and accordingly, aperture restriction regarding the optical beam of the third wavelength as described above can be performed in a sure an excellent manner. Specifically, in the event that (k1$m$, k2$m$, k3$m$)=(+3, +2, +2) as described later with reference to FIG. 33, P$\lambda$3 deviates from the design line L13, so in addition to the effect of reducing the diffraction efficiency of the order of the third wavelength, due to the diffraction structure formed on the second diffraction region 152 which is an initially expected advantage, the advantages of flaring can also be obtained, thereby enabling the quantity of light of the optical beam of the third wavelength input to the third optical disc to be further suppressed.

The third diffraction region 153 which is an outer ring zone has a third diffraction structure formed which is ring shaped and has a predetermined depth, and which is a different structure from the first and second diffraction structures. The third diffraction region 153 diffracts the optical beam of the first wavelength that is transmitted therethrough such that diffracted light of an order which forms an appropriate spot condensed on the signal recording face of the first optical disc via the object lens 134 is dominant, i.e., such that maximum diffraction efficiency is manifested regarding diffracted light of other orders.

Also, the third diffraction region 153 diffracts the optical beam of the second wavelength that is transmitted therethrough such that diffracted light of orders other than an order which forms an appropriate spot condensed on the signal recording face of the second optical disc via the object lens 134 is dominant, i.e., such that maximum diffraction efficiency is manifested regarding diffracted light of other orders, by way of the third diffraction structure. Note that the third diffraction region 153 diffracts the optical beam of the second wavelength that is transmitted therethrough such that diffraction efficiency of diffracted light of an order which forms an appropriate spot condensed on the signal recording face of the second optical disc via the object lens 134 is sufficiently reduced, by way of the third diffraction structure.

Also, the third diffraction region 153 diffracts the optical beam of the third wavelength that is transmitted therethrough such that diffracted light of orders other than an order which forms an appropriate spot condensed on the signal recording face of the third optical disc via the object lens 134 is dominant, i.e., such that maximum diffraction efficiency is manifested regarding diffracted light of other orders, by way of the third diffraction structure. Note that the third diffraction region 153 can sufficiently reduce diffraction efficiency diffracted light of an order which forms an appropriate spot on the signal recording face of the third optical disc via the object lens 134 for the optical beam of the third wavelength that is transmitted therethrough, by way of the third diffraction structure.

Thus, the third diffraction region 153 has a diffraction structure suitably formed whereby diffracted light of a predetermined order is dominant in the optical beam of each wavelength, thereby enabling correction and reduction of spherical aberration at the time of the optical beam of the first wavelength that has passed through the third diffraction region 153 and become diffracted light of a predetermined order being condensed on the signal recording face of the optical disc by the object lens 134.

Also, the third diffraction region 153 is configured so as to function as described above regarding the optical beams of the first wavelength, but such regarding optical beams of the second and third wavelength that diffracted light of orders other than diffracted light of an order which is condensed on the signal recording face of the second and third optical discs after passing through the third diffraction region 153 and the object lens 134 is dominant, whereby aperture restriction can be applied to the optical beam of the second wavelength, such that even if the optical beam of the second and third wavelengths which have been transmitted through the third diffraction region 153 is input to the object lens 134, there is very little effect on the signal recording face of the third optical disc, i.e., markedly reducing the light quantity of the optical beam of the third wavelength which is condensed on the signal recording face of the second and third optical discs after passing through the third diffraction region 153 and the object lens 134, to around zero. Note that the third diffraction region 153 can function so as to perform aperture restriction for the optical beam of the third wavelength, along with the above-described second diffraction region 152.

Now, the above-described second diffraction region 152 is formed of a size such that the optical beam of the second wavelength which has been transmitted through the region thereof is input to the object lens 134 in the same state as an optical beam which has been subjected to aperture restriction at around NA=0.6, and since the third diffraction region 153 formed on the outer side of the second diffraction region 152 does not allow condensation of the optical beam of the second wavelength which has been transmitted through this region on the optical disc via the object lens, the diffraction unit 150 which has the second and third diffraction regions 152 and 153 configured thus functions so as to restrict the numerical aperture of the optical beam of the second wavelength to around NA=0.6. It should be noted however, that while in this arrangement of the diffraction unit 150, the optical beam of the second wavelength is subjected to aperture restriction around NA=0.6, numerical aperture restriction due to the above configuration is not limited to this.

Also, the third diffraction region 153 is formed of a size such that the optical beam of the first wavelength which has been transmitted through the region thereof is input to the object lens 134 in the same state as an optical beam which has been subjected to aperture restriction at around NA=0.85, and since there is no diffraction region formed on the outer side of the third diffraction region 153, this does not allow condensation of the optical beam of the first wavelength which has been transmitted through this region on the first optical disc via the object lens, and the diffraction unit 150 which has the third diffraction region 153 configured thus functions so as to restrict the numerical aperture of the optical beam of the first wavelength to around NA=0.85. Note that with the first wavelength optical beam transmitted through the third diffraction region 153, light of diffraction of +1 order, +2 order, +3 order, +4 order, and +5 order, for example is dominant, so the zero-order light transmitted through the region outside the third diffraction region 153 almost never passes through the object lens 134 to be condensed on the first optical disc, but in cases wherein this zero-order light does pass through the object lens 134 and is condensed on the first optical disc, a configuration may be provided to perform aperture restriction by providing, at the region outside of the third diffraction region 153, either a shielding portion for shielding optical beams passing through, or a diffraction region having a diffraction structure wherein optical beams of orders other than the order of the optical beam passing through the object lens 134 to be condensed on the first optical disc are dominants. It should be noted however, that while in this arrangement of the diffraction unit 150, the optical beam of the first wavelength is subjected to aperture restriction around NA=0.85, but the present invention is not restricted to this, i.e., numerical aperture restriction due to the above configuration is not limited to this.

Specifically, as shown in FIGS. 22 and 23A, in the same way as with the above-described first diffraction region 151, the third diffraction region 153 is formed with the cross-sectional form of ring shapes centered on the optical axis being formed in a blazed shape having a predetermined depth d, for example.

Also, while description is made here with regard to the second diffraction region having the cross-sectional form of the rings formed as a diffraction structure with a blazed form, any diffraction structure may be used as long as an optical beam of a predetermined order is dominant as to the optical beam of each wavelength as described above, so a configuration may be used such as shown in FIG. 23C, with a diffraction region 153B having a diffraction structure wherein the cross-sectional form of the rings is formed with the cross-sectional form of ring shapes centered on the optical axis being formed in a staircase-like shape having a predetermined depth d and a predetermined number of steps S, continuing in the radial direction in a staircase form, for example.

For example, the diffraction structure of the third diffraction region 153B is, as shown in FIG. 23C, a diffraction structure having a staircase portion including first and second steps 153s1 and 153s2, formed continuously in the radial direction, wherein the number of steps is 2 (S=2), and the depth of each step is generally the same depth (d/2), and first through third diffraction faces 153f1, 153f2, and 153f3 formed at the same intervals of d/2 in the optical axis direction.

Also, the third diffraction region 153 is configured such that the diffraction order k1o is expressed with the following relation in a case wherein the k1o order diffracted light of the optical beam of the first wavelength transmitted therethrough is dominant, i.e., so that the diffraction efficiency is maximum, $$1 \leq k1o \leq 5$$

where k1o is a positive integer. That is to say, k1o is one of k1o=+1, +2, +3, +4, or +5.

Now, the third diffraction region 153 serving as the outer ring zone is selected by orders most excellent from the first through third perspectives described in the above description of the first diffraction region 151, and accordingly, spherical aberration can be reduced, occurrence of aberration under temperature change can be reduced, a configuration which is advantageous in manufacturing can be had.

Now, as described above, the third diffraction region 153 is configured so as to diffract light such that the diffraction efficiency of the diffracted light of the diffraction order k1o for the optical beam of the first wavelength passing through the object lens 134 is in a high state, so as to form a suitable spot condensed on the signal recording faces of the first optical disc, and also to have an aperture restriction function for suppressing the diffraction efficiency of the diffraction order of the optical beam of the second and third wavelengths to be condensed on the signal recording face of the second and third optical discs as much as possible, but a configuration may be made wherein the optical beam of this diffraction order in the optical beam of the second and third wavelengths are shifted from a state wherein the focal point is imaged on the signal recording face of the second and third optical discs, so as to further reduce the light quantity of the optical beam substantially condensed on the signal recording face of the second and third optical discs, i.e., where flaring is employed.

Now, with regard to the third diffraction region 153, flaring and the configuration thereof will be described. Description has been made above regarding the first diffraction region 151 that there is the need to satisfy the conditional expression of $$(\lambda1 \times k1x - \lambda2 \times k2x)/(t1-t2) \approx (\lambda1 \times k1x - \lambda3 \times k3x)/(t1-t3),$$

this conditional expression (x=o for the outer ring zone in k1x, k2x, and k3x in this conditional expression) being taken into consideration in the third diffraction region 153 as well. With regard to the third diffraction region 153 serving as the outer ring zone, giving thought to the function of diffracting light such that the diffraction efficiency of the diffracted light of the diffraction order k1o for the optical beams of the first wavelength passing through the object lens 134 is in a high state, so as to form a suitable spot condensed on the signal recording faces of the first optical disc, as described above, the Pλ1 to be plotted can be positioned on a design line, and further, a design line can be selected such that Pλ2 and Pλ3 corresponding to the second and third wavelengths intentionally deviate from the design line, so as to cause flaring regarding the second wavelength or the third wavelength, or the second and third wavelengths.

That is to say, configuring the object lens 134 formed based on a design line wherein Pλ2 deviates from the design line allows the diffracted rays of the diffraction order of the optical beam of the second wavelength to be shifted from a state of imaging the focal point on the signal recording face of the second optical disc, so the quantity of light of the optical beam of the second wavelength condensed on the signal recording face of the second optical disc can be substantially reduced, and accordingly, aperture restriction regarding the optical beam of the second wavelength as described above can be performed in a sure an excellent manner. Also, configuring the object lens 134 formed based on a design line wherein Pλ3 deviates from the design line allows the diffracted rays of the diffraction order of the optical beam of the third wavelength to be shifted from a state of imaging the focal point on the signal recording face of the third optical disc, so the quantity of light of the optical beam of the third wavelength condensed on the signal recording face of the third optical disc can be substantially reduced, and accordingly, aperture restriction regarding the optical beam of the third wavelength as described above can be performed in a sure an excellent manner. Also, configuring the object lens 134 formed based on a design line wherein both Pλ2 and Pλ3 deviate from the design line allows both of the above-described advantages to be had, i.e., the quantity of light of the optical beams of the second and third wavelengths condensed on the signal recording face of the corresponding optical discs can be reduced.

Figure 30:
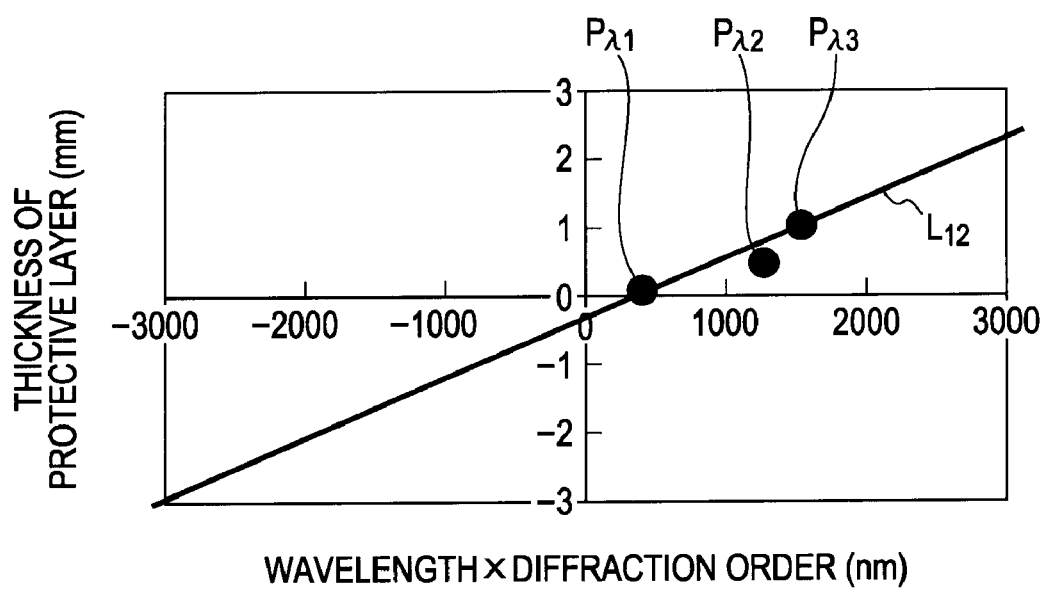
FIG. 30 is a diagram for describing flaring at the example 1 of an outer ring zone according to the second embodiment, showing points plotted according to the relation between wavelength×diffraction order and protective layer thickness, and the design line of the object lens, in a case wherein (k1o, k2o, k3o)=(+1, +2, +2)
Figure 31:
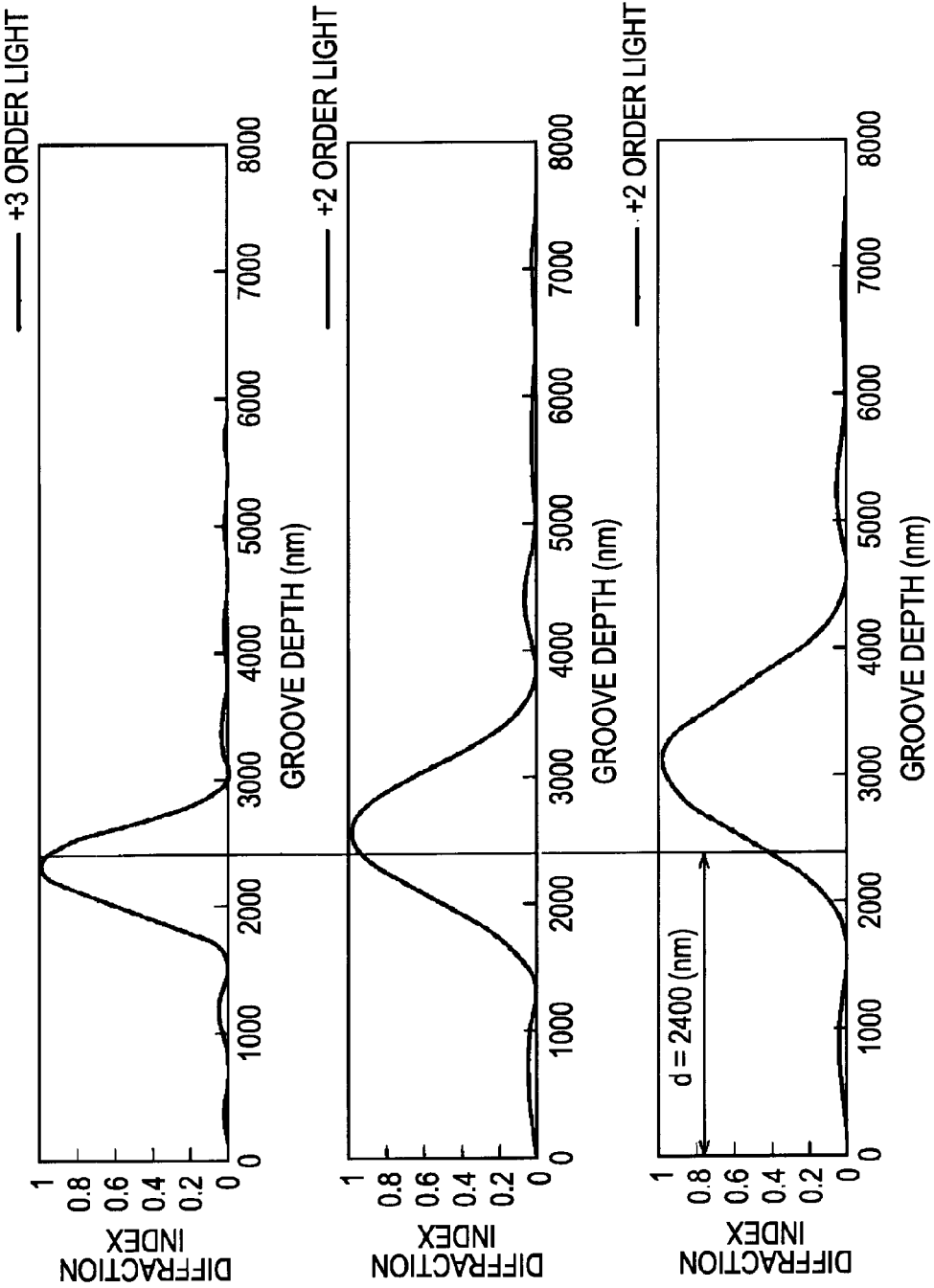
FIGS. 31A through 31C show graphs for calculating the diffraction efficiency of an example 2 of a middle ring zone according to the second embodiment, illustrating the change in the diffraction efficiency of the optical beams of each wavelength as to change in the groove depth d in a case wherein S=∞, and (k1m, k2m, k3m)=(+3, +2, +2)

Specifically, in the event that (k1o, k2o, k3o)=(+1, +2, +2) as described later with reference to FIG. 30, Pλ2 deviates from the design line L12, so in addition to the effect of reducing the diffraction efficiency of the diffracted light of the order of the second wavelength due to the diffraction structure formed on the third diffraction region 153 which is an initially expected advantage, the advantages of flaring can also be obtained, thereby enabling the quantity of light of the optical beam of the second wavelength input to the second optical disc to be further suppressed. Also, as described later with reference to FIG. 34, in the case of (k1o, k2o, k3o)=(+4, +3, +3) both Pλ2 and Pλ3 deviate from the design line L14, so in addition to the effect of reducing the diffraction efficiency of the diffracted light of the orders of the second and third wavelengths due to the diffraction structure formed on the third diffraction region 153 which is an initially expected advantage, the advantages of flaring can also be obtained, thereby enabling the quantity of light of the optical beam of the second and third wavelengths input to the second and third optical discs to be further suppressed.

Specific examples of the above-described diffraction unit 150 having the first diffraction region 151 which is the inner ring zone, second diffraction region 152 which is the middle ring zone, and third diffraction region 153 which is the outer ring zone, will be given below, with specific numerical values of the depth d and number of steps S in the staircase form or blazing, and the diffraction order of diffracted light of the order that is dominant in the optical beam of each wavelength, and the diffraction efficiency of the diffracted light of each diffraction order is shown in Table 4 and the later-described Table 5. Note that Table 4 illustrates a first embodiment of the diffraction unit 150 and Table 5 illustrates a second embodiment of the diffraction unit 150, wherein k1 in Tables 4 and 5 indicates the diffraction orders (k1$i$, k1$m$, k1$o$) where the optical beam of the first wavelength is condensed at each ring zone via the object lens 134 so as to form a suitable spot condensed on the signal recording face of the first optical disc, i.e., diffraction orders where diffraction efficiency is maximum, eff1 illustrates the diffraction efficiency of the diffraction orders (k1$i$, k1$m$, k1$o$) for the optical beam of the first wavelength, k2 indicates the diffraction orders (k2$i$, k2$m$, k2$o$) where the optical beam of the second wavelength is condensed via the object lens 134 so as to form a suitable spot on the signal recording face of the second optical disc, i.e., diffraction orders where diffraction efficiency is maximum, particularly at the inner ring zone and middle ring zone, eff2 illustrates the diffraction efficiency of the diffraction orders (k2$i$, k2$m$, k2$o$) for the optical beam of the second wavelength, k3 indicates the diffraction orders (k3$i$, k3$m$, k3$o$) where the optical beam of the third wavelength is condensed via the object lens 134 so as to form a suitable spot on the signal recording face of the third optical disc, i.e., diffraction orders where diffraction efficiency is maximum, particularly at the inner ring zone, eff3 illustrates the diffraction efficiency of the diffraction orders (k3$i$, k3$m$, k3$o$) for the optical beam of the third wavelength, d indicates the groove depth of each diffraction region, and S indicates the number of steps in the case of the staircase form, with "∞" indicating a blazed shape. Note that the asterisks in Table 4 and Table 5 indicate diffraction order for condensing an optical beam passing through the middle ring zone or the outer ring zone in each embodiment so as to appropriately form a spot on the signal recording face of the corresponding optical disk via the object lens 134, i.e., a diffraction order whereby spherical aberration on the signal recording face of the corresponding optical disc can be corrected, or a diffraction order for a flared state as described later, and "≈0" indicates that the diffraction efficiency is at a state of approximately zero.

TABLE 4

Diffraction orders, diffraction efficiency, depth, and number of steps, of First Embodiment

|  | k1 | eff$_1$ | K2 | eff$_2$ | K3 | eff$_3$ | d [μm] | s |
|---|---|---|---|---|---|---|---|---|
| Inner Ring zone | 1 | 0.91 | 1 | 0.73 | 1 | 0.53 | 0.9 | ∞ |
| Middle Ring zone | 1 | 0.72 | 1 | 0.66 | ※ | ~0 | 5.1 | 3 |
| Outer Ring zone | 1 | 0.92 | ※ | ~0 | ※ | ~0 | 0.65 | ∞ |

Now, the first embodiment shown in Table 4 will be described. At the inner ring zone in the first embodiment, as shown in Table 4, with a blazed form (S=∞) having a groove depth of d=0.9 (μm), the diffraction efficiency eff1=0.91 for the diffraction order k1$i$=+1 of the optical beam of the first wavelength, the diffraction efficiency eff2=0.73 for the diffraction order k2$i$=+1 of the optical beam of the second wavelength, and the diffraction efficiency eff3=0.53 for the diffraction order k3$i$=+1 of the optical beam of the third wavelength.

Next, the inner ring zone of the first embodiment will be described in further detail with reference to FIGS. 27A through 27C. FIG. 27A is a diagram illustrating change in the diffraction efficiency of the +1 order diffracted light of the optical beam of the first wavelength in a case of changing the groove depth d of the blazed form where the number of steps S=∞, FIG. 27B is a diagram illustrating change in the diffraction efficiency of the +1 order diffracted light of the optical beam of the second wavelength in a case of changing the groove depth d of the blazed form where the number of steps S=∞, and FIG. 27C is a diagram illustrating change in the diffraction efficiency of the +1 order diffracted light of the optical beam of the third wavelength in a case of changing the groove depth d of the blazed form where the number of steps S=∞. In FIGS. 27A through 27C, the horizontal axis represents the groove depth in nm, and the vertical axis represents the diffraction efficiency (intensity of light). As shown in FIG. 27A, at the position of 900 nm on the horizontal axis, eff1 is 0.91, eff2 is 0.73 as shown in FIG. 27B, and eff3 is 0.53 as shown in FIG. 27C.

At the middle ring zone in the first embodiment, as shown in Table 4, with groove depth d=5.1 (μm) and the number of steps S=3, the diffraction efficiency eff1=0.72 for the diffraction order k1$m$=+1 of the optical beam of the first wavelength, and the diffraction efficiency eff2=0.66 for the diffraction order k2$m$=+1 of the optical beam of the second wavelength. Also, the diffraction efficiency eff3 for the diffraction order k3$m$(*) of the optical beam of the third wavelength passing through the region, for condensing light so as to form a spot with the optical beam of the third wavelength on the signal recording face of the third optical disc via the object lens 134 is approximately zero.

Next, the middle ring zone of the first embodiment will be described in further detail with reference to FIGS. 28A through 28C. FIG. 28A is a diagram illustrating change in the diffraction efficiency of the +1 order diffracted light of the optical beam of the first wavelength in a case of changing the groove depth d of the staircase form where the number of steps S=3, FIG. 28B is a diagram illustrating change in the diffraction efficiency of the +1 order diffracted light of the optical beam of the second wavelength in a case of changing the groove depth d of the staircase form where the number of steps S=3, and FIG. 28C is a diagram illustrating change in the diffraction efficiency of the +1 order diffracted light of the optical beam of the third wavelength in a case of changing the groove depth d of the staircase form where the number of steps S=3. In FIGS. 28A through 28C, the horizontal axis represents the groove depth in nm, and the vertical axis represents the diffraction efficiency (intensity of light). As shown in FIG. 28A, at the position of 5100 nm on the horizontal axis, eff1 is 0.72, eff2 is 0.66 as shown in FIG. 28B, and eff3 is approximately zero as shown in FIG. 28C. Note that in Table 4 and the above, the diffraction order of the optical beam of the third wavelength noted with the asterisk "*" is +1.

Also, at the outer ring zone in the first embodiment, as shown in Table 4, with a blazed form (S=∞) having a groove depth of d=0.6 (μm), the diffraction efficiency eff1=0.92 for the diffraction order k1$o$=+1 of the optical beam of the first wavelength. Also, the diffraction efficiency eff2 for the diffraction order k2$o$(*) of the optical beam of the second wavelength passing through the region, for condensing light so as to form a spot on the signal recording face of the second optical disc via the object lens 134 is approximately zero, and the diffraction efficiency eff3 for the diffraction order k3o(*) of the optical beam of the third wavelength passing through the region, for condensing light so as to form a spot on the signal recording face of the third optical disc via the object lens 134 is approximately zero.

Figure 29A:
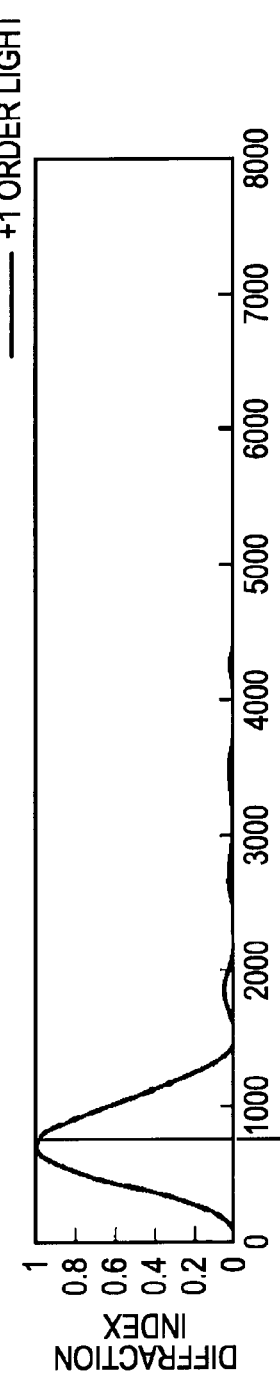
FIGS. 29A through 29C show graphs for calculating the diffraction efficiency of an example 1 of an outer ring zone according to the second embodiment, illustrating the change in the diffraction efficiency of the optical beams of each wavelength as to change in the groove depth d in a case wherein S=∞, and (k1o, k2o, k3o)=(+1, +2, +2)
Figure 29B:
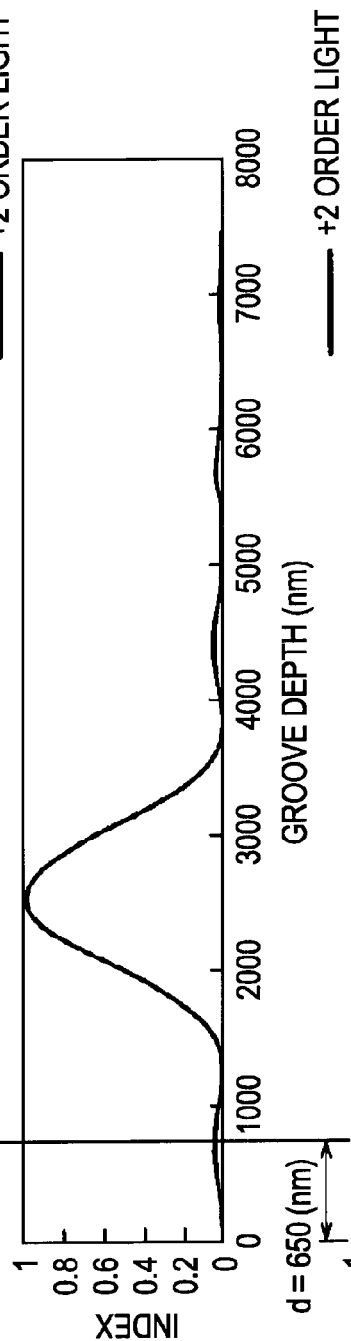
Figure 29C:
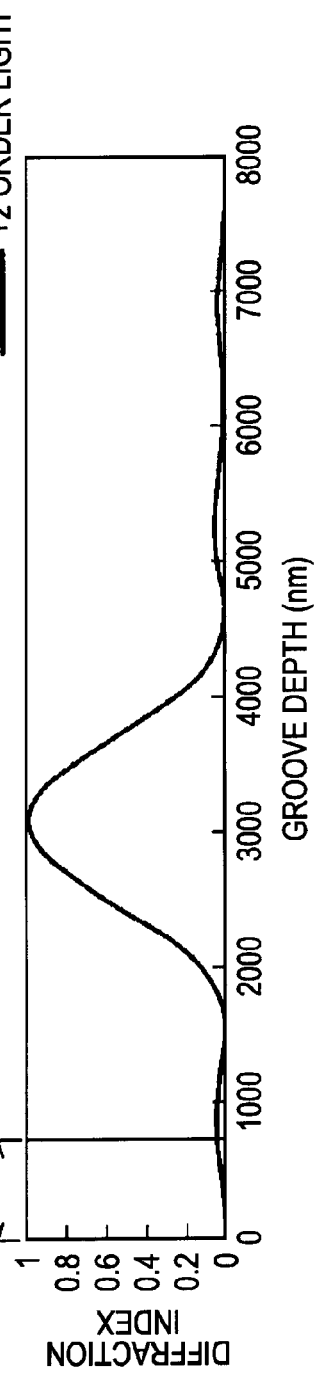

Next, the outer ring zone of the first embodiment will be described in further detail with reference to FIGS. 29A through 29C. FIG. 29A is a diagram illustrating change in the diffraction efficiency of the +1 order diffracted light of the optical beam of the first wavelength in a case of changing the groove depth d of the blazed form where the number of steps S=∞, FIG. 29B is a diagram illustrating change in the diffraction efficiency of the +2 order diffracted light of the optical beam of the second wavelength in a case of changing the groove depth d of the blazed form where the number of steps S=∞, and FIG. 29C is a diagram illustrating change in the diffraction efficiency of the +2 order diffracted light of the optical beam of the third wavelength in a case of changing the groove depth d of the blazed form where the number of steps S=∞. In FIGS. 29A through 29C, the horizontal axis represents the groove depth in nm, and the vertical axis represents the diffraction efficiency (intensity of light). As shown in FIG. 29A, at the position of 650 nm on the horizontal axis, eff1 is 0.92, eff2 is approximately zero as shown in FIG. 29B, and eff3 is approximately zero as shown in FIG. 29C. Note that in Table 4 and the above, the diffraction orders of the optical beams of the second and third wavelengths noted with the asterisk "*" are +2 and +2, respectively.

Also, with the outer ring zone in the first embodiment described above, of the design line in the relation between the above-described (wavelength×order) and the thickness of the protective layer, the y-intercept position and inclination with the vertical axis representing the thickness of the protective layer as the Y axis exhibits flaring regarding the second wavelength by change due to design of the object lens. Accordingly, performing appropriate object lens design based on such a design line enables the quantity of light of the optical beam of the second wavelength to be further suppressed and excellent aperture restriction to be performed regarding the optical beam of the second wavelength. Specifically, as shown in FIG. 30, the outer ring zone in the first embodiment has the design line indicated by L12 set by plotting the points Pλ1, Pλ2, and Pλ3 at the diffraction orders (k1o, k2o, k3o)= (+1, +2, +2). In FIG. 30 the design point Pλ1 of the first wavelength and the design point Pλ3 of the third wavelength are positioned on the design line L12, so the aberration of diffraction light of the diffraction orders k1o and k3o is approximately zero. On the other hand, the plotted point Pλ2 of the second wavelength is significantly deviated from the aberration zero design point, indicating the above-described flaring. Note that in FIG. 30, only (k2o, k3o)=(2, 2) is shown plotted, but there is deviation from the design line L12 in the same way for other orders in the second and third wavelengths as well. Consequently, there is uncorrected aberration in the second wavelength, and consequently, the light quantity of the optical beam of the second wavelength which has passed through the outer ring zone, that is not imaged at the signal recording face but input to the second optical disc can be suppressed. As a result, a suitable aperture restriction (NA=0.6) can be realized, regardless of the diffraction efficiency of the second wavelength.

As described above, with the outer ring zone in the first embodiment, the diffraction face is blazed, so according to this configuration, even in the case of providing the diffraction units to one face of the object lens as described later, diffraction grooves can be formed relatively easily at the curved face of the lens face at the perimeter of the lens which has a steep slope due to being at the outer ring zone. Also, with the outer ring zone in the first embodiment, the third wavelength regarding which aperture restriction the same as with the second wavelength is desired is condensed in a state of spherical aberration having been corrected due to selecting the +2 order, but the diffraction efficiency is approximately zero as shown in FIG. 29C, whereby aperture restriction functions can be manifested.

Next, description will be made regarding the second embodiment shown in Table 5. Note that the inner ring zone in the second embodiment is of the same configuration as that of the inner ring zone in the first embodiment described above, as can be seen from Table 4 and Table 5, and accordingly description thereof will be omitted.

TABLE 5

Diffraction orders, diffraction efficiency, depth, and number of steps, of Second Embodiment

|  | k1 | eff$_1$ | K2 | eff$_2$ | K3 | eff$_3$ | d [μm] | s |
|---|---|---|---|---|---|---|---|---|
| Inner Ring zone | 1 | 0.91 | 1 | 0.73 | 1 | 0.53 | 0.9 | ∞ |
| Middle Ring zone | 3 | 0.96 | 2 | 0.93 | ※ | ~0 | 2.4 | ∞ |
| Outer Ring zone | 4 | 1.0 | ※ | ~0 | ※ | ~0 | 3.1 | ∞ |

At the middle ring zone in the second embodiment, as shown in Table 5, with a blazed form (S=∞) having a groove depth of d=2.4 (μm), the diffraction efficiency eff1=0.96 for the diffraction order k1m=+3 of the optical beam of the first wavelength, the diffraction efficiency eff2=0.93 for the diffraction order k2m=+2 of the optical beam of the second wavelength. Also, the diffraction efficiency eff3=0.48 for the diffraction order k3m(*) of the optical beam of the third wavelength passing through the region, for condensing light so as to form a spot on the signal recording face of the third optical disc via the object lens 134, but as described later the spot is flared, and accordingly does not contribute to imaging.

Next, the middle ring zone of the second embodiment will be described in further detail with reference to FIGS. 31A through 31C. FIG. 31A is a diagram illustrating change in the diffraction efficiency of the +3 order diffracted light of the optical beam of the first wavelength in a case of changing the groove depth d of the blazed form where the number of steps S=∞, FIG. 31B is a diagram illustrating change in the diffraction efficiency of the +2 order diffracted light of the optical beam of the second wavelength in a case of changing the groove depth d of the blazed form where the number of steps S=∞, and FIG. 31C is a diagram illustrating change in the diffraction efficiency of the +2 order diffracted light of the optical beam of the third wavelength in a case of changing the groove depth d of the blazed form where the number of steps S=∞. In FIGS. 31A through 31C, the horizontal axis represents the groove depth in nm, and the vertical axis represents the diffraction efficiency (intensity of light). As shown in FIG. 31A, at the position of 2400 nm on the horizontal axis, eff1 is 0.96, eff2 is 0.93 as shown in FIG. 31B, and eff3 is 0.48 as shown in FIG. 31C, but the spot is flared, as described later. Note that here, the diffraction order of the optical beam of the third wavelength noted with the asterisk "*" is +2 in Table 5 and the above description.

Figure 33:
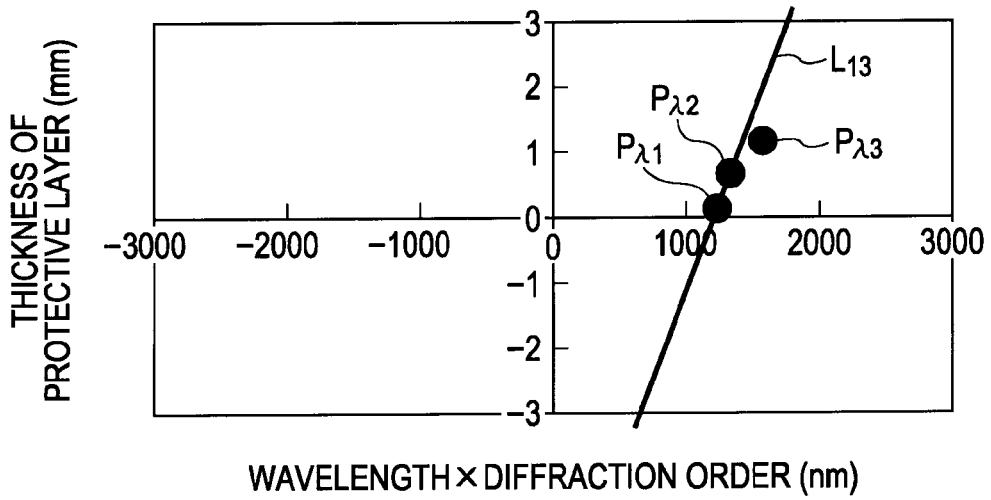
FIG. 33 is a diagram for describing flaring at the example 2 of a middle ring zone according to the second embodiment, showing points plotted according to the relation between wavelength×diffraction order and protective layer thickness, and the design line of the object lens, in a case wherein (k1m, k2m, k3m)=(+3, +2, +2)

Also, with the middle ring zone in the second embodiment, the design line of the object lens is changed for flaring of the third wavelength, thereby performing excellent aperture restriction, in the same way as with the case of the outer ring zone in the first embodiment described above. Specifically, as shown in FIG. 33, the middle ring zone in the second embodiment has the design line indicated by L13 set by plotting the points Pλ1, Pλ2, and Pλ3 at the diffraction orders (k1m, k2m, k3m)=(+3, +2, +2). In FIG. 33 the design point Pλ1 of the first wavelength and the design point Pλ2 of the second wavelength are positioned on the design line L13, so the aberration of diffraction light of the diffraction orders k1m and k2m is approximately zero. On the other hand, the plotted point Pλ3 of the third wavelength is significantly deviated from the aberration zero design point, indicating the above-described flaring. Note that in FIG. 33, only k3m=+2 is shown plotted, but there is deviation from the design line L13 in the same way for other orders in the third wavelength as well. Consequently, there is uncorrected aberration in the third wavelength, and accordingly, the light quantity of the optical beam of the third wavelength which has passed through the middle ring zone, that is not imaged at the signal recording face but input to the third optical disc, can be suppressed. As a result, even if there is a little diffraction efficiency of the optical beam of the third wavelength, as shown in FIG. 31C, this does not contribute to the imaging of these optical beams, and a suitable aperture restriction (NA=0.45) can be realized.

Also, the middle ring zone in the second embodiment described above has a higher diffraction efficiency as to the first wavelength than the middle ring zone in the first embodiment described above, and excels in that perspective.

Also, at the outer ring zone in the second embodiment, as shown in Table 5, with a blazed form (S=∞) having a groove depth of d=3.1 (μm), the diffraction efficiency eff1=1.0 for the diffraction order k1o=+4 of the optical beam of the first wavelength. Also, the diffraction efficiency eff2=0.25 for the diffraction order k2o(*) of the optical beam of the second wavelength, for condensing light so as to form a spot on the signal recording face of the second optical disc via the object lens 134, but as described later the spot is flared, and accordingly does not contribute to imaging. Further, the diffraction efficiency eff3 for the diffraction order k3o(*) of the optical beam of the third wavelength passing through the region, for condensing light so as to form a spot on the signal recording face of the third optical disc via the object lens 134 is approximately zero.

Next, the outer ring zone of the second embodiment will be described in further detail with reference to FIGS. 32A through 32C. FIG. 32A is a diagram illustrating change in the diffraction efficiency of the +4 order diffracted light of the optical beam of the first wavelength in a case of changing the groove depth d of the blazed form where the number of steps S=∞, FIG. 32B is a diagram illustrating change in the diffraction efficiency of the +3 order diffracted light of the optical beam of the second wavelength in a case of changing the groove depth d of the blazed form where the number of steps S=∞, and FIG. 32C is a diagram illustrating change in the diffraction efficiency of the +3 order diffracted light of the optical beam of the third wavelength in a case of changing the groove depth d of the blazed form where the number of steps S=∞. In FIGS. 32A through 32C, the horizontal axis represents the groove depth in nm, and the vertical axis represents the diffraction efficiency (intensity of light). As shown in FIG. 32A, at the position of 3100 nm on the horizontal axis, eff1 is 1.0, eff2 is 0.25 as shown in FIG. 32B, but the spot is flared as will be described later. Further, eff3 is approximately zero as shown in FIG. 32C. Note that in Table 5 and the above, the diffraction orders of the optical beams of the second and third wavelengths noted with the asterisk "*" are +3 and +3, respectively.

Figure 32:
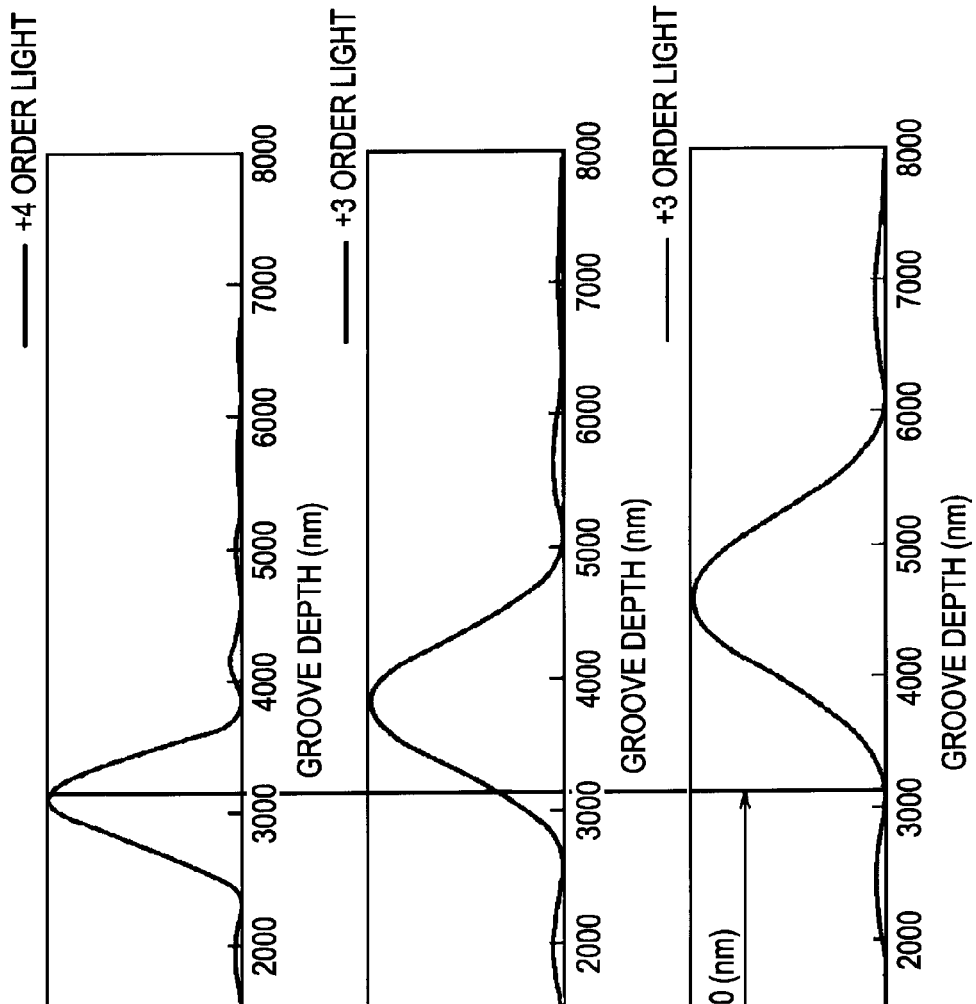
FIGS. 32A through 32C show for calculating the diffraction efficiency of an example 2 of an outer ring zone according to the second embodiment, illustrating the change in the diffraction efficiency of the optical beams of each wavelength as to change in the groove depth d in a case wherein S=∞, and (k1o, k2o, k3o)=(+4, +3, +3)
Figure 34:
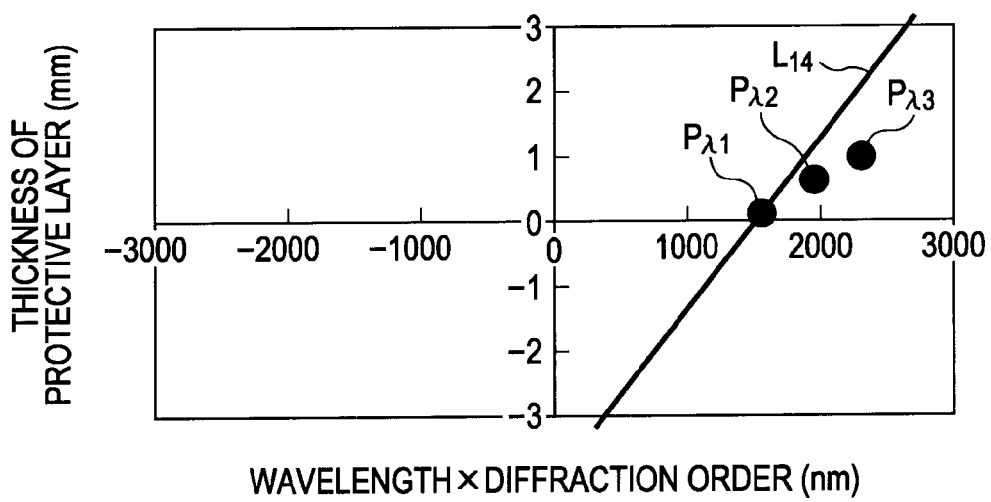
FIG. 34 is a diagram for describing flaring at the example 2 of an outer ring zone according to the second embodiment, showing points plotted according to the relation between wavelength×diffraction order and protective layer thickness, and the design line of the object lens, in a case wherein (k1o, k2o, k3o)=(+4, +3, +3)

Also, with the outer ring zone in the second embodiment, the design line of the object lens is changed for flaring of the second and third wavelengths, thereby performing excellent aperture restriction, in the same way as with the case of the outer ring zone in the first embodiment described above. Specifically, as shown in FIG. 34, the outer ring zone in the second embodiment has the design line indicated by L14 set by plotting the points Pλ1, Pλ2, and Pλ3 at the diffraction orders (k1o, k2o, k3o)=(+4, +3, +3). In FIG. 34 the design point Pλ1 of the first wavelength and is positioned on the design line L14, so the aberration of diffracted light of the diffraction order k1o is approximately zero. On the other hand, the plotted points Pλ2 and Pλ3 of the second and third wavelengths are significantly deviated from the aberration zero design point, indicating the above-described flaring. Note that in FIG. 34, only (k2o, k3o)=(+3, +3) is shown plotted, but there is deviation from the design line L14 in the same way for other orders in the second and third wavelengths as well. Consequently, there is uncorrected aberration in the second and third wavelengths, and accordingly, the light quantity of the optical beams of the second and third wavelengths which has passed through the outer ring zone, that is not imaged at the signal recording face but input to the second and third optical discs can be suppressed. As a result, even if there is a little diffraction efficiency of the optical beam of the second wavelength as shown in FIG. 32, this does not contribute to the imaging of these optical beams, and a suitable aperture restriction (NA=0.6) can be realized. Also, an even more suitable aperture restriction (NA=0.45) can be realized for the optical beam of the third wavelength.

Now, while it can be said that the outer ring zone in the first embodiment is basically easier to employ from a design perspective, there is demand for reduced aberration change due to temperature as described above in the diffraction unit having such an outer ring zone as described above, and the outer ring zone in the second embodiment is advantageous from this aspect. This will be described using the above-described effect term ΔWn due to refractive index fluctuation of the composition material under change in temperature, and effect term ΔWλ due to wavelength fluctuation of the incident optical beam under change in temperature. Generally, |ΔWn| is greater than |ΔWλ|, so it is difficult to realize ΔW≈0 with a diffraction order around 1 or so. Also, the effect term ΔWλ is generally proportionate to the diffraction order, so employing as great a diffraction order as possible can increase the ΔWλ which can be understood as being aberration change amount occurring due to diffraction, thereby aiming to realize ΔW≈0 of the spherical aberration ΔW due to temperature rise. A design example according to this perspective is the outer ring zone (k1o=+4) according to the second embodiment described with reference to FIGS. 32A through 32C and FIG. 34, and the amount of aberration occurring at the time of temperature change can be reduced as compared to the outer ring zone according to the first embodiment where k1o=+1 is employed. Describing this with a longitudinal aberration diagram in the same way as with FIG. 25 above, if we say that a longitudinal aberration diagram accompanying the temperature change in a case of (k1i, k1m, k1o)=(+1, +1, +1) is obtained as in FIG. 25B, in a case of selecting relatively high order diffraction orders at the middle ring zone and the outer ring zone such that (k1i, k1m, k1o)=(+1, +3, +4), a state such as shown in FIG. 25C is obtained. In FIG. 25C, the dotted line Lwn is the same as in FIG. 25B, the single-dot broken line Lwλ3 represents the effect term the effect term ΔWλ due to wavelength fluctuation in the case of selecting a relatively high order diffraction order for the middle ring zone and outer ring zone, as longitudinal aberration. In FIG. 25C the solid line Lw3 represents spherical aberration ΔW occurring due to temperature rise, obtained by adding the effect term ΔWn and effect term ΔWλ indicated by Lwn and Lwλ3. Thus, it can be seen from FIG. 25C that occurrence of longitudinal aberration (Lw3) is further suppressed as compared to the longitudinal aberration amount shown by the solid line Lw2 in FIG. 25B.

With the diffraction unit of the second embodiment having such an inner ring zone, middle ring zone, and outer ring zone, diffraction efficiency as to the first wavelength in particular is excellent for all ring zones, thereby realizing high diffraction efficiency as to the first wavelength, for which there has been strong demand regarding three-wavelength compatibility but which has been difficult with compatibility lenses which have been studied with relation to the related art.

The diffraction unit 150 and the object lens 134, having the first through third diffraction regions 151, 152, and 153 with the configuration such as described above, are capable of condensation of the optical beams of the first through third wavelengths passing through the first diffraction region 151 so as to form a suitable spot on the signal recording face of the corresponding optical disc by being input to the object lens 134, in a divergent angle state wherein no spherical aberration occurs at the signal recording face of respectively corresponding optical discs via the common object lens 34, i.e., in a converged state wherein spherical aberration is corrected via the object lens 134, and is capable of condensation of the optical beams of the first and second wavelengths passing through the second diffraction region 152 so as to form a suitable spot on the signal recording face of the corresponding optical disc by being input to the object lens 134, in a divergent angle state wherein no spherical aberration occurs at the signal recording face of respectively corresponding optical discs via the common object lens 34, i.e., in a converged state wherein spherical aberration is corrected via the object lens 134, and also is capable of condensation of the optical beams of the first wavelength passing through the third diffraction region 153 so as to form a suitable spot on the signal recording face of the corresponding optical disc by being input to the object lens 134, in a divergent angle state wherein no spherical aberration occurs at the signal recording face of the corresponding optical disc via the object lens 34, i.e., in a dispersed state or converged state wherein spherical aberration is corrected via the object lens 134.

That is to say, the diffraction unit 150 provided on one face of the diffraction optical element 135 disposed on the optical path between the first through third emitting units in the optical system of the optical pickup 103 and the signal recording face allows optical beams of respective wavelengths passing through the respective regions (first through third diffraction regions 151, 152, and 153) to be input to the object lens 134 in a state wherein spherical aberration occurring at the signal recording face to be reduced, so spherical aberration occurring at the signal recording face when condensing optical beams of the first through third wavelengths on the signal recording face of the respective corresponding optical discs using the common object lens 134 in the optical pickup 3 can be minimized, which is to say that three-wavelength compatibility of the optical pickup 3 using three types of wavelengths for three types of optical discs and a common object lens 134 can be realized, wherein information signals can be recorded to and/or played from respective optical discs.

Also, the above-described diffraction unit 150 and object lens 134 having the first through third diffraction regions 151, 152, and 153, are configured such that the diffraction orders (k1$i$, k2$i$, k3$i$) of light selected by the first diffraction region 151 serving as the inner ring zone and condensed on the signal recording face of the corresponding optical disk via the object lens 134 are set to (+1, +1, +1), light can be condensed on the signal recording face of each optical disc in a state of the three wavelengths having spherical aberration reduced and with a high diffraction efficiency for each, i.e., with sufficient light quantity, and also, spherical aberration occurring due to change in temperature reduced, and further, the groove depth of the diffraction structure to be formed can be prevented from becoming too deep so manufacturing is easily, and the problem of deterioration in precision and so forth is prevented, thereby obtaining a configuration which is advantageous from the perspective of manufacturing.

Further, the diffraction unit 150 and object lens 134 are configured such that the diffraction orders (k1$m$, k2$m$) of light selected by the second diffraction region 152 serving as the middle ring zone and condensed on the signal recording face of the corresponding optical disk via the object lens 134 are set to (+1, +1) or (+3, +2), light can be condensed on the signal recording face of each optical disc in a state of the first and second wavelengths having spherical aberration reduced and with sufficient light quantity, and also, spherical aberration occurring due to change in temperature reduced, thereby obtaining a configuration which is advantageous from the perspective of manufacturing, and further, advantages of the above-described flaring can be obtained as well.

Moreover, the diffraction unit 150 and object lens 134 are configured such that the diffraction order k1$o$ of light selected by the third diffraction region 153 serving as the outer ring zone and condensed on the signal recording face of the corresponding optical disk via the object lens 134 is set to +1, +2, +3, +4, +5, so light can be condensed on the signal recording face of each optical disc in a state of the first wavelength having spherical aberration reduced and with sufficient light quantity, and also, spherical aberration occurring due to change in temperature reduced, thereby obtaining a configuration which is advantageous from the perspective of manufacturing, and further, advantages of the above-described flaring can be obtained as well.

Also, the diffraction unit 150 having the first through third diffraction regions 151, 152, and 153 is capable of suitably solving the problems of diffraction efficiency and spherical aberration at the time of temperature change, of which solving has been difficult with three-wavelength compatible lenses studied with relation to the related art. That is, with the three-wavelength compatible lenses studied with relation to the related art, raising the design efficiency of the first wavelength which is the shortest wavelength has been difficult, and further the curvature at the lens perimeter is great due to being a three-wavelength compatible lens so there has been the problem such as necessary diffraction efficiency not being able to be obtained when diffraction efficiency drops due to the precision in form of the diffraction structure formed at the perimeter portion being low, and the problem that even if aberration can be suppressed when diffraction orders of opposite signs are selected for the first through third wavelengths, aberration increases for wavelengths regarding which diffraction orders of opposite signs are selected, due to inversion in behavior at the time of temperature changing between diffraction orders of opposite signs being selected for the first through third wavelengths, and that generally with such diffraction units, the amount of spherical aberration occurring due to the refraction index at the time of temperature rising is cancelled out by the amount of spherical aberration occurring due to wavelength fluctuation at the time of temperature rising, and that the sign of effect of the amount of spherical aberration occurring due to wavelength fluctuation at the time of temperature rising is determined by the diffraction direction; however, with the above-described diffraction unit 150 having the first through third diffraction regions 151, 152, and 153, the design efficiency as to the first wavelength can be raised to almost 100%, and also occurrence of spherical aberration at the time of temperature change can be suppressed.

Further, by forming the first diffraction region 151 of the diffraction unit 150 with a blazed form having a shallow groove depth to realize three-wavelength compatibility, the manufacturing processing becomes easy, enabling simplification of manufacturing and reduction in costs, and particularly, the case of integrating the diffraction unit with the object lens as described later, a configuration advantageous from the perspective of manufacturing can be obtained. Also, by forming the second and third diffraction regions 152 and 153 of the diffraction unit 150 with a blazed form having a shallow groove depth, the manufacturing processing becomes easy, enabling simplification of manufacturing and reduction in costs, and particularly, the case of integrating the diffraction unit with the object lens as described later, a configuration advantageous from the perspective of manufacturing can be obtained.

Also, the diffraction unit 150 having the first through third diffraction regions 151, 152, and 153 is configured such that an order other than the diffraction order, whereby the optical beam of the third wavelength passing through the second and third diffraction regions 152 and 153 is suitably condensed on the signal recording face of the corresponding type of optical disc via the object lens 134, is dominant, so that only the portion of the optical beam which has passed through the first diffraction region 151 is condensed on the signal recording face of the optical disc via the object lens 134, and the first diffraction region 151 is formed to a size such that the optical beam of the third wavelength passing through this region is shaped to have a size of a predetermined numerical aperture, whereby aperture restriction can be performed regarding the optical beam of the third wavelength so as to have a numerical aperture of around 0.45, for example. Note that by forming the diffraction unit 150 and object lens 134 such that flaring is implemented regarding the third wavelength as described at one or both of the second and third diffraction regions 152 and 153, whereby the light quantity of the optical beam of third wavelength condensed on the signal recording face of the third optical disc is further suppressed, thereby enabling manifesting of further aperture restriction functions.

Also, the diffraction unit 150 is configured such that an order other than the diffraction order, whereby the optical beam of the second wavelength passing through the third diffraction region 153 is suitably condensed on the signal recording face of the corresponding type of optical disc via the object lens 134, is dominant, so that only the portion of the optical beam which has passed through the first and second diffraction regions 151 and 152 is condensed on the signal recording face of the optical disc via the object lens 134, and the first and second diffraction regions 151 and 152 are formed to a size such that the optical beam of the second wavelength passing through this region is shaped to have a size of a predetermined numerical aperture, whereby aperture restriction can be performed regarding the optical beam of the second wavelength so as to have a numerical aperture of around 0.60, for example. Note that by forming the diffraction region 150 and object lens 134 such that flaring is implemented regarding the second wavelength as described at the third diffraction region 153, whereby the light quantity of the optical beam of the second wavelength condensed on the signal recording face of the second optical disc is further suppressed, thereby enabling manifesting of further aperture restriction functions.

Also, the diffraction unit 150 performs places the optical beam of the first wavelength passing outside of the third diffraction region 153 in a state so as to not be suitably condensed on the signal recording face of the corresponding type of optical disc via the object lens 134, or shields the optical beam of the first wavelength passing outside of the third diffraction region 153, whereby, with regard to the optical beam of the first wavelength, only the optical beam portion which has passed through the first through third diffraction regions 151, 152, and 153 is condensed on the signal recording face of the optical disc via the object lens 134, and also, the first through third diffraction regions 151, 152, and 153 are formed to a size which is the numerical aperture of the first wavelength optical beam passing through this region, whereby aperture restriction can be performed regarding the optical beam of the first wavelength such that NA=around 0.85, for example.

Thus, the diffraction unit 150 provided on one face of the diffraction optical element 135 disposed on the optical path as described above not only realizes three-wavelength compatibility, but also enables optical beams of each wavelength to be input to the common object lens 134 in a state wherein aperture restriction is performed appropriately with a numerical aperture corresponding to each of the three types of optical discs and optical beams of the first through third wavelengths. Thus, the diffraction unit 150 not only has functions of aberration correction corresponding to the three wavelengths, but also has functions as an aperture restricting unit.

It should be noted that a diffraction unit can be configured by suitably combining the diffraction regions in the above-described embodiments. That is to say, the diffraction order of each wavelength passing through each diffraction region can be selected as appropriate. In the event of changing the diffraction order of each wavelength passing through each diffraction region, an object lens 134 corresponding to each diffraction order of each wavelength passing through each region can be used.

Figure 35A:
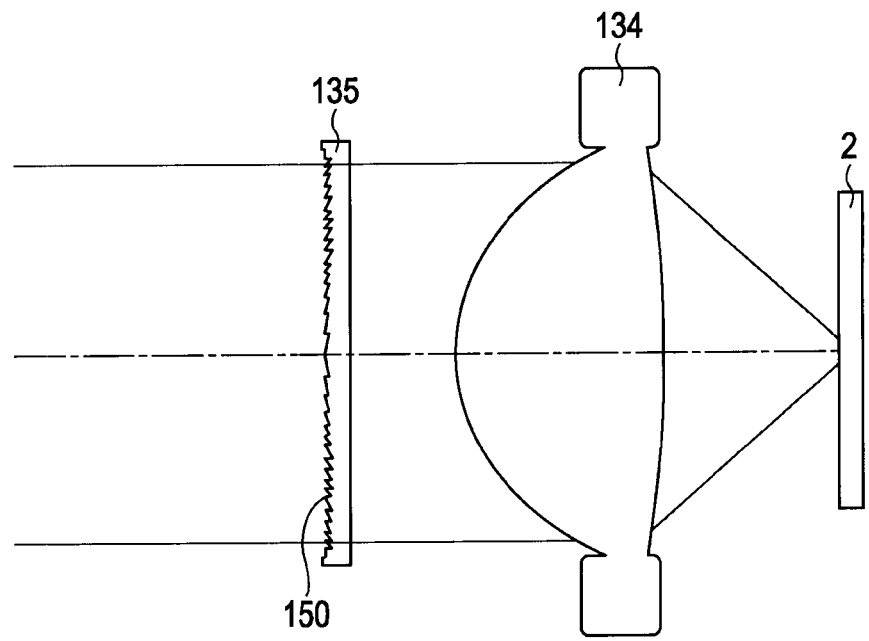
Figure 35B:
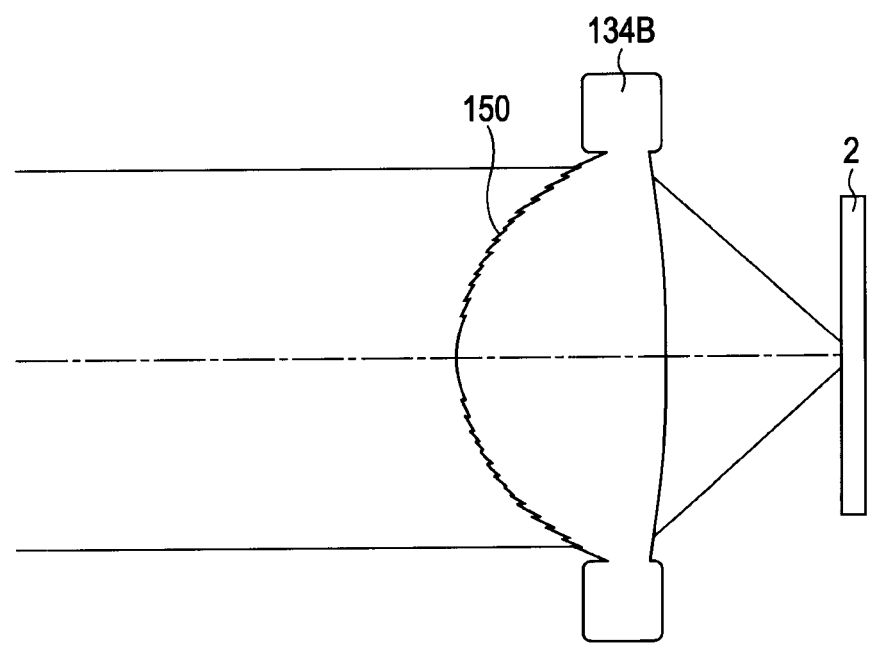

Also, while description has been made above with the diffraction unit 150 configured of the three diffraction regions 151, 152, and 153 formed on the incident side face of the diffraction optical element 135 provided separately from the object lens 134, as shown in FIG. 35A, the present invention is not restricted to this arrangement, and may be provided to the output side face of the diffraction optical element 135. Further, the diffraction unit 150 having the first through third diffraction regions 151, 152, and 153, can be integrally configured on the input or output side face of the object lens 134, or, as shown in FIG. 35B for example, an object lens 134B having the diffraction unit 150 on the incident side face thereof may be configured. In the event of providing the diffraction unit 150 on the incident side face of the object lens 134B for example, the planar shape of the above-described diffraction structure is combined with a reference face at the incident side face required for the lens to be able to function as an object lens. While the above-described diffraction optical element 135 and the object lens 134 are two separate elements serving as a condensing optical device, the object lens 134B thus configured functions as a condensing optical device which can perform suitable light condensing such that spherical aberration does not occur at the signal recording face of optical discs corresponding to each of the three optical beams of different wavelengths, with a single element. Providing the diffraction unit 150 integrally with the object lens 134B enables further reduction in optical parts and also reduction in configuration size. The object lens 134B having a diffraction unit having functions the same as the diffraction unit 150 provided integrally at the input side or output side face realizes three-wavelength compatibility of the optical pickup by reducing aberration and so forth when used in an optical pickup, and also reduces the number of parts so as to enable simplification and reduction in size of the configuration, thereby realizing high production and reduced costs. Note that the above-described diffraction unit 150 sufficiently manifests the advantages thereof with the diffraction structure for aberration correction to realize three-wavelength compatibility being provided on a single face that has been difficult with the related art, which enables such a diffraction element to be integrally formed with the object lens 134 serving as such a refractive element, further enabling directly forming a diffraction face on a plastic lens, and forming the object lens 134B with which the diffraction unit 150 has been integrated of a plastic material further realizing improved production and lower costs.

The collimator lens 142 provided between the diffraction optical element 135 and the third beam splitter 138 converts the divergent angle of each of the first through third wavelength optical beams of which the optical paths have been synthesized at the second beam splitter 137 and passed through the third beam splitter 138, and outputs to the quarter-wave plate 143 and diffraction optical element 135 side, in a generally parallel light state, for example. The arrangement wherein the collimator lens 142 inputs the optical beams of the first and second wavelengths into the above-described diffraction optical element 135 with the divergent angle thereof in the state of generally parallel light, and also inputs the optical beam of the third wavelength into the diffraction optical element 135 with divergent angle in a state which is slightly diffused as to parallel light (hereinafter also referred to as "finite system state") enables further reduction of spherical aberration, slightly occurring at the time of condensing the third wavelength optical beam on the signal recording face of the third optical disc via the diffraction optical element 135 and the object lens 134, described with reference to FIG. 24, to realize three-wavelength compatibility with less aberration occurring. While an arrangement has been described here wherein the optical beam of the third wavelength is input to the diffraction optical element 135 in a state of a predetermined divergent angle, due to the positional relation between the third light source 133 having the third emitting unit for emitting the third wavelength optical beam and the collimator lens 142, in the event of positioning multiple emitting units at a common light source for example, this may be realized by providing an element which converts only the divergent angle of the optical beam of the third wavelength, or by inputting into the diffraction optical element 135 in a predetermined divergent angle state by providing a mechanism to drive the collimator lens 142, or the like. Also, the optical beam of the second wavelength, or the optical beams of the second and third wavelengths, may be input to the diffraction optical element 135 in the finite system state, thereby further reducing aberration. Also, optical beams of the second and third wavelengths may be input in the finite system state and in a diffused state, thereby realizing adjustment of return power and even more excellent optical system compatibility may be achieved by setting the focus capture range and so forth to a desired state matching the format by adjusting the return power. Note that in this case, the object lens 134 is formed with the design line situated downwards by a predetermined distance with regard to the plotted points Pλ2 and Pλ3 with regard to the second and third wavelengths in the relation between the wavelength×diffraction order and protective layer thickness described above.

The multi-lens 146 is, for example, a wavelength-selective multi-lens, whereby the returning first through third wavelength optical beams separated from the outgoing path optical beams by being reflected at the third beam splitter 138, after having been reflected off of the signal recording face of the respective optical disc, and passed through the object lens 134, diffraction optical element 135, redirecting mirror 144, quarter-wave plate 143, and collimator lens 142, is appropriately condensed on the photoreception face of the photodetector or the like of the photosensor 145. At this time, the multi-lens 146 provides the return optical beam with astigmatism for detection of focus error signals or the like.

The photosensor 145 receives the return optical beam condensed at the multi-lens 146, and detects, along with information signals, various types of detection signals such as focus error signals, tracking error signals, and so forth.

With the optical pickup 103 configured as described above, the object lens 134 is driven so as to be displaced based on the focus error signals and tracking error signals obtained by the photosensor 145, whereby the object lens 134 is moved to a focal position as to the signal recording face of the optical disc 2, the optical beam is focused onto the signal recording face of the optical disc 2, and information is recorded to or played from the optical disc 2.

The optical pickup 103 is provided on one face of the diffraction optical element 135, can provide optical beams of each wavelength with a diffraction efficiency and diffraction angle suitable for each region due to the diffraction unit 150 having the first through third diffraction regions 151, 152, and 153, can sufficiently reduce spherical aberration at the signal recording face of the three types of first through third optical discs 11, 12, and 13, of which the format for the thickness of the protective layer or the like differs, and enables reading and writing of signals to and from the multiple types of optical discs 11, 12, and 13, using optical beams of three different wavelengths.

Also, the diffraction optical element 135 having the diffraction unit 150, and object lens 134, in the above optical pickup 103, can function as a condensing optical device for condensing incident optical beams at a predetermined position. In the event of using an optical pickup which performs recording and/or playing of information signals by irradiating optical beams onto three different types of optical discs, the diffraction unit 150 provided on one face of the diffraction optical element 135 enables the condensing optical device to appropriately condense corresponding optical beams onto the signal recording face of the three types of optical discs in a state with spherical aberration sufficiently reduced, meaning that three-wavelength compatibility of the optical pickup using the object lens 134 common to the three wavelengths can be realized.

Also, while description has been made above regarding a configuration wherein the diffraction optical element 135 to which the diffraction unit 150 is provided, and the object lens 134, are provided to an actuator such as an object lens driving mechanism or the like for driving the object lens 134 is as to be integral, this may be configured as a condensing optical unit wherein the diffraction optical element 135 and the object lens 134 are formed as an integrated unit, in order to improve precision of assembly to the lens holder of the actuator, and facilitate assembly work. For example, a condensing optical unit can be configured by use spacers or the like to fix the diffraction optical element 135 and object lens 134 to the holder while setting the positioning, spacing, and optical axis, so as to be integrally formed. Due to being integrally assembled to the object lens driving mechanism as described above, the diffraction optical element 135 and object lens 134 can appropriately condense the first through third wavelength optical beams on the signal recording face of the respective optical discs in a state with spherical aberration reduced, even at the time of field shift such as displacement in the tracking direction.

Next, the optical paths of the optical beams emitted from the first through third light sources 131, 132, and 133 of the optical pickup 103 configured as described above, will be described with reference to FIG. 2. First, the optical path at the time of emitting the optical beam of the first wavelength as to the first optical disc 11 and performing reading or writing of information will be described.

The disc type determination unit 22 which has determined that the type of the optical disc 2 is the first optical disc 11 causes the optical beam of the first wavelength to be emitted from the first emitting unit of the first light source 131.

The optical beam of the first wavelength emitted from the first emitting unit is split into three beams by the first grating 139, for detection of tracking error signals and so forth, and is input to the second beam splitter 137. The optical beam of the first wavelength which has been input to the second beam splitter 137 is reflected at a mirror face 137a thereof, and is output to the third beam splitter 138 side.

The optical beam of the first wavelength which is input to the third beam splitter 138 is transmitted through a mirror face 138a thereof, output to the collimator lens 142 side, where the divergent angle is converted so as to be generally parallel light by the collimator lens 142, provided with a predetermined phase difference at the quarter-wave plate 143, reflected off of the redirecting mirror 144, and output to the diffraction optical element 135 side.

The optical beam of the first wavelength which is input to the diffraction optical element 135 is output with the optical beam which has passed through each region thereof having a predetermined diffraction order (k1$i$, k1$m$, k1$o$) dominant therein as described above, due to the first through third diffraction regions 151, 152, and 153 of the diffraction unit 150 provided on the incident side face thereof, and input to the object lens 134. The optical beam of the first wavelength output from the diffraction optical element 135 is not only in a state of a predetermined divergent angle, but also is in a state of aperture restriction.

The optical beam of the first wavelength input to the object lens 134 has been input in a converged state of the divergent angle whereby spherical aberration of the optical beam having passed through the regions 151, 152, and 153 can be reduced, and accordingly is appropriately condensed by the object lens 134 on the signal recording face of the first optical disc 11.

The optical beam condensed at the first optical disc 11 is reflected at the signal recording face, passes through the object lens 134, diffraction optical element 135, redirecting mirror 144, quarter-wave plate 143, and collimator lens 142, is reflected off of the mirror face 138a of the third beam splitter 138, and is output to the photosensor 145 side.

The optical beam split from the optical path of the outgoing optical beam reflected off of the third beam splitter 138 is condensed on the photoreception face of the photosensor by the multi-lens 146, and detected.

Next, description will be made regarding the optical path at the time of emitting an optical beam of the second wavelength to the second optical disc 12 and reading or writing information. The disc type determination unit 22 which has determined that the type of the optical disc 2 is the second optical disc 12 causes the optical beam of the second wavelength to be emitted from the second emitting unit of the second light source 132.

The optical beam of the second wavelength emitted form the second emitting unit is split into three beams by the second grating 140, for detection of tracking error signals and so forth, and is input to the first beam splitter 136. The optical beam of the second wavelength which has been input to the first beam splitter 136 is transmitted through a mirror face 136a thereof, also transmitted through the mirror face 137a of the second beam splitter 137, and is output to the third beam splitter 138 side.

The optical beam of the second wavelength which is input to the third beam splitter 138 is transmitted through the mirror face 138a thereof, output to the collimator lens 142 side, where the divergent angle is converted so as to be generally parallel light or diffused light, by the collimator lens 142, provided with a predetermined phase difference at the quarter-wave plate 143, reflected off of the redirecting mirror 144, and output to the diffraction optical element 135 side.

The optical beam of the second wavelength which is input to the diffraction optical element 135 is output with the optical beam which has passed through each region thereof having a predetermined diffraction order dominant therein as described above, due to the first through third diffraction regions 151, 152, and 153 of the diffraction unit 150 provided on the incident side face thereof, and input to the object lens 134. The optical beam of the second wavelength output from the diffraction optical element 135 is not only in a state of a predetermined divergent angle, but also is in a state of aperture restriction due to being input to the object lens 134.

The optical beam of the second wavelength input to the object lens 134 has been input in a divergent angle state whereby spherical aberration of the optical beam having passed through the first and second diffraction regions 151 and 152 can be reduced, and accordingly is appropriately condensed by the object lens 134 on the signal recording face of the second optical disc 12.

The return side optical path of the optical beam reflected off of the signal recording face of the second optical disc 12 is the same as with the case of the above-described optical beam of the first wavelength, and accordingly description thereof will be omitted.

Next, description will be made regarding the optical path at the time of emitting an optical beam of the third wavelength to the third optical disc 13 and reading or writing information. The disc type determination unit 22 which has determined that the type of the optical disc 2 is the third optical disc 13 causes the optical beam of the third wavelength to be emitted from the third emitting unit of the third light source 133.

The optical beam of the third wavelength emitted from the third emitting unit is split into three beams by the third grating 141, for detection of tracking error signals and so forth, and is input to the first beam splitter 136. The optical beam of the third wavelength which has been input to the first beam splitter 136 is reflected off of the mirror face 136a thereof, transmitted through the mirror face 137a of the second beam splitter 137, and is output to the third beam splitter 138 side.

The optical beam of the third wavelength which is input to the third beam splitter 138 is transmitted through the mirror face 138a thereof, output to the collimator lens 142 side, where the divergent angle is converted by the collimator lens 142 so as to be diffused as to generally parallel light, provided with a predetermined phase difference at the quarter-wave plate 143, reflected off of the redirecting mirror 144, and output to the diffraction optical element 135 side.

The optical beam of the third wavelength which is input to the diffraction optical element 135 is output with the optical beam which has passed through each region thereof having a predetermined diffraction order dominant therein as described above, due to the first through third diffraction regions 151, 152, and 153 of the diffraction unit 150 provided on the incident side face thereof, and input to the object lens 134. The optical beam of the third wavelength output from the diffraction optical element 135 is not only in a state of a predetermined divergent angle, but also is in a state of aperture restriction due to having been input to the object lens 134.

The optical beam of the third wavelength input to the object lens 134 has been input in a divergent angle state whereby spherical aberration of the optical beam having passed through the first diffraction region 151 can be reduced, and accordingly is appropriately condensed by the object lens 134 on the signal recording face of the third optical disc 13.

The return side optical path of the optical beam reflected off of the signal recording face of the third optical disc 13 is the same as with the case of the above-described optical beam of the first wavelength, and accordingly description thereof will be omitted.

Note that while a configuration has been described here wherein the optical beam of the third wavelength has the position of the third emitting unit adjusted such that the optical beam of which the divergent angle is converted by the collimator lens 142 and input to the diffraction optical element 135 is in a diffused state as to a state of generally parallel light, a configuration may be made wherein the optical beam is input to the diffraction optical element 135 by providing an element which has wavelength selectivity and converts the divergent angle, or by providing a mechanism which drives the collimator lens 142 in the optical axis direction.

Also, while description has been made regarding a configuration wherein the optical beam of the first wavelength is input to the diffraction optical element 135 in a state of generally parallel light, the optical beam of the second wavelength is input to the diffraction optical element 135 in a state of generally parallel light or diffused light, and the optical beam of the third wavelength is input to the diffraction optical element 135 in a diffused state, the present invention is not restricted to this arrangement, and configurations may be made wherein, for example, the first through third wavelength optical beams are selectively input to the diffraction optical element 135 in a state of diffused light, parallel light, or converged light, taking into consideration the diffraction order selected according to the design line of the object lens 134 and diffraction unit 150.

The optical pickup 103 to which the present invention has been applied has first through third emitting units for emitting optical beams of first through third wavelengths, an object lens 134 for condensing the optical beams of first through third wavelengths emitted from the first through third emitting units into a signal recording face of an optical disc, and a diffraction unit 150 provided on one face of an optical element disposed on the outgoing optical path of the optical beams of first through third wavelengths, wherein the diffraction unit 150 has first through third diffraction regions 151, 152, and 153, with the first through third diffraction regions 151, 152, and 153 being different diffraction structures circular in shape and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having difference usage wavelengths can be appropriately condensed on the signal recording face using the common object lens 134, thereby realizing excellent recording and/or playing of information signals to/from the respective optical discs by realizing three-wavelength compatibility with the common object lens 134, without necessitating a complex structure.

That is to say, the optical pickup 103 to which the present invention has been applied obtains optimal diffraction efficiencies and diffraction angels for the first through third wavelength optical beams due to the diffraction unit 150 provided on one face within the optical path thereof, whereby signals can be read from and written to the multiple types of optical discs 11, 12, and 13, using the optical beams of different wavelengths emitted from the multiple emitting units provided to each of the light sources 131, 132, and 133, and also optical parts such as the object lens 134 and so forth can be shared, thereby reducing the number of parts, simplifying and reducing the size of the configuration, and realizing high production and lower costs.

The optical pickup 103 to which the present invention has been applied is configured with the diffraction unit 150 and object lens 134 has the predetermined diffraction orders (k1$i$, k2$i$, k3$i$) selected by the first diffraction region 151 set to (+1, +1, +1), whereby light can be condensed on the signal recording face of each optical disc with sufficiently high light use efficiency while reducing spherical aberration to the three wavelengths, and also excellent spherical aberration properties at the time of temperature change can be obtained, thereby realizing excellent compatibility and realizing excellent recording and/or playing to/from each optical disc.

The optical pickup 103 to which the present invention has been applied is configured with the diffraction unit 150 and object lens 134 has the predetermined diffraction orders (k1$m$, k2$m$) selected by the second and/or third diffraction regions 152 and 153 set to (+1, +1) or (+3, +2) and k1$o$ set to +1, +2, +3, +4, and +5, whereby light can be condensed on the signal recording face of each optical disc with sufficiently high light use efficiency while reducing spherical aberration to the corresponding wavelengths, and with particularly high light use efficiency regarding the optical beam of the first wavelength, and also even more excellent spherical aberration properties at the time of temperature change can be obtained, thereby realizing even more excellent compatibility and realizing excellent recording and/or playing to/from each optical disc.

Also, the optical pickup 103 to which the present invention has been applied can share the object lens 134 between the three wavelengths, thereby preventing trouble of reduction of sensitivity of the actuator and so forth due to increase weight of moving parts. Also, the optical pickup 103 to which the present invention has been applied can sufficiently reduce spherical aberration which is problematic in the case of sharing the object lens 134 between the three wavelengths, due to the diffraction unit 150 provided on one face of the optical element, so problems such as positioning of diffraction units one to another in the event that multiple diffraction units are provided on multiple faces to reduce spherical aberration as with the related art, and deterioration of diffraction efficiency due to providing of the multiple diffraction units, can be prevented, which realizes simplification of the assembly process and improved usage efficiency of light. Also, with the optical pickup 103 to which the present invention has been applied, a configuration wherein the diffraction unit 150 is provided on one face of the optical element as described above enables a configuration having an object lens 134B including the diffraction unit 150 instead of the object lens 134 and the diffraction optical element 135, and by integrally forming the diffraction unit 150 with the object lens, realizes further simplification of the structure, reduction in weight of moving parts of the actuator, simplification of the assembly process, and improved usage efficiency of light.

Further, the optical pickup 103 to which the present invention has been applied not only realizes three-wavelength compatibility with the diffraction unit 150 provided on the one face of the diffraction optical element described above, but also can perform aperture restriction with a numerical aperture corresponding to each of the three types of optical discs and optical beams of three types, thereby doing away with the need for aperture restriction filters or the like which have been necessary with the related art, and also adjustment in the positioning thereof, which enables further simplification of configuration, reduction in size, and reduction in costs. Also, the optical pickup 103 has a configuration wherein the above-described flaring is enabled at one or both of the second and third diffraction regions 152 and 153 at the diffraction unit 150 and object lens 134, thereby manifesting even more excellent aperture restriction functions.

Also, while the above optical pickup 103 has been described having the first emitting unit provided at the first light source 131, the second emitting unit provided at the second light source 132, and the third emitting unit provided at the third light source 133, the present invention is not restricted to this arrangement, and an arrangement may be made wherein a light source having two of the first through third emitting units, and another light source having the remaining one emitting unit, are provided at different positions.

Next, description will be made regarding an optical pickup 160 shown in FIG. 36 including a light source having a first emitting unit, and a light source having second and third emitting units. Note that portions in the following description which are the same as with the optical pickup 103 will be denoted with the same reference numerals, and description thereof will be omitted.

Figure 36:
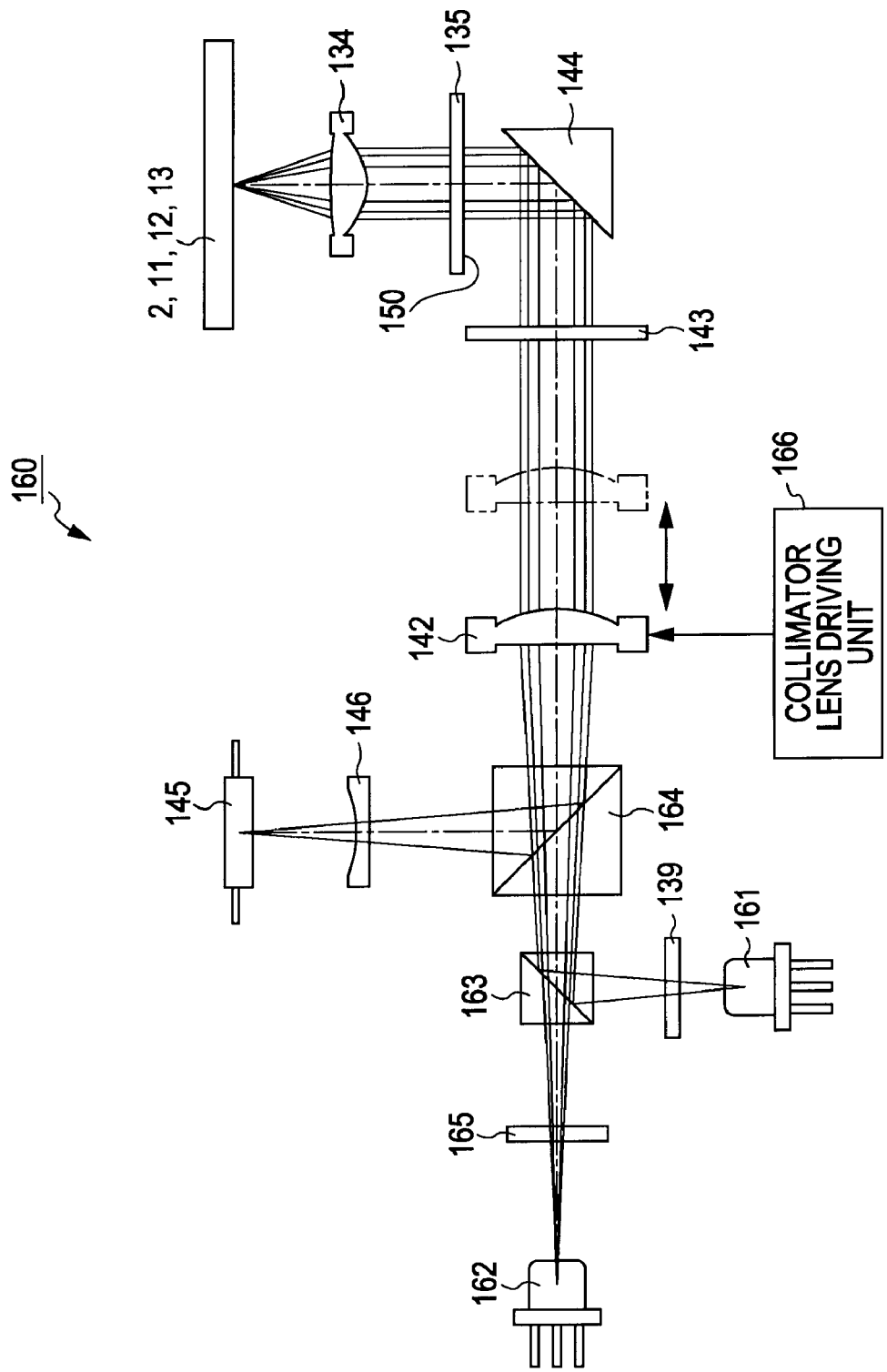
FIG. 36 is an optical path diagram illustrating another example of the optical system of an optical pickup to which the present invention has been applied, as a second embodiment.

As shown in FIG. 36, the optical pickup 160 to which the present invention has been applied includes a first light source 161 having a first emitting unit for emitting an optical beam of a first wavelength, a second light source 162 having a second emitting unit for emitting an optical beam of a second wavelength and a third emitting unit for emitting an optical beam of a third wavelength, an object lens 134 for condensing optical beams emitted from the first through third emitting units onto the signal recording face of an optical disc 2, and a diffraction optical element 135 provided on the optical path between the first through third emitting units and the object lens 134. This diffraction optical element 135 is provided with the diffraction unit 150, as described above. Also, with the optical pickup 160 described here as well, a configuration may be made wherein the diffraction unit 150 is integrally provided on one face of the optical lens, either the input side or output side, such as with the above-described object lens 134B for example, instead of the object lens 134 and the diffraction optical element 135.

Also, the optical pickup 160 includes a beam splitter 163 serving as an optical path synthesizing unit for synthesizing the optical paths of the optical beam of the first wavelength that has been emitted from the first emitting unit of the first light source 161 and the optical beams of the second and third wavelengths that have been emitted from the second and third emitting unit of the second light source 162, and a beam splitter 164 serving the same function as the above third beam splitter 138.

Further, the optical pickup 160 has a first grating 139, and a grating 165 with wavelength dependency, provided between the second light source unit 162 and the beam splitter 163, for diffracting the optical beams of the second and third wavelengths that have been emitted from the second and third emitting units into three beams, for detection of tracking error signals and so forth.

Also, the optical pickup 160 has a collimator lens 142, quarter-wave plate 143, redirecting mirror 144, photosensor 145, and multi-lens 146, and also a collimator lens driving unit 166 for driving the collimator lens 142 in the direction of the optical axis. The collimator lens driving unit 166 can adjust the divergent angle of optical beams passing through the collimator lens 142 as described above by driving the collimator lens 142 in the direction of the optical axis, whereby not only can spherical aberration be reduced by inputting the optical beams to the diffraction optical element 135 and object lens 134 in a desired state, but in the event that the mounted optical disc is a so-called multi-layer optical disc having multiple signal recording faces, recording and/or playing to/from each of the signal recording faces is enabled.

With the optical pickup 160 configured as described above, the functions of each of the optical parts is the same as with the optical pickup 103 except for those mentioned above, and the optical paths of the optical beams of the first through third wavelengths emitted from the first through third emitting units are the same as with the optical pickup 103 except for the above-mentioned, i.e., following synthesizing of the optical paths of the optical beams of each wavelength by the beam splitter 164, so detailed description thereof will be omitted.

The optical pickup 160 to which the present invention has been applied has first through third emitting units for emitting optical beams of first through third wavelengths, an object lens 134 for condensing the optical beams of first through third wavelengths emitted from the first through third emitting units into a signal recording face of an optical disc, and a diffraction unit 150 provided on one face of an optical element disposed on the outgoing optical path of the optical beams of first through third wavelengths, wherein the diffraction unit 150 has first through third diffraction regions 151, 152, and 153, with the first through third diffraction regions 151, 152, and 153 being different diffraction structures circular in shape and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having different usage wavelengths can be appropriately condensed on the signal recording face using the single shared object lens 134, thereby realizing excellent recording and/or playing of information signals to/from the respective optical discs by realizing three-wavelength compatibility with the common object lens 134, without necessitating a complex structure. The optical pickup 160 also has the other advantages of the above-described optical pickup 103, as well.

Further, the optical pickup 160 is configured such that the second and third emitting units are positioned at a common light source 162, thereby realizing further simplification of configuration and reduction in size. Note that in the same way, with the optical pickup to which the present invention has been applied, the first through third emitting units may be positioned at a light source at generally the same position, thereby realizing further simplification of configuration and reduction in size with such a configuration.

The optical disc device 1 to which the present invention has been applied has a driving unit for holding and rotationally driving an optical disc arbitrarily selected from the first through third optical discs, and an optical pickup for performing recording and/or playing of information signals from/to the optical disc being rotationally driven by the driving unit by selectively irradiating one of multiple optical beams of different wavelengths corresponding to the optical disc, and by using the above-described optical pickups 103 or 160 as the optical pickup, optical beams corresponding to each of three types of optical discs having different usage wavelengths can be appropriately condensed on the signal recording face due to the diffraction unit provided on one face of the optical element on the optical path of the optical beams of the first through third wavelengths, using a single common object lens 134, thereby realizing excellent recording and/or playing of information signals to/from the respective optical discs by realizing three-wavelength compatibility with the common object lens 134, while enabling simplification of the configuration and reduction in size, without necessitating a complex structure.

<4> Third Embodiment of Optical Pickup (FIGS. 37 through 59)

Next, an optical pickup 203 to which the present invention is applied will be described in detail as a third embodiment of the optical pickup used in the above-described optical disc device 1, with reference to FIGS. 37 through 59. As described above, the optical pickup 203 is an optical pickup which selectively irradiates multiple optical beams onto optical discs selected from first through third optical discs 11, 12, and 13, of which the format such as the thickness of the protective layer differs, thereby performing recording and/or playing of information signals.

Note that the optical pickup 203 serving as the third embodiment described here is for solving the same problems as those of the above-mentioned optical pickups 3 and 103, and additionally, solving the following problems, and includes an arrangement for obtaining more advantageous effects. Firstly, with the optical pickup 203, demands for realizing enhancement of light use efficiency can be handled, and a problem for reducing focal distance as to the first wavelength while holding a suitable operating distance of the third wavelength can be solved, and with regard to these points, the optical pickup 203 excels the above-mentioned optical pickup 3. Secondly, with the optical pickup 203, demands for reducing unwanted light incidence can be handled, and a problem for optimizing operating distance and focal distance can be solved by changing the order of diffraction selected for the first and third wavelengths, and with regard to these points, the optical pickup 203 excels the above-mentioned optical pickup 103.

Figure 37:
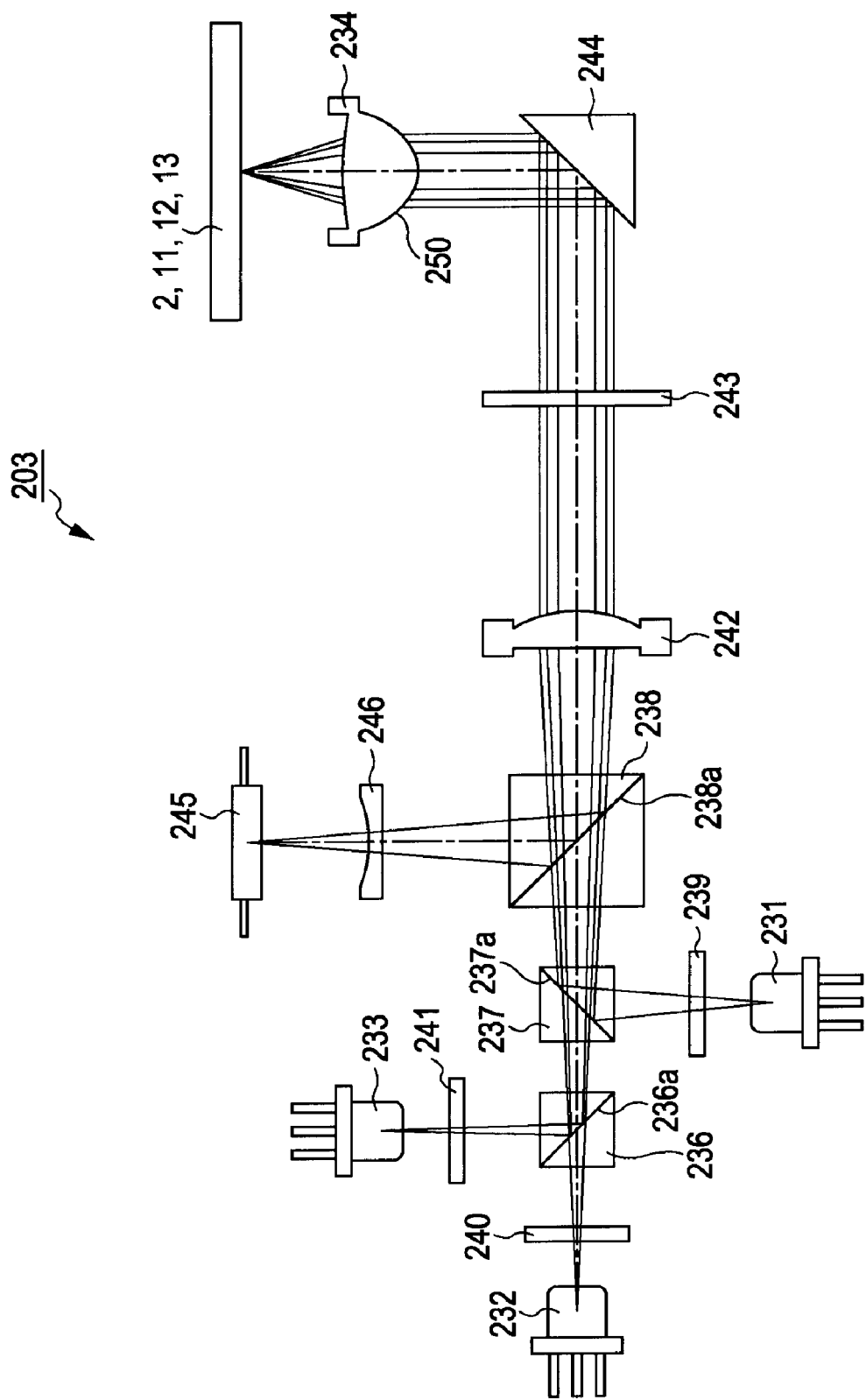
FIG. 37 is an optical path diagram illustrating the optical system of an optical pickup to which the present invention has been applied, as a third embodiment.

As shown in FIG. 37, the optical pickup 203 to which the present invention has been applied includes a first light source 231 having a first emitting unit for emitting an optical beam of a first wavelength, a second light source 232 having a second emitting unit for emitting an optical beam of a second wavelength which is longer than the first wavelength, a third light source 233 having a third emitting unit for emitting an optical beam of a third wavelength which is longer than the second wavelength, an object lens 234 which serves as a condensing optical device for condensing optical beams emitted from the first through third emitting units onto the signal recording face of an optical disc 2.

Also, the optical pickup 203 includes a first beam splitter 236 provided between the second and third emitting units and the object lens 234, serving as an optical path synthesizing unit for synthesizing the optical paths of the optical beam of the second wavelength that has been emitted from the second emitting unit and the optical beam of the third wavelength that has been emitted from the third emitting unit, a second beam splitter 237 provided between the first beam splitter 236 and the object lens 234, serving as an optical path synthesizing unit for synthesizing the optical paths of the optical beams of the second and third wavelengths of which the optical paths have been synthesized by the first beam splitter 236, and the optical path of the optical beam of the first wavelength that has been emitted from the first emitting unit, and a third beam splitter 238 provided between the second beam splitter 237 and the object lens 234, serving as an optical path splitting unit for splitting the outgoing optical path of the optical beam of the first through third wavelengths of which the optical paths have been synthesized at the second beam splitter 237 from the returning optical path of the optical beam of the first through third wavelengths reflected at the optical disc (hereinafter also referred to as "return path").

Further, the optical pickup 203 has a first grating 239 provided between the first emitting unit of the first light source unit 231 and the second beam splitter 237, for diffracting the optical beam of the first wavelength that has been emitted from the first emitting unit into three beams, for detection of tracking error signals and so forth, a second grating 240 provided between the second emitting unit of the second light source unit 232 and the first beam splitter 236, for diffracting the optical beam of the second wavelength that has been emitted from the second emitting unit into three beams, for detection of tracking error signals and so forth, and a third grating 241 provided between the third emitting unit of the third light source unit 233 and the first beam splitter 236, for diffracting the optical beam of the third wavelength that has been emitted from the third emitting unit into three beams, for detection of tracking error signals and so forth.

Also, the optical pickup 203 has a collimator lens 242 provided between the third beam splitter 238 and the object lens 234, serving as a divergent angle conversion unit for converting the divergent angle of the optical beam of the first through third wavelength of which the optical paths have been synthesized at the third beam splitter 238 so as to be adjusted into a state of generally parallel light or a state diffused or converged as to generally parallel light, and outputting, a quarter-wave plate 243 provided between the collimator lens 242 and the object lens 234, so as to provide quarter-wave phase difference to the optical beam of the first through third wavelength of which the divergent angle has been adjusted, and a redirecting mirror 244 provided between the object lens 234 and the quarter-wave plate 243, for redirecting the optical beam which has passed through the above-described optical parts within a plane generally orthogonal to the optical axis of the object lens 234, so as to emit the optical beam in the optical axis direction of the object lens 234.

Further, the optical pickup 203 includes a photosensor 245 for receiving and detecting the optical beams of the first through third wavelengths split at the third beam splitter 238 on the return path from the optical beam of the first through third wavelengths on the outgoing path, and a multi lens 246 provided between the third beam splitter 238 and the photosensor 245, for condensing optical beams of the first through third wavelengths split at the third beam splitter 238 onto the photoreception face of a photodetector or the like of the photosensor 245, and also providing astigmatism for detecting focus error signals or the like.

The first light source 231 has a first emitting unit for emitting an optical beam of a first wavelength around 405 nm onto the first optical disc 11. The second light source 232 has a second emitting unit for emitting an optical beam of a second wavelength around 655 nm onto the second optical disc 12. The third light source 233 has a third emitting unit for emitting an optical beam of a third wavelength around 785 nm onto the third optical disc 13. Note that while the first through third emitting units are configured disposed at individual light sources 231, 232, and 233, the invention is not restricted to this, and an arrangement may be made wherein two emitting units of the first through third emitting units are disposed at one light source and the remaining emitting unit is disposed at another light source, or wherein the first through third emitting units are disposed so as to form a light source at generally the same position.

The object lens 234 condenses the input optical beams of the first through third wavelengths into the signal recording face of the optical disc 2. The object lens 234 is movably held by an object lens driving mechanism such as an unshown biaxial actuator or the like. The object lens 234 is driven along two axes, one in the direction toward/away from the optical disc 2, and the other in the radial direction of the optical disc 2, by being moved by a biaxial actuator or the like based on the tracking error signals and focus error signals generated from the FR signals of the return light from the optical disc 2 that has been detected at the photosensor 245. The object lens 234 condenses optical beams emitted from the first through third emitting units such that the optical beams are always focused on the signal recording face of optical disc 2, and also causes the focused beam to track a recording track formed on the signal recording face of the optical disc 2. Note that an arrangement is made wherein, as described later, in the case of a diffraction unit 250 being provided on an optical element (diffraction optical element 235B) separate from the object lens (see FIG. 58), the later-described diffraction optical element 235B is held by a lens holder of the object lens driving mechanism where the object lens 234B is held so as to be integral with the object lens 234B enables the later-described advantages of the diffraction unit 250 provided to the diffraction optical element 235B to be suitably manifested at the time of field shift of the object lens 234B such as movement in the tracking direction.

Also, with the object lens 234, as one face thereof, for example, the diffraction unit 250 made up of multiple diffraction regions is provided on the incident side face, and according to this diffraction unit 250, each of the optical beams of the first through third wavelengths passing through each of the multiple diffraction regions is diffracted so as to become a predetermined order, thereby entering the object lens 234 as optical beams in a diffused state or converged state having a predetermined divergent angle, and accordingly, the single object lens 234 can be used to perform suitable condensing of the optical beams of the first through third wavelengths such that spherical aberration does not occur at the signal recording face of the three types of optical discs corresponding to the optical beams of the first through third wavelengths. The object lens 234 including the diffraction unit 250 serves as a condensation optical device for appropriately performing condensation such that no spherical aberration occurs at the signal recording face of the three types of optical discs corresponding to the optical beams of the three different wavelengths by a diffraction structure being formed which generates diffraction power with a lens face shape for generating diffraction power serving as reference. Also, thus, the object lens 234 has both of a refraction element function and a diffraction element function, i.e., has both of a refraction function according to a lens curved surface, and a diffraction function according to the diffraction unit 250 provided on one face.

Now, in order to describe the diffraction function of the diffraction unit 250 conceptually, as described later, description will be made regarding a case wherein the diffraction unit 250 is provided on the diffraction optical element 235B separate from the object lens 234B having refractive power (see FIG. 58) as an example. The diffraction optical element 235B, which is employed along with the object lens 234B having a refraction function alone as described later, having the diffraction unit 250 performs, for example, as shown in FIG. 38A, diffraction of the first wavelength optical beam BB0 which has transmitted the diffraction unit 250 so as to become +1st order diffracted beam BB1 and inputs to the object lens 234B, i.e., as a beam in a diffused state having a predetermined divergent angle, thereby appropriately condensing on the signal recording face of the first optical disc 11, as shown in FIG. 38B, performs diffraction of the second wavelength optical beam BD0 which has transmitted the diffraction unit 250 so as to become −1st order diffracted beam BD1 and inputs to the object lens 234B, i.e., as a beam in a converged state having a predetermined divergent angle, thereby appropriately condensing on the signal recording face of the second optical disc 12, as shown in FIG. 38C, and performs diffraction of the third wavelength optical beam BC0 which has transmitted the diffraction unit 250 so as to become −2nd order diffracted beam BC1 and inputs to the object lens 234B, i.e., as a beam in a converged state having a predetermined divergent angle, thereby appropriately condensing on the signal recording face of the third optical disc 13, whereby suitable condensation can be performed such that no spherical aberration occurs at the signal recording face of the three types of optical discs, with a single object lens 234B. While description has been made here with an example wherein optical beams of the same wavelength are made to be diffracted beams of the same diffraction order at the multiple diffraction regions of the diffraction unit 250, with reference to FIG. 38, the diffraction unit 250 configuring the optical pickup 3 to which the present invention is applied enables diffraction order corresponding to each wavelength to be set for each region as described later, so as to perform suitable aperture restriction, and further reduce spherical aberration. Description has been made so far regarding a case wherein the diffraction unit 250 is provided on an optical element separate from the object lens for the sake of description as an example, but the diffraction unit 250 provided integral with one face of the object lens 234 described here also has the same function by providing diffraction power according to the diffraction structure thereof, and the diffraction power of the diffraction unit 250, and the refractive power according to a lens curved face serving as the reference of the object lens 234 enable the optical beams of each wavelength to be condensed appropriately on the signal recording face of the corresponding optical disc such that no spherical aberration occurs.

In the above and following description of diffraction orders, an order of diffraction which draws closer to the optical axis side in the direction of progression with regard to an input optical beam is a positive order, and an order of diffraction which separates from the optical axis in the direction of progression is a negative order. In other words, an order which diffracts toward the optical axis of the input optical beam is a positive order.

Specifically, as shown in FIGS. 39A and 39B, the diffraction unit 250 provided at the incident side face of the object lens 234 has a generally-circular first diffraction region 251 provided on the innermost portion (hereinafter also referred to as "inner ring zone"), a ring-shaped second diffraction region 252 provided on the outer side of the first diffraction region 251 (hereinafter also referred to as "middle ring zone"), and a ring-shaped third diffraction region 253 provided on the outer side of the second diffraction region 252 (hereinafter also referred to as "outer ring zone").

The first diffraction region 251 which is an inner ring zone has a first diffraction structure formed having a ring shape with a predetermined depth, and diffracts the optical beam of the first wavelength that is transmitted therethrough such that diffracted light of an order which forms an appropriate spot on the signal recording face of the first optical disc via the object lens 234 is dominant, i.e., such that maximum diffraction efficiency is manifested regarding diffracted light of other orders.

Also, the first diffraction region 251 diffracts the optical beam of the second wavelength that is transmitted therethrough such that diffracted light of an order which forms an appropriate spot on the signal recording face of the second optical disc via the object lens 234 is dominant, i.e., such that maximum diffraction efficiency is manifested regarding diffracted light of other orders, by way of the first diffraction structure.

The first diffraction region 251 diffracts the optical beam of the third wavelength that is transmitted therethrough such that diffracted light of an order which forms an appropriate spot on the signal recording face of the third optical disc via the object lens 234 is dominant, i.e., such that maximum diffraction efficiency is manifested regarding diffracted light of other orders, by way of the first diffraction structure.

Thus, the first diffraction region 251 has a diffraction structure formed whereby diffracted light of a predetermined order is dominant in the optical beam of each wavelength, thereby enabling correction and reduction of spherical aberration at the time of optical beams of each wavelength that have passed through the first diffraction region 251 and become diffracted light of a predetermined order being condensed on the signal recording face of the respective optical discs by the object lens 234.

Note that regarding the first diffraction region 251, and also the second and third diffraction regions 252 and 253 described in detail later, description is made in the above and below with the understanding that transmitted light, i.e., light of zero order, is included in the diffracted light of a predetermined order selected so as to be dominant with regard to the optical beam of each wavelength.

Figure 39:
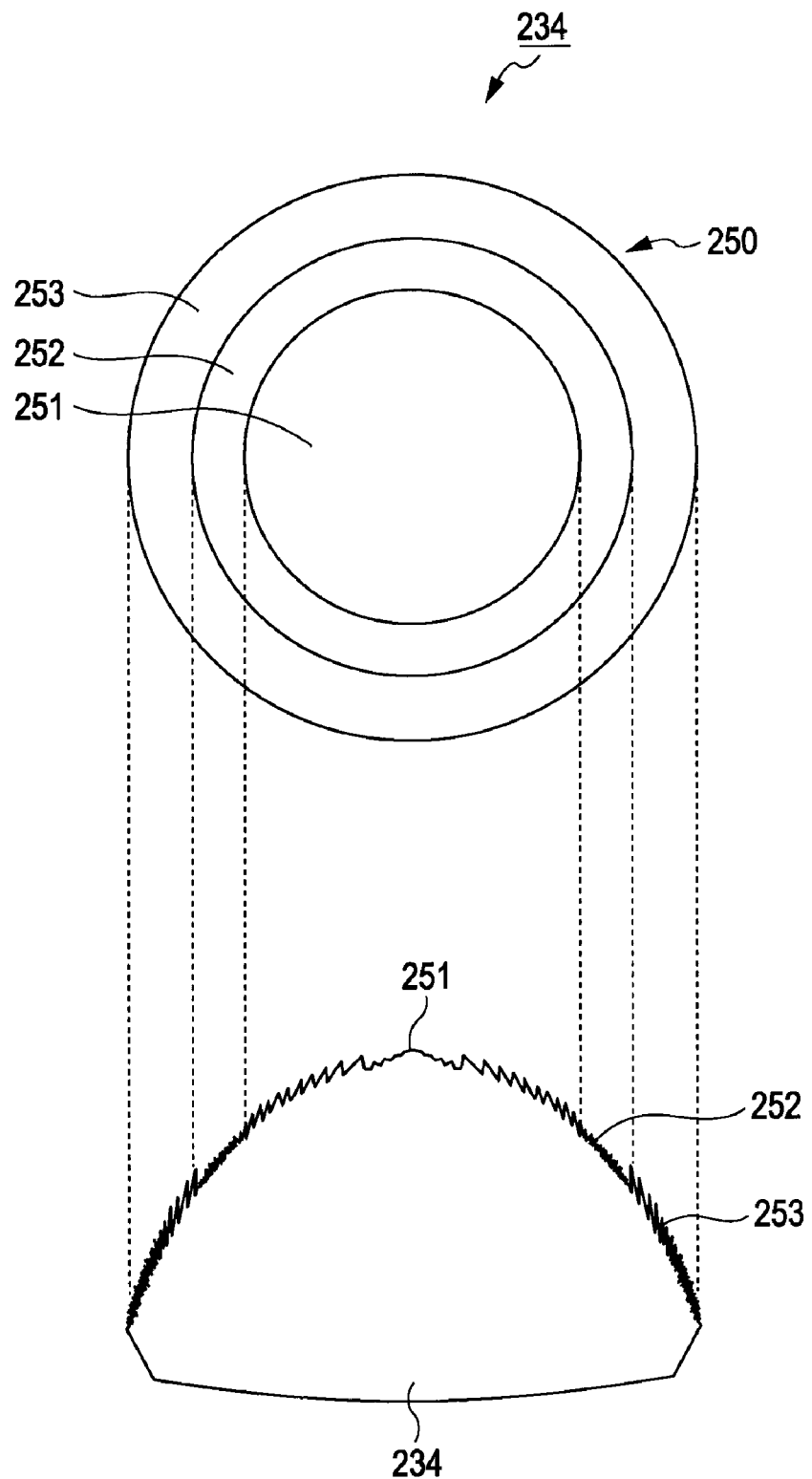
FIG. 39 is a diagram for describing the object lens configuring the optical pickup shown in FIG. 37, showing a correlated plan view and cross-sectional view of the object lens.
Figure 40:
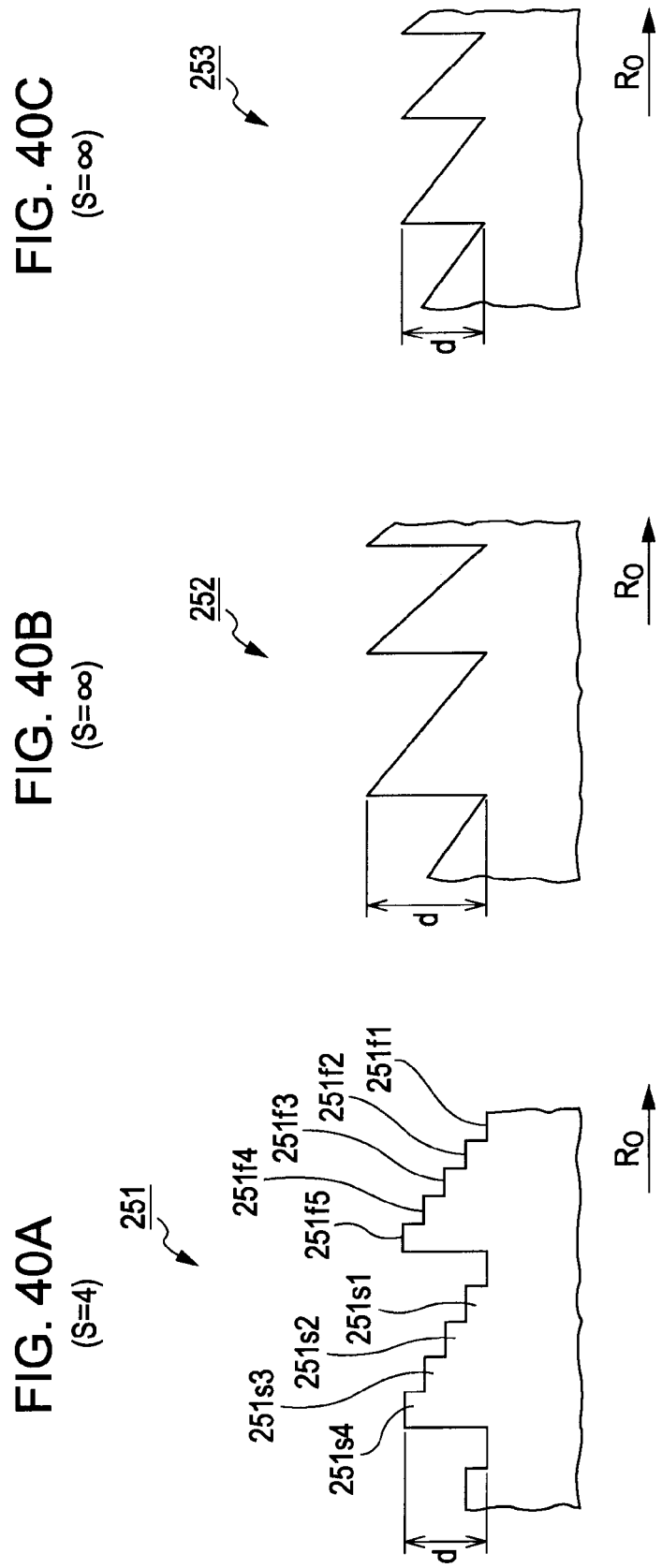

Specifically, as shown in FIGS. 39 and 40A, the first diffraction region 251 is formed with the cross-sectional form of ring shapes being formed as to the reference face of ring shapes centered on the optical axis, and with step shapes (hereafter referred to as "multiple steps of step shapes") of a predetermined number of steps S (S is assumed to be a positive integer) of a predetermined depth (hereinafter also referred to as "groove depth") d being formed consecutively in the radial direction. Note that the cross-sectional form of the ring shapes in this diffraction structure means the cross-sectional form of the rings taken along a plane including the radial direction of the rings, i.e., a plane orthogonal to the tangential direction of the rings.

Also, this reference face means the face shape of the incident side face required as a refraction element function of the object lens 234. With the first diffraction region 251, in reality, as shown in FIG. 39A, with the face shape of the incident side face required as a refraction element function of the object lens 234 as a reference face, as to this reference face, there is formed a face shape such as a combination of a ring zone form face shape and staircase form face shape making up a diffraction structure having a diffraction function such as shown in FIG. 40A, but in FIG. 39A through 39C and later-described FIG. 47, a diffraction structure shape alone as to the reference face thereof is illustrated for the sake of description, and also in the following description, the shape as to the reference face will be described. Note that in the case of providing the diffraction unit 250 in an optical element (later-described diffraction optical element 235B) separate from the object lens, the shapes illustrated in FIGS. 39A through 39C become the cross-sectional shape of the relevant diffraction optical element 235B. Also, the diffraction structure illustrated in FIG. 39 and so forth is actually formed with minute dimensions such as described later, and FIG. 39 and so forth illustrate enlarged cross sections.

Also, the diffraction structure having the staircase form with a predetermined number of steps S is a structure in which a staircase form having first through S steps, each of which have generally the same depth, continuing in the radial direction, which can be rephrased as saying that the structure has first through S+1'th diffraction faces formed with generally the same interval in the optical axis direction. Also, the predetermined depth d in the diffraction structure means the length along the optical axis between the diffraction face of the S+1'th diffraction face which is formed at the side of the staircase form closest to the surface (i.e., the highest step, which is the shallowest position) and diffraction face of the first diffraction face which is formed at the side of the staircase form closest to the optical element (i.e., the lowest step, which is the deepest position). Note that while a structure has been illustrated in FIG. 40A wherein the steps of each stepped portion of the staircase shape are formed such that the closer to the inner side in the radial direction, the closer to the surface side the steps are formed, this is because a later-described diffraction order is selected as the maximum diffraction efficiency order in an inner ring zone. Also, in FIGS. 40B and 40C, and later-described FIG. 47, examples are illustrated wherein similar to an inner ring zone, the sawtooth slopes of the protrusions and recesses or the stepped portions of the staircase shape are formed such that the closer to the inner side in the radial direction, the closer to the surface side the saw-tooth slopes of the protrusions and recesses or the stepped portions of the staircase shape are formed, the present invention is not restricted to this, the formation direction of the blazed shape or staircase shape is set according to the selected diffraction order. Ro in FIG. 40A through 40C indicates the direction toward the outer side in the radial direction of a ring zone, i.e., the direction separated from the optical axis.

In the first diffraction structure and the later-described second and third diffraction structures formed at the first diffraction region 251, the groove depth d and number of steps S are determined taking into consideration the dominant diffraction order and diffraction efficiency. Also, as shown in FIG. 40A, the groove width of each step portion (the radial-direction dimension of each step portion of the staircase form) is such that the steps are formed with equal width within one staircase form, while looking at the different staircase forms formed continuously in the radial direction, the value of the step width is smaller as staircase forms further away from the optical axis. Note that description has been made here assuming that such an arrangement is employed as described above, but the groove width of each step portion is such that while looking at the different staircase forms formed continuously in the radial direction, the value of the step width is grater as staircase forms further away from the optical axis in some cases. This point is also true for FIGS. 40B and 40C. Note that the groove widths are determined based on phase difference obtained at the diffraction regions formed with the groove widths, such that the spot condensed on the signal recording face of the optical disc is optimal.

For example, the diffraction structure of the first diffraction region 251 is, as shown in FIG. 40A, a diffraction structure having a staircase portion including first through fourth steps 251s1, 251s2, 251s3, and 251s4, formed continuously in the radial direction, wherein the number of steps is 4 (S=4), and the depth of each step is generally the same depth (d/4), and first through fifth diffraction faces 251f1, 251f2, 251f3, 251f4, and 251f5 formed at the same intervals of d/4 in the optical axis direction.

Also, in a case wherein the first diffraction region 251 diffracts the optical beam of the first wavelength which is transmitted therethrough such that diffracted light of the k1i'th order is dominant, i.e., such that the diffraction efficiency thereof is maximum, diffracts the optical beam of the second wavelength which is transmitted therethrough such that diffracted light of the k2i'th order is dominant, i.e., such that the diffraction efficiency thereof is maximum, and diffracts the optical beam of the third wavelength which is transmitted therethrough such that diffracted light of the k3i'th order is dominant, an arrangement is made so as to have the relation of k1i≧k2i>k3i.

Thus, according to the arrangement wherein diffracted light is generated so as to have the relation of k1i≧k2i>k3i, the first diffraction region 251 makes not only the diffracted light of an order whereby spherical aberration can be reduced appropriately dominant but also the relation between operating distance and focal distance changed to most appropriate state, ensuring the operating distance in the case of employing the third wavelength λ3 makes the focal distance long as to the first wavelength λ1, whereby problems can be prevented such as the lens diameter of the object lens and the optical pickup overall increasing in size, and also aberration can be reduced while ensuring diffraction efficiency.

Now, description will be made regarding a method for selecting the optimal diffraction order including the reason why an arrangement is made so as to have the relation of k1i≧k2i≧k3i with the first diffraction region 251 based on the following first through fourth perspectives. In other words, with the first diffraction region 251, as the first perspective there is a need to reduce spherical aberration at each wavelength, as the second perspective there is a need to optimize operating distance and focal distance at each wavelength, and as the third and fourth perspectives there is a need to employ the structure which is advantageous in manufacturing and can be readily manufactured, and consequently, from these perspectives, the diffraction orders k1i, k2i, and k3i have been selected as diffraction orders with maximum diffraction efficiency, and description will be made below regarding this point.

First, the first perspective will be described. As the first perspective, there is a need to employ an order whereby the spherical aberration of the corresponding optical disc can be corrected at the time of condensing light with the object lens 234 as the diffraction order with the first diffraction region 251 which is an inner ring zone. In general, in a case wherein material dispersion is ignored at a region having a function such as the first diffraction region 251, it is known that satisfying the conditional expression $$(\lambda 1 \times k1x - \lambda 2 \times k2x)/(t1-t2) \approx (\lambda 1 \times k1x - \lambda 3 \times k3x)/(t1-t3) \qquad (1)$$

where
λ1 is the first wavelength (nm),
λ2 is the second wavelength (nm),
λ3 is the third wavelength (nm),
k1i is the diffraction order where an optical beam of the first wavelength is selected,
k2i is the diffraction order where an optical beam of the second wavelength is selected,
k3i is the diffraction order where an optical beam of the third wavelength is selected,
t1 is the thickness (mm) of the first protective layer of the first optical disc,
t2 is the thickness (mm) of the first protective layer of the second optical disc,
t3 is the thickness (mm) of the first protective layer of the third optical disc, and
x=i for the inner ring zone in k1x, k2x, and k3x in this conditional expression, is a condition whereby spherical aberration on the signal recording face of each optical disc at each wavelength can be corrected and reduced.

In the first diffraction region 251 which is the above-described inner ring zone, when λ1=405 (nm), λ2=655 (nm), λ3=785 (nm), t1=0.1 (mm), t2=0.6 (mm), and t3=1.1 (mm), then k1i=+1, k2i=−1, and k3i=−2, each hold, thereby satisfying the conditional expression, and it has been confirmed that spherical aberration can be reduced. This can be restated in other words that when plotting points Pλ1, Pλ2, and Pλ3 in the graph in FIG. 41 wherein the horizontal axis represents a value calculated by wavelength×diffraction order (nm) and the vertical axis represents the thickness (mm) of the protective layer, the points are on a generally straight design line, meaning that spherical aberration on the signal recording face of each optical disc at each wavelength can be corrected and reduced, but actually when plotting the respective points Pλ1, Pλ2, and Pλ3 under the following conditions, the respective points are positioned on a generally straight design line, meaning that spherical aberration can be corrected and reduced. Specifically, the object lens 234 has the material of which it is configured, and the face shape at the input and output sides, determined with the line L21 in FIG. 41 as the design line, with the inclination of the design line approximating the inclination of the line connecting Pλ1 and Pλ2 calculated by (t1−t2)/(λ1×k1i−λ2×k2i) or the inclination of the line connecting Pλ1 and Pλ3 calculated by (t1−t3)/(λ1×k1i−λ3×k3i), or determined taking into consideration the inclination of these lines and other design conditions.

Figure 41:
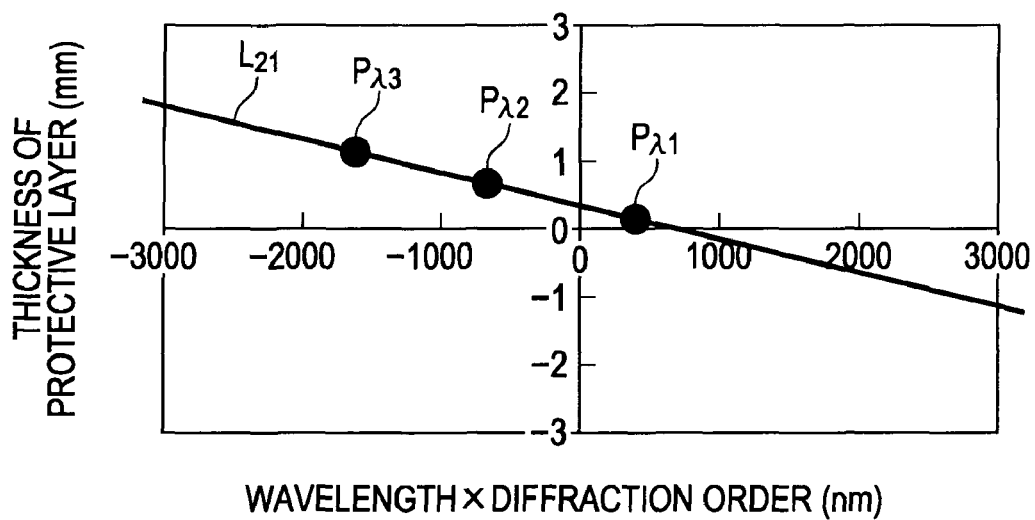
FIG. 41 is a diagram for describing spherical aberration correction possibility at the diffraction region of the diffraction unit configuring the optical pickup which is used for diffracting the three wavelengths (inner ring zone) with reference to the inner ring zone of an example 1, showing points plotted according to the relation between wavelength×diffraction order and protective layer thickness, and the design line of the object lens, in a case wherein (k1i, k2i, k3i)=(+1, −1, −2)

Note that while in FIG. 41 Pλ3 deviates slightly upwards from the line L21, spherical aberration can be corrected in a sure manner by inputting the incident light to the object lens 234 where the diffraction unit 250 is provided, as a divergent ray. That is to say, a divergent ray is input to the object lens 234, whereby the same result as that in the case of the apparent thickness of the protective layer being thickened can be obtained. Note that, as described later, in the case of providing the diffraction unit 250 in an optical element (diffraction optical element 235B, see FIG. 58) separate from the object lens, spherical aberration can be corrected in a sure manner by inputting the incident light to the one of the object lens 234B and diffraction optical element 235B which is closer to the emitting units, which is, for example, the diffraction optical element 235 in FIG. 58, as a divergent ray.

Figure 42:
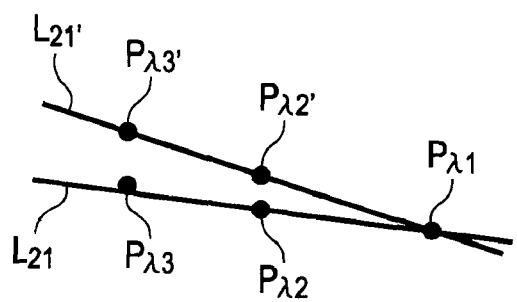
FIG. 42 is a diagram conceptually illustrating that spherical aberration can be corrected using divergent light, illustrating that the plotted points Pλ1, Pλ2', and Pλ3' are positioned on a straight line by the plot positions being shifted due to the second and third wavelengths having been input in a state of divergent rays as compared to the state in FIG. 41.

Description will be made regarding this point with reference to FIG. 42 illustrating the concept of this correction. Specifically, the optical beams of the second and third wavelengths λ2 and λ3 are input to the object lens 234 as minimal divergent rays, thereby shifting plots Pλ2' and Pλ3' indicating the second and third wavelengths upward as to the plots Pλ2 and Pλ3 according to the apparent thickness of the protective layer, as shown in FIG. 42. As shown in FIG. 42, the magnification of a divergent ray is adjusted appropriately, whereby these three points Pλ1, Pλ2', and Pλ3' can be positioned on one straight line L21' completely, and spherical aberration due to difference of protective layer thickness and so forth can be fully corrected. At this time, the straight line L21' where the plots Pλ1, Pλ2', and Pλ3' are positioned are taken as a design line.

Note here that, for example, an arrangement may be made wherein only the optical beam of the third wavelength λ3 is input as a convergent ray, and is shifted downward to position the respective plots on a straight line, thereby correcting spherical aberration, but employing a convergent ray shortens the operating distance, which is undesirable in some cases, and accordingly, it is desirable to employ a divergent ray as described above. Further, when compatibility of three wavelengths is taken into consideration, it is advantageous to input a divergent ray to the object lens with the second and third wavelengths from the perspective wherein appropriate return magnification can be ensured.

Also, when the plots $P\lambda 1$, $P\lambda 2$, and $P\lambda 3$ having close connection with the above-mentioned relational expression, described with reference to FIG. 41 are taken into consideration, if the absolute values of the respective orders k1$i$, k2$i$, and k3$i$ are within a range of around 3rd order, there is a need to satisfy the following relational expression (2A) or (2B).

$$k1i \leq k2i \leq k3i \quad (2A)$$

$$k1i \geq k2i \geq k3i \quad (2B)$$

Next, the second perspective will be described. As the second perspective, there is a need to employ an order whereby focal distance f1 as to the first wavelength $\lambda 1$ can be reduced while maintaining the operating distance WD3 large in the case of employing the third wavelength $\lambda 3$. In general, extending the focal distance f extends the operating distance. The focal distance f1 as to the first wavelength $\lambda 1$ needs to be reduced, and the focal distance f3 as to the third wavelength $\lambda 3$ needs to be increased. Now, it is desirable to suppress the focal distance f1 as to the first wavelength $\lambda 1$ to 2.2 mm or shorter. Also, there is a need to ensure the operating distance of around 0.4 mm or longer in the case of employing the third wavelength $\lambda 3$. In order to realize these, if we say that f1=2.2 mm, and incidence to the object lens 234 is infinite incidence, i.e., parallel light incidence, f3 needs to be around 2.5 mm or longer. With the material of the object lens made from plastics corresponding to the above-mentioned three wavelengths $\lambda 1$, $\lambda 2$, and $\lambda 3$, dispersion is great, but let us say that this is ignored here, and an approximate value is calculated.

The object lens 234 has refractive power according to a lens curved face, and diffraction power according to the diffraction unit 250 provided on one face. It has been known that focal distance $F_{dif}$ according to diffraction of the diffraction unit 250 of the object lens 234 can be calculated in accordance with the following Expression (3). In Expression (3), $\lambda 0$ is a manufacturing wavelength, and now, let us say that $\lambda 0=\lambda 1$. Also, $C_1$ is a value called a phase difference function coefficient, which is a coefficient for stipulating a phase difference shape provided by a diffraction structure (diffraction grating), and is a variable value depending on the value of $\lambda 0$. Also, in Expression (3), k represents a diffraction order selected by each of the wavelengths $\lambda 1$, $\lambda 2$, and $\lambda 3$, and specifically is k1, k2, or k3.

$$f_{dif} = \frac{0.5}{kC_1} \cdot \frac{\lambda_0}{\lambda} \quad (3)$$

In Expression (3), with the coefficient $C_1$, if we say that $\lambda 0=\lambda 1$, the absolute value thereof is not smaller than $1\times 10^{-2}$, the amount of pitches increases, and consequently, formation becomes impossible. Also, if we say that the focal distance according to the refractive power of a lens curved face is fr, focal distance $f_{all}$ of the refraction and diffraction overall of the object lens is calculated according to the relation of Expression (4) using the above-mentioned focal distance $f_{dif}$ according to diffraction, and this fr.

$$\frac{1}{f_{all}} = \frac{1}{f_{dif}} + \frac{1}{f_r} \quad (4)$$

Figure 43:
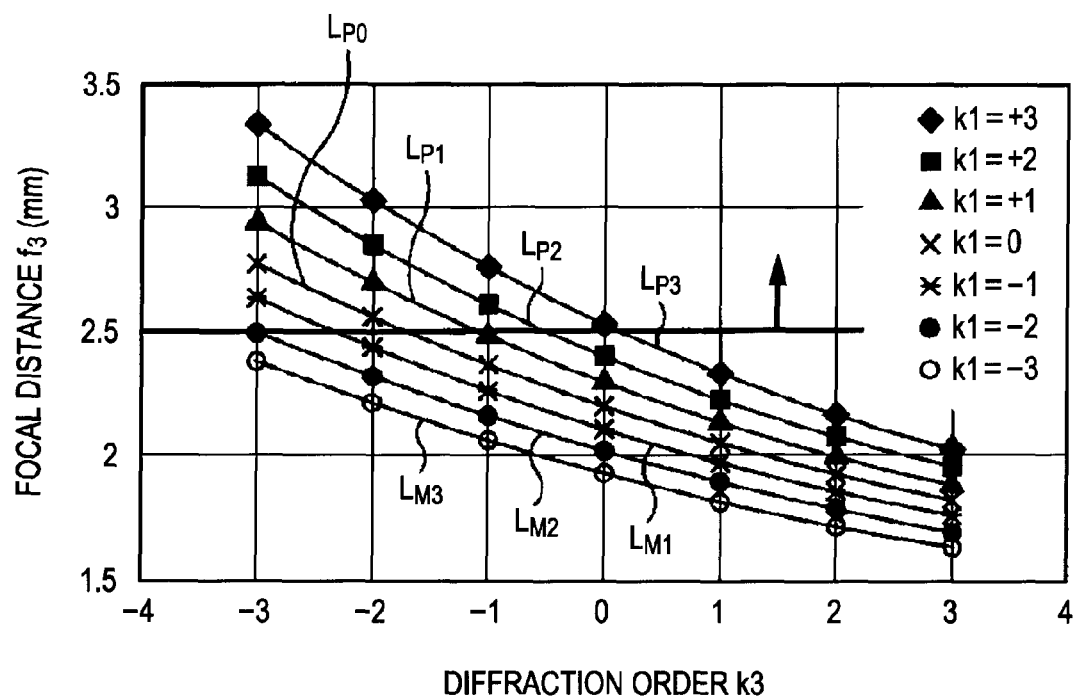
FIG. 43 is a diagram for describing the relation between the diffraction orders k1 and k3 selected at the diffraction unit regarding the first and third wavelengths, and the focal distance of the object lens as to the third wavelength, and is a diagram illustrating the change in the focal distance as to the third wavelength as the diffraction order k3 of the third wavelength changes, for each diffraction order k1 of the first wavelength.

FIG. 43 illustrates change in the value of the focal distance f3 when changing k1 and k3 based on such Expressions (3) and (4). In FIG. 43, the horizontal axis represents the order k3, and the vertical axis represents the focal distance f3 as to the third wavelength $\lambda 3$, and curves LM3, LM2, LM1, LP0, LP1, LP2, and LP3 represent curves connecting plotted changes in the focal distance f3 along with change in k3$i$ in the case of the corresponding orders k1$i$ being −3rd order, −2nd order, −1st order, zero-order, 1st order, 2nd order, and 3rd order. Note that FIG. 43 illustrates calculation results assuming that the coefficient $C_1$ is $1\times 10^{-2}$ which is the maximum, and $f_{all1}$ representing the overall focal distance $f_{all}$ calculated by Expression (4) of the first wavelength $\lambda 1$ is $f_{all1}$=2.2 (mm). The diffraction order has thus been described above, but actually, geometrical optics can be applied to the inner ring zone portion alone, and the properties such as the focal distance and so forth are determined with the inner ring zone portion, so the above-mentioned k1 through k3 correspond to k1$i$ through k3$i$, and in other words, the above-mentioned relation of k1 through k3 also has the relation where k1 through k3 are substituted for k1$i$ through k3$i$ respectively. According to FIG. 43, in order to set f3 to 2.5 mm or longer, the relation of the following Expression (5A) holds. Accordingly, in order to ensure appropriate focal distance and operating distance, it is necessary to have the relation of the following Expression (5B) from the above-mentioned relation of Expression (2B).

$$k1i > k3i \quad (5A)$$

$$k1i \geq k2i > k3i \quad (5B)$$

Further, from an perspective wherein this Expression (5B) and a later-described restriction that a diffraction order to be employed is equal to or smaller than around 3, each of combinations of (k1$i$, k3$i$)=(−2, −3), (−1, −2), (−1, −3), (0, −2), (0, −3), (1, −2), (1, −3), (2, −1), (2, −2), (2, −3), (3, 0), (3, −1), (3, −2), and (3, −3) is a suitable combination from the above-mentioned perspective. At this time, k2$i$ determined so as to satisfy Expression (5B) is employed. Note that, strictly, the relation in FIG. 43 is changed with the value of f1 and material dispersion, and further, the target value of f3 deteriorates by deteriorating f1, or changing incident magnification to the object lens to a divergent ray, but the above-mentioned choices of diffraction orders are suitable.

Next, description will be made regarding the third perspective. As the third perspective, the configuration needs to be advantageous in manufacturing. In a case wherein a diffraction order to be selected is too great, the steps of the diffraction structure to be formed, and the depth of blaze become deep. Further, when the depth of the diffraction structure becomes deep, there is a possibility that formation precision deteriorates, and also there is a possibility that a problem occurs wherein an optical path length enhancement effect due to change in temperature increases, and temperature diffraction efficiency properties deteriorate. Also, there is a problem wherein deterioration in formation precision leads to deterioration in diffraction efficiency. It is desirable and common from such reasons to select a diffraction order up to around 3rd through 4th. Accordingly, with the above-mentioned second perspective, study has been made employing a diffraction order up to 3rd.

Next, description will be made regarding the fourth perspective. As the fourth perspective, though similar to the third perspective, the diffraction structure needs to be able to be manufactured. When performing a diffraction efficiency calculation described in a later-described section of "Depth and shape of diffraction structure and diffraction efficiency", the depth d needs to be equal to or smaller than a suitable size, and the diffraction structure needs to be formed with this depth. Further, the depth d needs to be equal to or smaller than at least 15 μm.

From the above-mentioned first through fourth perspectives, the first diffraction region 251 which is an inner ring zone is configured so as to generate each diffracted light having relation of $k1i \geqq k2i > k3i$.

Further, the first diffraction region 251 is configured such that, of the diffraction orders $k1i$, $k2i$, and $k3i$ of each wavelength of which the diffraction efficiency is the maximum, $k1i$ and $k3i$ have any of the following relations.

$(k1i, k3i)$=(−2, −3), (−1, −2), (−1, −3), (0, −2), (0, −3), (1, −2), (1, −3), (2, −1), (2, −2), (2, −3), (3, 0), (3, −1), (3, −2), and (3, −3)

Also, from the first through fourth perspectives, specifically, as described later, the optimal configuration example is a case wherein $(k1i, k2i, k3i)$=(1, −1, −2), (0, −1, −2), (1, −2, −3) or (0, −2, −3). Now, when the diffraction orders $k1i$, $k2i$, and $k3i$ are selected as above, the number of steps S and groove depth d selected at the time of diffraction efficiency and so forth being taken into consideration are shown in I1 through I4 in Table 6. Also, in Table 6, additionally, with the relation of the plots Pλ1, Pλ2, and Pλ3, and design line L described with reference to FIG. 41, a later-described deviation amount Δ from the design line L of the plot Pλ3 indicating the third wavelength is shown in Table 6. That is to say, as shown in later-described FIG. 48, when setting a line connecting the plots Pλ1 and Pλ2 (hereafter, referred to as "spherical aberration correction line"), this deviation amount Δ indicates the distance deviated in the vertical axis direction (direction indicating protective layer thickness) from the plot Pλ3 toward the spherical aberration correction line thereof. Here, in the case of the deviation amount Δ=0, this indicates that the respective points Pλ1, Pλ2, and Pλ3 are on a straight line completely. Also, in the case of the deviation amount Δ is positive, this indicates that the plot Pλ3 is positioned lower than the spherical aberration correction line, and in the case of the deviation amount A is negative, this indicates that the plot Pλ3 is positioned upper than the spherical aberration correction line. Note here that in FIG. 41 illustrating the first embodiment of an inner ring zone, it is difficult to illustrate this deviation amount Δ from the features of inner ring zones, so description has been made regarding this deviation amount Δ using FIG. 48 employed for the first embodiment of an middle ring zone, but let us say that the definition regarding this deviation amount Δ is true for both inner ring zones and middle ring zones. As shown in Table 6, in any example, diffraction efficiency is sufficiently ensured, and the deviation amount Δ is also sufficiently small, and accordingly, a suitable diffraction order can be confirmed even if spherical aberration correction is taken into consideration.

TABLE 6

Order, diffraction efficiency, diffraction order, depth,
number of steps, deviation amount Δ of inner ring zones

| No. | $k_{1i}$ | $k_{2i}$ | $k_{3i}$ | $eff_1$ | $eff_2$ | $eff_3$ | d [μm] | s | Δ [mm] |
|---|---|---|---|---|---|---|---|---|---|
| I1 | 1 | −1 | −2 | 0.81 | 0.62 | 0.57 | 3.8 | 4 | −0.06 |
| I2 | 0 | −1 | −2 | 0.98 | 0.78 | 0.39 | 6.9 | 3 | 0.21 |
| I3 | 1 | −2 | −3 | 0.86 | 0.70 | 0.52 | 5.4 | 6 | −0.19 |
| I4 | 0 | −2 | −3 | 0.86 | 0.50 | 0.39 | 4.0 | 5 | −0.10 |

Next, description will be made regarding "Calculation of depth and shape of diffraction structure and diffraction efficiency" with the first diffraction region 251 and so forth with reference to a specific embodiment. Now, a diffraction face design example such that the diffracted light of each order described above is taken as the maximum diffracted light will be shown as the inner ring zone according to the first embodiment with reference to FIG. 44. Note that the diffraction amount (diffraction efficiency) of the selected diffraction order fluctuates depending on groove depth such as shown in FIG. 44, so setting suitable groove depth enables the diffraction efficiency of the selected diffraction order at each wavelength to be increased up to a desired level.

Figure 44A:
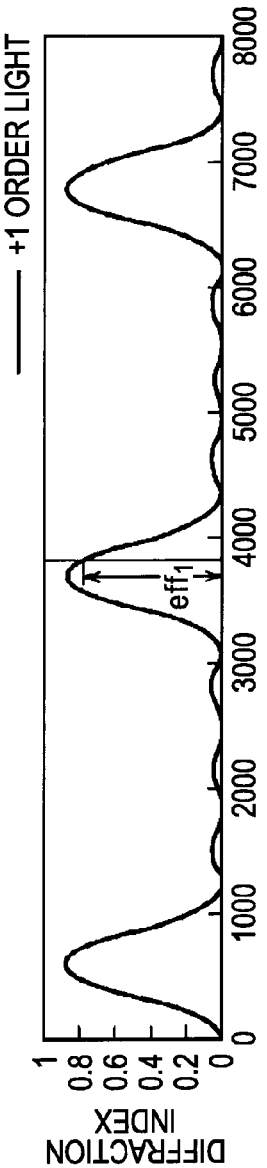
FIGS. 44A through 44C show graphs for calculating the diffraction efficiency of an example 1 of an inner ring zone according to the third embodiment, illustrating the change in the diffraction efficiency of the optical beams of each wavelength as to change in the groove depth d in a case wherein S=4, and (k1i, k2i, k3i)=(+1, −1, −2)
Figure 44B:
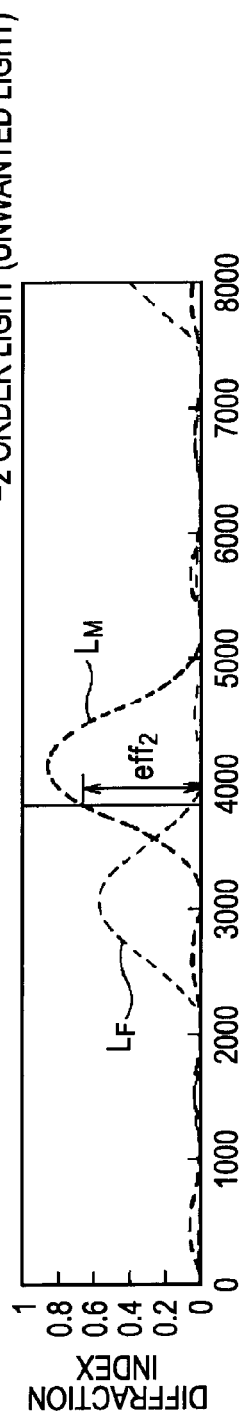
Figure 44C:
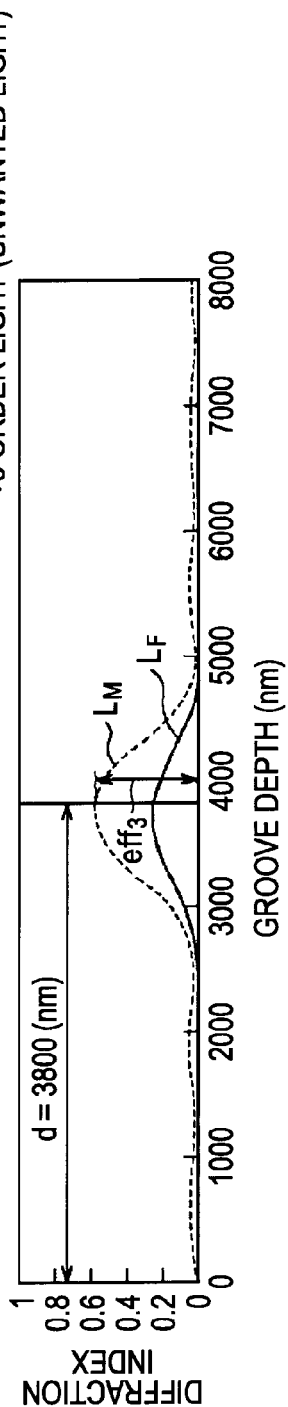

Specifically, FIGS. 44A through 44C illustrate change in diffraction efficiency as to the groove depth d when assuming that the diffraction structure is the staircase form of the number of steps S=4, and $(k1i, k2i, k3i)$=(+1, −1, −2). FIG. 44A is a diagram illustrating change in diffraction efficiency of +1st order diffracted light of the optical beam of the first wavelength, FIG. 44B is a diagram illustrating change in diffraction efficiency of −1st order diffracted light of the optical beam of the second wavelength, and is also a diagram illustrating change in diffraction efficiency of −2nd order diffracted light serving as unwanted light as described later, and FIG. 44C is a diagram illustrating change in diffraction efficiency of −2nd order diffracted light of the optical beam of the third wavelength, and is also a diagram illustrating change in diffraction efficiency of +3rd order diffracted light serving as unwanted light as described later. In FIGS. 44A through 44C, the horizontal axis represents groove depth (nm), and the vertical axis represents diffraction efficiency (light intensity). If we say that the diffraction efficiency of $k1i$ is eff1, the diffraction efficiency of $k2i$ is eff2, and the diffraction efficiency of $k3i$ is eff3, the position of the groove depth d=3800 (nm) shown in the horizontal axis has sufficient diffraction efficiency. Specifically, as shown in FIG. 44A eff1=0.81, as shown in FIG. 44B eff2=0.62, and as shown in FIG. 44C eff3=0.57, which have sufficient diffraction efficiency. As shown in FIGS. 44A through 44C, the relation between diffraction efficiency and groove depth fluctuates depending on the number of steps, so there is a need to select a suitable number of steps, but the number of steps S=4 is employed here, as described above.

With the first diffraction region 251, the inner ring zone region is configured of a step structure (diffraction structure of staircase form), which is a configuration suitable for deviating the diffraction efficiency of unwanted light generated at this diffraction region from the diffraction efficiency eff1, eff2, and eff3 of regular light. Now, let us say that the term "regular light" means diffracted light of the diffraction orders $k1i$, $k2i$, and $k3i$ thus selected, i.e., the diffracted light of a diffraction order of which the diffraction efficiency becomes the maximum, and the term "unwanted light" means the diffracted light of a diffraction order of which the diffraction efficiency becomes the second largest diffraction efficiency. Note that in FIGS. 44A through 44C, and later-described FIGS. 45A through 45C and 54A through 54C, LM represents change in the diffraction efficiency of the diffracted light of the diffraction order of which the diffraction efficiency becomes the maximum, and LF represents change in the diffraction efficiency of the diffracted light of the diffraction order serving as unwanted light described here.

Figure 45A:
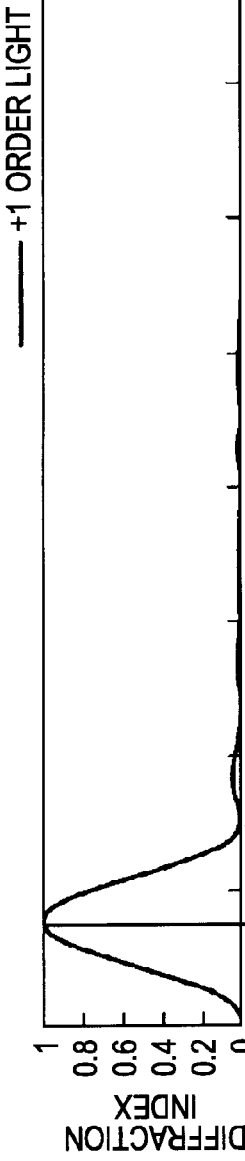
FIGS. 45A through 45C show graphs illustrating change in the diffraction efficiency of a reference example for comparison with the inner ring zone of the example 1 shown in FIG. 44, illustrating the change in the diffraction efficiency of the optical beams of each wavelength as to change in the groove depth d in a case of a blazed form (S=∞), and (k1i, k2i, k3i)=(+1, +1, +1)
Figure 45B:
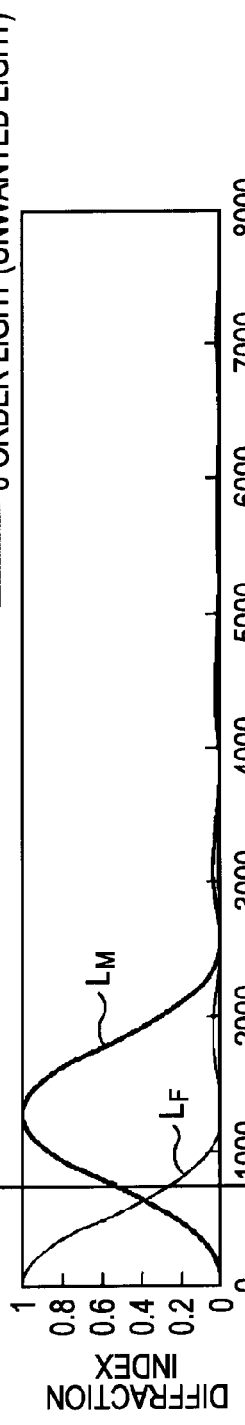
Figure 45C:
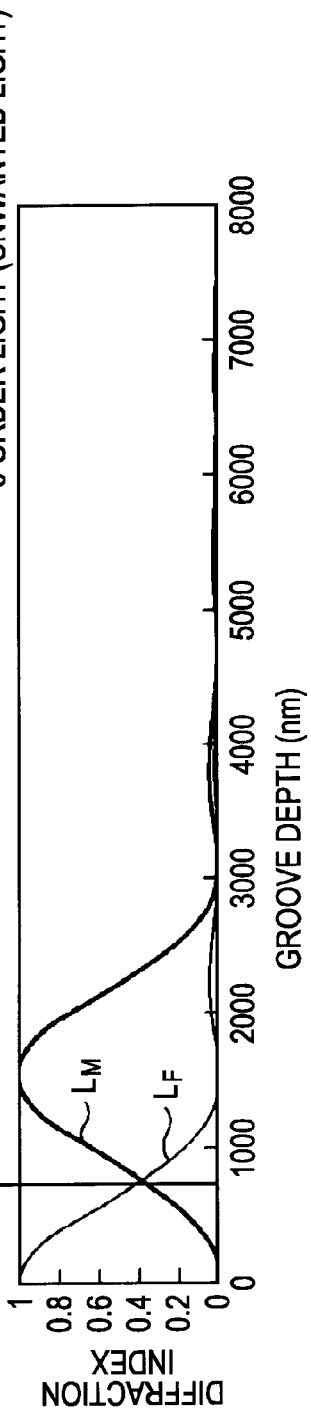

Description will be made wherein with the first diffraction region 251, the diffraction structure having the staircase form is formed, whereby the influence of unwanted light can be reduced. In order to compare to this FIGS. 44A through 44C, the diffraction efficiency in the case of this inner ring zone being formed as a blazed shape is illustrated in FIGS. 45A through 45C as a reference example. FIGS. 45A through 45C illustrate change in the diffraction efficiency as to the groove depth d when assuming that the diffraction structure is formed as a blazed shape of the number of steps S=∞, and (k1$i$, k2$i$, k3$i$)=(+1, +1, +1). FIG. 45A is a diagram illustrating change in the diffraction efficiency of the +1st order diffracted light of the optical beam of the first wavelength, FIG. 45B is a diagram illustrating change in the diffraction efficiency of the +1st order diffracted light of the optical beam of the second wavelength, and also illustrating change in the diffraction efficiency of the zero-order light serving as unwanted light, and FIG. 45C is a diagram illustrating change in the diffraction efficiency of the +1st order diffracted light of the optical beam of the third wavelength, and also illustrating change in the diffraction efficiency of the zero-order light serving as unwanted light. In FIG. 45A through 45C, the horizontal axis represents groove depth (nm), and the vertical axis represents diffraction efficiency (light intensity). As shown in FIGS. 45A through 45C, in the case of the second and third wavelengths, the zero-order light has efficiency as unwanted light. With each optical beam of adjacent diffraction orders such as the zero-order light and 1st order light, diffraction angles have few differences. Thus, when the regular light which is either optical beam of the selected diffraction orders k2$i$ and k3$i$ is condensed on the corresponding optical disc so as to be in a focused state, unwanted light is also condensed in a blurring state. Subsequently, this unwanted light is also reflected at the optical disc, and the reflection light of the unwanted light is irradiated on a photoreceptor portion, which has adverse influence upon a signal obtained at the photoreceptor portion, and there is a possibility that jittering or the like will deteriorate. Further, there is a possibility that this unwanted light leads to a problem wherein in the case of defocus occurring, the influence thereof becomes great. As shown in FIGS. 44A through 44C described above, the diffraction structure having the staircase form is formed, whereby the diffraction efficiency of unwanted light can be reduced as compared to the case shown in FIGS. 45A through 45C.

That is to say, in a case wherein an inner ring zone portion such as the first diffraction region 251 is formed in a staircase form, a structure can be realized whereby the quantity of the diffracted light of unwanted light is suppressed. With the diffraction structure having the staircase form, groove depth which deteriorates the efficiency of unwanted light can be selected, and even if unwanted light efficiency becomes high efficiency, the order serving as regular light and the order serving as unwanted light differ greatly, whereby unwanted light can be prevented from condensing at the time of focus. Specifically, as shown in FIG. 44B, the unwanted light efficiency according to the second wavelength can be suppressed to around 5% which does not contribute. Also, as shown in FIG. 44C, the regular light according to the third wavelength is −2nd order light, but unwanted light is +3rd order light, and with this −2nd order light and +3rd order light, diffraction angles differs greatly, so unwanted light is defocused greatly in the case of regular light being focused, and accordingly, there is no bad influence due to unwanted light being input to the photoreceptor portion. In other words, a so-called step structure such as a staircase form is a structure suitable for deviating the diffraction efficiency of regular light from the diffraction efficiency of the diffracted light of the adjacent orders as compared to a blazed form or the like.

Next, description will be made regarding "pitch design" according to the first diffraction region 251 and so forth. With the pitch design of the diffraction structure, if we say that a phase to be provided by a diffraction unit (diffraction face) having a predetermined diffraction structure is φ, the phase thereof can be represented as the following Expression (6) using the phase difference function coefficient Cn. Note that in Expression (6), k represents the diffraction order to be selected at the respective wavelengths λ1, λ2, and λ3, and specifically, represents k1, k2, and k3, r represents a position in the radial direction, and λ0 represents a design wavelength. Now, let us say that in the case of λ0 employed for pitch design, calculation is performed assuming k=1.

$$\phi = k \sum_{i=0}^{n} \frac{C_n r^{2i}}{\lambda_0} \qquad (6)$$

Figure 46A:
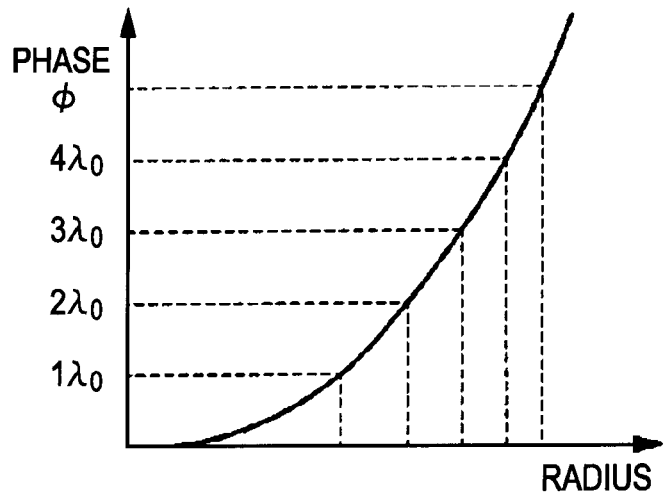
Figure 46B:
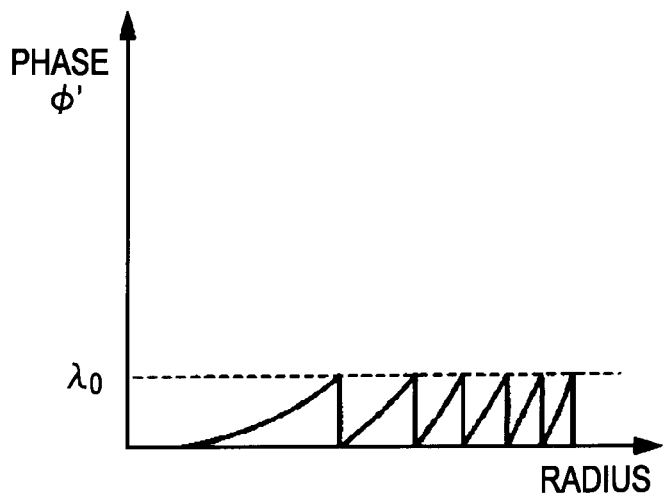
Figure 46C:
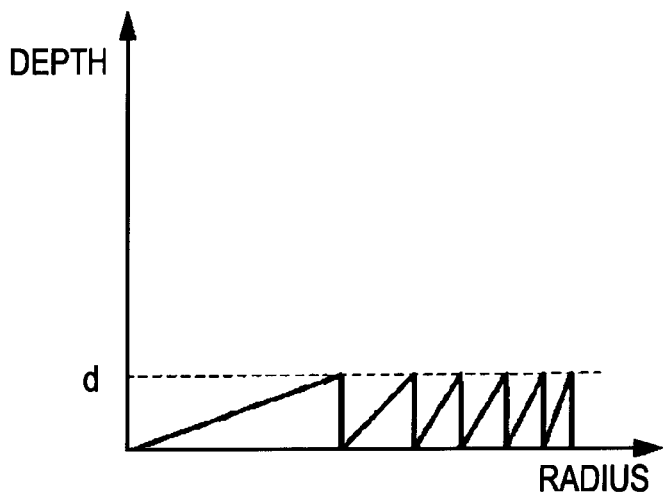

In Expression (6), the value of φ can be obtained uniquely at the time of lens design. On the other hand, φ represents the phase of the design wavelength λ0, and with φ' obtained from the relational expression of φ'=φ−nλ0, and the phase obtained by this φ, the given influence thereof is completely the same. In other words, φ' obtained from the above-mentioned relational expression is, as shown in FIG. 46B, is a remainder in the case of dividing φ by λ0 such as shown in FIG. 46A for example, i.e., a value obtained by a so-called remainder calculation. This φ' can be referred to as phase amount to be provided for determining the pitches of the actual diffraction structure. The actual diffraction structure pitches are determined from this φ', and specifically, as shown in FIG. 46C, are determined so as to be along with the shape of this φ'. Note that the horizontal axes in FIG. 46A through 46C represent a position in the radial direction, the vertical axis in FIG. 46A represents necessary phase amount φ for each position thereof, the vertical axis in FIG. 46B represents granting phase amount φ' obtained by remainder calculation for each position thereof, and the vertical axis in FIG. 46C represents groove depth d. Here, in FIG. 46C, after pitches are determined, a blazed shape is illustrated, but in the case of employing a staircase form such as the above-mentioned first diffraction region 251 or the like, the blazed slope portion shown in FIG. 46C is formed in a staircase form of a predetermined number of steps S.

Note that description has been made above assuming that of the diffraction structure provided in the first diffraction region 251, the cross-sectional shape including the radial direction and optical axis direction thereof has, as shown in FIG. 40A, the diffraction structure of multiple staircase forms formed with predetermined height and predetermined width set generally with an equal interval within one staircase portion, but the present invention is not restricted to this, an non-cyclical step form may be formed such that the height and/or width of a staircase form serving as reference is finely adjusted based on an acquisition target phase such as shown in FIG. 46B. Further, a form determined by phase design may be formed so as to provide predetermined phase difference to the optical beam of a predetermined wavelength, i.e., the cross-sectional shape may not be formed of only a straight line parallel to a horizontal line indicating a plane serving as reference, and a perpendicular line, but may be formed so as to be an non-cyclical form including a straight line (sloping surface) inclined as to that straight line, curve (curved surface), or the like. This point is true for a later-described second diffraction region 252.

A second diffraction region 252 which is a middle ring zone, where a second diffraction structure is formed, which is a structure different from the first diffraction structure having a ring zone shape and predetermined depth, diffracts the optical beam of the first wavelength that is transmitted therethrough such that diffracted light of an order which forms an appropriate spot on the signal recording face of the first optical disc via the object lens 234 is dominant, i.e., such that maximum diffraction efficiency is manifested regarding diffracted light of other orders.

Also, the second diffraction region 252 diffracts the optical beam of the second wavelength that is transmitted therethrough such that diffracted light of an order which forms an appropriate spot on the signal recording face of the second optical disc via the object lens 234 is dominant, i.e., such that maximum diffraction efficiency is manifested regarding diffracted light of other orders, by way of the second diffraction structure.

Also, the second diffraction region 252 diffracts the optical beam of the third wavelength that is transmitted therethrough such that diffracted light of orders other than an order which forms an appropriate spot on the signal recording face of the third optical disc via the object lens 234 is dominant, i.e., such that maximum diffraction efficiency is manifested regarding diffracted light of other orders, by way of the second diffraction structure. If it puts in another way regarding this point, in light of later-described flaring operation and so forth, the second diffraction region 252 diffracts the optical beam of the third wavelength that is transmitted therethrough such that diffracted light of an order which forms no appropriate spot on the signal recording face of the third optical disc via the object lens 234 is dominant, by way of the second diffraction structure. Note that the second diffraction region 252 can sufficiently reduce diffraction efficiency diffracted light of an order which forms an appropriate spot on the signal recording face of the third optical disc via the object lens 234 for the optical beam of the third wavelength that is transmitted therethrough, by way of the second diffraction structure.

Thus, with the second diffraction region 252, there is formed a diffraction structure suitable for the diffracted light of a predetermined order being dominant as to the optical beam of the above-mentioned respective wavelengths, thereby enabling spherical aberration to be corrected and reduced at the time of the optical beams of the first and second wavelengths serving as the diffracted light of a predetermined order that is transmitted therethrough being condensed on the signal recording face of the corresponding optical disc via the object lens 234.

Also, the second diffraction region 252 is configured so as to function as described above as to the optical beams of the first and second wavelengths, and is configured such that the diffracted light of an order that does not condense the optical beam of the third wavelength that is transmitted therethrough upon the signal recording face of the third optical disc via the object lens 234 is dominant by taking into consideration the influence of flaring and so forth, so even if the optical beam of the third wavelength that has transmitted the second diffraction region 252 is input to the object lens 234, this seldom affects the signal recording face of the third optical disc, i.e., the second diffraction region 252 can serve so as to markedly reduce the light quantity of the optical beam of the third wavelength transmitted through the second diffraction region 252, and condensed on the signal recording face by the object lens 234 to around zero, and subject the optical beam of the third wavelength to aperture restriction.

Incidentally, the above-mentioned first diffraction region 251 is formed with a size wherein the optical beam of the third wavelength transmitted through the region thereof is input to the object lens 234 in the same state as that of the optical beam subjected to aperture restriction at around NA=0.45, and also, the second diffraction region 252 formed on the outer side of the first diffraction region 251 does not condense the optical beam of the third wavelength transmitted through this region on the third optical disc via the object lens 234, so consequently, the diffraction unit 250 including the first and second diffraction regions 251 and 252 thus configured serves so as to perform aperture restriction at around NA=0.45 as to the optical beam of the third wavelength. An arrangement has been made here wherein with the diffraction unit 250, aperture restriction of numerical aperture NA of around 0.45 is performed as to the optical beam of the third wavelength, but the numerical aperture restricted by the above arrangement is not restricted to this.

Specifically, the second diffraction region 252 has, as shown in FIG. 39 and FIG. 40B, a ring zone shape centered on the optical axis, which is formed such that the cross-sectional shape of this ring zone becomes a blazed shape of a predetermined depth (hereafter, also referred to as "groove depth") d as to the reference face.

Figure 47:
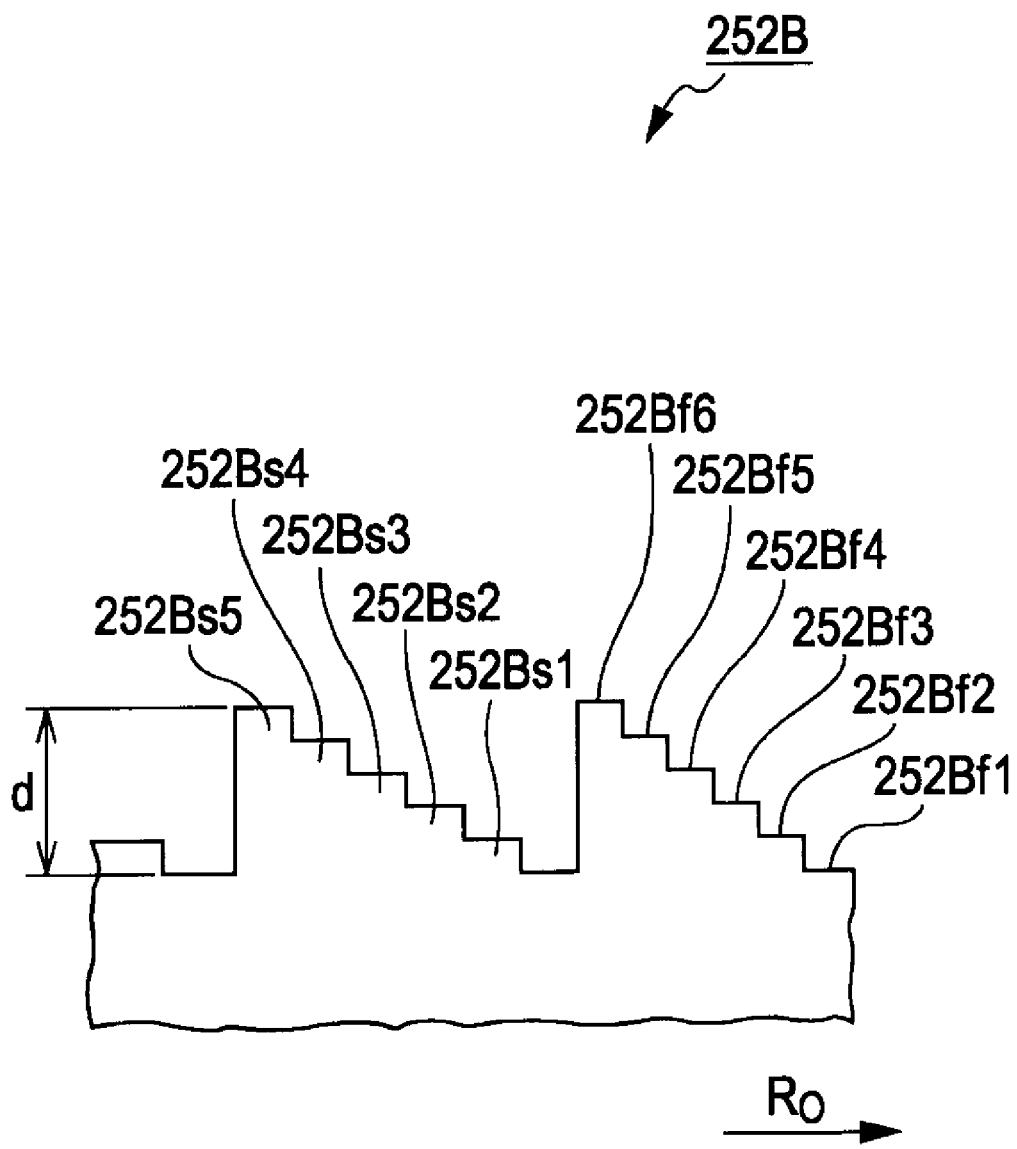
FIG. 47 is a diagram illustrating another example of the middle ring zone configuring the diffraction unit, and is a cross-sectional view illustrating a shape as to the reference face as an example of the second diffraction region where a staircase from diffraction structure is formed.

Also, description will be made here assuming that the second diffraction region having a diffraction structure is formed such that the cross-sectional shape of the ring zone is a blazed shape, but as long as this diffraction structure is configured such that the optical beam of a predetermined order is dominant as to the optical beam of each wavelength as described above, for example, a diffraction region 252B may be formed, as shown in FIG. 47, which has a ring zone shape centered on the optical axis, and the cross-sectional shape of this ring zone is configured as to the reference face such that staircase forms having a predetermined depth d, and a predetermined number of steps S are formed consecutively in the radial direction.

As shown in FIG. 47, the diffraction region 252B in the case of a staircase form being formed as a middle ring zone has a ring zone shape centered on the optical axis, and the cross-sectional shape of this ring zone is configured wherein staircase forms having a predetermine depth d and a predetermined number of steps S are consecutively formed in the radial direction. Note that the second diffraction region 252B has different numeric values of d and/or S as compared with those in the case of the first diffraction region 251, i.e., the second diffraction structure different from the first diffraction structure provided in the first diffraction region 251 is formed. For example, the diffraction structure of the second diffraction region 252B shown in FIG. 47 is a diffraction structure wherein the number of steps S is set to 5 (S=5), staircase forms including first through fifth step portions 252$Bs1$, 252$Bs2$, 252$Bs3$, 252$Bs4$, and 252$Bs5$ each having generally the same depth (d/3) are consecutively formed in the radial direction, and first through sixth diffractive faces 252$Bf1$, 252$Bf2$, 252$Bf3$, 252$Bf4$, 252$Bf5$, and 252$Bf6$ are formed generally with the same interval (d/5) in the optical axis direction.

Also, in a case wherein the second diffraction region 252 diffracts the optical beam of the first wavelength which is transmitted therethrough such that diffracted light of the k1$m$'th order is dominant, i.e., such that the diffraction efficiency thereof is maximum, diffracts the optical beam of the second wavelength which is transmitted therethrough such that diffracted light of the k2$m$'th order is dominant, i.e., such that the diffraction efficiency thereof is maximum, and diffracts the optical beam of the third wavelength which is transmitted therethrough such that diffracted light of the k3$m$'th order is dominant, i.e., such that the diffraction efficiency thereof is maximum, the diffraction orders k1$m$, k2$m$, and k3$m$ are set so as to satisfy relations determined from the following first through third perspectives.

First, the first perspective will be described. As the first perspective, the diffraction orders k1*m*, k2*m*, and k3*m* which become the maximum diffraction efficiency do not satisfy the relational expression of the above-mentioned Expression (1) (let us say that x of k1*x*, k2*x*, k3*x* within this conditional expression with a middle ring zone is x=m). This is because with a middle ring zone region, in the case of k1*m*, k2*m*, and k3*m* satisfying Expression (1), the diffracted light of the order k3*m* of the third wavelength is formed on the signal recording face of the third optical disc. In such a case, the aperture restriction as to the third wavelength cannot be realized.

In other words, an arrangement may be made wherein the second diffraction region 252 generates the diffraction efficiency of the diffracted light of the diffraction orders k1*m* and k2*m* of the optical beams of the first and second wavelengths in a high state via the object lens 234 so as to condense light to form a suitable spot on the signal recording faces of the first and second optical discs, and suppresses the diffraction efficiency of the diffraction order of the optical beam of the third wavelength condensed on the signal recording face of the third optical disc as much as possible so as to have an aperture restriction function, but the relation of Expression (1) is not satisfied here, thereby shifting the optical beam of the diffraction order according to the optical beam of this third wavelength from a state where a focal point is imaged on the signal recording face of the third optical disc to further reduce the light quantity of the optical beam condensed on the signal recording face of the third optical disc substantially. Hereafter, a position where the optical beam of a predetermined wavelength is formed via the object lens 234 is shifted from the signal recording face of the corresponding optical disc, thereby reducing the light quantity of the optical beam of this wavelength condensed on the signal recording face substantially, which will be called flaring, and the details thereof will be described later.

Note that with regard to the third wavelength, there is a need to make an arrangement such that with not only the diffraction order k3*m* having the maximum diffraction efficiency but also all of the diffraction orders having predetermined diffraction efficiency, the diffraction orders thereof will be replaced with k3*m*, and the above-mentioned relational expression is set so as not to be satisfied along with k1*m*, and k2*m*. This is because if the diffracted light of the diffraction order having predetermined efficiency satisfies the relation of Expression (1), the diffracted light thereof is condensed by the object lens, and accordingly aperture restriction cannot be performed appropriately. Now, let us say that the term "predetermined diffraction efficiency" means an efficiency level wherein the optical beam transmitted through this region is irradiated on the optical disc, the optical beam reflected at the optical disc is input to the photoreceptor portion, and this becomes noise when the return light of the optical beam transmitted within a regular aperture range is detected at the photoreceptor unit, and in other words, means an efficiency level wherein aperture restriction cannot be performed appropriately.

On the other hand thereof, like this first perspective, the diffraction orders k1*m*, k2*m*, and k3*m* that do not satisfy the relational expression of Expression (1) are selected, whereby aperture restriction as to the third wavelength can be performed appropriately.

Next, the second perspective will be described. As the second perspective, in a case wherein similar to the description regarding inner ring zones, the selected order is too great, the steps, groove width, and blazed depth of the diffraction structure becomes deeper. When the depth of the diffraction structure becomes deeper, there is a possibility that formation precision deteriorates, and also there is problem wherein the optical path length enhancement increase effect according to change in temperature increases, temperature diffraction efficiency properties deteriorate. It is desirable and common from such reasons to select an diffraction order up to around 3rd to 4th order.

Next, the third perspective will be described. As the third perspective, similar to the description regarding inner ring zones, when diffraction efficiency calculation as described later is performed, there is a need to satisfy that the depth d is equal to or smaller than a suitable size, and formation can be made with this depth size. Further, the depth d needs to be equal to or smaller than at least 15 µm.

Predetermined diffraction orders k1*m* and k2*m* need to be selected so as to satisfy the above-mentioned first through third perspectives at the second diffraction region, and for example, a combination of (k1*m*, k2*m*)=(+1, +1), (−1, −1), (0, +2), (0, −2), (0, +1), (0, −1), (+1, 0), and (−1, 0) (hereafter, this combination is referred to as "diffraction order combination A of middle ring zones"), and a combination of (k1*m*, k2*m*)=(+3, +2), (−3, −2), (+2, +1), and (−2, −1) (hereafter, this combination is referred to as "diffraction order combination B of middle ring zones") are optimal arrangement examples. Now, the following Table 7 shows the above-mentioned functions of middle ring zones, staircase forms when taking into consideration diffraction efficiency and so forth, diffraction structure form selected from blazed forms, number of steps S ("∞" in the case of a blazed form), and groove depth d, when selecting the diffraction order combination A or B of middle ring zones. As shown in Table 7, with the diffraction order combination A of middle ring zones, there is groove depth whereby the optimal diffraction efficiency can be obtained with the diffraction structure of the staircase form which is a so-called step form, i.e., it can be said that this combination is a combination suitable for the diffraction structure of the staircase form. In Table 7, MA1 through MA4 show respective combinations of the combination A, and MB1 through MB2 show respective combinations of the combination B. Note that in the case of the combination A, the optimal solution can be obtained even with an non-cyclical structure. Also, with the diffraction order combination B of middle ring zones, there is groove depth whereby the optimal diffraction efficiency can be obtained with the diffraction structure of the blazed form, i.e., it can be said that this combination is a combination suitable for the diffraction structure of the blazed form. Note that in Table 7, with the diffraction structure suitable for the above-mentioned combination of the diffraction orders k1*m* and k2*m*, a diffraction order k3*m* of which the diffraction efficiency of the optical beam of the third wavelength becomes the maximum efficiency, and a diffraction order having the second largest diffraction efficiency as so-called unwanted light is shown as "k3*m*'". Also, in Table 7, diffraction efficiency eff1, eff2, and eff3 of the orders k1*m*, k2*m*, and k3*m* of the respective wavelengths, and also diffraction efficiency eff3' of the diffraction order k3*m*' of the third wavelength are shown. Further, in a case wherein with each example, the deviation amount Δ from the spherical aberration correction line of the plot Pλ3 of the third wavelength, and also in the case of plotting the diffraction order k3*m*' of the third wavelength similarly, the deviation amount from the spherical aberration correction line of this plot point is shown as "Δ'". Note that the combinations of Table 7 and the orders k1*m*, k2*m*, k3*m*, and k3*m*' within later-described Table 8 are combinations of decoding in the same order. Also, in Table 7, the asterisk "*" indicates that with eff3', diffraction efficiency is low, which effects no problem.

TABLE 7

Order, diffraction efficiency, diffraction order, depth,
number of steps, deviation amount Δ of middle ring zones

| No. | $K_{1m}$ | $k_{2m}$ | $k_{3m}$ | $k_{3m}'$ | $eff_1$ | $eff_2$ | $eff_3$ | $eff_3'$ | d [μm] | s | Δ [mm] | Δ' [mm] |
|---|---|---|---|---|---|---|---|---|---|---|---|---|
| MA1 | ∓1 | ∓1 | 0 | ✗ | 0.80 | 0.48 | 0.52 | ✗ | 6.4 | 3 | −1.83 | ✗ |
| MA2 | 0 | ∓2 | 0 | ∓2 | 1.00 | 0.57 | 0.25 | 0.23 | 3.1 | 4 | −1.01 | −0.40 |
| MA3 | 0 | ∓1 | ±1 | ∓1 | 0.99 | 0.63 | 0.28 | 0.28 | 1.6 | 2 | −1.62 | −0.40 |
| MA4 | ∓1 | 0 | 0 | ∓1 | 0.79 | 0.85 | 0.43 | 0.34 | 4.1 | 3 | −0.50 | −1.49 |
| MB1 | ±3 | ±2 | ±2 | ±1 | 0.96 | 0.93 | 0.47 | 0.34 | 2.4 | ∞ | 0.75 | −3.15 |
| MB2 | ±2 | ±1 | ±1 | ✗ | 1.00 | 0.86 | 1.00 | ✗ | 1.6 | ∞ | −0.93 | ✗ |

As shown in Table 7, with the above-mentioned combinations A and B, in either case, diffraction efficiency is sufficiently ensured, and also in the case of the diffraction efficiency of the third wavelength existing, the deviation amount Δ is sufficiently great, i.e., spherical aberration is provided greatly to the optical beam of the third wavelength, which does not contribute to image formation, thereby confirming that the aperture restriction function is exhibited. This means that flaring effects are obtained. Note that in Table 7, with the combinations A and B, it goes without saying that there is a combination including multiple solutions as to the groove depth d and number of steps S, but an example of the groove depth d and number of steps S thereof is shown as a typical example thereof.

Also, the diffraction orders k1m and k2m to be selected at the second diffraction region 252 that satisfy the above-mentioned first through third perspectives are not restricted to the above combinations, and for example, a combination of (k1m, k2m)=(+1, −1) and (−1, +1) (hereafter, this combination is referred to as "diffraction order combination C of middle ring zones"), and a combination of (k1m, k2m)=(+1, +1) and (−1, −1) (hereafter, this combination is referred to as "diffraction order combination D of middle ring zones") are also optimal arrangement examples. Now, when selecting the diffraction order combination C or D of the middle ring zones, the above-mentioned functions of the middle ring zones, staircase form to be selected when taking into consideration diffraction efficiency and so forth, the form of the diffraction structure to be selected from blazed forms, number of steps S, and groove width d are shown in MC1 and MD1 in the following Table 8. Now, as shown in Table 8, with the diffraction order combination C of the middle ring zones, there is groove depth whereby the optimal diffraction efficiency can be obtained with the diffraction structure of the staircase form which is a so-called step form, i.e., it can be said that this combination is a combination suitable for the diffraction structure of the staircase form. Also, with the diffraction order combination D of middle ring zones, there is groove depth whereby the optimal diffraction efficiency can be obtained with the diffraction structure of the blazed form, i.e., it can be said that this combination is a combination suitable for the diffraction structure of the blazed form. Note that "k1m", "k2m", "k3m", "k3m'", "eff1", "eff2", "eff3", "eff3'", "d", "S", "Δ", and "Δ'" shown in Table 8 are the same as those described above with reference to Table 7.

TABLE 8

Order, diffraction efficiency, diffraction order, depth,
number of steps, deviation amount Δ of middle ring zones

| No. | $K_{1m}$ | $k_{2m}$ | $k_{3m}$ | $k_{3m}'$ | $eff_1$ | $eff_2$ | $eff_3$ | $eff_3'$ | d [μm] | s | Δ [mm] | Δ' [mm] |
|---|---|---|---|---|---|---|---|---|---|---|---|---|
| MC1 | ±1 | ∓1 | ∓1 | ∓2 | 0.81 | 0.81 | 0.32 | 0.19 | 2.9 | 3 | −0.44 | −0.06 |
| MD1 | ±1 | ±1 | ±1 | 0 | 1.00 | 0.60 | 0.42 | 0.39 | 0.8 | ∞ | −0.25 | −1.83 |

As shown in Table 8, with the above-mentioned combinations C and D, in either case, diffraction efficiency is sufficiently ensured. Note that with the example shown in Table 8, the deviation amount Δ or Δ' is not sufficiently great amount as compared to the example shown in Table 7, but comparatively low diffraction efficiency eff3 and eff3', and a certain level of separation amount Δ and Δ' are obtained, so influence of unwanted light can sufficiently be reduced while realizing aperture restriction, for example, using a method for setting return magnification of an optical system greatly, or the like.

As described above, with the second diffraction region 252 serving as an inner ring zone, from the above-mentioned first through fourth perspectives, the diffraction order combination A, B, C, or D of inner ring zones such as describe above can be selected, and such a diffraction order is selected, whereby the optical beams of the first and second wavelengths can be condensed on the signal recording face of the corresponding optical disc with high diffraction efficiency in a state in which spherical aberration is reduced, and also the diffracted light of the high diffraction order of diffraction efficiency is prevented from being condensed on the signal recording face of the third optical disc as to the optical beam of the third wavelength, thereby enabling aperture restriction to be performed.

Note that, as described above, with a middle ring zone, the second diffraction region 252B of the staircase form may be employed instead of the second diffraction region 252 of the blazed form. This is because, as described in the above description of inner ring zones, while the staircase form (step structure) is advantageous to reduce influence of unwanted light, middle ring zones are provided outer side than inner ring zones, and the lens curved face is steep, so the blazed form (blazed structure) is advantageous from the perspective of manufacturing. That is to say, with a middle ring zone, an advantageous structure needs to be selected while taking into consideration the relation with other structures with subtle balance between influence of unwanted light and advantages from the perspective of manufacturing.

Figure 48:
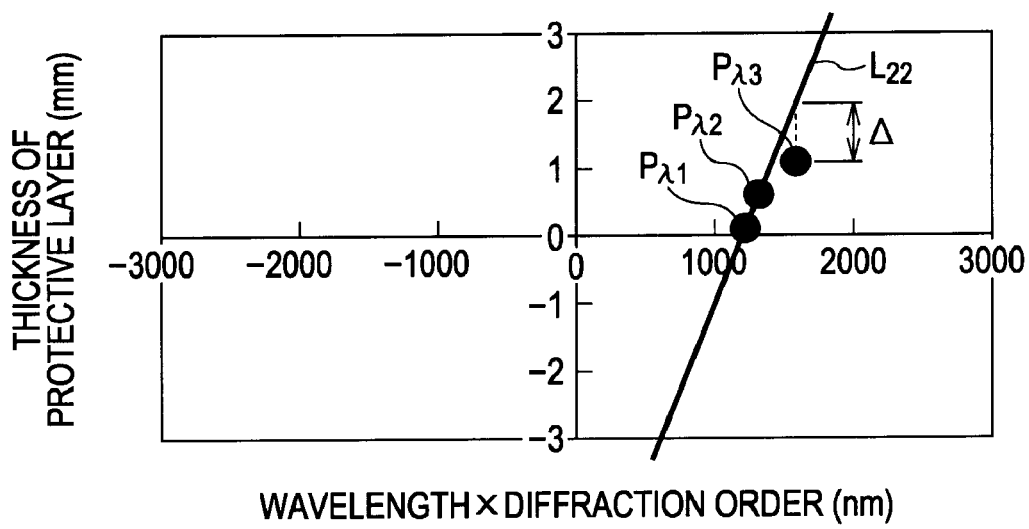
FIG. 48 is a diagram for describing flaring at the middle ring zone in the example 1 of the third embodiment, showing points plotted according to the relation between wavelength×diffraction order and protective layer thickness, and the design line of the object lens, in a case wherein (k1m, k2m, k3m)=(+3, +2, +2)

Now, description will be made regarding flaring with the second diffraction region 252, and the structure thereof. With the above description of the first diffraction region 251, description has been made wherein it is required to satisfy the above-mentioned conditional expression $(\lambda 1 \times k1x - \lambda 2 \times k2x)/(t1-t2) \approx (\lambda 1 \times k1x - \lambda 3 \times k3x)/(t1-t3)$, but this conditional expression (with a middle ring zone, let us say that x of k1x, k2x, and k3x within this conditional expression is x=m) is also taken into consideration with the second diffraction region 252. With the second diffraction region 252 serving as a middle ring zone, when taking into consideration a function for generating the diffraction light of the diffraction orders k1m and k2m of the optical beams of the first and second wavelengths to be condensed via the object lens 234 in a state wherein diffraction efficiency is high so as to form a suitable spot on the signal recording faces of the first and second optical discs such as described above, Pλ1 and Pλ2 to be plotted need to be positioned on a design line, but further, in order to perform flaring regarding the third wavelength, there is a need to select a design line so as to make Pλ3 deviate from this design line intentionally. That is to say, the object lens 234 is configured based on the design line that deviates from the design line regarding Pλ3, whereby the diffracted light of the relevant diffraction order of the optical beam of the third wavelength can be shifted from a state wherein a focal point is imaged on the signal recording face of the third optical disc, the light quantity of the optical beam of the third wavelength condensed on the signal recording face of the third optical disc can be reduced substantially, whereby aperture restriction as to the optical beam of the third wavelength as described above can be performed in a sure and excellent manner. Specifically, Pλ3 deviates from the design line L22 in the case of (k1m, k2m, k3m)=(+3, +2, +2) such as shown in FIG. 48, and in addition to the effects wherein the diffraction efficiency of the diffracted light of the relevant order of the third wavelength can be reduced according to the diffraction structure formed in the second diffraction region 252 expected from the beginning, the flaring effects are further obtained, and according to such a configuration, the light quantity of the optical beam of the third wavelength can be further prevented from being input to the third optical disc.

With the third diffraction region 253 which is an outer ring zone, the third diffraction structure is formed, which has a ring zone shape, predetermined depth, and a structure different from the first and second diffraction structures, and the third diffraction region 253 diffracts the optical beam of the first wavelength that is transmitted therethrough such that diffracted light of an order which forms an appropriate spot on the signal recording face of the first optical disc via the object lens 234 is dominant, i.e., such that maximum diffraction efficiency is manifested regarding diffracted light of other orders.

Also, the third diffraction region 253 diffracts the optical beam of the second wavelength that is transmitted therethrough such that diffracted light of an order other than the order which condenses light so as to form an appropriate spot on the signal recording face of the second optical disc via the object lens 234 is dominant, i.e., such that maximum diffraction efficiency is manifested regarding diffracted light of other orders, by way of the third diffraction structure. If it puts in another way regarding this point, in light of later-described flaring operation and so forth, the third diffraction region 253 diffracts the optical beam of the second wavelength that is transmitted therethrough such that diffracted light of an order which forms no appropriate spot on the signal recording face of the second optical disc via the object lens 234 is dominant, by way of the third diffraction structure. Note that the third diffraction region 253 can sufficiently reduce the diffraction efficiency of diffracted light of an order which forms an appropriate spot condensed on the signal recording face of the second optical disc via the object lens 234 for the optical beam of the second wavelength that is transmitted therethrough, by way of the third diffraction structure.

Also, the third diffraction region 253 diffracts the optical beam of the third wavelength that is transmitted therethrough such that diffracted light of an order other than which forms an appropriate spot condensed on the signal recording face of the third optical disc via the object lens 234 is dominant, i.e., such that maximum diffraction efficiency is manifested regarding diffracted light of other orders, by way of the third diffraction structure. If it puts in another way regarding this point, in light of later-described flaring operation and so forth, the third diffraction region 253 diffracts the optical beam of the third wavelength that is transmitted therethrough such that diffracted light of an order which forms no appropriate spot on the signal recording face of the third optical disc via the object lens 234 is dominant, by way of the third diffraction structure. Note that the third diffraction region 253 can sufficiently reduce the diffraction efficiency of diffracted light of an order which forms an appropriate spot condensed on the signal recording face of the third optical disc via the object lens 234 for the optical beam of the third wavelength that is transmitted therethrough, by way of the third diffraction structure.

Thus, with the third diffraction region 253, there is formed a diffraction structure suitable for the diffracted light of a predetermined order being dominant as to the optical beam of the above-mentioned respective wavelengths, thereby enabling spherical aberration to be corrected and reduced at the time of the optical beams of the first wavelength serving as the diffracted light of a predetermined order that is transmitted therethrough being condensed on the signal recording face of the optical disc via the object lens 234.

Also, the third diffraction region 253 serves as described above as to the optical beam of the first wavelength, and is configured such that the diffracted light of an order that does not condense the optical beams of the second and third wavelengths that is transmitted therethrough upon the signal recording faces of the second and third optical discs via the object lens 234 is dominant by taking into consideration the influence of flaring and so forth, so even if the optical beams of the second and third wavelengths that have transmitted the third diffraction region 253 is input to the object lens 234, this seldom affects the signal recording faces of the second and third optical discs, i.e., the third diffraction region 253 can serve so as to markedly reduce the light quantity of the optical beams of the second and third wavelengths transmitted through the third diffraction region 253, and condensed on the signal recording face by the object lens 234 to around zero, and subject the optical beam of the second wavelength to aperture restriction. Note that the third diffraction region 253 can serve so as to subject the optical beam of the third wavelength to aperture restriction together with the above-mentioned second diffraction region 252.

Incidentally, the above-mentioned second diffraction region 252 is formed with a size wherein the optical beam of the second wavelength transmitted through the region thereof is input to the object lens 234 in the same state as that of the optical beam subjected to aperture restriction at around NA=0.6, and also, the third diffraction region 253 formed on the outer side of the second diffraction region 252 does not condense the optical beam of the second wavelength transmitted through this region on the optical disc via the object lens 234, so consequently, the diffraction unit 250 including the second and third diffraction regions 252 and 253 thus configured serves so as to perform aperture restriction at around NA=0.6 as to the optical beam of the second wavelength. An arrangement has been made here wherein with the diffraction unit 250, aperture restriction of numerical aperture NA of around 0.6 is performed as to the optical beam of the second wavelength, but the numerical aperture restricted by the above arrangement is not restricted to this.

Also, the third diffraction region 253 is formed of a size such that the optical beam of the first wavelength which has been transmitted through the region thereof is input to the object lens 234 in the same state as an optical beam which has been subjected to aperture restriction at around NA=0.85, and since there is no diffraction structure formed on the outer side of this third diffraction region 253, this does not allow condensation of the optical beam of the first wavelength which has been transmitted through this region on the first optical disc, and the diffraction unit 250 which has the third diffraction region 253 configured thus functions so as to restrict the numerical aperture of the optical beam of the first wavelength to around NA=0.85. Note that with the first wavelength optical beam transmitted through the third diffraction region 253, light of 1st and 4th diffraction orders is dominant, so the zero-order light transmitted through the region outside the third diffraction region 253 almost never passes through the object lens 234 to be condensed on the first optical disc, but in cases wherein this zero-order does pass through the object lens 234 and is condensed on the first optical disc, a configuration may be provided to perform aperture restriction by providing, at the region outside of the third diffraction region 253, either a shielding portion for shielding optical beams passing through, or a diffraction region having a diffraction structure wherein optical beams of orders other than the order of the optical beam passing through the object lens 234 to be condensed on the first optical disc are dominant. It should be noted however, that while in this arrangement of the diffraction unit 250, the optical beam of the first wavelength is subjected to aperture restriction around NA=0.85, but the present invention is not restricted to this, i.e., numerical aperture restriction due to the above configuration is not limited to this.

Specifically, the third diffraction region 253 has, as shown in FIG. 39 and FIG. 40C, a ring zone shape centered on the optical axis, which is formed such that the cross-sectional shape of this ring zone becomes a blazed shape of a predetermined depth d as to the reference face.

With the third diffraction region 253 which is an outer ring zone, a blazed structure is employed, as described above. This is because with the outer ring zone provided on the outermost side, the lens curved face has the most steep curvature, and providing a structure other than a blazed structure is disadvantageous from the perspective of manufacturing. Also, there is no need to take into consideration problems such as unwanted light, efficiency, and so forth as described above, so sufficient performance can be obtained with a blazed structure. Description will be made below regarding the respective orders to be selected.

Also, in a case wherein the third diffraction region 253 diffracts the optical beam of the first wavelength which is transmitted therethrough such that diffracted light of the k1o'th order is dominant, i.e., such that the diffraction efficiency thereof is maximum, diffracts the optical beam of the second wavelength which is transmitted therethrough such that diffracted light of the k2o'th order is dominant, i.e., such that the diffraction efficiency thereof is maximum, and diffracts the optical beam of the third wavelength which is transmitted therethrough such that diffracted light of the k3o'th order is dominant, i.e., such that the diffraction efficiency thereof is maximum, when selecting the diffraction orders k1o, k2o, and k3o, only the order of the first wavelength and diffraction efficiency need to be taken into consideration.

This is because the condensed points of the second and third wavelengths having predetermined diffraction efficiency are subjected to flaring so as to be shifted from the state wherein an image is formed, whereby the light quantity of the optical beams condensed on the signal recording face of the second and third optical discs can be reduced substantially, and accordingly, flexibility is high, and conditions are alleviated.

From the perspectives described above, with the third diffraction region 253, predetermined diffraction orders k1o, k2o, and k3o need to be selected, as for an example thereof, like a later-described first embodiment, in the case of (k1o, k2o, k3o)=(+4, +2, +2), the above-mentioned respective perspectives are satisfied, the corresponding efficiency can be obtained.

Now, description will be made regarding flaring with the third diffraction region 253, and the structure thereof. With the above description of the first diffraction region 251, description has been made wherein it is required to satisfy the conditional expression $(\lambda1 \times k1x - \lambda2 \times k2x)/(t1-t2) \approx (\lambda1 \times k1x - \lambda3 \times k3x)/(t1-t3)$, but this conditional expression (with an outer ring zone, let us say that x of k1x, k2x, and k3x within this conditional expression is x=o) is also taken into consideration with the third diffraction region 253. With the third diffraction region 253 serving as an outer ring zone, when taking into consideration a function for generating the diffraction light of the diffraction order ko of the optical beams of the first wavelength to be condensed via the object lens 234 in a state wherein diffraction efficiency is high so as to form a suitable spot on the signal recording face of the first optical disc such as described above, Pλ1 to be plotted needs to be positioned on a design line, but further, in order to subject the second or third wavelength, or the second and third wavelengths to flaring, there is a need to select a design line so as to make the corresponding Pλ2 and Pλ3 deviate from this design line intentionally.

That is to say, the object lens 234 is configured based on the design line that deviates from the design line regarding Pλ2, whereby the diffracted light of the relevant diffraction order of the optical beam of the second wavelength can be shifted from a state wherein a focal point is imaged on the signal recording face of the second optical disc, the light quantity of the optical beam of the second wavelength condensed on the signal recording face of the second optical disc can be reduced substantially, whereby aperture restriction as to the optical beam of the second wavelength as described above can be performed in a sure and excellent manner. Also, the object lens 234 is configured based on the design line that deviates from the design line regarding Pλ3, whereby the diffracted light of the relevant diffraction order of the optical beam of the third wavelength can be shifted from a state wherein a focal point is imaged on the signal recording face of the third optical disc, the light quantity of the optical beam of the third wavelength condensed on the signal recording face of the third optical disc can be reduced substantially, whereby aperture restriction as to the optical beam of the third wavelength as described above can be performed in a sure and excellent manner. Also, the object lens 234 is configured based on the design line that deviates from the design line regarding Pλ2 and Pλ3, whereby both effects described above, i.e., the light quantity of the optical beams of the second and third wavelengths condensed on the signal recording face of the corresponding optical disc can be reduced.

Figure 49:
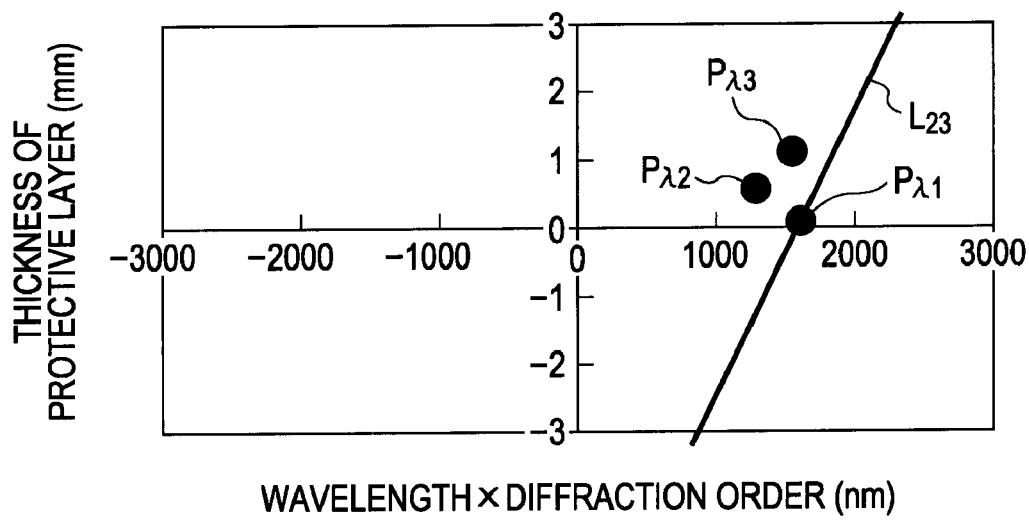
FIG. 49 is a diagram for describing flaring at the outer ring zone in the example 1 of the third embodiment, showing points plotted according to the relation between wavelength×diffraction order and protective layer thickness, and the design line of the object lens, in a case wherein (k1o, k2o, k3o)=(+4, +2, +2)

Specifically, both of Pλ2 and Pλ3 deviate from the design line L23 in the case of (k1o, k2o, k3o)=(+4, +2, +2) such as shown in FIG. 49, and in addition to effects wherein the diffraction efficiency of the diffracted light of the orders of the second and third wavelengths can be reduced according to the diffraction structure formed in the third diffraction region 253 expected from the beginning, the flaring effects are further obtained, and according to such a configuration, the light quantity of the optical beams of the second and third wavelengths can be further prevented from being input to the second and third optical discs.

As a specific embodiment of the diffraction unit 250 including the first diffraction region 251 which is an inner ring zone, the second diffraction region 252 which is a middle ring zone, and the third diffraction region 253 which is an outer ring zone, the diffraction order of the diffracted light of an order that is dominant as to the optical beam of each wavelength, and the diffraction efficiency of the diffracted light of the diffraction order thereof will be shown in Table 9 and later-described Table 10 by listing specific numeric values regarding the depth d and number of steps S according to the blazed or staircase form. Note that Table 9 shows the first embodiment of the diffraction unit 250, Table 10 shows the second embodiment of the diffraction unit 250, and in Tables 9 and 10, k1 represents the diffraction orders (k1$i$, k1$m$, k1$o$) wherein the diffraction efficiency of the optical beam of the first wavelength at each ring zone becomes the maximum efficiency, i.e., the diffraction orders wherein condensation is made so as to form a spot appropriately on the signal recording face of the first optical disc via the object lens 234, eff1 represents the diffraction efficiency of the relevant diffraction orders (k1$i$, k1$m$, k1$o$) of the optical beam of the first wavelength, k2 represents the diffraction orders (k2$i$, k2$m$, k2$o$) wherein the diffraction efficiency of the optical beam of the second wavelength becomes the maximum efficiency, and particularly with the inner and middle ring zones, represents the diffraction orders wherein condensation is made so as to form a spot appropriately on the signal recording face of the second optical disc via the object lens 234, eff2 represents the diffraction efficiency of the relevant diffraction orders (k2$i$, k2$m$, k2$o$) of the optical beam of the second wavelength, k3 represents the diffraction orders (k3$i$, k3$m$, k3$o$) wherein the diffraction efficiency of the optical beam of the third wavelength becomes the maximum efficiency, and particularly with the inner ring zone, represents the diffraction orders wherein condensation is made so as to form a spot appropriately on the signal recording face of the third optical disc via the object lens 234, eff3 represents the diffraction efficiency of the relevant diffraction orders (k3$i$, k3$m$, k3$o$) of the optical beam of the third wavelength, d represents the groove depth of each diffraction region, S represents the number of steps in the case of the staircase form, or "∞" in the case of the blazed form. Also, "*" in Tables 9 and 10 represents a state wherein according to the above-mentioned flaring, efficiency does not effect a problem.

TABLE 9

Diffraction efficiency, diffraction order, depth, and number of steps at each ring zone, of First Embodiment

|  | k1 | eff$_1$ | K2 | eff$_2$ | K3 | eff$_3$ | d [μm] | s |
|---|---|---|---|---|---|---|---|---|
| Inner Ring zone | 1 | 0.81 | −1 | 0.62 | −2 | 0.57 | 3.8 | 4 |
| Middle Ring zone | 3 | 0.96 | 2 | 0.93 | 2 | * | 2.4 | ∞ |
| Outer Ring zone | 4 | 1.0 | 2 | * | 2 | * | 3.1 | ∞ |

* represents that according to flaring, efficiency does not effect a problem.

Now, the first embodiment shown in Table 9 will be described. With the inner ring zone according to the first embodiment, as shown in Table 9, when employing a staircase form with the number of steps S=4 and groove depth d=3.8 (μm), with the diffraction order k1$i$=+1 of the optical beam of the first wavelength, the diffraction efficiency is eff1=0.81, with the diffraction order k2$i$=−1 of the optical beam of the second wavelength, the diffraction efficiency is eff2=0.62, and with the diffraction order k3$i$=−2 of the optical beam of the third wavelength, the diffraction efficiency is eff3=0.57. Further specific description of the inner ring zone according to the first embodiment has been made with reference to FIGS. 44A through 44C, so detailed description thereof will be omitted.

Also, with the middle ring zone according to the first embodiment, as shown in Table 9, when employing a blazed form (S=∞) with groove depth d=2.4 (μm), with the diffraction order k1$m$=+3 of the optical beam of the first wavelength, the diffraction efficiency is eff1=0.96, and with the diffraction order k2$m$=+2 of the optical beam of the second wavelength, the diffraction efficiency is eff2=0.93. Also, the diffraction efficiency eff3 of the diffraction order k3$m$=+2 serving as the maximum diffraction efficiency of the optical beam of the third wavelength transmitting this region is around 0.4, but this does not contribute to image formation since the spot is subjected to flaring as described above with reference to FIG. 48.

Next, description will be made further specifically regarding the middle ring zone according to the first embodiment with reference to FIGS. 50A through 50C. FIG. 50A is a diagram illustrating change in the diffraction efficiency of +3rd order diffracted light of the optical beam of the first wavelength in the case of changing the groove depth d of the blazed form of the number of steps S=∞, FIG. 50B is a diagram illustrating change in the diffraction efficiency of +2nd order diffracted light of the optical beam of the second wavelength in the case of changing the groove depth d of the blazed form of the number of steps S=∞, and FIG. 50C is a diagram illustrating change in the diffraction efficiency of +2nd order diffracted light of the optical beam of the third wavelength in the case of changing the groove depth d of the blazed form of the number of steps S=∞. In FIGS. 50A through 50C, the horizontal axis represents groove depth (nm), and the vertical axis represents diffraction efficiency (light intensity). At a position where the horizontal axis is 2400 nm, as shown in FIG. 50A, eff1 is 0.96, and as shown in FIG. 50B, eff2 is 0.93, and as shown in FIG. 50C, eff3 is around 0.4, but the spot is subjected to flaring.

Figure 50:
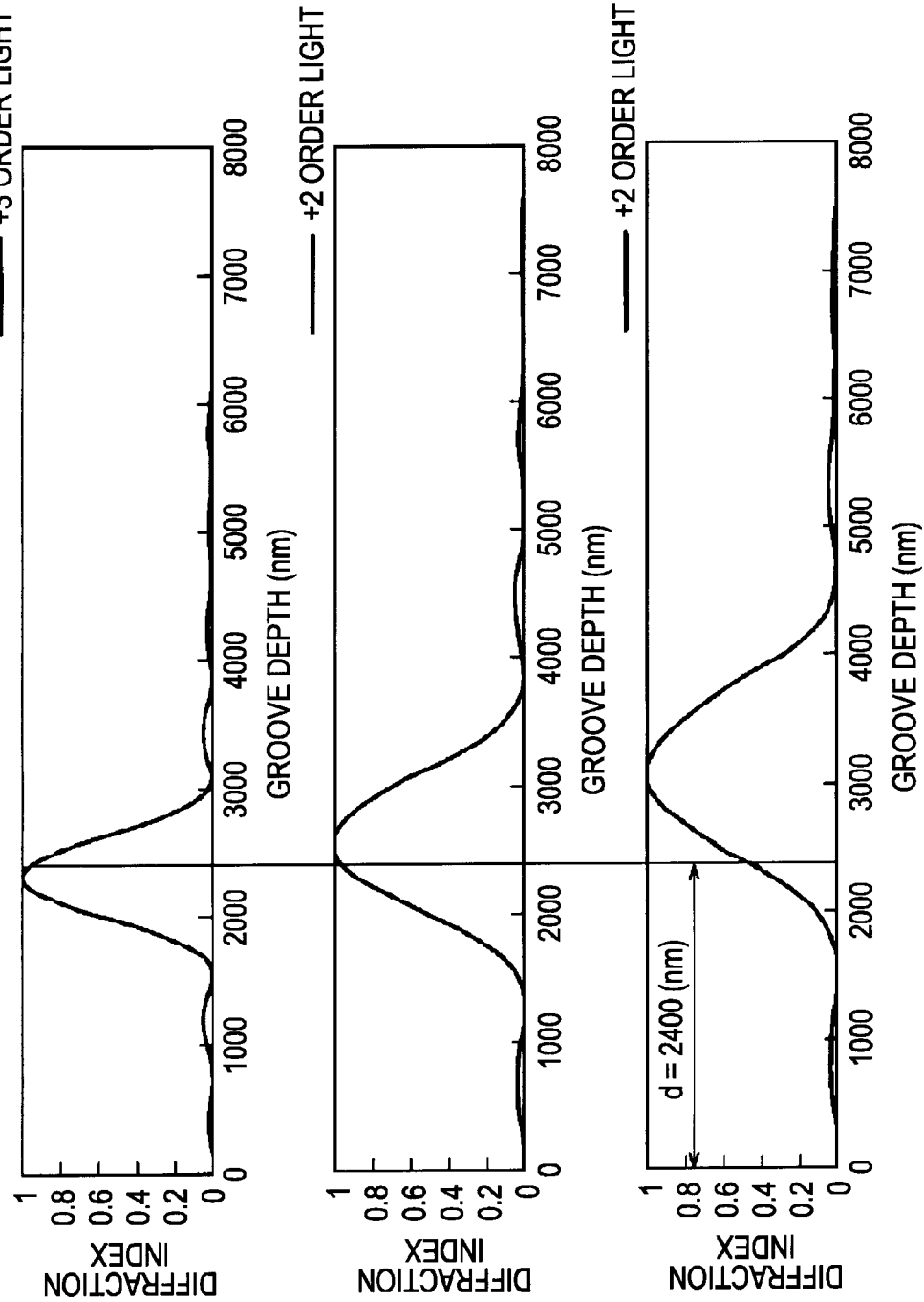
FIGS. 50A through 50C show graphs for calculating the diffraction efficiency of the example 1 of the middle ring zone according to the third embodiment, illustrating the change in the diffraction efficiency of the optical beams of each wavelength as to change in the groove depth d in a case wherein S=∞, and (k1m, k2m, k3m)=(+3, +2, +2)

Also, with the middle ring zone in the first embodiment described above, of the design line in the relation between the above-described (wavelength×order) and the thickness of the protective layer, the y-intercept position and inclination with the vertical axis representing the thickness of the protective layer as the Y axis exhibits flaring regarding the third wavelength by change due to design of the object lens. Accordingly, performing appropriate object lens design based on such a design line enables the quantity of light of the optical beam of the third wavelength to be further suppressed and excellent aperture restriction to be performed regarding the optical beam of the third wavelength. Specifically, as shown in FIG. 48, the middle ring zone in the first embodiment has the design line indicated by L22 set by plotting the points Pλ1, Pλ2, and Pλ3 at the diffraction orders (k1$m$, k2$m$, k3$m$)=(+3, +2, +2). In FIG. 48 the design point Pλ1 of the first wavelength and the design point Pλ2 of the second wavelength are positioned on the design line L22, so the aberration of diffraction light of the diffraction orders k1$m$ and k2$m$ is approximately zero. On the other hand, the plotted point Pλ3 of the third wavelength is significantly deviated from the aberration zero design point, indicating the above-described flaring. Note that in FIG. 48, only k3m=+2 is shown plotted, but there is deviation from the design line L22 in the same way for other orders in the third wavelength as well. Consequently, there is uncorrected aberration in the third wavelength, and consequently, the light quantity of the optical beam of the third wavelength which has passed through the middle ring zone, that is not imaged at the signal recording face but input to the third optical disc can be suppressed. As a result, regardless of the diffraction efficiency of the optical beam of the third wavelength as shown in FIG. 50, these optical beams do not contribute to image formation, and accordingly, a suitable aperture restriction (NA=0.45) can be realized.

Also, with the outer ring zone according to the first embodiment, as shown in Table 9, when employing a blazed form (S=∞) with groove depth d=3.1 (μm), with the diffraction order k1o=+4 of the optical beam of the first wavelength, the diffraction efficiency is eff1=1.0. Also, the diffraction efficiency eff2 of the diffraction order k2o=+2 serving as the maximum diffraction efficiency of the optical beam of the second wavelength transmitting this region is around 0.6, but this does not contribute to image formation since the spot is subjected to flaring as described above with reference to FIG. 49. Further, the diffraction efficiency eff3 of the diffraction order k3o=+2 serving as the maximum diffraction efficiency of the optical beam of the third wavelength transmitting this region is around 1.0, but this does not contribute to image formation since the spot is subjected to flaring as described above with reference to FIG. 49.

Next, description will be made further specifically regarding the outer ring zone according to the first embodiment with reference to FIGS. 51A through 51C. FIG. 51A is a diagram illustrating change in the diffraction efficiency of +4th order diffracted light of the optical beam of the first wavelength in the case of changing the groove depth d of the blazed form of the number of steps S=∞, FIG. 51B is a diagram illustrating change in the diffraction efficiency of +2nd order diffracted light of the optical beam of the second wavelength in the case of changing the groove depth d of the blazed form of the number of steps S=∞, and FIG. 51C is a diagram illustrating change in the diffraction efficiency of +2nd order diffracted light of the optical beam of the third wavelength in the case of changing the groove depth d of the blazed form of the number of steps S=∞. In FIGS. 51A through 51C, the horizontal axis represents groove depth (nm), and the vertical axis represents diffraction efficiency (light intensity). At a position where the horizontal axis is 3100 nm, as shown in FIG. 51A, eff1 is 1.0, and as shown in FIG. 51B, eff2 is around 0.6, and as shown in FIG. 51C, eff3 is around 1.0, but the spot is subjected to flaring.

Figure 51:
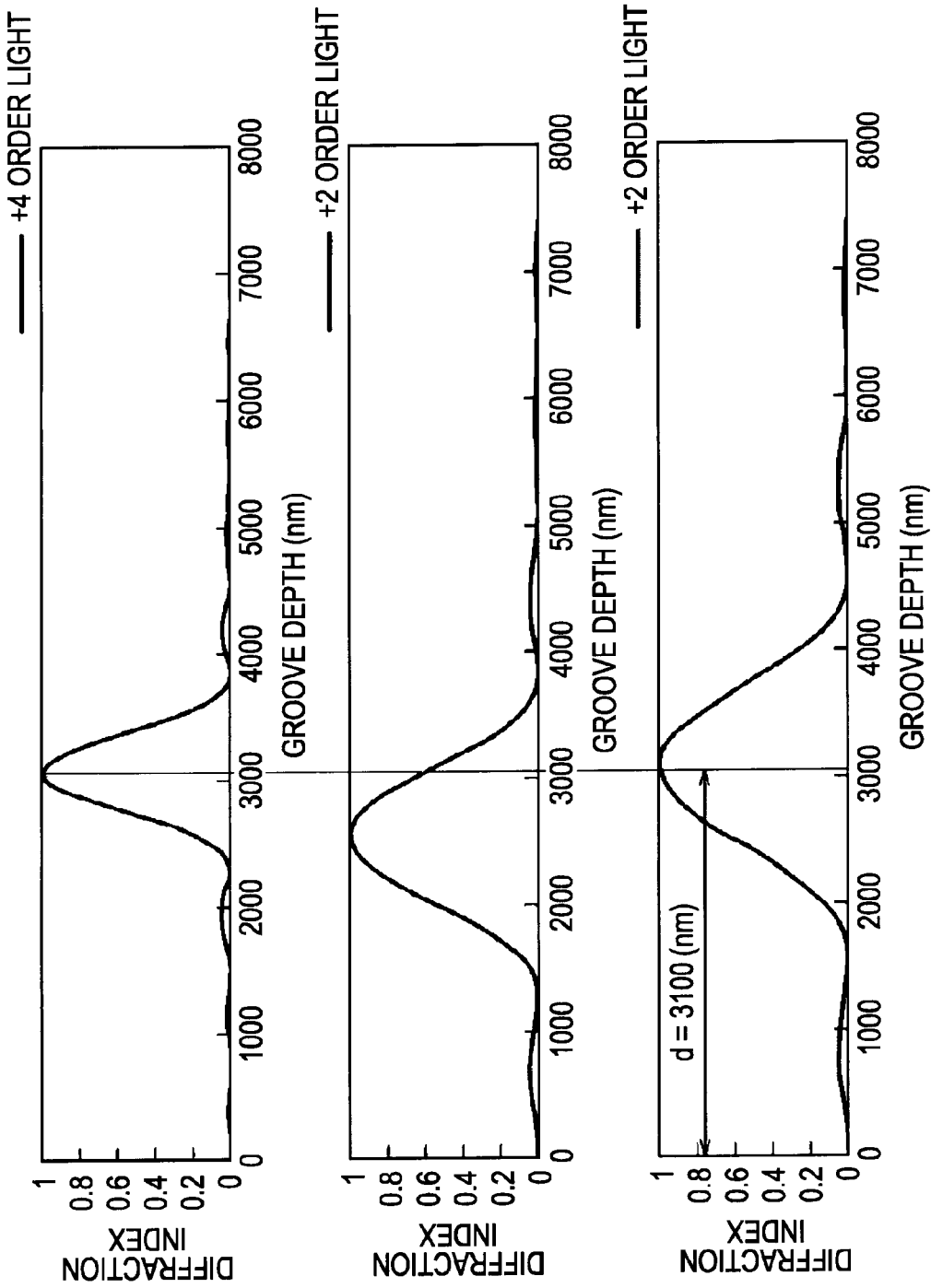
FIGS. 51A through 51C show graphs for calculating the diffraction efficiency of the example 1 of the outer ring zone according to the third embodiment, illustrating the change in the diffraction efficiency of the optical beams of each wavelength as to change in the groove depth d in a case wherein S=∞, and (k1o, k2o, k3o)=(+4, +2, +2)
Figure 52:
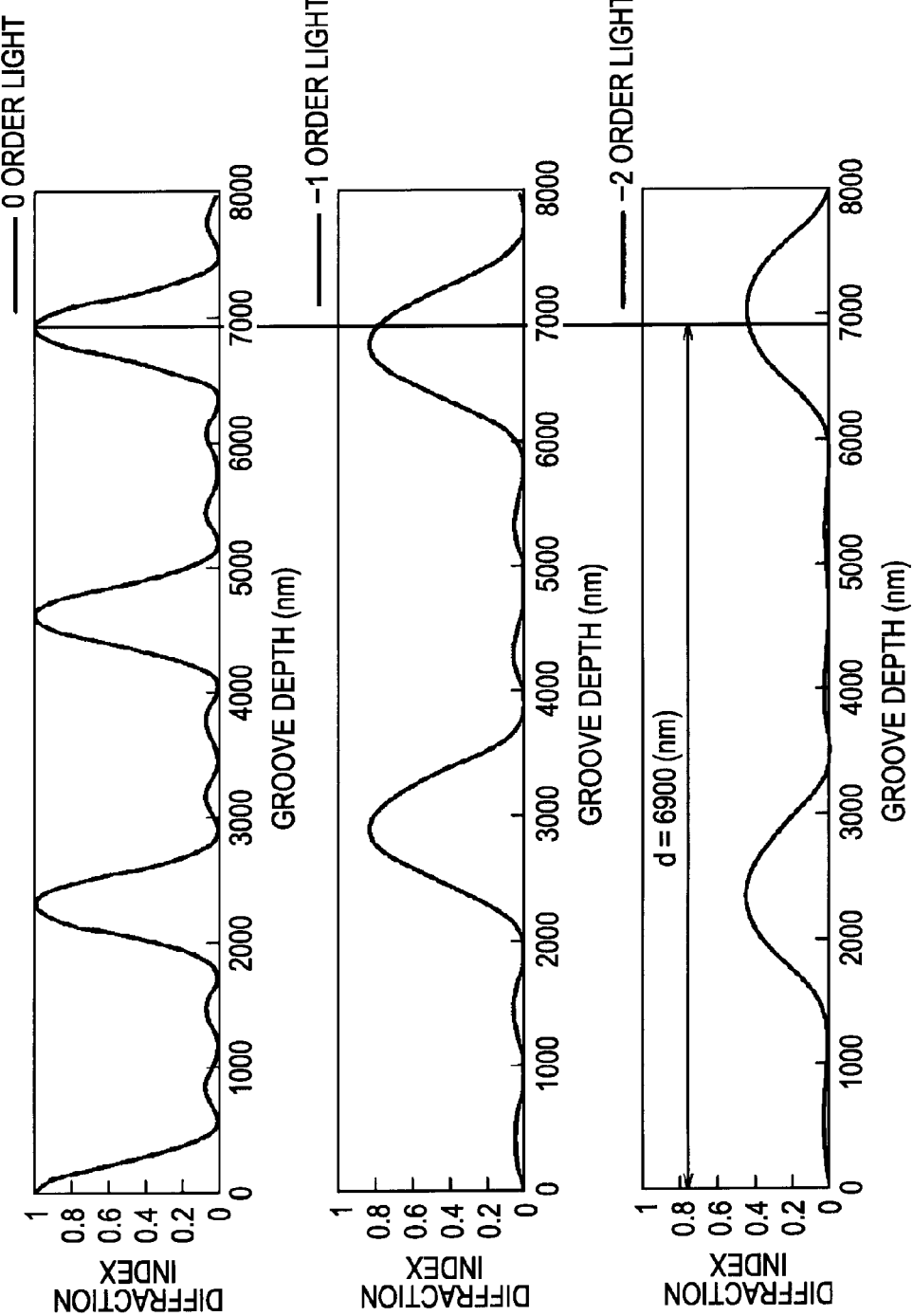
FIGS. 52A through 52C show graphs for calculating the diffraction efficiency of the example 2 of the inner ring zone according to the third embodiment, illustrating the change in the diffraction efficiency of the optical beams of each wavelength as to change in the groove depth d in a case wherein S=3, and (k1i, k2i, k3i)=(0, −1, −2)

Also, with the outer ring zone in the first embodiment described above as well, in the same way as the case of the middle ring zone in the first embodiment described above, an arrangement is made wherein the design line of the object lens is deviated, and flaring is carried out regarding the second and third wavelengths to perform excellent aperture restriction. Specifically, as shown in FIG. 49, the outer ring zone in the first embodiment has the design line indicated by L23 set by plotting the points Pλ1, Pλ2, and Pλ3 at the diffraction orders (k1o, k2o, k3o)=(+4, +2, +2). In FIG. 49 the design point Pλ1 of the first wavelength is positioned on the design line L23, so the aberration of diffraction light of the diffraction orders k1o is approximately zero. On the other hand, the plotted points Pλ2 and Pλ3 of the second and third wavelengths are significantly deviated from the aberration zero design point, indicating the above-described flaring. Note that in FIG. 49, only (k2o, k3o)=(+2, +2) is shown plotted, but there is deviation from the design line L23 in the same way for other orders in the second and third wavelengths as well. Consequently, there is uncorrected aberration in the second wavelength, and consequently, the light quantity of the optical beams of the second and third wavelengths which have passed through the outer ring zone, that is not imaged at the signal recording face but input to the second and third optical discs can be suppressed. As a result, regardless of the diffraction efficiency of the optical beam of the second wavelength as shown in FIG. 51, this optical beam does not contribute to image formation, and accordingly, a suitable aperture restriction (NA=0.6) can be realized. Also, regardless of the diffraction efficiency of the optical beam of the third wavelength as shown in FIG. 51, this optical beam does not contribute to image formation, and accordingly, a suitable aperture restriction (NA=0.45) can be realized.

As described above, with the outer ring zones in the first embodiment and a later-described second embodiment, the diffraction face is blazed, so according to this configuration, even in the case of providing the diffraction grooves to one face of the object lens as described later, diffraction grooves can be formed relatively easily at the curved face of the lens face at the perimeter of the lens which has a steep slope due to being at the outer ring zone.

Next, a second embodiment shown in Table 10 will be described.

TABLE 10

Diffraction efficiency, diffraction order, depth, and number of steps at each ring zone, of Second Embodiment

|  | K1 | eff$_1$ | K2 | eff$_2$ | K3 | eff$_3$ | d [μm] | s |
|---|---|---|---|---|---|---|---|---|
| Inner Ring zone | 0 | 0.98 | −1 | 0.78 | −2 | 0.39 | 6.9 | 3 |
| Middle Ring zone | 0 | 0.96 | −1 | 0.81 | −3 | ✳ | 11.65 | 5 |
| Outer Ring zone | 1 | 1.0 | 1 | ✳ | 1 | ✳ | 0.8 | ∞ |

* represents that according to flaring, efficiency does not effect a problem.

Also, with the inner ring zone according to the second embodiment, as shown in Table 10, when employing a staircase form with the number of steps S=3 and groove depth d=6.9 (μm), with the diffraction order k1i=0 of the optical beam of the first wavelength, the diffraction efficiency is eff1=0.98, and with the diffraction order k2i=−1 of the optical beam of the second wavelength, the diffraction efficiency is eff2=0.78, and with the diffraction order k3i=−2 of the optical beam of the third wavelength, the diffraction efficiency is eff3=0.39.

Next, description will be made further specifically regarding the inner ring zone according to the second embodiment with reference to FIGS. 52A through 52C. FIG. 52A is a diagram illustrating change in the diffraction efficiency of zero-order diffracted light of the optical beam of the first wavelength in the case of changing the groove depth d of the staircase form of the number of steps S=3, FIG. 52B is a diagram illustrating change in the diffraction efficiency of −1st order diffracted light of the optical beam of the second wavelength in the case of changing the groove depth d of the staircase form of the number of steps S=3, and FIG. 52C is a diagram illustrating change in the diffraction efficiency of −2nd order diffracted light of the optical beam of the third wavelength in the case of changing the groove depth d of the staircase form of the number of steps S=3. In FIGS. 52A through 52C, the horizontal axis represents groove depth (nm), and the vertical axis represents diffraction efficiency (light intensity). At a position where the horizontal axis is 6900 nm, as shown in FIG. 52A, eff1 is 0.98, and as shown in FIG. 52B, eff2 is 0.78, and as shown in FIG. 52C, eff3 is 0.39.

Figure 55:
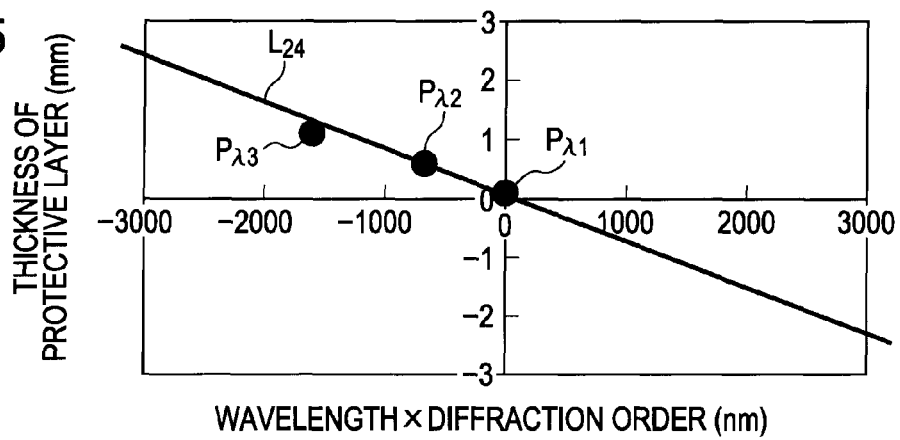
FIG. 55 is a diagram for describing spherical aberration correction possibility at the inner ring zone in the example 2 of the third embodiment, showing points plotted according to the relation between wavelength×diffraction order and protective layer thickness, and the design line of the object lens, in a case wherein (k1$i$, k2$i$, k3$i$)=(+0, −1, −2)

Note that with the inner ring zone in the second embodiment as well, the diffraction orders (k1$i$, k2$i$, k3$i$)=(0, −1, −2) selected here satisfy the above-mentioned conditional expression (1) (let us say that x of k1$x$, k2$x$, and k3$x$ within the conditional expression is x=i), and are diffraction orders that can correct and reduce the spherical aberration on the signal recording face of each optical disc. Further, specifically, as shown in FIG. 55, the respective plots Pλ1, Pλ2, and Pλ3 are positioned in a straight line on the straight line L24 serving as a generally design line. Now, strictly, in the same way as described above with reference to FIG. 42, let us say that the second and third wavelengths λ2 and λ3 are input as divergent rays, thereby disposing on a straight line completely.

With the middle ring zone according to the second embodiment, as shown in Table 10, when employing a staircase form with the number of steps S=5 and groove depth d=11.65 (μm), with the diffraction order k1$m$=0 of the optical beam of the first wavelength, the diffraction efficiency is eff1=0.96, and with the diffraction order k2$m$=−1 of the optical beam of the second wavelength, the diffraction efficiency is eff2=0.81. Also, the diffraction efficiency eff3 of the diffraction order k3$m$=−3 serving as the maximum diffraction efficiency of the optical beam of the third wavelength transmitting this region is around 0.4, but this does not contribute to image formation since the spot is subjected to flaring as described above (see FIG. 56).

Next, description will be made further specifically regarding the middle ring zone according to the second embodiment with reference to FIGS. 53A through 53C. FIG. 53A is a diagram illustrating change in the diffraction efficiency of zero-order diffracted light of the optical beam of the first wavelength in the case of changing the groove depth d of the staircase form of the number of steps S=5, FIG. 53B is a diagram illustrating change in the diffraction efficiency of −1st order diffracted light of the optical beam of the second wavelength in the case of changing the groove depth d of the staircase form of the number of steps S=5, and FIG. 53C is a diagram illustrating change in the diffraction efficiency of −3rd order diffracted light of the optical beam of the third wavelength in the case of changing the groove depth d of the staircase form of the number of steps S=5. In FIGS. 53A through 53C, the horizontal axis represents groove depth (nm), and the vertical axis represents diffraction efficiency (light intensity). At a position where the horizontal axis is 11650 nm, as shown in FIG. 53A, eff1 is 0.96, and as shown in FIG. 53B, eff2 is 0.81, and as shown in FIG. 53C, eff3 is around 0.4, but the spot is subjected to flaring.

Figure 53:
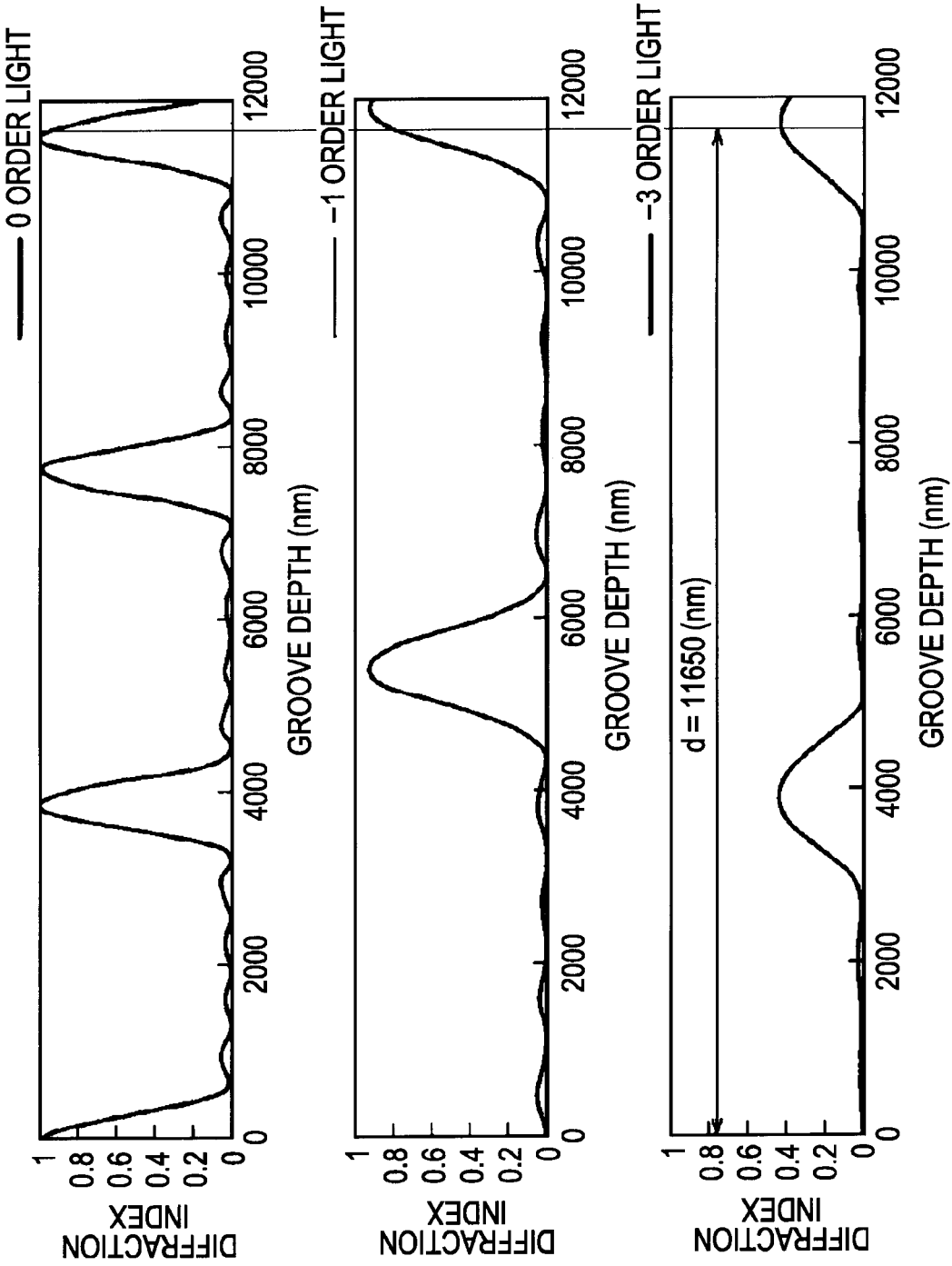
FIGS. 53A through 53C show graphs for calculating the diffraction efficiency of the example 2 of the middle ring zone according to the third embodiment, illustrating the change in the diffraction efficiency of the optical beams of each wavelength as to change in the groove depth d in a case wherein S=∞, and (k1$m$, k2$m$, k3$m$)=(0, −1, −3)
Figure 56:
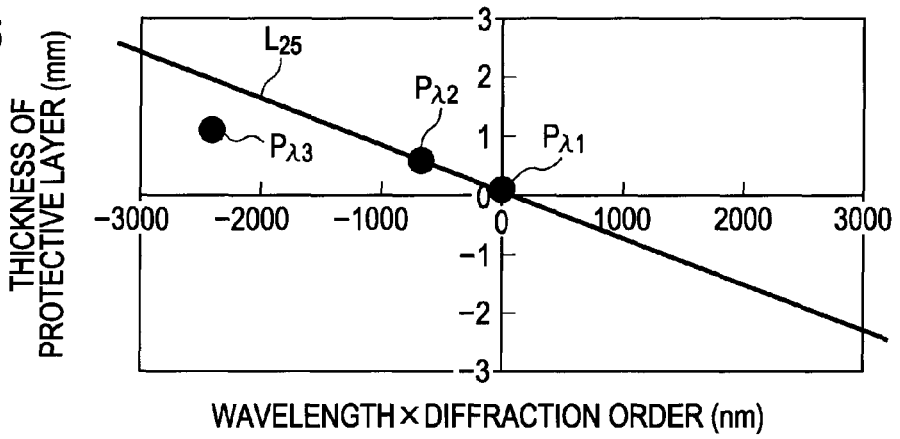
FIG. 56 is a diagram for describing flaring at the middle ring zone in the example 2 of the third embodiment, showing points plotted according to the relation between wavelength×diffraction order and protective layer thickness, and the design line of the object lens, in a case wherein (k1$m$, k2$m$, k3$m$)=(0, −1, −3)

Also, with the middle ring zone in the second embodiment, in the same way as the case of the middle ring zone in the first embodiment described above, an arrangement is made wherein the design line of the object lens is deviated, and flaring is carried out regarding the third wavelength to perform excellent aperture restriction. Specifically, as shown in FIG. 56, the middle ring zone in the second embodiment has the design line indicated by L25 set by plotting the points Pλ1, Pλ2, and Pλ3 at the diffraction orders (k1$m$, k2$m$, k3$m$)=(0, −1, −3). In FIG. 56 the design point Pλ1 of the first wavelength and the design point Pλ2 of the second wavelength are positioned on the design line L25, so the aberration of diffraction light of the diffraction orders k1$m$ and k2$m$ is approximately zero. On the other hand, the plotted point Pλ3 of the third wavelength is significantly deviated from the aberration zero design point, indicating the above-described flaring. Note that in FIG. 56, only k3$m$=−3 is shown plotted, but there is deviation from the design line L25 in the same way for other orders in the third wavelength as well. Consequently, there is uncorrected aberration in the third wavelength, and consequently, the light quantity of the optical beam of the third wavelength which has passed through the middle ring zone, that is not imaged at the signal recording face but input to the third optical disc can be suppressed. As a result, regardless of the diffraction efficiency of the optical beam of the third wavelength as shown in FIG. 53, these optical beams do not contribute to image formation, and accordingly, a suitable aperture restriction (NA=0.45) can be realized.

With the outer ring zone according to the second embodiment, as shown in Table 10, when employing a blazed form (S=∞) with groove depth d=0.8 (μm), with the diffraction order k1$o$=+1 of the optical beam of the first wavelength, the diffraction efficiency is eff1=1.0. Also, with the diffraction order k2$o$=+1 serving as the maximum diffraction efficiency of the optical beam of the second wavelength transmitting this region, the diffraction efficiency eff2 is around 0.6, but this does not contribute to image formation since the spot is subjected to flaring as described above (see FIG. 57). Further, the diffraction efficiency eff3 of the diffraction order k3$o$=+1 serving as the maximum diffraction efficiency of the optical beam of the third wavelength transmitting this region is around 0.4, but this does not contribute to image formation since the spot is subjected to flaring as described above.

Next, description will be made further specifically regarding the outer ring zone according to the second embodiment with reference to FIGS. 54A through 54C. FIG. 54A is a diagram illustrating change in the diffraction efficiency of +1st order diffracted light of the optical beam of the first wavelength in the case of changing the groove depth d of the blazed form of the number of steps S=∞, FIG. 54B is a diagram illustrating change in the diffraction efficiency of +1st order diffracted light of the optical beam of the second wavelength in the case of changing the groove depth d of the blazed form of the number of steps S=∞ . . . and also illustrating change in diffraction efficiency of zero order light which is unwanted light, and FIG. 54C is a diagram illustrating change in the diffraction efficiency of +1st order diffracted light of the optical beam of the third wavelength in the case of changing the groove depth d of the blazed form of the number of steps S=∞ . . . and also illustrating change in diffraction efficiency of zero order light which is unwanted light. In FIGS. 54A through 54C, the horizontal axis represents groove depth (nm), and the vertical axis represents diffraction efficiency (light intensity). At a position where the horizontal axis is 800 nm, as shown in FIG. 54A, eff1 is 1.0, and as shown in FIG. 54B, eff2 is around 0.6, but the spot is subjected to flaring, and as shown in FIG. 54C, eff3 is around 0.4, but the spot is subjected to flaring.

Figure 54:
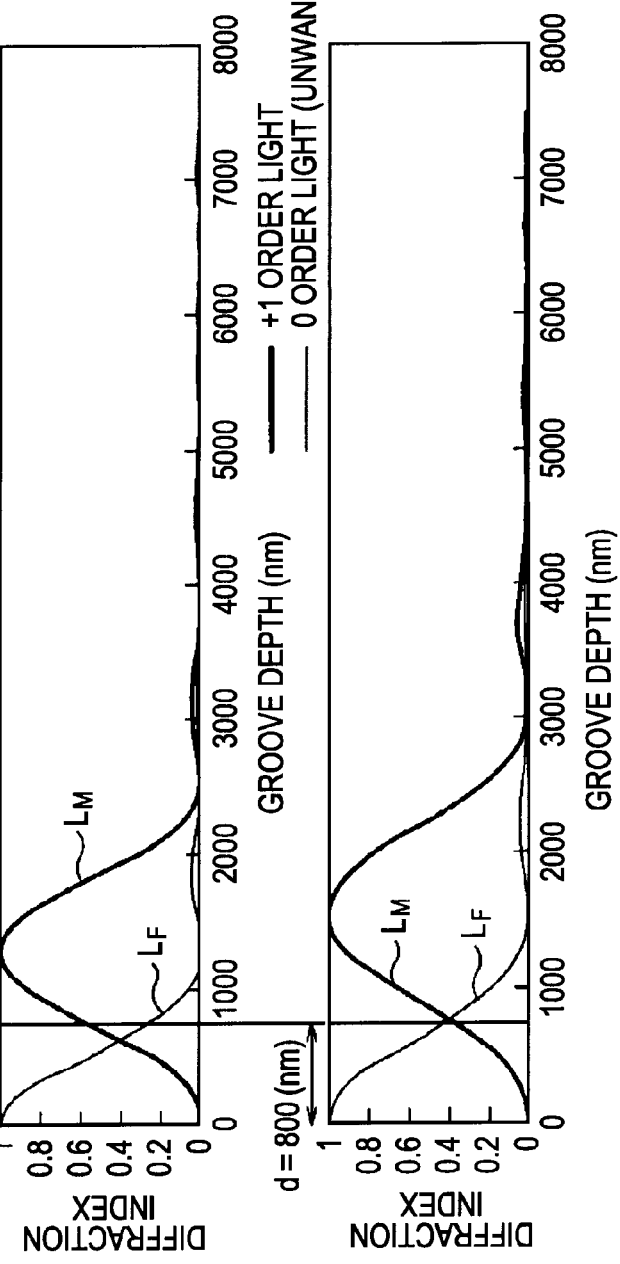
FIGS. 54A through 54C show graphs for calculating the diffraction efficiency of the example 2 of the outer ring zone according to the third embodiment, illustrating the change in the diffraction efficiency of the optical beams of each wavelength as to change in the groove depth d in a case wherein S=∞, and (k1$o$, k2$o$, k3$o$)=(+1, +1, +1)
Figure 57:
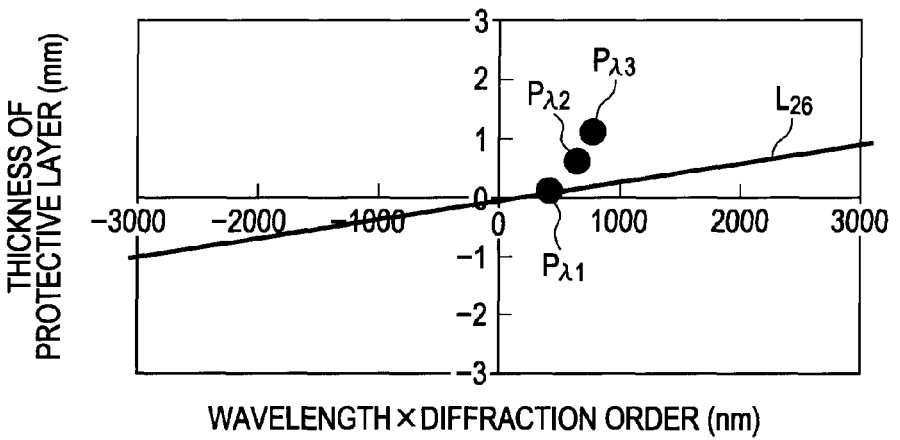
FIG. 57 is a diagram for describing flaring at the outer ring zone in the example 2 of the third embodiment, showing points plotted according to the relation between wavelength×diffraction order and protective layer thickness, and the design line of the object lens, in a case wherein (k1$o$, k2$o$, k3$o$)=(+1, +1, +1)

Also, with the outer ring zone in the second embodiment described above, in the same way as the case of the outer ring zone in the first embodiment described above, an arrangement is made wherein the design line of the object lens is deviated, and flaring is carried out regarding the second and third wavelengths to perform excellent aperture restriction. Specifically, as shown in FIG. 57, the outer ring zone in the second embodiment has the design line indicated by L26 set by plotting the points Pλ1, Pλ2, and Pλ3 at the respective diffraction orders (k1$o$, k2$o$, k3$o$)=(+1, +1, +1). In FIG. 57 the design point Pλ1 of the first wavelength is positioned on the design line L26, so the aberration of diffraction light of the diffraction order k1$o$ is approximately zero. On the other hand, the plotted points Pλ2 and Pλ3 of the second and third wavelengths are significantly deviated from the aberration zero design point, indicating the above-described flaring. Note that in FIG. 57, only (k2o, k3o)=(+1, +1) is shown plotted, but there is deviation from the design line L26 in the same way for other orders, such as zero order light for example, in the second and third wavelengths as well. Consequently, there is uncorrected aberration in the second and third wavelengths, and consequently, the light quantity of the optical beams of the second and third wavelengths which have passed through the outer ring zone, that is not imaged at the signal recording face but input to the second and third optical discs can be suppressed. As a result, regardless of the diffraction efficiency of the optical beam of the second wavelength as shown in FIG. 54, this optical beam does not contribute to image formation, and accordingly, a suitable aperture restriction (NA=0.6) can be realized. Also, regardless of the diffraction efficiency of the optical beam of the third wavelength as shown in FIG. 54, this optical beam does not contribute to image formation, and accordingly, a suitable aperture restriction (NA=0.45) can be realized.

The diffraction units according to the first and second embodiments having such an inner ring zone, middle ring zone, and outer ring zone, the relation of the above-mentioned Expression (5B) is satisfied, diffraction efficiency as to the respective wavelengths is excellent for all ring zones, whereby sufficient efficiency can be obtained, and it can be confirmed that the problem of unwanted light is eliminated. Also, as described above, the inner ring zone is formed in a step form (staircase form), and the outer ring zone is formed in a blazed form, which is an advantageous configuration on manufacturing as well.

Next, the first and second embodiments are confirmed from the perspective of operating distance and focal distance. Each wavelength of the first and second embodiments shown in Tables 9 and 10, and the optical properties as to the corresponding optical disc are shown in the following Tables 11 and 12. Note that Table 11 corresponds to the first embodiment, and Table 12 corresponds to the second embodiment. Also, Tables 11 and 12 show "focal distance", "NA", "effective diameter", "magnification", and "operating distance" of the object lens, as to the optical beam of each wavelength and the corresponding optical disc, "thickness of protective layer" of the optical disc, and "axial thickness" of the object lens.

TABLE 11

Optical properties as to each disc and corresponding each wavelength, of First Embodiment

|  | First optical disc $\lambda 1$ | Second optical disc $\lambda 2$ | Third optical disc $\lambda 3$ |
|---|---|---|---|
| Focal distance [mm] | 2.2 | 2.28 | 2.30 |
| NA | 0.85 | 0.60 | 0.45 |
| Effective diameter [mm] | 3.74 | 2.72 | 2.07 |
| Magnification | 0 | $-1/60$ | $-1/60$ |
| Thickness of protective layer [mm] | 0.0875 | 0.6 | 1.1 |
| Operating distance [mm] | 0.92 | 0.70 | 0.41 |
| Axial thickness [mm] |  | 2.13 |  |

TABLE 12

Optical properties as to each disc and corresponding each wavelength, of Second Embodiment

|  | First optical disc $\lambda 1$ | Second optical disc $\lambda 2$ | Third optical disc $\lambda 3$ |
|---|---|---|---|
| Focal distance [mm] | 1.92 | 2.05 | 2.19 |
| NA | 0.85 | 0.60 | 0.45 |
| Effective diameter [mm] | 3.26 | 2.46 | 2.00 |
| Magnification | 0 | $-1/50$ | $-1/60$ |
| Thickness of protective layer [mm] | 0.0875 | 0.6 | 1.1 |
| Operating distance [mm] | 0.62 | 0.52 | 0.40 |
| Axial thickness [mm] |  | 2.20 |  |

As shown in Tables 11 and 12, with the diffraction units according to the first and second embodiments, "focal distance" as to the first wavelength can be suppressed to equal to or smaller than 2.2, and "operating distance" in the case of employing the optical beam of the third wavelength can be set to equal to or greater than 0.40, which are required as described above.

As described above, with the diffraction units according to the first and second embodiments, the configurations advantageous to manufacturing can be provided, the problem of unwanted light can be eliminated, the conditions for the focal distance and operating distance of the object lens as to each wavelength can be set desirably, and predetermined aperture restriction and desired diffraction efficiency can be obtained as to each wavelength.

Note that description has been made above assuming that there are provided the first diffraction region 251 where the diffraction structure of the staircase form is formed wherein staircase structures including multiple step portions as inner ring zones are consecutively formed in the radial direction of the ring zones, the second diffraction regions 252 and 252B where the diffraction structure of the staircase form or blazed form is formed wherein staircase structures including multiple step portions as middle ring zones are consecutively formed in the radial direction of the ring zones, and the third diffraction region 253 where the diffraction structure of the blazed form is formed as an outer ring zone, but the present invention is not restricted to this, so the inner ring zones and middle ring zones may be configured of the diffraction structure which is an non-cyclical structure as long as this structure satisfies the above-mentioned relation of a diffraction order to be selected.

For example, the first diffraction region may be configured such that a non-cyclical diffraction structure is formed, wherein an non-cyclical structure for providing desired phase difference is formed in the radial direction of the ring zones as described above, and the second diffraction region may be configured such that a non-cyclical diffraction structure is formed, wherein an non-cyclical structure for providing desired phase difference is formed in the radial direction of the ring zones as described above. In the case of providing a non-cyclical diffraction structure in the first and second diffraction regions, flexibility of design is extended, more desirable diffraction efficiency can be obtained, which is an advantageous structure from the perspective of the temperature properties of diffraction efficiency.

Also, as a modification of the above-mentioned first through third diffraction regions 251, 252, and 253, the third diffraction region may be formed as a so-called aspherical continuous face. Specifically, an arrangement may be made wherein predetermined refractive power is applied to the optical beam of the first wavelength by the refractive power of a lens curved face instead of such a third diffraction region 253 such as described above to condense the optical beam on the corresponding optical disc in a state wherein there is no spherical aberration, and the optical beams of the second and third wavelengths are subjected to aperture restriction suitably. In other words, the diffraction unit may be configured as a diffraction unit including the first diffraction region 251 where the diffraction structure of the staircase form is formed wherein staircase structures, formed on a region corresponding to the numerical aperture of the third optical disc, including multiple step portions as inner ring zones are consecutively formed in the radial direction of the ring zones, the second diffraction regions 252 and 252B where the diffraction structure of the staircase form or blazed form is formed wherein staircase structures, formed on a region corresponding to the numerical aperture of the second optical disc, including multiple step portions as middle ring zones are consecutively formed in the radial direction of the ring zones, and a region formed on a region corresponding to the numeric aperture of the first optical disc wherein the optical beam of the first wavelength transmitted therethrough is condensed on the signal recording face of the corresponding first optical disc, and the optical beams of the second and third wavelengths transmitted therethrough are not condensed on the signal recording faces of the corresponding second and third optical discs.

With the diffraction unit 250 including the first through third diffraction regions 251, 252, and 253 thus configured, the optical beams of the first through third wavelengths transmitted through the first diffraction region 251 can be diffracted by diffraction power so as to generate a divergent angle state wherein no spherical aberration occurs on the signal recording face of the corresponding type of optical disc by the refractive power of the object lens 234 which is common to the three wavelengths, a suitable spot can be condensed on the signal recording face of the corresponding optical disc by the refractive power of the object lens 234, the optical beams of the first and second wavelengths transmitted through the second diffraction region 252 can be diffracted by diffraction power so as to generate a divergent angle state wherein no spherical aberration occurs on the signal recording face of the corresponding type of optical disc by the refractive power of the common object lens, a suitable spot can be condensed on the signal recording face of the corresponding optical disc by the refractive power of the object lens 234, the optical beam of the first wavelength transmitted through the third diffraction region 253 can be diffracted by diffraction power so as to generate a divergent angle state wherein no spherical aberration occurs on the signal recording face of the corresponding type of optical disc by the refractive power of the object lens 234, and a suitable spot can be condensed on the signal recording face of the corresponding optical disc by the refractive power of the object lens 234. Here, "a divergent angle state wherein no spherical aberration occurs" includes a diverged state, converged state, and parallel light state, and means a state wherein spherical aberration is corrected by the refractive power of a lens curved face.

That is to say, with the diffraction unit 250 provided on one face of the object lens 234 disposed on the optical path between the first through third emitting units of the optical system the optical pickup 203 and the signal recording face, diffraction power can be applied to optical beams of respective wavelengths passing through the respective regions (first through third diffraction regions 251, 252, and 253) so as to be in a state wherein spherical aberration occurring at the signal recording face is reduced, so spherical aberration occurring at the signal recording face when condensing optical beams of the first through third wavelengths on the signal recording face of the respective corresponding optical discs using the common object lens 234 in the optical pickup 203 can be minimized, which is to say that three-wavelength compatibility of the optical pickup 203 using three types of wavelengths for three types of optical discs and the common object lens 234 can be realized, wherein information signals can be recorded to and/or played from respective optical discs.

Also, the object lens 234 having the diffraction unit 250 configured of the first through third diffraction regions 251, 252, and 253 as described above is configured having the relation $k1i \geqq k2i > k3i$ for the diffraction orders ($k1i$, $k2i$, $k3i$) selected by the first diffraction region 251 serving as the inner ring zone so as to be dominant and condensed on the signal recording face of the corresponding optical disc via the object lens 234, so making diffracted light of an order regarding which spherical aberration can be suitably reduced dominant, enables a suitable spot to be condensed on the signal recording face of the optical discs corresponding to the optical beams of each wavelength, and realize a suitable state for the operating distance for using the optical beams of each wavelength and a focal distance for each wavelength, which is to say in the case of using the third wavelength $\lambda 3$ the focal distance can be prevented from becoming too long as to the first wavelength $\lambda 1$ in order to ensure operating distance thereof, thereby preventing problems such as the lens diameter of the object lens being large, the overall size of the optical pickup being large, and so forth. Accordingly, the object lens 234 having the diffraction unit 250 realizes condensing optical beams of each wavelength to form a suitable spot on the signal recording face of the corresponding optical discs with high light use efficiency without increasing the size of the optical parts and optical pickup by ensuring a suitable operating distance and focal distance, which is to say that three-wavelength compatibility of the optical pickup using three types of wavelengths for three types of optical discs and the common object lens 234 can be realized, wherein information signals can be suitably recorded to and/or played from respective optical discs.

Also, the object lens 234 having the diffraction unit 250 such as described above is configured such that, of the diffraction orders selected by the first diffraction region 251 serving as the inner ring zone so as to be dominant and condensed on the signal recording face of the corresponding optical disc via the object lens, $k1i$ and $k3i$ are (−2, −3), (−1, −2), (−1, −3), (0, −2), (0, −3), (1, −2), (1, −3), (2, −1), (2, −2), (2, −3), (3, 0), (3, −1), (3, −2), or (3, −3), so making diffracted light of an order regarding which spherical aberration can be suitably reduced enables a suitable spot to be condensed on the signal recording face of the optical discs corresponding to the optical beams of each wavelength, and realize a suitable state for the operating distance for using the optical beams of each wavelength and a focal distance for each wavelength, which is to say in the case of using the third wavelength $\lambda 3$ the focal distance can be prevented from becoming too long as to the first wavelength $\lambda 1$ in order to ensure operating distance thereof, thereby preventing problems such as the lens diameter of the object lens being large, the overall size of the optical pickup being large, and so forth, and additionally, as described above with regard to the third perspective for configuring the inner ring zone, the configuration is advantageous from a manufacturing viewpoint in that the necessary depth of the grooves is prevented from becoming too deep, whereby the manufacturing process can be simplified, and also deterioration of forming precision can be prevented. Accordingly, the object lens 234 having the diffraction unit 250 can realize condensing optical beams of each wavelength on the signal recording face of the corresponding optical discs to form a suitable spot with high light use efficiency without increasing the size of the optical parts and optical pickup by ensuring a suitable operating distance and focal distance, and also simplifies manufacturing process and prevents deterioration of forming precision.

Also, the object lens 234 having the diffraction unit 250 such as described above is configured such that the first diffraction region 251 has formed a staircase form diffraction structure wherein a staircase structure with multiple steps continue in the radial direction of the ring zones, and the third diffraction region 253 has a blazed diffraction structure formed. The object lens 234 having the diffraction unit 250 has the inner ring zone, which needs to provide the first through third wavelengths with a diffraction power so as to be in a predetermined state, and also have high diffraction efficiency, formed in a stepped shape, thereby suppressing the quantity of diffracted light of unwanted light, preventing deterioration of jittering and the like due to unwanted light being received at the photosensor, and also, even in cases of a certain amount of diffracted light of unwanted light occurring, unwanted light being received at the time of focusing leading to deterioration of jittering and the like can be prevented by making the diffraction order of the unwanted light to be a deviated order with great diffraction angle difference, that is other than an adjacent diffraction order of the focus light. Also, the object lens 234 having the diffraction unit 250 has a configuration has the outer ring zone provided integrally on one face of the object lens and also provided on the outermost side thereof, formed in a blazed form, which is an advantageous structure in the case of forming a diffraction structure at portions having an extremely steep lens curved surface, such as with a three-wavelength-compatible lens, whereby manufacturing can be facilitated and deterioration in forming precision can be prevented.

Also, the object lens 234 having the diffraction unit 250 such as described above is configured such that the optical beam of the first wavelength at the time of input to the incident side of the object lens 234 is an infinite optical system, i.e., generally parallel light, and the optical beams of the second and third wavelengths are input as a finite optical system, i.e., as divergent light, whereby, as described with reference to FIGS. 41, 42, and 55, optical beams passing through the first diffraction region 251 which is the inner ring zone where there is need to take into consideration the possibility of spherical aberration correction can be suitably condensed on the signal recording face of the optical disc in a state of high diffraction efficiency and no spherical aberration as predetermined diffraction efficiency as to the selected diffraction orders k1$i$, k2$i$, and k3$i$ for the three wavelengths. Further, due to the configuration wherein the optical beam of the first wavelength at the time of input to the incident side of the object lens is generally parallel light and the optical beams of the second and third wavelengths are input as divergent light, the object lens 234 having the diffraction unit 250 has improved freedom for flaring at the middle ring zone and outer ring zone as described with reference to FIGS. 48, 49, 56, and 57, and by improving freedom and benefiting from the advantages of flaring, the freedom of diffraction structure selection of the middle ring zone and outer ring zone is improved, i.e., higher efficiency can be obtained, and also the stricture itself is simplified, further enabling deterioration in formation precision thereof to be prevented. Thus, due to the configuration wherein the optical beam of the first wavelength at the time of input to the incident side of the object lens 234 is generally parallel light and the optical beams of the second and third wavelengths are input as divergent light, the object lens 234 having the diffraction unit 250 can realize suitably condensing light of each wavelength at the signal recording face of the corresponding optical disc in a state of high diffraction efficiency and no spherical aberration, with a simpler configuration.

Note that in the event that the diffraction unit 250 is to be provided to a diffraction optical element 235B separate from the object lens as described later (see FIG. 58B), the same advantages can be had with a configuration wherein, of the object lens and the diffraction optical element to which the diffraction unit has been provided, the element positioned at the side closer to the first through third emitting units is configured such that the optical beam of the first wavelength at the time of input to the incident side thereof is generally parallel light and the optical beams of the second and third wavelengths are input as divergent light.

Further, the object lens 234 having the diffraction unit 250 such as described above is configured such that the diffraction orders (k1$i$, k2$i$, k3$i$) of light selected by the first diffraction region 251 serving as the inner ring zone and made dominant, and condensed onto the signal recording face of the corresponding optical disc via the object lens 234, are (1, −1, −2), (0, −1, −2), (1, −2, −3) or (0, −2, −3), whereby spherical aberration at each wavelength described with respect to the first perspective can be reduced when configuring the inner ring zone, the operating distance and focal distance at each wavelength described with respect to the second perspective can be made optimal, a configuration which is advantageous from the aspect of manufacturing as described with respect to the third and fourth perspectives can be realized, and further, the diffraction efficiency of the diffraction orders selected for each wavelength can be set sufficiently high, and also diffraction efficiency of unwanted light can be suppressed due to enabling configuration with the stepped form, so adverse effects of unwanted light can be maximally suppressed since the diffraction efficiency of the adjacent diffraction order can be suppressed to a low level. Accordingly, the object lens 234 having the diffraction unit 250 realizes condensing light for a suitable spot on the signal recording face of corresponding optical discs with high light use efficiency, using a more advantageous configuration taking into consideration a more specific configuration and the advantages of reduction in size and of the configuration.

Further, with the object lens 234 having the diffraction unit 250 such as described above, when the diffraction orders (k1$i$, k2$i$, k3$i$) of light selected by the first diffraction region 251 serving as the inner ring zone are as above, the diffraction orders (k1$m$, k2$m$) of light selected by the second diffraction region 252 serving as the middle ring zone and made dominant, and condensed onto the signal recording face of the corresponding optical disc via the object lens 234, are (+1, +1), (−1, −1), (0, +2), (0, −2), (0, +1), (0, −1), (+1, 0), or (−1, 0), whereby a configuration can be realized in a staircase form or non-cyclical form diffraction structure which is advantageous regarding diffraction efficiency for example, whereby the functions of the inner ring zone and middle ring zone can be each sufficiently manifested. That is to say, the object lens 234 having the second diffraction region 252 configured thus is of a configuration wherein, at the time of configuring the middle ring zone in particular, matching the image point position with the diffraction functions at the inner ring zone and middle ring zone such as described with respect to the second perspective is easier, so optical beams of the first and second wavelengths input to the middle ring zone can be placed in a state where the relation with the optical beam of which aberration has been reduced as described above by the inner ring zone is optimal, and also spherical aberration can be sufficiently reduced. Further, with the object lens 234 having the second diffraction region 252, high diffraction efficiency can be obtained regarding the first and second wavelengths in a state of spherical aberration having been corrected, and also suitable aperture restriction can be performed regarding the third wavelength, and also the configuration is advantageous from a manufacturing viewpoint. Accordingly, the object lens 234 having the diffraction unit 250 realizes condensing a suitable spot on the signal recording face of the corresponding optical disc with high light use efficiency, with a more advantageous configuration taking into consideration advantages of configuration and so forth.

Further, with the object lens 234 having the diffraction unit 250 such as described above, when the diffraction orders (k1$i$, k2$i$, k3$i$) of light selected by the first diffraction region 251 serving as the inner ring zone are as above, the diffraction orders (k1$m$, k2$m$) of light selected by the second diffraction region 252 serving as the middle ring zone and made dominant, and condensed onto the signal recording face of the corresponding optical disc via the object lens 234, are (+3, +2), (−3, −2), (+2, +1), or (−2, −1), whereby a configuration can be realized in a blazed form or non-cyclical form diffraction structure which is advantageous regarding diffraction efficiency for example, whereby the functions of the inner ring zone and middle ring zone can be each sufficiently manifested. That is to say, the object lens 234 having the second diffraction region 252 configured thus is of a configuration wherein, at the time of configuring the middle ring zone in particular, matching the image point position with the diffraction functions at the inner ring zone and middle ring zone such as described with respect to the second perspective is easier, so optical beams of the first and second wavelengths input to the middle ring zone can be placed in a state where the relation with the optical beam of which aberration has been reduced by the inner ring zone as described above is optimal, and also spherical aberration can be sufficiently reduced. Further, with the object lens 234 having the second diffraction region 252, high diffraction efficiency can be obtained regarding the first and second wavelengths in a state of spherical aberration having been corrected, and also suitable aperture restriction can be performed regarding the third wavelength, and also the configuration is advantageous from a manufacturing viewpoint. Accordingly, the object lens 234 having the diffraction unit 250 realizes condensing a suitable spot on the signal recording face of the corresponding optical disc with high light use efficiency, with a more advantageous configuration taking into consideration advantages of configuration and so forth.

Further, with the object lens 234 having the diffraction unit 250 such as described above, when the diffraction orders (k1$i$, k2$i$, k3$i$) of light selected by the first diffraction region 251 serving as the inner ring zone are as above, the diffraction orders (k1$m$, k2$m$) of light selected by the second diffraction region 252 serving as the middle ring zone and made dominant, and condensed onto the signal recording face of the corresponding optical disc via the object lens 234, are (+1, −1), or (−1, +1), whereby a configuration can be realized in a staircase form or non-cyclical form diffraction structure which is advantageous regarding diffraction efficiency for example, and also (k1$m$, k2$m$) are (+1, +1), or (−1, −1), whereby a configuration can be realized in a blazed form or non-cyclical form diffraction structure which is advantageous regarding diffraction efficiency for example, whereby the functions of the inner ring zone and middle ring zone can be each sufficiently manifested. That is to say, the object lens 234 having the second diffraction region 252 configured thus is of a configuration wherein, due to being used along with a configuration wherein the effects of unwanted light are reduced by a technique such as setting the return power or the optical pickup optical system higher, at the time of configuring the middle ring zone in particular, matching the image point position with the diffraction functions at the inner ring zone and middle ring zone such as described with respect to the second perspective is easier, so optical beams of the first and second wavelengths input to the middle ring zone can be placed in a state where the relation with the optical beam of which aberration has been reduced by the inner ring zone as described above is optimal, and also spherical aberration can be sufficiently reduced. Further, with the object lens 234 having the second diffraction region 252, high diffraction efficiency can be obtained regarding the first and second wavelengths in a state of spherical aberration having been corrected, and also suitable aperture restriction can be performed regarding the third wavelength, and also the configuration is advantageous from a manufacturing viewpoint. Accordingly, the object lens 234 having the diffraction unit 250 realizes condensing a suitable spot on the signal recording face of the corresponding optical disc with high light use efficiency, with a more advantageous configuration taking into consideration advantages of configuration and so forth.

Also, the diffraction unit 250 having the first through third diffraction regions 251, 252, and 253 is configured such that the optical beam of the third wavelength passing through the second and third diffraction regions 252 and 253 results in the diffracted light of a diffraction order output with maximum diffraction efficiency and a predetermined diffraction efficiency being flared and the imaging position is shifted from the signal recording face, thereby reducing the diffraction efficiency of the diffracted light of the diffraction order, whereby, with regard to the optical beam of the third wavelength, only the portion of the optical beam which has passed through the first diffraction region 251 is condensed on the signal recording face of the optical disc by the object lens 234, and the first diffraction region 251 is formed to a size such that the optical beam of the third wavelength passing through this region is shaped to have a size of a predetermined numerical aperture, whereby aperture restriction can be performed regarding the optical beam of the third wavelength so as to have a numerical aperture of around 0.45, for example.

Also, the diffraction unit 250 is configured such that that the optical beam of the second wavelength passing through the third diffraction regions 253 results in the diffracted light of a diffraction order output with maximum diffraction efficiency and a predetermined diffraction efficiency being flared and the imaging position is shifted from the signal recording face, thereby reducing the diffraction efficiency of the diffracted light of the diffraction order, whereby, with regard to the optical beam of the second wavelength, only the portion of the optical beam which has passed through the first and second diffraction regions 251 and 252 is condensed on the signal recording face of the optical disc by the object lens 234, and the first and second diffraction regions 251 and 252 are formed to a size such that the optical beam of the second wavelength passing through this region is shaped to have a size of a predetermined numerical aperture, whereby aperture restriction can be performed regarding the optical beam of the second wavelength so as to have a numerical aperture of around 0.60, for example.

Also, the diffraction unit 250 performs places the optical beam of the first wavelength passing outside of the third diffraction region 253 in a state so as to not be suitably condensed on the signal recording face of the corresponding type of optical disc via the object lens 234, or shields the optical beam of the first wavelength passing outside of the third diffraction region 253, whereby, with regard to the optical beam of the first wavelength, only the optical beam portion which has passed through the first through third diffraction regions 251, 252, and 253 is condensed on the signal recording face of the optical disc via the object lens 234, and also, the first through third diffraction regions 251, 252, and 253 are formed to a size which is the predetermined numerical aperture of the first wavelength optical beam passing through this region, whereby aperture restriction can be performed regarding the optical beam of the first wavelength such that NA=around 0.85, for example.

Thus, the diffraction unit 250 provided on one face of the by the object lens 234 disposed on the optical path as described above not only realizes three-wavelength compatibility, but also enables optical beams of each wavelength to be input to the common object lens 234 in a state wherein aperture restriction is performed with a numerical aperture appropriate for each of the three types of optical discs and optical beams of the first through third wavelengths, thereby not only having functions of aberration correction corresponding to the three wavelengths, but also serving as an aperture restricting unit.

It should be noted that a diffraction unit can be configured by suitably combining the diffraction regions in the above-described embodiments. That is to say, the diffraction order of each wavelength passing through each diffraction region can be selected as appropriate. In the event of changing the diffraction order of each wavelength passing through each diffraction region, an object lens 234 having a lens curve face corresponding to each diffraction order of each wavelength passing through each diffraction region can be used.

Figure 58A:
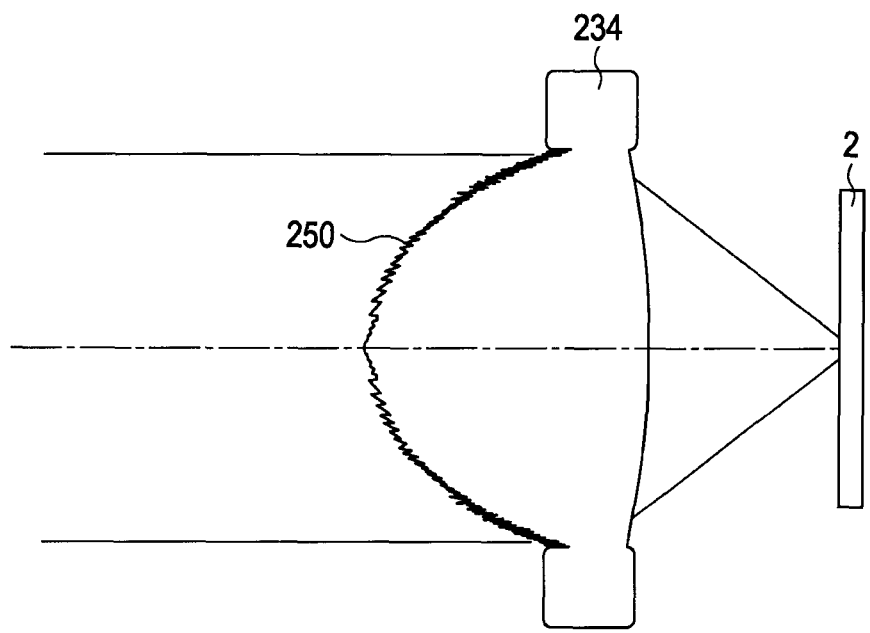
Figure 58B:
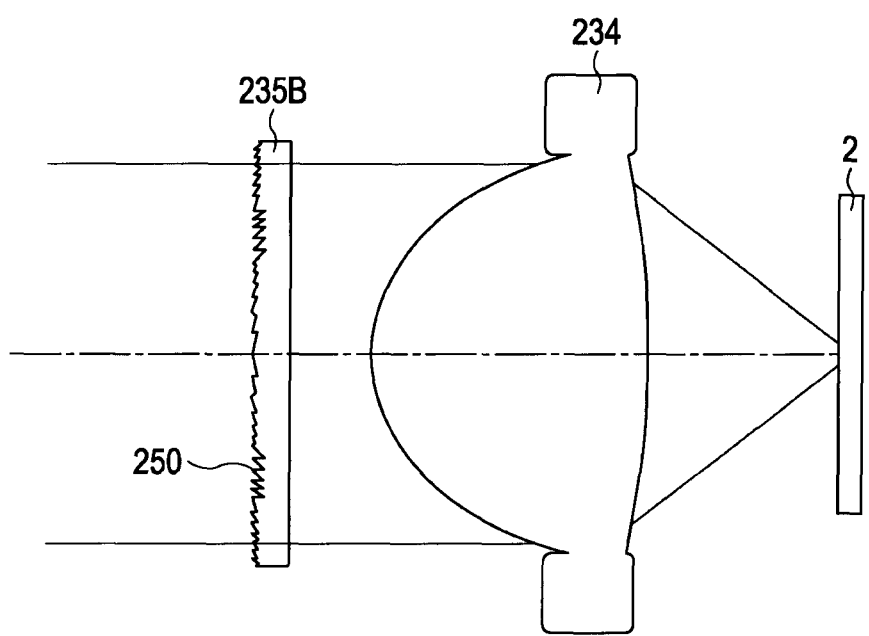

Also, while description has been made above with the diffraction unit 250 configured of the three diffraction regions 251, 252, and 253 formed on the incident side face of the object lens 234, as shown in FIG. 58A, the present invention is not restricted to this arrangement, and may be provided to the output side of the object lens 234. Further, the diffraction unit 250 having the first through third diffraction regions 251, 252, and 253, can be integrally configured on the input or output side of an optical element provided separately from the object lens 234, and as shown in FIG. 58B for example, a condensing optical device may be configured including an object lens 234B which has only a lens curve with the diffraction unit 250 removed therefrom, and a diffraction optical element 235B with the diffraction unit 250 provided on one face thereof and disposed on the optical path shared by the three wavelengths. With the object lens 234 shown in FIG. 58A for example, the planar shape of a diffraction structure required for the functions of diffractive power is combined with a reference face at the incident side required for the lens to be able to have functions of refractive power, conversely, in the case shown in FIG. 58B wherein a separate diffraction optical element 235B is provided, the object lens 234B itself has the planar shape of a diffraction structure required for the functions of refractive power, and the diffraction optical element 235B has formed on one face thereof a diffraction structure required for the functions of diffractive power. The object lens 234B and diffraction optical element 235B shown in FIG. 58B function as a condensing optical device in the same way as the above-described object lens 234, so as to reduce aberration and the like and also realize three-wavelength compatibility of the optical pickup due to being used as the optical pickup and manifests advantages of enabling further reduction in optical parts and also simplification of configuration and reduction in configuration size, high productivity, and low costs, and the diffraction structure can be made more complex as compared with a case of integrally providing on the object lens 234. On the other hand, the arrangement shown in FIG. 58A described above functioning as a condensing optical device which suitably condenses the optical beams of three different wavelengths on the signal recording face of respectively corresponding optical discs such that spherical aberration does not occur, with the single element (object lens 234) alone configured of the diffraction unit 250 integrally provided to the object lens 234, enables further reduction in optical parts and reduction in size of the configuration. Note that the above-described diffraction unit 250 sufficiently manifests the advantages thereof with the diffraction structure for aberration correction to realize three-wavelength compatibility being provided on a single face that has been difficult with the related art, which enables such a refractive element to be integrally formed with the object lens 234, further enabling directly forming a diffraction face on a plastic lens, and forming the object lens 234 with which the diffraction unit 250 has been integrated of a plastic material further realizes improved production and lower costs.

The collimator lens 242 provided between the object lens 234 and the third beam splitter 238 converts the divergent angle of each of the first through third wavelength optical beams of which the optical paths have been synthesized at the second beam splitter 237 and passed through the third beam splitter 238, and outputs to the quarter-wave plate 243 and object lens 234 side, in a generally parallel light state, for example. The arrangement wherein the collimator lens 242 inputs the optical beams of the first and second wavelengths into the above-described object lens 234 with the divergent angle thereof in the state of generally parallel light, and also inputs the optical beam of the third wavelength into the object lens 234 in a state which is slightly diffused or converged as to parallel light (hereinafter also referred to as "finite system state") enables further reduction of spherical aberration at the time of condensing the second and third wavelength optical beams on the signal recording face of the second and third optical discs via object lens 234, realizing three-wavelength compatibility with even less aberration occurring. This point has been described above with reference to FIGS. 41 and 42. While an arrangement has been described here wherein the optical beam of the third wavelength is input to the object lens 234 in a state of a predetermined divergent angle, due to the positional relation between the second light source 232 having the second emitting unit for emitting the second wavelength optical beam and the collimator lens 242, and/or the positional relation between the third light source 233 having the third emitting unit for emitting the third wavelength optical beam and the collimator lens 242, in the event of positioning multiple emitting units at a common light source for example, this may be realized by providing an element which converts only the divergent angle of the optical beam of the second and/or third wavelengths, or by inputting into the object lens 234 in a predetermined divergent angle state by providing a mechanism to drive the collimator lens 242 or the like. Also, either the optical beams of the second wavelength, or the optical beams of the second and third wavelengths, may be input to the object lens 234 in the finite system state in accordance with the situation, thereby further reducing aberration. Also, optical beams of the second and third wavelengths may be input in the finite system state and in a diffused state, thereby realizing adjustment of return power and even more excellent optical system compatibility may be achieved by setting the focus capture range and so forth to a desired state matching the format by adjusting the return power.

The multi-lens 246 is, for example, a wavelength-selective multi-lens, whereby the returning first through third wavelength optical beams separated from the outgoing path optical beams by being reflected at the third beam splitter 238, after having been reflected off of the signal recording face of the respective optical disc, and passed through the object lens 234, redirecting mirror 244, quarter-wave plate 243, and collimator lens 242, is appropriately condensed on the photoreception face of the photodetector or the like of the photosensor 245. At this time, the multi-lens 246 provides the return optical beam with astigmatism for detection of focus error signals or the like.

The photosensor 245 receives the return optical beam condensed at the multi-lens 246, and detects, along with information signals, various types of detection signals such as focus error signals, tracking error signals, and so forth.

With the optical pickup 203 configured as described above, the object lens 234 is driven so as to be displaced based on the focus error signals and tracking error signals obtained by the photosensor 245, whereby the object lens 234 is moved to a focal position as to the signal recording face of the optical disc 2, the optical beam is focused onto the signal recording face of the optical disc 2, and information is recorded to or played from the optical disc 2.

The optical pickup 203 is provided on one face of the object lens 234, can provide optical beams of each wavelength with a diffraction efficiency and diffraction angle suitable for each region due to the diffraction unit 250 having the first through third diffraction regions 251, 252, and 253, can sufficiently reduce spherical aberration at the signal recording face of the three types of first through third optical discs 11, 12, and 13, of which the format for the thickness of the protective layer or the like differs, and enables reading and writing of signals to and from the multiple types of optical discs 11, 12, and 13, using optical beams of three different wavelengths.

Also, the object lens 234 having the diffraction unit 250 shown in FIG. 58A, and the diffraction optical element 235B having the diffraction unit 250 and object lens 234B described with reference to FIG. 58B, making up the above-described optical pickup 203, can each function as a condensing optical device for condensing input optical beams at predetermined positions. In the event of using this condensing optical device for an optical pickup which performs recording and/or playing of information signals by irradiating optical beams onto three different types of optical discs, the diffraction unit 250 provided on one face of the object lens 234 or the diffraction optical element 235B enables the condensing optical device to appropriately condense corresponding optical beams onto the signal recording face of the three types of optical discs in a state with spherical aberration sufficiently reduced, meaning that three-wavelength compatibility of the optical pickup using the object lens 234 or the object lens 234B common to the three wavelengths can be realized.

Also, while the diffraction optical element 235B having the diffraction unit 250 and object lens 234B described with reference to FIG. 58B for example may be provided to an actuator such as an object lens driving mechanism or the like for driving the object lens 234B such that the diffraction optical element 235B having the diffraction unit 250 and the object lens 234B are integral, this may be configured as a condensing optical unit wherein the diffraction optical element 235B and object lens 234B are formed as an integrated unit, in order to improve precision of assembly to the lens holder of the actuator, and facilitate assembly work. For example, a condensing optical unit can be configured by using spacers or the like to fix the diffraction optical element 235B and object lens 234B to the holder while setting the positioning, spacing, and optical axis, so as to be integrally formed. Due to being integrally assembled to the object lens driving mechanism as described above, the diffraction optical element 235B and object lens 234B can appropriately condense the first through third wavelength optical beams on the signal recording face of the respective optical discs with spherical aberration reduced, even at the time of field shift such as displacement in the tracking direction, and so forth, for example.

Next, the optical paths of the optical beams emitted from the first through third light sources 231, 232, and 233 of the optical pickup 203 configured as described above, will be described with reference to FIG. 37. First, the optical path at the time of emitting the optical beam of the first wavelength as to the first optical disc 11 and performing reading or writing of information will be described.

The disc type determination unit 22 which has determined that the type of the optical disc 2 is the first optical disc 11 causes the optical beam of the first wavelength to be emitted from the first emitting unit of the first light source 231.

The optical beam of the first wavelength is split into three beams by the first grating 239, for detection of tracking error signals and so forth, and is input to the second beam splitter 237. The optical beam of the first wavelength which has been input to the second beam splitter 237 is reflected at a mirror face 237a thereof, and is output to the third beam splitter 238 side.

The optical beam of the first wavelength which is input to the third beam splitter 238 is transmitted through a mirror face 238a thereof, output to the collimator lens 242 side, where the divergent angle is converted by the collimator lens 242 so as to be generally parallel light, provided with a predetermined phase difference at the quarter-wave plate 243, reflected off of the redirecting mirror 244, and output to the object lens 234 side.

The optical beam of the first wavelength which is input to the object lens 234 is diffracted with the optical beam which has passed through each region thereof having a predetermined diffraction order dominant therein as described above, due to the first through third diffraction regions 251, 252, and 253 of the diffraction unit 250 provided on the incident side face thereof, and also suitably condensed on the signal recording face of the first optical disc 11 due to the refractive power of the lens curved face of the object lens 234. At this time, the optical beam of the first wavelength is provided with diffractive power such that the optical beam passing through the regions 251, 252, and 253 is in a state where spherical aberration can be reduced, and accordingly can be suitably condensed. Note that the optical beam of the first wavelength output from the object lens 234 is not only in a state of a predetermined divergent angle, but also is in a state of aperture restriction.

The optical beam condensed at the first optical disc 11 is reflected at the signal recording face, passes through the object lens 234, redirecting mirror 244, quarter-wave plate 243, and collimator lens 242, is reflected off of the mirror face 238a of the third beam splitter 238, and is output to the photosensor 245 side.

The optical beam split from the optical path of the outgoing optical beam reflected off of the third beam splitter 238 is condensed on the photoreception face of the photodetector 245 by the multi-lens 246, and detected.

Next, description will be made regarding the optical path at the time of emitting an optical beam of the second wavelength to the second optical disc 12 and reading or writing information. The disc type determination unit 22 which has determined that the type of the optical disc 2 is the second optical disc 12 causes the optical beam of the second wavelength to be emitted from the second emitting unit of the second light source 232.

The optical beam of the second wavelength emitted form the second emitting unit is split into three beams by the second grating 240, for detection of tracking error signals and so forth, and is input to the first beam splitter 236. The optical beam of the second wavelength which has been input to the first beam splitter 236 is transmitted through a mirror face 236a thereof, also transmitted through the mirror face 237a of the second beam splitter 237, and is output to the third beam splitter 238 side.

The optical beam of the second wavelength which is input to the third beam splitter 238 is transmitted through the mirror face 238a thereof, output to the collimator lens 242 side, where the divergent angle is converted by the collimator lens 242 so as to be in a state of diffused light, provided with a predetermined phase difference at the quarter-wave plate 243, reflected off of the redirecting mirror 244, and output to the object lens 234 side.

The optical beam of the second wavelength which is input to the object lens 234 is diffused with the optical beam which has passed through each region thereof having a predetermined diffraction order dominant therein as described above, due to the first and second diffraction regions 251 and 252 of the diffraction unit 250 provided on the incident side face thereof, and also suitably condensed on the signal recording face of the second optical disc 12 due to the refractive power of the lens curved face of the object lens 234. At this time, the optical beam of the second wavelength is provided with diffractive power such that the optical beam passing through the first and second diffraction regions 251 and 252 is in a state where spherical aberration can be reduced, and accordingly can be suitably condensed. Also note that the diffracted light due to the optical beam of the second wavelength which having passed through the third diffraction region 253 is in a state of not being condensed on the signal recording face of the second optical disc, i.e., suitable aperture restriction advantages can be had, due to the advantages of the above-described flaring.

The return optical path of the optical beam reflected off of the signal recording face of the second optical disc 12 is the same as with the case of the above-described optical beam of the first wavelength, and accordingly description thereof will be omitted.

Next, description will be made regarding the optical path at the time of emitting an optical beam of the third wavelength to the third optical disc 13 and reading or writing information. The disc type determination unit 22 which has determined that the type of the optical disc 2 is the third optical disc 13 causes the optical beam of the third wavelength to be emitted from the third emitting unit of the third light source 233.

The optical beam of the third wavelength emitted form the third emitting unit is split into three beams by the third grating 241, for detection of tracking error signals and so forth, and is input to the first beam splitter 236. The optical beam of the third wavelength which has been input to the first beam splitter 236 is reflected off of the mirror face 236a thereof, transmitted through the mirror face 237a of the second beam splitter 237, and is output to the third beam splitter 238 side.

The optical beam of the third wavelength which is input to the third beam splitter 238 is transmitted through the mirror face 238a thereof, output to the collimator lens 242 side, where the divergent angle is converted by the collimator lens 242 so as to be in a diffused light state, provided with a predetermined phase difference at the quarter-wave plate 243, reflected off of the redirecting mirror 244, and output to the object lens 234 side.

The optical beam of the third wavelength which is input to the object lens 234 is diffused with the optical beam which has passed through each region thereof having a predetermined diffraction order dominant therein as described above, due to the first diffraction region 251 of the diffraction unit 250 provided on the incident side face thereof, and also suitably condensed on the signal recording face of the third optical disc 13 due to the refractive power of the lens curved face of the object lens 234. At this time, the optical beam of the third wavelength is provided with diffractive power such that the optical beam passing through the first diffraction region 251 is in a state where spherical aberration can be reduced, and accordingly can be suitably condensed. Also note that the diffracted light due to the optical beam of the third wavelength which having passed through the second and third diffraction regions 252 and 253 is in a state of not being condensed on the signal recording face of the third optical disc 13, i.e., suitable aperture restriction advantages can be had, due to the advantages of the above-described flaring.

The return optical path of the optical beam reflected off of the signal recording face of the third optical disc 13 is the same as with the case of the above-described optical beam of the first wavelength, and accordingly description thereof will be omitted.

Note that while a configuration has been described here wherein the optical beam of the second and third wavelengths have the position of the second and/or third emitting units adjusted such that the optical beam of which the divergent angle is converted by the collimator lens 242 and input to the object lens 234 is in a diffused state as to generally parallel light, a configuration may be made wherein the optical beam is input to the object lens 234 by providing an element which has wavelength selectivity and converts the divergent angle, or by providing a mechanism which drives the collimator lens 242 in the optical axis direction in a diffused or converged state.

Also, while description has been made regarding a configuration wherein the optical beam of the first wavelength is input to the object lens 234 in a state of generally parallel light, the optical beams of the second and third wavelengths are input to the object lens 234 in a state of diffused light, the present invention is not restricted to this arrangement, and configurations may be made wherein, for example, the first through third wavelength optical beams are selectively input to the object lens 234 in a state of diffused light, parallel light, or converged light.

The optical pickup 203 to which the present invention has been applied has first through third emitting units for emitting optical beams of first through third wavelengths, an object lens 234 for condensing the optical beams of first through third wavelengths emitted from the first through third emitting units into a signal recording face of an optical disc, and a diffraction unit 250 provided on one face of the object lens 234 serving as an optical element disposed on the outgoing optical path of the optical beams of first through third wavelengths, wherein the diffraction unit 250 has first through third diffraction regions 251, 252, and 253, with the first through third diffraction regions 251, 252, and 253 being different diffraction structures ring shaped and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having difference usage wavelengths can be appropriately condensed on the signal recording face using a common object lens 234, thereby realizing excellent recording and/or playing of information signals to/from the respective optical discs by realizing three-wavelength compatibility with the common object lens 234, without necessitating a complex structure.

That is to say, the optical pickup 203 to which the present invention has been applied obtains optimal diffraction efficiencies and diffraction angels for the first through third wavelength optical beams due to the diffraction unit 250 provided on one face within the optical path thereof, whereby signals can be read from and written to the multiple types of optical discs 11, 12, and 13, using the optical beams of different wavelengths emitted from the multiple emitting units provided to each of the light sources 231, 232, and 233, and also optical parts such as the object lens 234 and so forth can be shared, thereby reducing the number of parts, simplifying and reducing the size of the configuration, and realizing high production and lower costs.

Also, the optical pickup 203 to which the present invention has been applied is configured having the relation $k1i \geq k2i > k3i$ for the predetermined diffraction orders ($k1i$, $k2i$, $k3i$) selected by the first diffraction region 251 serving as the inner ring zone, so condensing diffracted light in a state in which spherical aberration can be reduced on the signal recording face of the corresponding optical discs maximizes diffraction efficiency, which is to say in the case of using the third wavelength $\lambda 3$, the focal distance can be prevented from becoming too long as to the first wavelength $\lambda 1$ in order to ensure operating distance thereof, thereby preventing problems such as the lens diameter of the object lens being large, the overall size of the optical pickup being large, and so forth. Reducing the lens diameter of the object lens facilitates design of the actuator, and the focal distance can be shortened, thereby obtaining excellent aberration properties. Accordingly, information signals can be suitably recorded to and/or played from respective optical discs with excellent compatibility being realized, the configuration can be further simplified and the size reduced, realizing high productivity and low costs.

Also, the optical pickup 203 to which the present invention has been applied is configured such that, of the diffraction orders ($k1i$, $k2i$, $k3i$) selected by the first diffraction region 251 serving as the inner ring zone, $k1i$ and $k3i$ are (−2, −3), (−1, −2), (−1, −3), (0, −2), (0, −3), (1, −2), (1, −3), (2, −1), (2, −2), (2, −3), (3, 0), (3, −1), (3, −2), or (3, −3), thereby preventing problems such as the lens diameter of the object lens being large, the overall size of the device being large, and so forth, with the operating distance and focal distance for each wavelength being in a suitable state, and additionally, the grooves are prevented from becoming too deep, whereby the manufacturing process can be simplified, and also deterioration of forming precision can be prevented. Accordingly, information signals can be suitably recorded to and/or played from respective optical discs with excellent compatibility being realized, the configuration can be simplified and the size reduced while facilitating manufacturing, realizing high productivity and low costs.

Also, the optical pickup 203 to which the present invention has been applied is configured such that the first diffraction region 251 serving as the inner ring zone which provides the three wavelengths with predetermined diffractive power and needs high diffraction efficiency, has formed a stepped diffraction structure, thereby suppressing the amount of diffracted light of unwanted light, preventing deterioration of jittering and the like due to unwanted light being received at the photosensor, and also, even in cases of a certain amount of diffracted light of unwanted light occurring, unwanted light being received at the photosensor at the time of focusing leading to deterioration of jittering and the like can be prevented by making the diffraction order of the unwanted light to be a deviated order with great diffraction angle difference, that is other than an adjacent diffraction order of the focus light.

Also, the optical pickup 203 to which the present invention has been applied is configured having the outer ring zone formed integrally on one face of the object lens 234 and also provided on the outermost side thereof, formed as a blazed form diffraction structure at the third diffraction region 235, which is an advantageous structure in the case of forming a diffraction structure at portions having an extremely steep lens curved surface, such as with a three-wavelength-compatible lens, whereby manufacturing can be facilitated and deterioration in forming precision can be prevented.

Also, the optical pickup 203 to which the present invention has been applied is configured such that the diffraction orders ($k1i$, $k2i$, $k3i$) of light selected by the first diffraction region 251 are (1, −1, −2), (0, −1, −2), (1, −2, −3) or (0, −2, −3), and the diffraction structure is configured in a staircase form, so adverse affects of unwanted light can be suppressed, the operating distance and focal distance for each wavelength can be made to be in a suitable state and the lens diameter of the object lens and the size of the device can be prevented from being large, and additionally, the grooves are prevented from becoming too deep, whereby the manufacturing process can be simplified, and also deterioration of forming precision can be prevented. Accordingly, information signals can be suitably recorded to and/or played from respective optical discs with excellent compatibility being realized, the configuration can be simplified and the size reduced while facilitating manufacturing, realizing high productivity and low costs.

Also, with the optical pickup 203 to which the present invention has been applied, in addition to the diffraction order selected by the inner ring zone, the diffraction orders ($k1m$, $k2m$) of light selected by the second diffraction region 252 serving as the middle ring zone are (+1, +1), (−1, −1), (0, +2), (0, −2), (0, +1), (0, −1), (+1, 0), (−1, 0), (+1, −1), or (−1, +1), and the diffraction structure is configured as a staircase form or non-cyclical form, whereby the functions of the inner ring zone and middle ring zone can be each sufficiently manifested. Accordingly, information signals can be suitably recorded to and/or played from respective optical discs with excellent compatibility being realized, the configuration can be simplified and the size reduced while facilitating manufacturing, realizing high productivity and low costs.

Also, with the optical pickup 203 to which the present invention has been applied, in addition to the diffraction order selected by the inner ring zone, the diffraction orders ($k1m$, $k2m$) of light selected by the second diffraction region 252 serving as the middle ring zone are (+3, +2), (−3, −2), (+2, +1), (−2, −1), (+1, −1), or (−1, −1), and the diffraction structure is configured as a blazed form or non-cyclical form, whereby the functions of the inner ring zone and middle ring zone can be each sufficiently manifested. Accordingly, information signals can be suitably recorded to and/or played from respective optical discs with excellent compatibility being realized, the configuration can be simplified and the size reduced while facilitating manufacturing, realizing high productivity and low costs.

Also, with the optical pickup 203 to which the present invention has been applied, at the time of input of the condensing optical device such as the object lens 234 or the like, the optical beam of the first wavelength is generally parallel light and the optical beams of the second and third wavelengths are input as diffused light, and due to this configuration, the optical beams passing through the first diffraction region 251 serving as the inner ring zone can be suitably condensed on the signal recording face of the corresponding optical disc in a state of high diffractive efficiency and even further reduced spherical aberration, and also the advantages of flaring can be had at the second and third diffraction regions serving as the middle ring zone and outer ring zone, high efficiency and reduced spherical aberration can be realized for optical beams of a predetermined wavelength while the quantity of light input to the corresponding signal recording face can be reduced for optical beams of wavelengths regarding which condensing is undesirable, and further, the freedom of diffraction order selection can be improved and simplification of configuration and so forth realized.

Also, the optical pickup 203 to which the present invention has been applied can share the object lens 234 between the three wavelengths, thereby preventing trouble such as reduction of sensitivity of the actuator due to increased weight of moving parts, and the attachment angle of the actuator to lens holder being unsuitable, and so forth. Also, the optical pickup 203 to which the present invention has been applied can sufficiently reduce spherical aberration which is problematic in the case of sharing the object lens 234 between the three wavelengths, due to the diffraction unit 250 provided on one face of the optical element (object lens 234, diffraction optical element 235B), so problems such as positioning of diffraction units in the event that diffraction units are provided on multiple faces to reduce spherical aberration as with the related art, and deterioration of diffraction efficiency due to providing of the multiple diffraction units and so forth, can be prevented, which realizes simplification of the assembly process and improved usage efficiency of light. Also, with the optical pickup 203 to which the present invention has been applied, a configuration such as described above, wherein the diffraction unit 250 is provided on one face of the optical element enables a configuration having the object lens 234 integrally formed with the diffraction unit 250, realizes further simplification of the configuration, reduction in weight of moving parts of the actuator, simplification of the assembly process, and improved usage efficiency of light.

Further, as shown in FIGS. 58A and 58B described above, with the optical pickup 203 to which the present invention has been applied, the diffraction unit 250 provided on one face of the object lens 234 or diffraction optical element 235B not only realizes three-wavelength compatibility, but also enables aperture restriction by numerical aperture to be performed corresponding to the three types of optical discs and optical beams of the three wavelengths, thereby doing away with the need for aperture restriction filters or the like which have been necessary with the related art, and also adjustment in the positioning thereof, realizing further simplification of the configuration, reduction in size, and reduction in costs.

Also, the optical pickup 203 has been described above with a configuration wherein the first emitting unit is provided at the first light source 231, the second emitting unit is provided at the second light source 232, and the third emitting unit is provided at the third light source 233, the invention is not restricted to this, and an arrangement may be made wherein two emitting units of the first through third emitting units are disposed at one light source and the remaining emitting unit is disposed at another light source, for example.

Next, description will be made regarding an optical pickup 260 shown in FIG. 59 including a light source having a first emitting unit, and a light source having second and third emitting units. Note that portions in the following description which are the same as with the optical pickup 203 will be denoted with the same reference numerals, and description thereof will be omitted.

Figure 59:
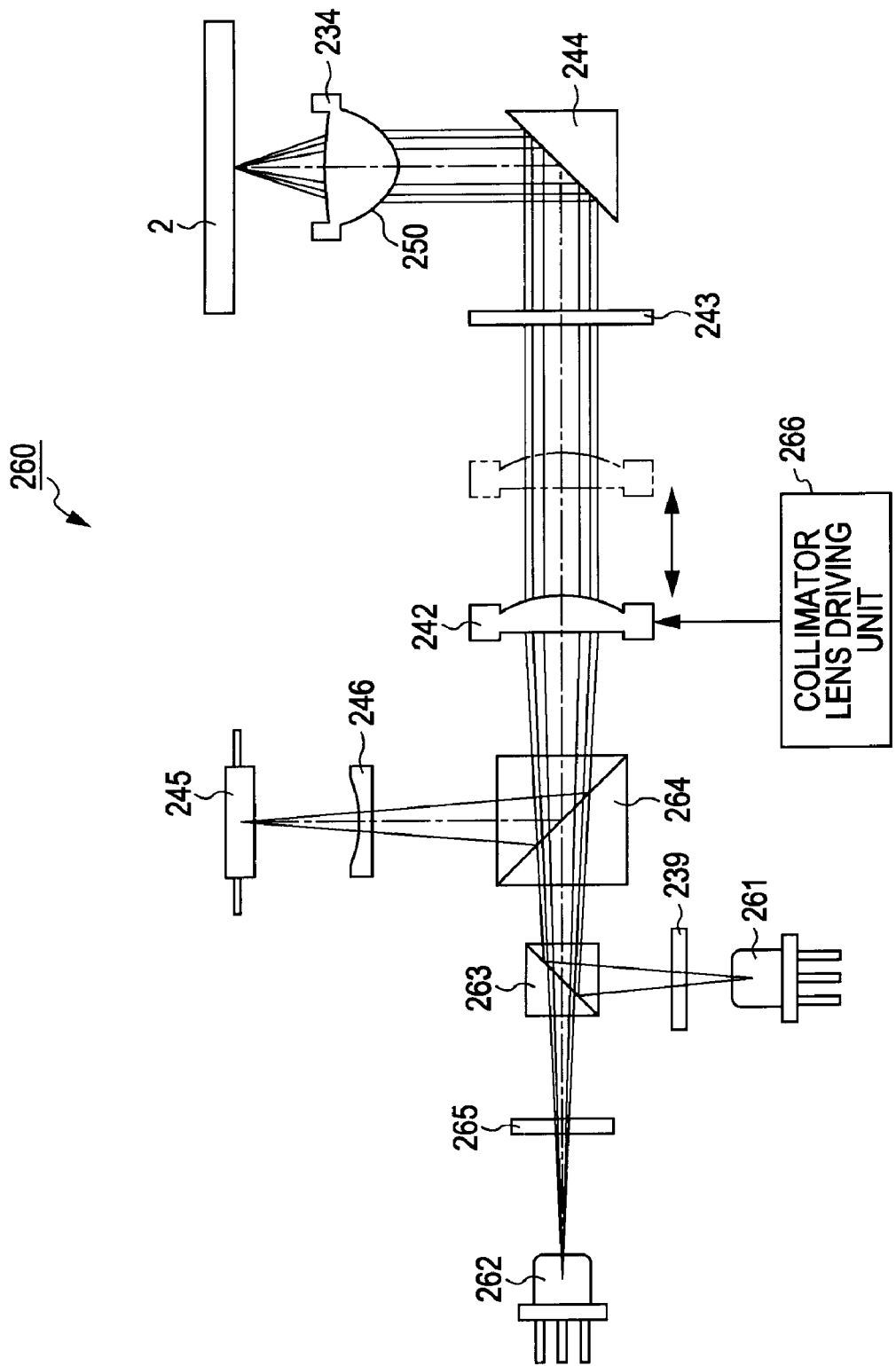
FIG. 59 is an optical path diagram illustrating another example of the optical system of an optical pickup to which the present invention has been applied.
Figure 60:
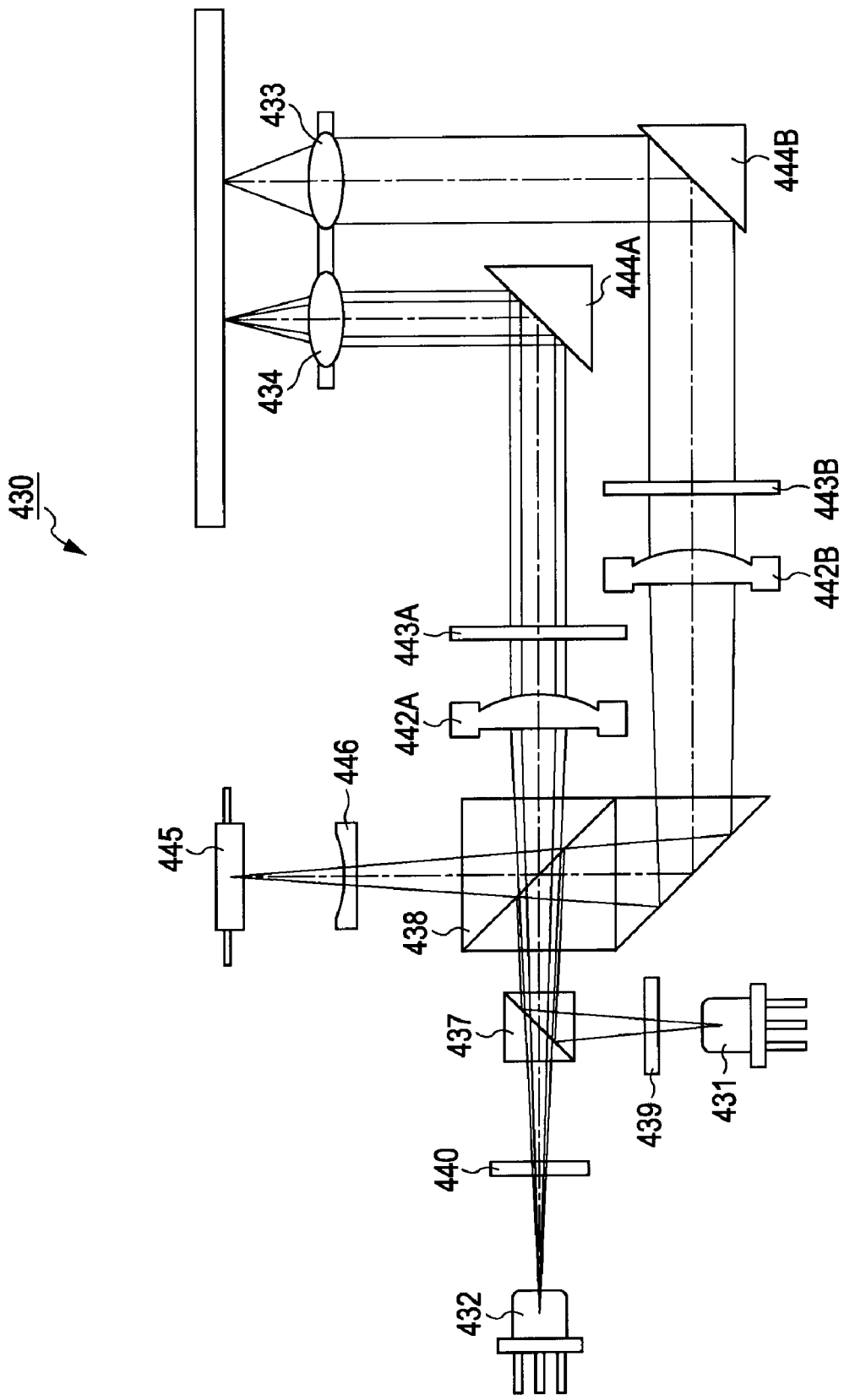
FIG. 60 is an optical path diagram illustrating an example of an optical system of an optical pickup according to the related art.

As shown in FIG. 59, the optical pickup 260 to which the present invention has been applied includes a first light source 261 having a first emitting unit for emitting an optical beam of a first wavelength, a second light source 262 having a second emitting unit for emitting an optical beam of a second wavelength and a third emitting unit for emitting an optical beam of a third wavelength, and an object lens 234 serving as a condensing optical device for condensing optical beams emitted from the first through third emitting units onto the signal recording face of an optical disc 2. Also, with the optical pickup 260 described here as well, a configuration may be made wherein a condensing optical device configured of the object lens 234B and the diffraction optical element 235B having the diffraction unit 250 such as shown in FIG. 58B is provided instead of the object lens 234 having the diffraction unit 250 described here.

Also, the optical pickup 260 includes a beam splitter 263 serving as an optical path synthesizing unit for synthesizing the optical paths of the optical beam of the first wavelength that has been emitted from the first emitting unit of the first light source 261 and the optical beams of the second and third wavelengths that have been emitted from the second and third emitting units of the second light source 262, and a beam splitter 264 serving the same function as the above third beam splitter 238.

Further, the optical pickup 260 has a first grating 239, and a grating 265 with wavelength dependency, provided between the second light source unit 262 and the beam splitter 263, for diffracting the optical beams of the second and third wavelengths that have been emitted from the second and third emitting units into three beams, for detection of tracking error signals and so forth.

Also, the optical pickup 260 has a collimator lens 242, quarter-wave plate 243, redirecting mirror 244, photosensor 245, and multi-lens 246, and also a collimator lens driving unit 266 for driving the collimator lens 242 in the direction of the optical axis. The collimator lens driving unit 266 can adjust the divergent angle of optical beams passing through the collimator lens 242 as described above by driving the collimator lens 242 in the direction of the optical axis, whereby not only can spherical aberration be reduced by inputting each optical beam to the object lens 234 in a predetermined state enabling the above-described flaring, but in the event that the mounted optical disc is a so-called multi-layer optical disc having multiple signal recording faces, recording and/or playing to/from each of the signal recording faces is enabled.

With the optical pickup 260 configured as described above, the functions of each of the optical parts is the same as with the optical pickup 203 except for those mentioned above, and the optical paths of the optical beams of the first through third wavelengths emitted from the first through third emitting units are the same as with the optical pickup 203 except for the above-mentioned, i.e., following synthesizing of the optical paths of the optical beams of each wavelength by the beam splitter 264, so detailed description thereof will be omitted.

The optical pickup 260 to which the present invention has been applied has first through third emitting units for emitting optical beams of first through third wavelengths, an object lens 234 for condensing the optical beams of first through third wavelengths emitted from the first through third emitting units into a signal recording face of an optical disc, and a diffraction unit 250 provided on one face of the object lens 234 serving as an optical element disposed on the outgoing optical path of the optical beams of first through third wavelengths, wherein the diffraction unit 250 has first through third diffraction regions 251, 252, and 253, with the first through third diffraction regions 251, 252, and 253 being different diffraction structures ring shaped and having a predetermined depth, and the first through third diffraction structures whereby optical beams of each wavelength are diffracted such that diffracted light of a predetermined diffraction order is dominant as described above, and according to this configuration, optical beams corresponding to each of three types of optical discs having different usage wavelengths can be appropriately condensed on the signal recording face using the single shared object lens 234, thereby realizing excellent recording and/or playing of information signals to/from the respective optical discs by realizing three-wavelength compatibility with the common object lens 234, without necessitating a complex structure. The optical pickup 260 also has the other advantages of the above-described optical pickup 203, as well.

Further, the optical pickup 260 is configured such that the second and third emitting units are positioned at a common light source 262, thereby realizing further simplification of configuration and reduction in size. Note that in the same way, with the optical pickup to which the present invention has been applied, the first through third emitting units may be positioned at a light source at generally the same position, thereby realizing further simplification of configuration and reduction in size with such a configuration.

The optical disc device 1 to which the present invention has been applied has a driving unit for holding and rotationally driving an optical disc arbitrarily selected from the first through third optical discs, and an optical pickup for performing recording and/or playing of information signals from/to the optical disc being rotationally driven by the driving unit by selectively irradiating one of multiple optical beams of different wavelengths corresponding to the optical disc, and by using the above-described optical pickups 203 or 260 as the optical pickup, optical beams corresponding to each of three types of optical discs having different usage wavelengths can be appropriately condensed on the signal recording face due to the diffraction unit provided on one face of the optical element on the optical path of the optical beams of the first through third wavelengths, using a single shared object lens 234, thereby realizing excellent recording and/or playing properties by realizing three-wavelength compatibility with the common object lens 234, while enabling simplification of the structure and reduction in size, without necessitating a complex structure.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a first emitting unit configured to emit an optical beam of a first wavelength corresponding to a first optical disc having a first transmissive layer;
   a second emitting unit configured to emit an optical beam of a second wavelength which is longer than said first wavelength, corresponding to a second optical disc which is different from said first optical disc and has a second transmissive layer thicker than said first transmissive layer;
   a third emitting unit configured to emit an optical beam of a third wavelength which is longer than second wavelength, corresponding to a third optical disc which is different from said first and second optical discs and has a third transmissive layer thicker than said second transmissive layer;
   an object lens configured to condense optical beams emitted from said first through third emitting units onto a signal recording face of an optical disc; and
   a diffraction unit provided on one face of an optical element or said object lens positioned on the optical path of said optical beams of said first through third wavelengths;
   wherein said diffraction unit includes
      a generally circular first diffraction region provided on the innermost perimeter,
      a ring zone shaped second diffraction region provided on the outer side of said first diffraction region, and
      a ring zone shaped third diffraction region or aspheric continuous region, provided on the outer side of said second diffraction region;
   wherein said first diffraction region has a first diffraction structure formed in a generally circular shape and having a predetermined depth, where the spherical aberration polarity given to the diffracted light of said optical beam of the first wavelength which passes therethrough and is condensed on the signal recording face of said first optical disc via said object lens, is of opposite polarity as to the spherical aberration polarity given to the diffracted light of said optical beam of the second wavelength which passes therethrough and is condensed on the signal recording face of said second optical disc via said object lens, and as to the spherical aberration polarity given to the diffracted light of said of said optical beam of the third wavelength which passes therethrough and is condensed on the signal recording face of said third optical disc via said object lens;
   and wherein said second diffraction region has a second diffraction structure which is different from said first diffraction structure formed in a ring zone shape and having a predetermined depth, which emits diffracted light of an order of said optical beam of the first wavelength which passes therethrough and is condensed on the signal recording face of said first optical disc via said object lens, emits diffracted light of an order of said optical beam of the second wavelength which passes therethrough and is condensed on the signal recording face of said second optical disc via said object lens, and emits diffracted light such that diffracted light of an order other than the order of said optical beam of the third wavelength which passes therethrough and is condensed on the signal recording face of said third optical disc via said object lens is dominant;
   and wherein said third diffraction region
      collects said optical beam of the first wavelength which passes therethrough on the signal recording face of said first optical disc via said object lens,
      does not collect said optical beam of the second wavelength which passes therethrough on the signal recording face of said second optical disc via said object lens, and
      does not collect said optical beam of the third wavelength which passes therethrough on the signal recording face of said third optical disc via said object lens.

2. The optical pickup according to claim 1, wherein said first diffraction region
   emits diffracted light such that diffracted light of an order $k1i$ of said optical beam of the first wavelength which passes therethrough and is condensed on the signal recording face of said first optical disc via said object lens has maximum diffraction efficiency as to diffracted light of the other orders, emits diffracted light such that diffracted light of an order k2$i$ of said optical beam of the second wavelength which passes therethrough and is condensed on the signal recording face of said second optical disc via said object lens has maximum diffraction efficiency as to diffracted light of the other orders, and emits diffracted light such that diffracted light of an order k3$i$ of said optical beam of the third wavelength which passes therethrough and is condensed on the signal recording face of said third optical disc via said object lens has maximum diffraction efficiency as to diffracted light of the other orders;

and wherein said k1$i$ and said k2$i$ are of the opposite sign, and said k2$i$ and said k3$i$ are of the same sign.

3. The optical pickup according to claim 2, wherein said first diffraction region emits diffracted light so as to have the relation of k1$i$>k2$i$>k3$i$ wherein an order diffracting toward the optical axis direction of the input optical beam is a positive order.

4. The optical pickup according to claim 3, wherein
the thickness of said first transmissive layer is around 0.1 mm,
the thickness of said second transmissive layer is around 0.6 mm,
the thickness of said third transmissive layer is around 1.1 mm,
said first wavelength is around 405 nm,
said second wavelength is around 655 nm,
said third wavelength is around 785 nm;
and wherein said k1$i$ and k3$i$ are (1, −2), (1, −3), (2, −1), (2, −2), (2, −3), (3, −1), (3, −2), or (3, −3), respectively.

5. The optical pickup according to claim 3, wherein said first diffraction region has a staircase form diffraction structure formed, in which a staircase structure having a plurality of steps is continuously formed in the radial direction of the ring zone;
and wherein said second diffraction region has a staircase form diffraction structure formed, in which a staircase form having a plurality of steps is continuously formed in the radial direction of the ring zone, or a blazed form;
and wherein said third diffraction region has a diffraction structure formed of a blazed form.

6. The optical pickup according to claim 3, wherein said first diffraction region has a non-cyclical diffraction structure formed, in which a non-cyclical structure is formed in the radial direction of the ring zone;
and wherein said second diffraction region has a non-cyclical diffraction structure formed, in which a non-cyclical structure is formed in the radial direction of the ring zone, or a blazed form;
and wherein said third diffraction region has a diffraction structure formed of a blazed form.

7. The optical pickup according to claim 3, wherein
the thickness of said first transmissive layer is around 0.1 mm,
the thickness of said second transmissive layer is around 0.6 mm,
the thickness of said third transmissive layer is around 1.1 mm,
said first wavelength is around 405 nm,
said second wavelength is around 655 nm,
said third wavelength is around 785 nm;
and wherein said k1$i$, k2$i$, and k3$i$ are (1, −1, −2) or (1, −2, −3), respectively.

8. The optical pickup according to claim 7, wherein said second diffraction region has a staircase form diffraction structure formed, in which a staircase form having a plurality of steps is continuously formed in the radial direction of the ring zone, or a non-cyclical diffraction structure formed, in which a non-cyclical structure is formed in the radial direction of the ring zone;
and wherein said second diffraction region
emits diffracted light such that diffracted light of an order k1$m$ of said optical beam of the first wavelength which passes therethrough and is condensed on the signal recording face of said first optical disc via said object lens has maximum diffraction efficiency as to diffracted light of the other orders, and
emits diffracted light such that diffracted light of an order k2$m$ of said optical beam of the second wavelength which passes therethrough and is condensed on the signal recording face of said second optical disc via said object lens has maximum diffraction efficiency as to diffracted light of the other orders;
and wherein said k1$m$ and k2$m$ are (+1, +1), (−1, −1), (0, +2), (0, −2), (0, +1), (0, −1), (+1, 0), (−1, 0), (+1, −1), or (−1, +1), respectively.

9. The optical pickup according to claim 7, wherein said second diffraction region has a blazed form diffraction structure formed;
and wherein said second diffraction region
emits diffracted light such that diffracted light of an order k1$m$ of said optical beam of the first wavelength which passes therethrough and is condensed on the signal recording face of said first optical disc via said object lens has maximum diffraction efficiency as to diffracted light of the other orders, and
emits diffracted light such that diffracted light of an order k2$m$ of said optical beam of the second wavelength which passes therethrough and is condensed on the signal recording face of said second optical disc via said object lens has maximum diffraction efficiency as to diffracted light of the other orders;
and wherein said k1$m$ and k2$m$ are (+3, +2), (−3, 31 2), (+2, +1), (−2, −1), (+1, +1), or (−1, −1), respectively.

10. The optical pickup according to claim 3, wherein at the time of input to the input side face of the closer-disposed element, of said object lens or the optical element to which said diffraction unit has been provided, to said first through third emitting units, the optical beam of the first wavelength is input as generally parallel light, and the optical beams of the second and third wavelengths as diffused light.

11. The optical pickup according to claim 1, wherein said first through third diffraction regions emit diffracted light such that diffracted light of said optical beams of the first through third wavelengths passing therethrough of an order other than zero order is dominant.

12. The optical pickup according to claim 1, wherein said first through third diffraction regions each have a staircase form diffraction structure formed, in which a staircase form having a plurality of steps is continuously formed in the radial direction of the ring zone.

13. The optical pickup according to claim 1, wherein said first and second diffraction regions each have a staircase form diffraction structure formed, in which a staircase form having a plurality of steps is continuously formed in the radial direction of the ring zone;
and wherein said third diffraction region has a blazed form diffraction structure formed.

14. The optical pickup according to claim 1, further comprising a divergent angle converting element configured to convert the divergent angle of the optical beams emitted from said first through third emitting units;
    wherein said divergent angle converting element converts the divergent angle of said optical beams of the first through third wavelengths, and at the time of input to the input side face of the closer-disposed element of said object lens or the optical element to which said diffraction unit has been provided to said first through third emitting units, the optical beams of the first and second wavelengths are input as generally parallel light, and the optical beam of the third wavelength as converged light or diffused light.

15. The optical pickup according to claim 2, wherein
the thickness of said first transmissive layer is around 0.1 mm,
the thickness of said second transmissive layer is around 0.6 mm,
the thickness of said third transmissive layer is around 1.1 mm,
said first wavelength is around 405 nm,
said second wavelength is around 655 nm,
said third wavelength is around 785 nm;
and wherein said $k1i$, $k2i$, and $k3i$ are (+1, −1, −2), (−1, +1, +2), (+1, −, −2, −3), (−1, +2, +3), (+2, −1, −2), (−2, +1, +2), (+2, −2, −3), or (−2, +2, +3), respectively.

16. The optical pickup according to claim 1, wherein said first through third diffraction regions are formed to a size such that said optical beam of the first wavelength passing therethrough becomes a corresponding first numerical aperture;
    and wherein said first and second diffraction regions are formed to a size such that said optical beam of the second wavelength passing therethrough becomes a corresponding second numerical aperture;
    and wherein said first diffraction region is formed to a size such that said optical beam of the third wavelength passing therethrough becomes a corresponding third numerical aperture.

17. An optical disc device comprising:
driving means configured to hold and rotationally drive an optical disc optionally selected from at least
    a first optical disc having a first transmissive layer,
    a second optical disc of a different type from said first optical disc and having a second transmissive layer thicker than said first transmissive layer, and
    a third optical disc of a different type from said first and second optical discs and having a third transmissive layer thicker than said second transmissive layer; and
an optical pickup configured to selectively irradiate multiple optical beams of different wavelengths to an optical disc rotationally driven by said driving means, so as to record and/or play information signals;
said optical pickup including
a first emitting unit configured to emit an optical beam of a first wavelength corresponding to said first optical disc,
a second emitting unit configured to emit an optical beam of a second wavelength which is longer than said first wavelength, corresponding to said second optical disc,
a third emitting unit configured to emit an optical beam of a third wavelength which is longer than said second wavelength, corresponding to said third optical disc,
an object lens configured to condense optical beams emitted from said first through third emitting units onto a signal recording face of an optical disc, and
a diffraction unit provided on one face of an optical element or said object lens, positioned on the optical path of said optical beams of the first through third wavelengths;
    wherein said diffraction unit includes a generally circular first diffraction region provided on the innermost perimeter, a ring zone shaped second diffraction region provided on the outer side of said first diffraction region, and a ring zone shaped third diffraction region or aspheric continuous region provided on the outer side of said second diffraction region;
    wherein with said first diffraction region, the spherical aberration polarity given to the diffracted light of said optical beam of the first wavelength which passes therethrough and is condensed on the signal recording face of said first optical disc via said object lens, is of opposite polarity as to the spherical aberration polarity given to the diffracted light of said optical beam of the second wavelength which passes therethrough and is condensed on the signal recording face of said second optical disc via said object lens, and as to the spherical aberration polarity given to the diffracted light of said of said optical beam of the third wavelength which passes therethrough and is condensed on the signal recording face of said third optical disc via said object lens;
    and wherein said second diffraction region has a second diffraction structure which is different from said first diffraction structure formed in a ring zone shape and having a predetermined depth, which emits diffracted light of an order of said optical beam of the first wavelength which passes therethrough and is condensed on the signal recording face of said first optical disc via said object lens, emits diffracted light of an order of said optical beam of the second wavelength which passes therethrough and is condensed on the signal recording face of said second optical disc via said object lens, and emits diffracted light such that diffracted light of an order other than the order of said optical beam of the third wavelength which passes therethrough and is condensed on the signal recording face of said third optical disc via said object lens is dominant;
    and wherein said third diffraction region
        collects said optical beam of the first wavelength which passes therethrough on the signal recording face of said first optical disc via said object lens,
        does not collect said optical beam of the second wavelength which passes therethrough on the signal recording face of said second optical disc via said object lens, and
        does not collect said optical beam of the third wavelength which passes therethrough on the signal recording face of said third optical disc via said object lens.

18. An object lens used with an optical pickup configured to irradiate optical beams on at least
    a first optical disc having a first transmissive layer,
    a second optical disc of a different type from said first optical disc and having a second transmissive layer thicker than said first transmissive layer, and
    a third optical disc of a different type from said first and second optical discs and having a third transmissive layer thicker than said second transmissive layer; and
    so as to record and/or play information signals, with said object lens condensing
    an optical beam of a first wavelength corresponding to said first optical disc,
    an optical beam of a second wavelength which is longer than said first wavelength, corresponding to said second optical disc, and
    an optical beam of a third wavelength which is longer than said second wavelength, corresponding to said third optical disc, onto a signal recording face of a corresponding optical disc, said object lens comprising:

a diffraction unit provided on the input side face or output side face;

wherein said diffraction unit includes a generally circular first diffraction region provided on the innermost perimeter, a ring zone shaped second diffraction region provided on the outer side of said first diffraction region, and a ring zone shaped third diffraction region or aspheric continuous region provided on the outer side of said second diffraction region;

wherein with said first diffraction region, the spherical aberration polarity given to the diffracted light of said optical beam of the first wavelength which passes therethrough and is condensed on the signal recording face of said first optical disc via said object lens, is of opposite polarity as to the spherical aberration polarity given to the diffracted light of said optical beam of the second wavelength which passes therethrough and is condensed on the signal recording face of said second optical disc via said object lens, and as to the spherical aberration polarity given to the diffracted light of said of said optical beam of the third wavelength which passes therethrough and is condensed on the signal recording face of said third optical disc via said object lens;

and wherein said second diffraction region has a second diffraction structure which is different from said first diffraction structure formed in a ring zone shape and having a predetermined depth, which emits diffracted light of an order of said optical beam of the first wavelength which passes therethrough and is condensed on the signal recording face of said first optical disc via said object lens, emits diffracted light of an order of said optical beam of the second wavelength which passes therethrough and is condensed on the signal recording face of said second optical disc via said object lens, and emits diffracted light such that diffracted light of an order other than the order of said optical beam of the third wavelength which passes therethrough and is condensed on the signal recording face of said third optical disc via said object lens is dominant;

and wherein said third diffraction region collects said optical beam of the first wavelength which passes therethrough on the signal recording face of said first optical disc via said object lens, does not collect said optical beam of the second wavelength which passes therethrough on the signal recording face of said second optical disc via said object lens, and does not collect said optical beam of the third wavelength which passes therethrough on the signal recording face of said third optical disc via said object lens.

19. The optical lens according to claim 18, wherein said first diffraction region emits diffracted light such that diffracted light of an order $k1i$ of said optical beam of the first wavelength which passes therethrough and is condensed on the signal recording face of said first optical disc via said object lens has maximum diffraction efficiency as to diffracted light of the other orders, emits diffracted light such that diffracted light of an order $k2i$ of said optical beam of the second wavelength which passes therethrough and is condensed on the signal recording face of said second optical disc via said object lens has maximum diffraction efficiency as to diffracted light of the other orders, and emits diffracted light such that diffracted light of an order $k3i$ of said optical beam of the third wavelength which passes therethrough and is condensed on the signal recording face of said third optical disc via said object lens has maximum diffraction efficiency as to diffracted light of the other orders;

and wherein said $k1i$ and said $k2i$ are of the opposite sign, and said $k2i$ and said $k3i$ are of the same sign.

20. The optical lens according to claim 19, wherein said first diffraction region emits diffracted light so as to have the relation of $k1i > k2i > k3i$ wherein an order diffracting toward the optical axis direction of the input optical beam is a positive order.

21. The optical lens according to claim 20, wherein said first diffraction region has a staircase form diffraction structure formed, in which a staircase structure having a plurality of steps is continuously formed in the radial direction of the ring zone;

and wherein said second diffraction region has a staircase form diffraction structure formed, in which a staircase form having a plurality of steps is continuously formed in the radial direction of the ring zone, or a blazed form;

and wherein said third diffraction region has a diffraction structure formed of a blazed form.

22. The optical lens according to claim 20, wherein said first diffraction region has a non-cyclical diffraction structure formed, in which a non-cyclical structure is formed in the radial direction of the ring zone;

and wherein said second diffraction region has a non-cyclical diffraction structure formed, in which a non-cyclical structure is formed in the radial direction of the ring zone, or a blazed form;

and wherein said third diffraction region has a diffraction structure formed of a blazed form.

23. The optical lens according to claim 20, wherein at the time of input to the input side face of the closer-disposed element, of said object lens or the optical element to which said diffraction unit has been provided, to said first through third emitting units, the optical beam of the first wavelength is input as generally parallel light, and the optical beams of the second and third wavelengths as diffused light.

24. The optical lens according to claim 18, wherein said first through third diffraction regions emit diffracted light such that diffracted light of said optical beams of the first through third wavelengths passing therethrough of an order other than zero order is dominant.

25. The optical lens according to claim 18, wherein said first through third diffraction regions each have a staircase form diffraction structure formed, in which a staircase form having a plurality of steps is continuously formed in the radial direction of the ring zone.

26. The optical lens according to claim 18, wherein said first and second diffraction regions each have a staircase form diffraction structure formed, in which a staircase form having a plurality of steps is continuously formed in the radial direction of the ring zone;

and wherein said third diffraction region has a blazed form diffraction structure formed.

27. The optical lens according to claim 18, further comprising a divergent angle converting element configured to convert the divergent angle of the optical beams emitted from said first through third emitting units;

wherein said divergent angle converting element converts the divergent angle of said optical beams of the first through third wavelengths, and at the time of input to the input side face of the closer-disposed element of said object lens or the optical element to which said diffraction unit has been provided to said first through third emitting units, the optical beams of the first and second wavelengths are input as generally parallel light, and the optical beam of the third wavelength as converged light or diffused light.

28. The optical lens according to claim 18, wherein said first through third diffraction regions are formed to a size such that said optical beam of the first wavelength passing therethrough becomes a corresponding first numerical aperture; and wherein said first and second diffraction regions are formed to a size such that said optical beam of the second wavelength passing therethrough becomes a corresponding second numerical aperture; and wherein said first diffraction region is formed to a size such that said optical beam of the third wavelength passing therethrough becomes a corresponding third numerical aperture.

* * * * *